(12) United States Patent
Kelly et al.

(10) Patent No.: US 8,920,236 B2
(45) Date of Patent: Dec. 30, 2014

(54) GAME RELATED SYSTEMS, METHODS, AND ARTICLES THAT COMBINE VIRTUAL AND PHYSICAL ELEMENTS

(75) Inventors: Bryan M. Kelly, Alamo, CA (US); Kenneth J. Eichmann, Egg Harbor Township, NJ (US); Paul J. Ferrara, Mays Landing, NJ (US)

(73) Assignee: Bally Gaming, Inc., Las Vegas, NV (US)

( * ) Notice: Subject to any disclaimer, the term of this patent is extended or adjusted under 35 U.S.C. 154(b) by 1516 days.

(21) Appl. No.: 11/938,203

(22) Filed: Nov. 9, 2007

(65) Prior Publication Data

US 2009/0118005 A1    May 7, 2009

Related U.S. Application Data

(60) Provisional application No. 60/985,178, filed on Nov. 2, 2007.

(51) Int. Cl.
*A63F 9/24* (2006.01)
*G07F 17/00* (2006.01)
*G07F 17/32* (2006.01)
*A63F 3/00* (2006.01)
*A63F 3/04* (2006.01)

(52) U.S. Cl.
CPC ............ *G07F 17/322* (2013.01); *G07F 17/32* (2013.01); *A63F 3/00643* (2013.01); *A63F 3/0423* (2013.01); *A63F 3/00072* (2013.01)
USPC .......................................... 463/31

(58) Field of Classification Search
CPC ............... G07F 17/322; G07F 17/32
USPC ................... 463/16, 25, 29, 30, 34, 36
See application file for complete search history.

(56) References Cited

U.S. PATENT DOCUMENTS

| | | | |
|---|---|---|---|
| 1,361,202 | A | 12/1920 | Thomas |
| 1,599,390 | A | 9/1926 | Albert |
| 1,727,800 | A | 9/1929 | Albert |
| 1,890,504 | A | 12/1932 | Ferguson, Jr. |

(Continued)

FOREIGN PATENT DOCUMENTS

| | | |
|---|---|---|
| DE | 3807127 A1 | 9/1989 |
| DE | 44 39 502 C1 | 9/1995 |

(Continued)

OTHER PUBLICATIONS

U.S. Appl. No. 11/966,840, filed Dec. 28, 2007, Delaney et al.

(Continued)

*Primary Examiner* — Paul A D'Agostino
(74) *Attorney, Agent, or Firm* — Frank Abramonte; Fearon Brown; Marvin Hein

(57) ABSTRACT

Physical objects may be employed with a virtual game layout to enhance wager and non-wagered based gaming. Displays subsystems may provide a changeable or selectable virtual game layout with demarcations appropriate to a selected game. A sensor subsystem may detect physical aspects of game related pieces (e.g., playing cards, chips, markers, dice, spinners, tokens, tiles) as well as media (e.g., identity media, financial media). All gaming functions may occur through interaction with a playing surface, as well as functions such as order food, beverages and services. Automated tracking of players, dealers and games may be realized along with bonusing and promotions.

69 Claims, 36 Drawing Sheets

(56) References Cited

U.S. PATENT DOCUMENTS

| | | | |
|---|---|---|---|
| 2,595,845 A | 5/1952 | Hagwell | |
| 2,663,418 A | 12/1953 | Grunwald | |
| 2,694,662 A | 11/1954 | Hunter, Jr. | 154/121 |
| 3,222,071 A | 12/1965 | Lang | 273/149 |
| 3,377,070 A | 4/1968 | Nottoli | 273/149 |
| 3,401,391 A | 9/1968 | Rice | |
| 3,493,728 A | 2/1970 | Braden et al. | 235/61.11 |
| 3,561,756 A | 2/1971 | Barnett | 271/41 |
| 3,667,759 A | 6/1972 | Barr | 273/152.1 |
| 3,690,670 A | 9/1972 | Cassady et al. | 273/149 P |
| 3,735,982 A | 5/1973 | Gerfin | |
| 3,740,742 A | 6/1973 | Thompson et al. | |
| 3,751,041 A | 8/1973 | Seifert | 273/149 P |
| 3,752,962 A | 8/1973 | Greskovics | 235/61.11 D |
| 3,766,452 A | 10/1973 | Burpee et al. | 317/262 R |
| 3,799,553 A * | 3/1974 | Hurley | 273/141 A |
| 3,810,172 A | 5/1974 | Burpee et al. | 343/5 PD |
| 3,814,436 A | 6/1974 | Boren | 273/149 P |
| 3,907,282 A | 9/1975 | Hunter | 271/233 |
| 3,937,312 A | 2/1976 | Gehrke | |
| 3,994,377 A | 11/1976 | Elmore | |
| 4,023,167 A | 5/1977 | Wahlstrom | |
| 4,026,309 A | 5/1977 | Howard | 133/8 R |
| 4,028,615 A | 6/1977 | Jansen et al. | |
| 4,031,376 A | 6/1977 | Corkin, Jr. | 235/156 |
| 4,135,663 A | 1/1979 | Nojiri et al. | |
| 4,244,582 A | 1/1981 | Raees et al. | 273/293 |
| 4,264,074 A | 4/1981 | Sobajima | |
| 4,339,798 A | 7/1982 | Hedges et al. | 364/412 |
| 4,373,726 A | 2/1983 | Churchill et al. | 273/138 A |
| 4,377,285 A | 3/1983 | Kadlic | 273/148 A |
| 4,428,582 A | 1/1984 | Smith | |
| 4,448,419 A | 5/1984 | Telnaes | 273/143 R |
| 4,467,424 A | 8/1984 | Hedges et al. | |
| 4,510,490 A | 4/1985 | Anderson, III et al. | |
| 4,517,558 A | 5/1985 | Davids | 340/700 |
| 4,517,654 A | 5/1985 | Carmean | 364/521 |
| 4,531,117 A | 7/1985 | Nourse et al. | |
| 4,531,187 A | 7/1985 | Uhland | 364/412 |
| 4,534,562 A | 8/1985 | Cuff et al. | 273/149 P |
| 4,577,152 A | 3/1986 | Macovski | |
| 4,586,712 A | 5/1986 | Lorber et al. | |
| 4,621,814 A | 11/1986 | Stepan et al. | 273/138 A |
| 4,635,937 A | 1/1987 | Dickinson et al. | |
| 4,636,846 A | 1/1987 | Villarreal | 358/100 |
| 4,656,463 A | 4/1987 | Anders et al. | 340/572 |
| 4,659,082 A | 4/1987 | Greenberg | |
| 4,660,025 A | 4/1987 | Humphrey | |
| 4,660,833 A | 4/1987 | Dickinson et al. | |
| 4,662,637 A | 5/1987 | Pfeiffer | 273/149 P |
| 4,667,959 A | 5/1987 | Pfeiffer et al. | 273/149 R |
| 4,693,477 A | 9/1987 | Dickinson et al. | |
| 4,693,480 A | 9/1987 | Smith | 273/296 |
| 4,711,452 A | 12/1987 | Dickinson et al. | |
| 4,721,307 A | 1/1988 | Okada | |
| 4,725,079 A | 2/1988 | Koza et al. | 283/73 |
| 4,727,800 A | 3/1988 | Richmond et al. | |
| 4,728,108 A | 3/1988 | Neuwahl | 273/296 |
| 4,746,830 A | 5/1988 | Holland | |
| 4,750,743 A | 6/1988 | Nicoletti | 273/148 A |
| 4,755,941 A | 7/1988 | Bacchi | 364/412 |
| 4,770,421 A | 9/1988 | Hoffman | |
| 4,802,218 A | 1/1989 | Wright et al. | 380/23 |
| 4,814,589 A | 3/1989 | Storch et al. | 235/375 |
| 4,817,528 A | 4/1989 | Baker | 101/395 |
| 4,822,050 A | 4/1989 | Normand et al. | 273/149 P |
| 4,832,341 A | 5/1989 | Muller et al. | 273/139 |
| D301,592 S | 6/1989 | Needler | |
| 4,837,728 A | 6/1989 | Barrie et al. | |
| 4,859,991 A | 8/1989 | Watkins et al. | |
| 4,861,041 A | 8/1989 | Jones et al. | 273/292 |
| 4,870,391 A | 9/1989 | Cooper | |
| 4,885,700 A | 12/1989 | Kondziolka et al. | 364/519 |
| 4,889,367 A | 12/1989 | Miller | |
| 4,920,335 A | 4/1990 | Andrews | |
| 4,926,996 A | 5/1990 | Eglise et al. | 194/212 |
| 4,948,138 A | 8/1990 | Pease et al. | |
| 4,951,950 A | 8/1990 | Normand et al. | 273/149 P |
| 4,952,799 A | 8/1990 | Loewen | |
| 4,995,615 A | 2/1991 | Cheng | 273/292 |
| 4,998,737 A | 3/1991 | Lamle | |
| 5,007,641 A | 4/1991 | Seidman | 273/138 A |
| 5,007,649 A | 4/1991 | Richardson | |
| 5,031,914 A | 7/1991 | Rosenthal | |
| 5,039,102 A | 8/1991 | Miller | 273/148 R |
| 5,042,809 A | 8/1991 | Richardson | |
| 5,050,881 A | 9/1991 | Nagao | |
| 5,053,612 A | 10/1991 | Pielemeier et al. | 235/462 |
| 5,058,893 A | 10/1991 | Dickinson et al. | |
| 5,067,713 A | 11/1991 | Soules et al. | 273/149 P |
| 5,067,724 A | 11/1991 | Rinkavage | |
| 5,067,725 A | 11/1991 | Leach | |
| 5,083,800 A | 1/1992 | Lockton | 273/439 |
| 5,100,137 A | 3/1992 | Fulton | |
| 5,103,081 A | 4/1992 | Fisher et al. | 235/464 |
| 5,103,234 A | 4/1992 | Watkins et al. | |
| 5,110,134 A | 5/1992 | Laughlin et al. | 273/293 |
| 5,114,153 A | 5/1992 | Rosenwinkel et al. | |
| 5,121,921 A | 6/1992 | Friedman et al. | |
| 5,152,529 A | 10/1992 | Okada | 273/143 R |
| 5,154,419 A | 10/1992 | Madhavan | |
| 5,157,602 A | 10/1992 | Fields et al. | 364/412 |
| 5,166,502 A | 11/1992 | Rendleman et al. | 235/492 |
| 5,167,413 A | 12/1992 | Fulton | |
| 5,175,499 A | 12/1992 | Davies | |
| 5,178,389 A | 1/1993 | Bentley et al. | 273/138 A |
| 5,179,517 A | 1/1993 | Sarbin et al. | 364/410 |
| 5,184,821 A | 2/1993 | Korenek | |
| 5,186,464 A | 2/1993 | Lamle | 273/149 R |
| 5,188,363 A | 2/1993 | Marnell, II et al. | |
| 5,199,710 A | 4/1993 | Lamle | 273/149 R |
| 5,216,234 A | 6/1993 | Bell | 235/494 |
| 5,224,712 A | 7/1993 | Laughlin et al. | 273/304 |
| 5,241,172 A | 8/1993 | Lugaresi | |
| 5,242,163 A | 9/1993 | Fulton | |
| 5,248,142 A | 9/1993 | Breeding | |
| 5,251,897 A | 10/1993 | Fulton | |
| 5,258,837 A | 11/1993 | Gormley | 358/140 |
| 5,259,907 A | 11/1993 | Soules et al. | 156/277 |
| 5,265,874 A | 11/1993 | Dickinson et al. | 273/138 A |
| 5,273,281 A | 12/1993 | Lovell | |
| 5,275,400 A | 1/1994 | Weingardt et al. | 273/85 CP |
| 5,283,422 A | 2/1994 | Storch et al. | 235/375 |
| 5,288,081 A | 2/1994 | Breeding | |
| 5,312,104 A | 5/1994 | Miller | 273/148 R |
| 5,317,149 A | 5/1994 | Uebbing et al. | |
| 5,319,181 A | 6/1994 | Shellhammer et al. | |
| 5,321,241 A | 6/1994 | Craine | 235/380 |
| 5,322,295 A | 6/1994 | Cabot et al. | |
| 5,324,035 A | 6/1994 | Morris et al. | 273/138 A |
| 5,326,104 A | 7/1994 | Pease et al. | 273/138 A |
| 5,332,219 A | 7/1994 | Marnell, II et al. | 273/138 A |
| 5,343,028 A | 8/1994 | Figarella et al. | |
| 5,344,144 A | 9/1994 | Canon | |
| 5,361,885 A | 11/1994 | Modler | |
| 5,362,053 A | 11/1994 | Miller | 273/148 R |
| 5,364,104 A | 11/1994 | Jones et al. | 273/292 |
| 5,374,061 A | 12/1994 | Albrecht | 273/149 R |
| 5,389,945 A | 2/1995 | Sheridon | 345/85 |
| 5,393,057 A | 2/1995 | Marnell, II | |
| 5,393,067 A | 2/1995 | Paulsen et al. | |
| 5,395,111 A | 3/1995 | Inoue | |
| 5,397,133 A | 3/1995 | Penzias | 273/439 |
| 5,398,932 A | 3/1995 | Eberhardt et al. | 273/138 A |
| 5,406,264 A | 4/1995 | Plonsky et al. | 340/572 |
| 5,411,257 A | 5/1995 | Fulton | |
| 5,411,268 A | 5/1995 | Nelson et al. | |
| 5,416,308 A | 5/1995 | Hood et al. | 235/454 |
| 5,417,430 A | 5/1995 | Breeding | |
| 5,417,431 A | 5/1995 | Gluck | 273/293 |
| 5,429,361 A | 7/1995 | Raven et al. | |
| 5,431,399 A | 7/1995 | Kelley | 273/149 P |
| 5,431,407 A | 7/1995 | Hofberg et al. | |
| 5,431,408 A | 7/1995 | Adams | |

(56) References Cited

U.S. PATENT DOCUMENTS

| | | |
|---|---|---|
| 5,437,451 A | 8/1995 | Fulton |
| 5,437,462 A | 8/1995 | Breeding |
| 5,458,333 A | 10/1995 | Takemoto et al. ........ 273/138 A |
| 5,462,277 A | 10/1995 | Takemoto ................ 273/121 B |
| 5,470,079 A | 11/1995 | LeStrange et al. |
| 5,472,194 A | 12/1995 | Breeding et al. .......... 273/138 A |
| 5,486,005 A | 1/1996 | Neal |
| 5,487,544 A | 1/1996 | Clapper, Jr. |
| 5,493,613 A | 2/1996 | Denno et al. .................... 380/24 |
| 5,505,449 A | 4/1996 | Eberhardt et al. ........ 273/138 A |
| 5,505,461 A | 4/1996 | Bell et al. ...................... 273/433 |
| 5,511,784 A | 4/1996 | Furry et al. ............... 273/143 R |
| 5,513,851 A | 5/1996 | Harris .......................... 273/274 |
| 5,518,249 A | 5/1996 | Sines et al. ................... 273/304 |
| 5,534,690 A | 7/1996 | Goldenberg et al. |
| 5,538,803 A | 7/1996 | Gambino et al. |
| 5,544,892 A | 8/1996 | Breeding |
| 5,544,893 A | 8/1996 | Jones et al. |
| 5,548,110 A | 8/1996 | Storch et al. |
| 5,557,280 A | 9/1996 | Marsh et al. |
| 5,559,312 A | 9/1996 | Lucero .......................... 235/380 |
| 5,559,950 A | 9/1996 | Cannon ........................ 395/162 |
| 5,562,284 A | 10/1996 | Stevens ........................ 273/139 |
| 5,564,700 A | 10/1996 | Celona |
| 5,570,885 A | 11/1996 | Ornstein |
| 5,575,474 A | 11/1996 | Rossides |
| 5,581,257 A | 12/1996 | Greene et al. |
| 5,584,764 A | 12/1996 | Inoue |
| 5,586,936 A | 12/1996 | Bennett et al. .................. 463/25 |
| 5,595,538 A | 1/1997 | Haste, III |
| 5,605,334 A | 2/1997 | McCrea, Jr. .................. 273/309 |
| 5,605,506 A | 2/1997 | Hoorn et al. .................... 463/47 |
| 5,609,524 A | 3/1997 | Inoue |
| 5,613,680 A | 3/1997 | Groves et al. .............. 273/138.2 |
| 5,613,912 A | 3/1997 | Slater .............................. 463/25 |
| 5,625,341 A | 4/1997 | Giles et al. |
| 5,630,753 A | 5/1997 | Fuchs ............................... 463/9 |
| 5,632,483 A | 5/1997 | Garczynski et al. ...... 273/148 R |
| 5,632,489 A | 5/1997 | Rozzi, Sr. et al. |
| 5,636,842 A | 6/1997 | Cabot et al. |
| 5,636,843 A | 6/1997 | Roberts ......................... 273/292 |
| 5,639,088 A | 6/1997 | Schneider et al. |
| 5,643,086 A | 7/1997 | Alcorn et al. ................... 463/29 |
| 5,643,088 A | 7/1997 | Vaughn et al. |
| 5,645,486 A | 7/1997 | Nagao et al. .................... 463/27 |
| 5,647,592 A | 7/1997 | Gerow |
| 5,651,548 A * | 7/1997 | French et al. ................... 463/25 |
| 5,653,635 A | 8/1997 | Breeding |
| 5,654,050 A | 8/1997 | Whalen-Shaw ............ 428/35.7 |
| 5,655,961 A | 8/1997 | Acres et al. ..................... 463/27 |
| 5,669,816 A | 9/1997 | Garczynski et al. ............ 463/12 |
| 5,676,376 A | 10/1997 | Valley ........................... 273/288 |
| 5,679,077 A | 10/1997 | Pocock et al. |
| 5,681,039 A | 10/1997 | Miller ....................... 273/148 R |
| 5,685,774 A | 11/1997 | Webb |
| 5,698,839 A | 12/1997 | Jagielinski et al. ........... 235/493 |
| 5,699,066 A | 12/1997 | Marsh et al. |
| 5,702,302 A | 12/1997 | Gauselmann |
| 5,704,835 A | 1/1998 | Dietz, II |
| 5,707,287 A | 1/1998 | McCrea, Jr. .................... 463/27 |
| 5,711,525 A | 1/1998 | Breeding ....................... 273/292 |
| 5,720,484 A | 2/1998 | Hsu |
| 5,722,891 A | 3/1998 | Inoue |
| 5,722,893 A | 3/1998 | Hill et al. ........................ 463/47 |
| 5,732,948 A | 3/1998 | Yoseloff |
| 5,735,525 A | 4/1998 | McCrea, Jr. .................. 273/309 |
| 5,735,742 A | 4/1998 | French ............................ 463/25 |
| 5,741,183 A | 4/1998 | Acres et al. ..................... 463/42 |
| 5,742,656 A | 4/1998 | Mikulak et al. ................. 377/7 |
| 5,743,526 A | 4/1998 | Inoue |
| 5,743,800 A | 4/1998 | Huard et al. .................... 463/26 |
| 5,745,110 A | 4/1998 | Ertemalp ....................... 345/340 |
| 5,752,881 A | 5/1998 | Inoue .............................. 463/20 |
| 5,754,110 A | 5/1998 | Appalucci et al. |
| 5,755,618 A | 5/1998 | Mothwurf ....................... 453/17 |
| 5,757,876 A | 5/1998 | Dam et al. ......................... 377/7 |
| 5,758,875 A | 6/1998 | Giacalone, Jr. ........... 273/143 R |
| 5,759,102 A | 6/1998 | Pease et al. ...................... 463/42 |
| 5,759,103 A | 6/1998 | Freels et al. |
| 5,766,074 A | 6/1998 | Cannon et al. .................. 463/16 |
| 5,766,076 A | 6/1998 | Pease et al. |
| 5,769,458 A | 6/1998 | Carides et al. |
| 5,769,716 A | 6/1998 | Saffari et al. |
| 5,770,533 A | 6/1998 | Franchi .......................... 463/42 |
| 5,770,914 A | 6/1998 | Pease et al. .................... 310/339 |
| 5,772,505 A | 6/1998 | Garczynski et al. ............ 463/12 |
| 5,775,692 A | 7/1998 | Watts et al. |
| 5,779,545 A | 7/1998 | Berg et al. ....................... 463/22 |
| 5,779,546 A | 7/1998 | Meissner et al. ................ 463/25 |
| 5,780,831 A | 7/1998 | Seo et al. |
| 5,781,647 A | 7/1998 | Fishbine et al. ................. 382/1 |
| 5,785,321 A | 7/1998 | van Putten et al. ........... 273/309 |
| 5,788,241 A | 8/1998 | Ung |
| 5,788,573 A | 8/1998 | Baerlocher et al. ............. 463/16 |
| 5,788,574 A | 8/1998 | Ornstein et al. ................ 463/25 |
| 5,791,988 A | 8/1998 | Nomi .............................. 463/11 |
| 5,794,964 A | 8/1998 | Jones et al. |
| 5,795,225 A | 8/1998 | Jones et al. |
| 5,796,389 A | 8/1998 | Bertram et al. ............... 345/173 |
| 5,796,868 A | 8/1998 | Dutta-Choudhury |
| 5,800,268 A | 9/1998 | Molnick ......................... 463/40 |
| 5,801,766 A | 9/1998 | Alden ........................... 348/157 |
| 5,803,453 A | 9/1998 | Stephan et al. ............. 273/138.2 |
| 5,803,808 A | 9/1998 | Strisower ........................ 463/11 |
| 5,803,809 A | 9/1998 | Yoseloff ......................... 463/13 |
| 5,809,482 A | 9/1998 | Strisower ........................ 705/30 |
| 5,812,065 A | 9/1998 | Schrott et al. |
| 5,813,912 A | 9/1998 | Shultz ............................. 463/25 |
| 5,816,918 A | 10/1998 | Kelly et al. ..................... 463/16 |
| 5,823,534 A | 10/1998 | Banyai .......................... 273/269 |
| 5,823,879 A | 10/1998 | Goldberg et al. ............... 463/42 |
| 5,830,064 A | 11/1998 | Bradish et al. .................. 463/22 |
| 5,830,067 A | 11/1998 | Graves et al. ................... 463/40 |
| 5,830,068 A | 11/1998 | Brenner et al. ................. 463/42 |
| 5,831,532 A | 11/1998 | Gambino et al. |
| 5,831,669 A | 11/1998 | Adrain .......................... 348/143 |
| 5,833,536 A | 11/1998 | Davids et al. ................... 463/11 |
| 5,836,586 A | 11/1998 | Marks et al. |
| 5,839,730 A | 11/1998 | Pike |
| 5,842,921 A | 12/1998 | Mindes et al. .................. 463/16 |
| 5,846,132 A | 12/1998 | Junkin |
| 5,847,650 A | 12/1998 | Zhou et al. |
| 5,848,932 A | 12/1998 | Adams |
| 5,851,011 A | 12/1998 | Lott ............................... 273/292 |
| 5,851,148 A | 12/1998 | Brune et al. |
| 5,851,149 A | 12/1998 | Xidos et al. ..................... 463/42 |
| 5,855,515 A | 1/1999 | Pease et al. |
| 5,863,249 A | 1/1999 | Inoue .............................. 463/20 |
| 5,871,213 A | 2/1999 | Chadband et al. ............. 273/292 |
| 5,871,400 A | 2/1999 | Yfantis ............................ 463/22 |
| 5,882,261 A | 3/1999 | Adams |
| 5,885,158 A | 3/1999 | Torango et al. |
| 5,890,963 A | 4/1999 | Yen ................................. 463/42 |
| 5,895,048 A | 4/1999 | Smith, Jr. ...................... 273/293 |
| 5,895,321 A | 4/1999 | Gassies et al. .................. 463/29 |
| 5,895,451 A | 4/1999 | Yamade et al. |
| 5,902,983 A | 5/1999 | Crevelt et al. ................ 235/380 |
| 5,903,874 A | 5/1999 | Leonard et al. ................ 705/14 |
| 5,905,847 A | 5/1999 | Kobayashi et al. |
| 5,909,876 A | 6/1999 | Brown .......................... 273/309 |
| 5,910,048 A | 6/1999 | Feinberg |
| 5,911,418 A | 6/1999 | Adams |
| 5,911,419 A | 6/1999 | Delaney et al. |
| 5,911,626 A | 6/1999 | McCrea, Jr. .................... 463/27 |
| 5,919,088 A | 7/1999 | Weiss |
| 5,919,090 A | 7/1999 | Mothwurf ....................... 463/25 |
| 5,919,091 A | 7/1999 | Bell et al. ........................ 463/25 |
| 5,924,926 A | 7/1999 | Brown ............................ 463/11 |
| 5,931,731 A | 8/1999 | Chwalisz ........................ 453/32 |
| 5,934,676 A | 8/1999 | Rubin ........................... 273/309 |
| 5,934,999 A | 8/1999 | Valdez |
| 5,936,527 A | 8/1999 | Isaacman et al. ........... 340/572.1 |
| 5,941,769 A | 8/1999 | Order .............................. 463/12 |
| 5,941,771 A | 8/1999 | Haste, III |

(56) References Cited

U.S. PATENT DOCUMENTS

| | | | |
|---|---|---|---|
| 5,945,654 A | 8/1999 | Huang | 235/449 |
| 5,947,820 A | 9/1999 | Morro et al. | |
| 5,947,821 A | 9/1999 | Stone | |
| 5,949,050 A | 9/1999 | Fosbenner et al. | 235/449 |
| 5,951,397 A | 9/1999 | Dickinson | 463/36 |
| 5,954,654 A | 9/1999 | Eaton et al. | 600/462 |
| 5,957,776 A | 9/1999 | Hoehne | 463/25 |
| 5,967,893 A | 10/1999 | Lawrence et al. | 463/10 |
| 5,967,894 A | 10/1999 | Kinoshita et al. | 463/13 |
| 5,971,851 A | 10/1999 | Pascal et al. | 463/24 |
| 5,974,135 A | 10/1999 | Breneman et al. | |
| 5,980,384 A | 11/1999 | Barrie | |
| 5,980,385 A | 11/1999 | Clapper, Jr. | |
| 5,984,782 A | 11/1999 | Inoue | |
| 5,989,122 A | 11/1999 | Roblejo | 463/22 |
| 5,999,808 A | 12/1999 | LaDue | 455/412 |
| 6,001,016 A | 12/1999 | Walker et al. | 463/42 |
| 6,003,867 A | 12/1999 | Rodesch et al. | 273/143 R |
| 6,004,205 A | 12/1999 | Lauretta et al. | |
| 6,004,207 A | 12/1999 | Wilson, Jr. et al. | |
| 6,004,208 A | 12/1999 | Takemoto et al. | 463/20 |
| 6,010,404 A | 1/2000 | Walker et al. | 463/21 |
| 6,019,374 A | 2/2000 | Breeding | |
| 6,021,949 A | 2/2000 | Boiron | 235/492 |
| 6,027,115 A | 2/2000 | Griswold et al. | 273/143 R |
| 6,029,891 A * | 2/2000 | Freeman et al. | 235/380 |
| 6,032,955 A | 3/2000 | Luciano et al. | 273/138.1 |
| 6,039,649 A | 3/2000 | Schulze | |
| 6,039,650 A | 3/2000 | Hill | 463/47 |
| 6,041,722 A | 3/2000 | Baker | |
| 6,042,150 A | 3/2000 | Daley | 283/86 |
| 6,045,130 A | 4/2000 | Jones et al. | |
| 6,047,322 A | 4/2000 | Vaid et al. | |
| 6,048,269 A | 4/2000 | Burns et al. | 463/25 |
| 6,050,895 A | 4/2000 | Luciano, Jr. et al. | |
| 6,056,641 A | 5/2000 | Webb | |
| 6,059,289 A | 5/2000 | Vancura | |
| 6,059,658 A | 5/2000 | Mangano et al. | |
| 6,062,481 A | 5/2000 | Storch et al. | |
| 6,062,565 A | 5/2000 | Chadband et al. | 273/292 |
| 6,062,979 A | 5/2000 | Inoue | |
| 6,062,981 A | 5/2000 | Luciano, Jr. | 463/26 |
| 6,068,262 A | 5/2000 | Goldfarb et al. | |
| 6,068,552 A | 5/2000 | Walker et al. | 463/21 |
| 6,068,553 A | 5/2000 | Parker | 463/27 |
| 6,070,878 A | 6/2000 | Jones et al. | |
| 6,077,161 A | 6/2000 | Wisler | 463/11 |
| 6,080,063 A | 6/2000 | Khosla | 463/42 |
| 6,083,105 A | 7/2000 | Ronin et al. | 463/17 |
| 6,086,477 A | 7/2000 | Walker et al. | |
| 6,089,978 A | 7/2000 | Adams | |
| 6,089,980 A | 7/2000 | Gauselmann | 463/27 |
| 6,093,103 A | 7/2000 | McCrea, Jr. | 463/27 |
| 6,099,407 A | 8/2000 | Parker, Jr. et al. | |
| 6,102,394 A | 8/2000 | Wurz et al. | 273/138.2 |
| 6,102,799 A | 8/2000 | Stupak | 463/27 |
| 6,104,815 A | 8/2000 | Alcorn et al. | |
| 6,105,962 A | 8/2000 | Malavazos et al. | |
| 6,105,964 A | 8/2000 | Maahs | 273/292 |
| 6,106,396 A | 8/2000 | Alcorn et al. | |
| 6,110,041 A | 8/2000 | Walker et al. | 463/20 |
| 6,110,043 A | 8/2000 | Olsen | 463/27 |
| 6,113,098 A | 9/2000 | Adams | |
| 6,113,492 A | 9/2000 | Walker et al. | |
| 6,113,493 A | 9/2000 | Walker et al. | |
| 6,117,009 A | 9/2000 | Yoseloff | 463/20 |
| 6,117,012 A | 9/2000 | McCrea, Jr. | |
| 6,120,377 A | 9/2000 | McGinnis, Sr. et al. | |
| 6,123,333 A | 9/2000 | McGinnis, Sr. et al. | |
| 6,126,166 A | 10/2000 | Lorson et al. | 273/148 R |
| 6,126,542 A | 10/2000 | Fier | |
| 6,135,453 A | 10/2000 | Srichayaporn | 273/292 |
| 6,135,884 A | 10/2000 | Hedrick et al. | 463/20 |
| 6,135,887 A | 10/2000 | Pease et al. | 463/42 |
| 6,142,872 A | 11/2000 | Walker et al. | |
| 6,142,876 A | 11/2000 | Cumbers | |
| 6,144,300 A | 11/2000 | Dames | |
| 6,145,835 A | 11/2000 | Such | |
| 6,145,838 A | 11/2000 | White | 273/295 |
| 6,146,273 A | 11/2000 | Olsen | 463/27 |
| 6,149,154 A | 11/2000 | Grauzer et al. | 273/149 R |
| 6,149,155 A | 11/2000 | Hoyt et al. | |
| 6,149,522 A | 11/2000 | Alcorn et al. | |
| 6,152,822 A | 11/2000 | Herbert | 463/22 |
| 6,152,824 A | 11/2000 | Rothschild et al. | 463/42 |
| 6,154,131 A | 11/2000 | Jones, II et al. | 340/540 |
| 6,155,925 A | 12/2000 | Giobbi et al. | |
| 6,159,096 A | 12/2000 | Yoseloff | 463/20 |
| 6,162,121 A | 12/2000 | Morro et al. | |
| 6,165,069 A | 12/2000 | Sines et al. | 463/12 |
| 6,165,070 A | 12/2000 | Nolte et al. | |
| 6,166,763 A | 12/2000 | Rhodes et al. | 348/143 |
| 6,168,520 B1 | 1/2001 | Baerlocher et al. | |
| 6,168,523 B1 | 1/2001 | Piechowiak et al. | 463/26 |
| 6,179,711 B1 | 1/2001 | Yoseloff | |
| 6,183,361 B1 | 2/2001 | Cummings et al. | |
| 6,183,362 B1 | 2/2001 | Boushy | |
| 6,183,366 B1 | 2/2001 | Goldberg et al. | 463/42 |
| 6,183,631 B1 | 2/2001 | Cormier et al. | |
| 6,185,184 B1 | 2/2001 | Mattaway et al. | |
| 6,186,892 B1 | 2/2001 | Frank et al. | 463/19 |
| 6,186,894 B1 | 2/2001 | Mayeroff | |
| 6,186,895 B1 | 2/2001 | Oliver | 463/25 |
| 6,190,256 B1 | 2/2001 | Walker et al. | 463/25 |
| 6,193,607 B1 | 2/2001 | Kay | 463/22 |
| 6,196,547 B1 | 3/2001 | Pascal et al. | 273/292 |
| 6,200,218 B1 | 3/2001 | Lindsay | 463/25 |
| 6,201,532 B1 | 3/2001 | Tode et al. | 345/156 |
| 6,203,427 B1 | 3/2001 | Walker et al. | |
| 6,203,430 B1 | 3/2001 | Walker et al. | |
| 6,206,780 B1 | 3/2001 | Awada | 463/13 |
| 6,206,782 B1 | 3/2001 | Walker et al. | |
| 6,210,275 B1 | 4/2001 | Olsen | |
| 6,210,277 B1 | 4/2001 | Stefan | 463/27 |
| 6,210,279 B1 | 4/2001 | Dickinson | 463/37 |
| 6,213,875 B1 | 4/2001 | Suzuki | 463/20 |
| 6,213,877 B1 | 4/2001 | Walker et al. | |
| 6,217,447 B1 | 4/2001 | Lofink et al. | 463/12 |
| 6,219,836 B1 | 4/2001 | Wells et al. | 717/11 |
| 6,220,959 B1 | 4/2001 | Holmes, Jr. et al. | |
| 6,224,483 B1 | 5/2001 | Mayeroff | |
| 6,224,484 B1 | 5/2001 | Okuda et al. | |
| 6,227,969 B1 | 5/2001 | Yoseloff | |
| 6,227,970 B1 | 5/2001 | Shimizu et al. | 463/20 |
| 6,227,971 B1 | 5/2001 | Weiss | |
| 6,227,972 B1 | 5/2001 | Walker et al. | 463/25 |
| 6,234,898 B1 | 5/2001 | Belamant et al. | 463/25 |
| 6,237,916 B1 | 5/2001 | Webb | |
| 6,244,958 B1 | 6/2001 | Acres | 463/26 |
| 6,248,016 B1 | 6/2001 | Walker et al. | |
| 6,250,632 B1 | 6/2001 | Albrecht | 273/149 R |
| 6,251,014 B1 | 6/2001 | Stockdale et al. | 463/16 |
| 6,254,096 B1 | 7/2001 | Grauzer et al. | 273/149 R |
| 6,254,483 B1 | 7/2001 | Acres | |
| 6,254,484 B1 | 7/2001 | McCrea, Jr. | 463/27 |
| 6,256,651 B1 | 7/2001 | Tuli | |
| 6,264,109 B1 | 7/2001 | Chapet et al. | 235/492 |
| 6,264,561 B1 | 7/2001 | Saffari et al. | 463/42 |
| 6,267,248 B1 | 7/2001 | Johnson et al. | 209/547 |
| 6,267,671 B1 | 7/2001 | Hogan | 463/25 |
| 6,273,424 B1 | 8/2001 | Breeding | |
| 6,282,522 B1 | 8/2001 | Davis et al. | |
| 6,283,856 B1 | 9/2001 | Mothwurf | 463/17 |
| 6,286,834 B1 | 9/2001 | Caputo | |
| 6,287,202 B1 | 9/2001 | Pascal et al. | 463/42 |
| 6,290,603 B1 | 9/2001 | Luciano, Jr. | |
| 6,293,864 B1 | 9/2001 | Romero | 463/12 |
| 6,299,170 B1 | 10/2001 | Yoseloff | |
| 6,299,534 B1 | 10/2001 | Breeding et al. | 463/25 |
| 6,299,536 B1 | 10/2001 | Hill | 463/47 |
| 6,302,790 B1 | 10/2001 | Brossard | 463/20 |
| 6,302,793 B1 | 10/2001 | Fertitta, III et al. | 463/25 |
| 6,305,689 B1 | 10/2001 | Webb | |
| 6,307,473 B1 | 10/2001 | Zampini et al. | |

(56) References Cited

U.S. PATENT DOCUMENTS

| | | | |
|---|---|---|---|
| 6,309,300 B1 | 10/2001 | Glavich | |
| 6,311,976 B1 | 11/2001 | Yoseloff et al. | |
| 6,312,332 B1 | 11/2001 | Walker et al. | 463/23 |
| 6,312,334 B1 | 11/2001 | Yoseloff | 463/25 |
| 6,313,871 B1 | 11/2001 | Schubert | 348/143 |
| 6,315,664 B1 | 11/2001 | Baerlocher et al. | 463/21 |
| 6,315,666 B1 | 11/2001 | Mastera et al. | 463/31 |
| 6,318,721 B1 | 11/2001 | Randall et al. | |
| 6,319,124 B1 | 11/2001 | Baerlocher et al. | 463/20 |
| 6,322,078 B1 | 11/2001 | Adams | |
| 6,328,649 B1 | 12/2001 | Randall et al. | |
| 6,331,143 B1 | 12/2001 | Yoseloff | |
| 6,334,613 B1 | 1/2002 | Yoseloff | |
| 6,334,614 B1 | 1/2002 | Breeding | |
| 6,334,814 B1 | 1/2002 | Adams | |
| 6,336,858 B1 | 1/2002 | Yoseloff | |
| 6,336,863 B1 | 1/2002 | Baerlocher et al. | |
| 6,345,823 B1 | 2/2002 | Webb | |
| 6,346,043 B1 | 2/2002 | Colin et al. | |
| 6,346,044 B1 | 2/2002 | McCrea, Jr. | 463/27 |
| 6,347,738 B1 | 2/2002 | Crevelt et al. | 235/380 |
| 6,350,199 B1 | 2/2002 | Williams et al. | 463/16 |
| 6,352,261 B1 | 3/2002 | Brown | 273/288 |
| 6,357,746 B1 | 3/2002 | Sadowski | 273/148 R |
| 6,358,146 B1 | 3/2002 | Adams | |
| 6,361,044 B1 | 3/2002 | Block et al. | 273/149 R |
| 6,361,437 B1 | 3/2002 | Walker et al. | |
| 6,362,836 B1 | 3/2002 | Shaw et al. | |
| 6,364,767 B1 | 4/2002 | Brossard et al. | 463/20 |
| 6,368,216 B1 | 4/2002 | Hedrick et al. | 463/20 |
| 6,371,379 B1 | 4/2002 | Dames et al. | |
| 6,371,482 B1 | 4/2002 | Hall, Jr. | 273/138.1 |
| 6,371,867 B1 | 4/2002 | Webb | |
| 6,375,187 B1 | 4/2002 | Baerlocher | |
| 6,375,569 B1 | 4/2002 | Acres | |
| 6,375,570 B1 | 4/2002 | Poole | |
| 6,380,953 B1 | 4/2002 | Mizuno | |
| 6,383,076 B1 | 5/2002 | Tiedeken | 463/40 |
| 6,386,973 B1 | 5/2002 | Yoseloff | 463/13 |
| 6,386,974 B1 | 5/2002 | Adams | 463/16 |
| 6,389,126 B1 | 5/2002 | Bjornberg et al. | |
| 6,390,921 B1 * | 5/2002 | Busch et al. | 463/42 |
| 6,394,900 B1 | 5/2002 | McGlone et al. | 463/20 |
| 6,394,902 B1 | 5/2002 | Glavich | 463/20 |
| 6,394,907 B1 | 5/2002 | Rowe | 463/42 |
| 6,398,220 B1 | 6/2002 | Inoue | 273/142 R |
| 6,400,272 B1 | 6/2002 | Holtzman et al. | 340/572.1 |
| 6,401,099 B1 | 6/2002 | Koppolu et al. | |
| 6,402,142 B1 | 6/2002 | Warren et al. | 273/149 R |
| 6,403,908 B2 | 6/2002 | Stardust et al. | 209/587 |
| 6,406,023 B1 | 6/2002 | Rowe | |
| 6,406,369 B1 | 6/2002 | Baerlocher et al. | 463/20 |
| 6,409,595 B1 | 6/2002 | Uihlein et al. | 463/29 |
| 6,409,602 B1 | 6/2002 | Wiltshire et al. | 463/42 |
| 6,413,161 B1 | 7/2002 | Baerlocher et al. | |
| 6,413,162 B1 | 7/2002 | Baerlocher et al. | 463/20 |
| 6,416,408 B2 | 7/2002 | Tracy et al. | |
| 6,419,583 B1 | 7/2002 | Crumby et al. | |
| 6,425,817 B1 | 7/2002 | Momemy | 453/17 |
| 6,425,824 B1 | 7/2002 | Baerlocher et al. | 463/16 |
| 6,435,970 B1 | 8/2002 | Baerlocher et al. | |
| 6,437,692 B1 | 8/2002 | Petite et al. | |
| 6,439,995 B1 | 8/2002 | Hughs-Baird et al. | |
| 6,443,452 B1 | 9/2002 | Brune | |
| 6,443,839 B2 | 9/2002 | Stockdale et al. | 463/16 |
| 6,446,864 B1 | 9/2002 | Kim et al. | 235/382 |
| 6,454,266 B1 | 9/2002 | Breeding et al. | |
| 6,454,649 B1 | 9/2002 | Mattice et al. | 463/17 |
| 6,454,651 B1 | 9/2002 | Yoseloff | |
| 6,457,715 B1 | 10/2002 | Friedman | 273/274 |
| 6,459,882 B1 | 10/2002 | Palermo | |
| 6,460,848 B1 | 10/2002 | Soltys et al. | 273/149 R |
| 6,461,241 B1 | 10/2002 | Webb et al. | |
| 6,464,581 B1 | 10/2002 | Yoseloff | 463/20 |
| 6,464,582 B1 | 10/2002 | Baerlocher et al. | |
| 6,464,584 B2 | 10/2002 | Oliver | 463/25 |
| 6,468,155 B1 | 10/2002 | Zucker et al. | 463/23 |
| 6,468,156 B1 | 10/2002 | Hughs-Baird et al. | 463/25 |
| 6,471,208 B2 | 10/2002 | Yoseloff et al. | 273/143 R |
| 6,471,591 B1 | 10/2002 | Crumby | |
| 6,476,798 B1 | 11/2002 | Bertram et al. | 345/174 |
| 6,478,676 B1 | 11/2002 | Dayan | |
| 6,483,519 B1 | 11/2002 | Long et al. | |
| 6,485,366 B1 | 11/2002 | Rowe | |
| 6,486,655 B1 | 11/2002 | Crossfield | |
| 6,490,285 B2 | 12/2002 | Lee et al. | |
| 6,494,454 B2 | 12/2002 | Adams | |
| 6,494,785 B1 | 12/2002 | Gerrard et al. | |
| 6,497,408 B1 | 12/2002 | Walker et al. | |
| 6,502,116 B1 | 12/2002 | Kelly et al. | 708/250 |
| 6,503,147 B1 | 1/2003 | Stockdale et al. | 463/29 |
| 6,505,772 B1 | 1/2003 | Mollett et al. | 235/379 |
| 6,506,118 B1 | 1/2003 | Baerlocher et al. | |
| 6,508,709 B1 | 1/2003 | Karmarkar | 463/42 |
| 6,508,710 B1 | 1/2003 | Paravia et al. | |
| 6,511,375 B1 | 1/2003 | Kaminkow | 463/20 |
| 6,514,140 B1 | 2/2003 | Storch | 463/25 |
| 6,514,141 B1 | 2/2003 | Kaminkow et al. | |
| 6,516,350 B1 | 2/2003 | Lumelsky et al. | |
| 6,517,435 B2 | 2/2003 | Soltys et al. | 463/25 |
| 6,517,436 B2 | 2/2003 | Soltys et al. | 463/29 |
| 6,517,437 B1 | 2/2003 | Wells et al. | 463/30 |
| 6,520,856 B1 | 2/2003 | Walker et al. | |
| 6,520,857 B2 | 2/2003 | Soltys et al. | |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,530,842 B1 | 3/2003 | Wells et al. | 463/46 |
| 6,532,297 B1 | 3/2003 | Lindquist | 382/100 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,547,131 B1 | 4/2003 | Foodman et al. | 235/380 |
| 6,547,247 B2 | 4/2003 | Hoyt et al. | |
| 6,554,703 B1 | 4/2003 | Bussick et al. | 463/20 |
| 6,558,254 B2 | 5/2003 | Baelocher et al. | 463/20 |
| 6,561,897 B1 | 5/2003 | Bourbour et al. | 463/13 |
| 6,561,900 B1 | 5/2003 | Baerlocher et al. | |
| 6,561,908 B1 | 5/2003 | Hoke | 463/35 |
| 6,565,433 B1 | 5/2003 | Baerlocher et al. | |
| 6,565,436 B1 | 5/2003 | Baerlocher | |
| 6,567,159 B1 | 5/2003 | Corech | |
| 6,568,678 B2 | 5/2003 | Breeding et al. | 273/149 R |
| 6,569,015 B1 | 5/2003 | Baerlocher et al. | |
| 6,572,204 B1 | 6/2003 | Hedrick et al. | 312/223.1 |
| 6,572,472 B1 | 6/2003 | Glavich | |
| 6,572,473 B1 | 6/2003 | Baerlocher | |
| 6,575,541 B1 | 6/2003 | Hedrick et al. | 312/223.1 |
| 6,575,829 B2 | 6/2003 | Coleman et al. | |
| 6,575,830 B2 | 6/2003 | Baerlocher et al. | |
| 6,575,834 B1 | 6/2003 | Lindo | 463/40 |
| 6,579,179 B2 | 6/2003 | Poole et al. | 463/25 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,582,301 B2 | 6/2003 | Hill | 463/11 |
| 6,582,306 B1 | 6/2003 | Kaminkow | |
| 6,582,307 B2 | 6/2003 | Webb | 463/22 |
| 6,585,588 B2 | 7/2003 | Hartl | |
| 6,585,591 B1 | 7/2003 | Baerlocher et al. | |
| 6,585,592 B1 | 7/2003 | Crumby | |
| 6,585,598 B2 | 7/2003 | Nguyen et al. | 463/41 |
| 6,588,750 B1 | 7/2003 | Grauzer et al. | 273/149 R |
| 6,588,751 B1 | 7/2003 | Grauzer et al. | 273/149 R |
| 6,592,458 B1 | 7/2003 | Ho | |
| 6,595,854 B2 | 7/2003 | Hughs-Baird et al. | |
| 6,595,857 B2 | 7/2003 | Soltys et al. | 463/29 |
| 6,599,185 B1 | 7/2003 | Kaminkow et al. | 463/16 |
| 6,599,191 | 7/2003 | Breeding et al. | 463/25 |
| 6,599,192 B1 | 7/2003 | Baerlocher et al. | |
| 6,599,193 B2 | 7/2003 | Baerlocher et al. | |
| 6,602,135 B1 | 8/2003 | Gerrard | |
| 6,602,136 B1 | 8/2003 | Baerlocher et al. | |

(56) References Cited

U.S. PATENT DOCUMENTS

| | | |
|---|---|---|
| 6,602,137 B2 | 8/2003 | Kaminkow et al. |
| 6,604,741 B1 | 8/2003 | Snow |
| 6,605,000 B2 | 8/2003 | Adams |
| 6,605,002 B2 | 8/2003 | Baerlocher ............... 463/25 |
| 6,607,438 B2 | 8/2003 | Baerlocher et al. |
| 6,607,441 B1 | 8/2003 | Acres ........................ 463/25 |
| 6,609,974 B2 | 8/2003 | Mead et al. |
| 6,609,978 B1 | 8/2003 | Paulsen ..................... 463/42 |
| 6,612,928 B1 | 9/2003 | Bradford et al. .......... 463/29 |
| 6,620,046 B2 | 9/2003 | Rowe ......................... 463/25 |
| 6,620,047 B1 | 9/2003 | Alcorn et al. ............. 463/37 |
| 6,623,357 B2 | 9/2003 | Chowdhury ............... 463/25 |
| 6,626,750 B2 | 9/2003 | Momemy |
| 6,628,939 B2 | 9/2003 | Paulsen ..................... 455/414 |
| 6,629,184 B1 | 9/2003 | Berg et al. ................. 710/306 |
| 6,629,591 B1 | 10/2003 | Griswold et al. .......... 194/205 |
| 6,629,889 B2 | 10/2003 | Mothwurf .................. 463/25 |
| 6,632,139 B1 | 10/2003 | Baerlocher |
| 6,632,141 B2 | 10/2003 | Webb et al. |
| 6,634,943 B1 | 10/2003 | Baerlocher |
| 6,634,945 B2 | 10/2003 | Glavich et al. |
| 6,638,161 B2 | 10/2003 | Soltys et al. .............. 463/12 |
| 6,638,164 B2 | 10/2003 | Randall et al. |
| 6,638,169 B2 | 10/2003 | Wilder et al. |
| 6,638,170 B1 | 10/2003 | Crumby ..................... 463/42 |
| 6,645,073 B2 | 11/2003 | Lemay et al. |
| 6,645,077 B2 | 11/2003 | Rowe ......................... 463/42 |
| 6,645,078 B1 | 11/2003 | Mattice ..................... 463/42 |
| 6,648,753 B1 | 11/2003 | Tracy et al. |
| 6,648,754 B2 | 11/2003 | Baerlocher et al. |
| 6,651,981 B2 | 11/2003 | Grauzer et al. ........... 273/149 R |
| 6,651,982 B1 | 11/2003 | Grauzer et al. ........... 273/149 R |
| 6,651,985 B2 | 11/2003 | Sines et al. ................ 273/309 |
| 6,652,378 B2 | 11/2003 | Cannon et al. ............ 463/20 |
| 6,652,379 B2 | 11/2003 | Soltys et al. .............. 463/22 |
| 6,655,684 B2 | 12/2003 | Grauzer et al. ........... 273/149 R |
| 6,656,040 B1 | 12/2003 | Brosnan et al. ........... 463/16 |
| 6,656,041 B1 | 12/2003 | Kaminkow et al. ....... 463/16 |
| 6,656,048 B2 | 12/2003 | Olsen ........................ 463/25 |
| 6,659,461 B2 | 12/2003 | Yoseloff et al. |
| 6,659,864 B2 | 12/2003 | McGahn et al. .......... 463/16 |
| 6,659,875 B2 | 12/2003 | Purton |
| 6,663,488 B1 | 12/2003 | Adams |
| 6,663,489 B2 | 12/2003 | Baerlocher |
| 6,663,490 B2 | 12/2003 | Soltys et al. .............. 463/25 |
| 6,666,766 B2 | 12/2003 | Baerlocher et al. |
| 6,669,559 B1 | 12/2003 | Baerlocher et al. |
| 6,672,960 B1 | 1/2004 | B-Jensen ................... 463/20 |
| 6,675,152 B1 | 1/2004 | Prasad et al. ............. 705/64 |
| 6,676,127 B2 | 1/2004 | Johnson et al. ........... 273/149 R |
| 6,676,510 B1 | 1/2004 | Bittman et al. |
| 6,676,516 B2 | 1/2004 | Baerlocher et al. ....... 463/25 |
| 6,676,522 B2 | 1/2004 | Rowe et al. ............... 463/42 |
| 6,682,419 B2 | 1/2004 | Webb et al. |
| 6,682,420 B2 | 1/2004 | Webb et al. |
| 6,682,421 B1 | 1/2004 | Rowe et al. ............... 463/25 |
| 6,682,423 B2 | 1/2004 | Brosnan et al. ........... 463/29 |
| 6,683,321 B2 | 1/2004 | Livingston et al. |
| 6,685,189 B2 | 2/2004 | Cherven .................... 273/304 |
| 6,685,564 B2 | 2/2004 | Oliver ....................... 463/25 |
| 6,685,567 B2 | 2/2004 | Cockerille et al. ........ 463/43 |
| 6,685,568 B2 | 2/2004 | Soltys et al. .............. 463/47 |
| 6,688,975 B2 | 2/2004 | Baerlocher et al. |
| 6,688,977 B1 | 2/2004 | Baerlocher et al. |
| 6,688,979 B2 | 2/2004 | Soltys et al. .............. 463/25 |
| 6,690,156 B1 | 2/2004 | Weiner et al. |
| 6,692,354 B2 | 2/2004 | Tracy et al. |
| 6,692,355 B2 | 2/2004 | Baerlocher et al. |
| 6,692,356 B2 | 2/2004 | Baerlocher et al. ....... 463/20 |
| 6,695,695 B2 | 2/2004 | Angel |
| 6,695,696 B1 | 2/2004 | Kaminkow ................ 463/16 |
| 6,695,699 B2 | 2/2004 | Beaulieu ................... 463/25 |
| 6,695,703 B1 | 2/2004 | McGahn ................... 463/46 |
| 6,698,759 B2 | 3/2004 | Webb et al. ............... 273/292 |
| 6,699,128 B1 | 3/2004 | Beadell et al. ............ 463/46 |
| 6,702,291 B2 | 3/2004 | Grebler et al. ............ 273/292 |
| 6,702,409 B2 | 3/2004 | Hedrick et al. ........... 312/223.1 |
| 6,702,667 B2 | 3/2004 | Mattice et al. ............ 463/16 |
| 6,702,672 B1 | 3/2004 | Angell et al. |
| 6,702,675 B2 | 3/2004 | Poole et al. |
| 6,709,332 B2 | 3/2004 | Adams |
| 6,712,693 B1 | 3/2004 | Hettinger .................. 463/20 |
| 6,712,694 B1 | 3/2004 | Nordman ................... 463/20 |
| 6,712,695 B2 | 3/2004 | Mothwurf et al. ........ 463/25 |
| 6,712,696 B2 | 3/2004 | Soltys et al. .............. 463/25 |
| 6,712,698 B2 | 3/2004 | Paulsen et al. ............ 463/30 |
| 6,718,361 B1 | 4/2004 | Basani et al. ............. 709/201 |
| 6,719,632 B2 | 4/2004 | Palmer et al. |
| 6,722,974 B2 | 4/2004 | Sines et al. ................ 463/12 |
| 6,722,976 B2 | 4/2004 | Adams ...................... 463/16 |
| 6,722,981 B2 | 4/2004 | Kaminkow et al. |
| 6,722,982 B2 | 4/2004 | Kaminkow et al. |
| 6,722,983 B2 | 4/2004 | Kaminkow et al. |
| 6,722,985 B2 | 4/2004 | Criss-Puszkiewicz et al. |
| 6,726,099 B2 | 4/2004 | Becker et al. ............. 235/380 |
| 6,726,205 B1 | 4/2004 | Purton ....................... 273/148 R |
| 6,726,427 B2 | 4/2004 | Jarvis et al. |
| 6,726,563 B1 | 4/2004 | Baerlocher et al. |
| 6,726,565 B2 | 4/2004 | Hughs-Baird |
| 6,728,740 B2 | 4/2004 | Kelly et al. ............... 708/250 |
| 6,729,956 B2 | 5/2004 | Wolf et al. ................ 463/25 |
| 6,729,961 B1 | 5/2004 | Millerschone ............ 463/30 |
| 6,731,313 B1 | 5/2004 | Kaminkow ................ 345/839 |
| 6,733,386 B2 | 5/2004 | Cuddy et al. |
| 6,733,389 B2 | 5/2004 | Webb et al. |
| 6,734,843 B2 | 5/2004 | Bertram et al. ........... 345/173 |
| 6,735,183 B2 | 5/2004 | O'Toole et al. |
| 6,739,973 B1 | 5/2004 | Lucchesi et al. |
| 6,739,975 B2 | 5/2004 | Nguyen et al. ........... 463/39 |
| 6,743,102 B1 | 6/2004 | Fiechter et al. ........... 463/42 |
| 6,745,330 B1 | 6/2004 | Maillot |
| 6,746,328 B2 | 6/2004 | Cannon et al. ............ 463/17 |
| 6,746,330 B2 | 6/2004 | Cannon ..................... 463/25 |
| 6,749,502 B2 | 6/2004 | Baerlocher |
| 6,749,504 B2 | 6/2004 | Hughs-Baird |
| 6,752,312 B1 | 6/2004 | Chamberlain et al. .... 235/375 |
| 6,755,741 B1 | 6/2004 | Rafaeli ...................... 463/25 |
| 6,758,747 B2 | 7/2004 | Baerlocher |
| 6,758,750 B2 | 7/2004 | Baerlocher et al. |
| 6,758,751 B2 | 7/2004 | Soltys et al. .............. 463/29 |
| 6,761,632 B2 | 7/2004 | Bansemer et al. ........ 463/16 |
| 6,769,982 B1 | 8/2004 | Brosnan |
| 6,769,983 B2 | 8/2004 | Slomiany |
| 6,769,985 B1 | 8/2004 | Laakso et al. ............ 463/25 |
| 6,789,801 B2 | 9/2004 | Snow |
| 6,800,029 B2 | 10/2004 | Rowe et al. ............... 463/25 |
| 6,808,173 B2 | 10/2004 | Snow |
| 6,811,486 B1 | 11/2004 | Luciano, Jr. .............. 463/24 |
| 6,811,488 B2 | 11/2004 | Paravia et al. ............ 463/42 |
| 6,812,824 B1 | 11/2004 | Goldinger et al. |
| 6,817,948 B2 | 11/2004 | Pascal et al. .............. 463/42 |
| 6,823,419 B2 | 11/2004 | Berg et al. ................. 710/306 |
| 6,837,789 B2 | 1/2005 | Garahi et al. ............. 463/29 |
| 6,846,238 B2 | 1/2005 | Wells |
| 6,848,994 B1 | 2/2005 | Knust et al. ............... 463/25 |
| 6,857,961 B2 | 2/2005 | Soltys et al. .............. 463/47 |
| 6,866,581 B2 | 3/2005 | Martinek et al. ......... 463/16 |
| 6,866,586 B2 | 3/2005 | Oberberger et al. ...... 463/42 |
| 6,874,786 B2 | 4/2005 | Bruno et al. |
| 6,884,170 B2 | 4/2005 | Rowe |
| 6,884,173 B2 | 4/2005 | Gauselmann .............. 463/42 |
| 6,884,174 B2 | 4/2005 | Lundy et al. .............. 463/42 |
| 6,887,157 B2 | 5/2005 | LeMay et al. ............. 463/32 |
| 6,889,979 B2 | 5/2005 | Blaha et al. ............... 273/149 R |
| 6,896,618 B2 | 5/2005 | Benoy et al. .............. 463/25 |
| 6,899,627 B2 | 5/2005 | Lam et al. ................. 463/40 |
| 6,902,481 B2 | 6/2005 | Breckner et al. ......... 463/30 |
| 6,905,411 B2 | 6/2005 | Nguyen et al. ........... 463/25 |
| 6,908,387 B2 | 6/2005 | Hedrick et al. ........... 463/31 |
| 6,923,446 B2 | 8/2005 | Snow |
| 6,923,719 B2 | 8/2005 | Wolf ......................... 463/16 |
| 6,925,701 B2 | 8/2005 | Eckstein et al. |
| 6,938,900 B2 | 9/2005 | Snow |
| 6,947,513 B2 | 9/2005 | O'Toole et al. |

(56) References Cited

U.S. PATENT DOCUMENTS

| | | | |
|---|---|---|---|
| 6,955,599 B2 | 10/2005 | Bourbour et al. | 463/13 |
| 6,960,134 B2 | 11/2005 | Hartl et al. | |
| 6,964,612 B2 | 11/2005 | Soltys et al. | 463/47 |
| 6,969,319 B2 | 11/2005 | Rowe et al. | |
| 6,970,141 B2 | 11/2005 | Copeland et al. | |
| 6,971,956 B2 | 12/2005 | Rowe et al. | 463/25 |
| 6,972,682 B2 | 12/2005 | Lareau et al. | 340/568.1 |
| 6,982,415 B2 | 1/2006 | Kovtoun | |
| 6,986,514 B2 | 1/2006 | Snow | |
| 6,987,261 B2 | 1/2006 | Horning et al. | |
| 6,991,540 B2 | 1/2006 | Marlow | 463/16 |
| 6,991,544 B2 | 1/2006 | Soltys et al. | 463/42 |
| 6,993,587 B1 | 1/2006 | Basani et al. | 709/229 |
| 6,997,803 B2 | 2/2006 | LeMay et al. | 463/20 |
| 7,000,921 B2 | 2/2006 | Schultz | |
| 7,005,985 B1 | 2/2006 | Steeves | 340/572.1 |
| 7,009,496 B2 | 3/2006 | Arneson et al. | |
| 7,011,309 B2 | 3/2006 | Soltys et al. | 273/149 R |
| 7,013,469 B2 | 3/2006 | Smith et al. | |
| 7,025,674 B2 | 4/2006 | Adams et al. | 463/1 |
| 7,027,996 B2 | 4/2006 | Levinson | |
| 7,028,910 B2 | 4/2006 | Reignoux et al. | |
| 7,029,009 B2 | 4/2006 | Grauzer et al. | 273/149 P |
| 7,035,626 B1 | 4/2006 | Luciano, Jr. | 455/414.1 |
| 7,036,818 B2 | 5/2006 | Grauzer et al. | 273/149 R |
| 7,037,195 B2 | 5/2006 | Schneider et al. | |
| 7,040,139 B2 | 5/2006 | Sunshine | |
| 7,048,630 B2 | 5/2006 | Berg et al. | 463/30 |
| 7,050,056 B2 | 5/2006 | Meyringer | 345/440 |
| 7,055,823 B2 | 6/2006 | Denkewicz, Jr. | |
| 7,062,470 B2 | 6/2006 | Prasad et al. | 705/64 |
| 7,063,615 B2 | 6/2006 | Alcorn et al. | 463/1 |
| 7,063,617 B2 | 6/2006 | Brosnan et al. | 463/25 |
| 7,073,791 B2 | 7/2006 | Grauzer et al. | 273/149 R |
| 7,075,440 B2 | 7/2006 | Fabian et al. | |
| 7,077,332 B2 | 7/2006 | Verschuur et al. | 235/492 |
| 7,086,947 B2 | 8/2006 | Walker et al. | 463/25 |
| 7,099,035 B2 | 8/2006 | Brooks et al. | 358/1.15 |
| 7,100,184 B1 | 8/2006 | Kahn | |
| 7,103,438 B2 | 9/2006 | Hallowell et al. | |
| 7,112,138 B2 | 9/2006 | Hedrick et al. | 463/29 |
| 7,114,718 B2 | 10/2006 | Grauzer et al. | 273/149 R |
| 7,119,685 B2 | 10/2006 | Eckstein et al. | |
| 7,120,879 B2 | 10/2006 | Gutberlet et al. | |
| 7,137,627 B2 | 11/2006 | Grauzer et al. | 273/149 R |
| 7,147,558 B2 | 12/2006 | Giobbi | 463/25 |
| 7,156,735 B2 | 1/2007 | Brosnan et al. | |
| 7,168,089 B2 | 1/2007 | Nguyen et al. | 726/4 |
| 7,172,197 B2 | 2/2007 | Wilson et al. | |
| 7,175,522 B2 | 2/2007 | Hartl | |
| 7,186,181 B2 | 3/2007 | Rowe | 463/42 |
| 7,187,289 B2 | 3/2007 | Eckstein et al. | |
| 7,198,571 B2 | 4/2007 | LeMay et al. | |
| 7,201,656 B2 | 4/2007 | Darder | 463/16 |
| RE39,644 E | 5/2007 | Alcorn et al. | 380/251 |
| 7,213,812 B2 | 5/2007 | Schubert et al. | 273/149 R |
| 7,222,852 B2 | 5/2007 | Soltys et al. | 273/148 R |
| 7,234,698 B2 | 6/2007 | Grauzer et al. | |
| 7,246,799 B2 | 7/2007 | Snow | |
| 7,255,344 B2 | 8/2007 | Grauzer et al. | 273/149 R |
| 7,260,834 B1 | 8/2007 | Carlson | |
| 7,264,241 B2 | 9/2007 | Schubert et al. | 273/149 R |
| 7,271,727 B2 | 9/2007 | Steeves | 340/572.7 |
| 7,275,988 B2 | 10/2007 | Aida et al. | 463/20 |
| 7,278,917 B2 | 10/2007 | McGlone et al. | |
| 7,278,923 B2 | 10/2007 | Grauzer et al. | 463/47 |
| 7,291,068 B2 | 11/2007 | Bryant et al. | 463/25 |
| 7,300,352 B2 | 11/2007 | Rowe | |
| 7,303,475 B2 | 12/2007 | Britt et al. | 463/42 |
| 7,309,065 B2 | 12/2007 | Yoseloff et al. | 273/292 |
| 7,311,598 B2 | 12/2007 | Kaminkow et al. | 463/16 |
| 7,311,605 B2 | 12/2007 | Moser | 463/25 |
| 7,316,615 B2 | 1/2008 | Soltys et al. | 463/25 |
| 7,322,576 B2 | 1/2008 | Grauzer et al. | 273/149 R |
| 7,329,185 B2 | 2/2008 | Conover et al. | |
| 7,330,822 B1 | 2/2008 | Robson et al. | 705/9 |
| 7,331,520 B2 | 2/2008 | Silva et al. | 235/381 |
| 7,331,579 B2 | 2/2008 | Snow | |
| 7,331,859 B2 | 2/2008 | Hornik et al. | |
| 7,337,330 B2 | 2/2008 | Gatto et al. | |
| 7,341,254 B2 | 3/2008 | Loewenstein et al. | |
| 7,346,682 B2 | 3/2008 | Basani et al. | 709/224 |
| 7,349,920 B1 | 3/2008 | Feinberg et al. | 707/102 |
| 7,351,145 B1 | 4/2008 | Ornstein et al. | 463/25 |
| 7,351,147 B2 | 4/2008 | Stockdale et al. | 463/29 |
| 7,353,183 B1 | 4/2008 | Musso | |
| 7,356,770 B1 | 4/2008 | Jackson | 715/736 |
| 7,363,342 B1 | 4/2008 | Wang et al. | 709/204 |
| 7,364,510 B2 | 4/2008 | Walker et al. | 463/42 |
| 7,367,885 B2 | 5/2008 | Escalera et al. | 463/32 |
| 7,370,282 B2 | 5/2008 | Cary | 715/772 |
| 7,382,910 B2 | 6/2008 | Donders | |
| 7,384,044 B2 | 6/2008 | Grauzer et al. | 273/149 R |
| 7,384,339 B2 | 6/2008 | LeMay et al. | 463/30 |
| 7,390,256 B2 | 6/2008 | Soltys et al. | 463/12 |
| 7,398,327 B2 | 7/2008 | Lee | 709/250 |
| 7,399,226 B2 | 7/2008 | Mishra | |
| 7,404,763 B2 | 7/2008 | Malone et al. | 463/13 |
| 7,404,765 B2 | 7/2008 | Soltys et al. | 463/25 |
| 7,407,438 B2 | 8/2008 | Schubert et al. | 463/22 |
| 7,410,422 B2 | 8/2008 | Fine | 463/42 |
| 7,419,428 B2 | 9/2008 | Rowe | 463/25 |
| 7,422,522 B2 | 9/2008 | Fujimoto et al. | 463/16 |
| 7,427,233 B2 | 9/2008 | Walker et al. | 463/16 |
| 7,427,234 B2 | 9/2008 | Soltys et al. | 463/16 |
| 7,427,236 B2 | 9/2008 | Kaminkow et al. | 463/26 |
| 7,434,805 B2 | 10/2008 | Grauzer et al. | 273/149 R |
| 7,435,179 B1 | 10/2008 | Ford | |
| 7,438,221 B2 | 10/2008 | Washington et al. | |
| 7,438,643 B2 | 10/2008 | Brosnan et al. | 463/42 |
| 7,448,626 B2 | 11/2008 | Fleckenstein | 273/149 R |
| 7,455,591 B2 | 11/2008 | Nguyen | 463/42 |
| 7,458,890 B2 | 12/2008 | Loose et al. | |
| 7,460,863 B2 | 12/2008 | Steelberg et al. | 455/419 |
| 7,465,231 B2 | 12/2008 | Lewin et al. | 463/37 |
| 7,473,178 B2 | 1/2009 | Boyd et al. | 463/25 |
| 7,481,430 B1 | 1/2009 | Jackson et al. | |
| 7,483,394 B2 | 1/2009 | Chang et al. | 370/254 |
| 7,485,043 B2 | 2/2009 | Beaulieu et al. | |
| 7,494,413 B2 | 2/2009 | Singer et al. | |
| 7,500,915 B2 | 3/2009 | Wolf et al. | |
| 7,510,186 B2 | 3/2009 | Fleckenstein | |
| 7,510,194 B2 | 3/2009 | Soltys et al. | |
| 7,510,474 B2 | 3/2009 | Carter, Sr. | 463/29 |
| 7,515,718 B2 | 4/2009 | Nguyen et al. | 380/278 |
| 7,523,935 B2 | 4/2009 | Grauzer et al. | |
| 7,523,937 B2 | 4/2009 | Fleckenstein | |
| 7,525,283 B2 | 4/2009 | Cheng et al. | 320/108 |
| 7,534,169 B2 | 5/2009 | Amaitis et al. | 463/39 |
| 7,540,806 B2 | 6/2009 | Tastad | 463/46 |
| 7,549,576 B2 | 6/2009 | Alderucci et al. | 235/380 |
| 7,559,839 B2 | 7/2009 | Bahar | 463/25 |
| 7,566,274 B2 | 7/2009 | Johnson et al. | 463/42 |
| 7,575,234 B2 | 8/2009 | Soltys et al. | |
| 7,577,847 B2 | 8/2009 | Nguyen et al. | |
| 7,578,739 B2 | 8/2009 | Gauselmann | 463/27 |
| 7,585,217 B2 | 9/2009 | Lutnick et al. | 463/16 |
| 7,585,220 B2 | 9/2009 | Loose et al. | |
| 7,594,030 B2 | 9/2009 | Teodosiu et al. | |
| 7,607,976 B2 | 10/2009 | Baerlocher et al. | |
| 7,607,977 B2 | 10/2009 | Baerlocher et al. | |
| 7,610,549 B2 | 10/2009 | Vignet | |
| 7,611,407 B1 | 11/2009 | Itkis et al. | 463/29 |
| 7,611,409 B2 | 11/2009 | Muir et al. | 463/29 |
| 7,617,151 B2 | 11/2009 | Rowe | 705/39 |
| 7,618,317 B2 | 11/2009 | Jackson | |
| 7,621,809 B2 | 11/2009 | Baerlocher et al. | |
| 7,629,886 B2 | 12/2009 | Steeves | 340/572.1 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,666,081 B2 | 2/2010 | Baerlocher et al. | |
| 7,674,179 B2 | 3/2010 | Baerlocher et al. | |

(56) References Cited

U.S. PATENT DOCUMENTS

| | | | |
|---|---|---|---|
| 7,684,874 B2 | 3/2010 | Schlottmann et al. | 700/9 |
| 7,685,516 B2 | 3/2010 | Fischer | |
| 7,685,593 B2 | 3/2010 | Solomon et al. | 717/170 |
| 7,686,688 B2 | 3/2010 | Friedman et al. | 463/25 |
| 7,688,322 B2 | 3/2010 | Kapler et al. | |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,702,719 B1 | 4/2010 | Betz et al. | |
| 7,706,895 B2 | 4/2010 | Callaghan | |
| 7,712,050 B2 | 5/2010 | Gutberlet et al. | |
| 7,722,453 B2 | 5/2010 | Lark et al. | 463/16 |
| 7,730,198 B2 | 6/2010 | Ruppert et al. | 709/230 |
| 7,736,221 B2 | 6/2010 | Black et al. | 463/13 |
| 7,736,223 B2 | 6/2010 | Pace | 463/19 |
| 7,744,462 B2 | 6/2010 | Grav et al. | 463/27 |
| 7,747,741 B2 | 6/2010 | Basani et al. | 709/224 |
| 7,753,781 B2 | 7/2010 | Storch | 463/25 |
| 7,753,789 B2 | 7/2010 | Walker et al. | 463/42 |
| 7,753,790 B2 | 7/2010 | Nguyen et al. | 463/42 |
| 7,753,798 B2 | 7/2010 | Soltys et al. | |
| 7,762,888 B2 | 7/2010 | Rowe | 463/29 |
| 7,769,877 B2 | 8/2010 | McBride et al. | 709/230 |
| 7,775,868 B2 | 8/2010 | Toyoda | 463/12 |
| 7,778,635 B2 | 8/2010 | Crookham et al. | 455/426.1 |
| 7,780,525 B2 | 8/2010 | Walker et al. | 463/29 |
| 7,780,526 B2 | 8/2010 | Nguyen et al. | 463/29 |
| 7,780,529 B2 | 8/2010 | Rowe et al. | 463/42 |
| 7,783,881 B2 | 8/2010 | Morrow et al. | 713/165 |
| 7,785,204 B2 | 8/2010 | Wells et al. | |
| 7,788,503 B2 | 8/2010 | Gatto et al. | |
| 7,819,742 B2 | 10/2010 | Chamberlain et al. | |
| 7,819,745 B2 | 10/2010 | Cuddy et al. | |
| 7,824,267 B2 | 11/2010 | Cannon et al. | 463/42 |
| 7,828,649 B2 | 11/2010 | Cuddy et al. | 463/26 |
| 7,841,946 B2 | 11/2010 | Walker et al. | 463/42 |
| 7,844,944 B2 | 11/2010 | Gutberlet et al. | |
| 7,846,020 B2 | 12/2010 | Walker et al. | 463/29 |
| 7,850,528 B2 | 12/2010 | Wells | 463/42 |
| 7,854,654 B2 | 12/2010 | Baerlocher et al. | |
| 7,857,702 B2 | 12/2010 | Hilbert | |
| 7,862,425 B2 | 1/2011 | Cavagna | 463/25 |
| 7,867,081 B2 | 1/2011 | Schneider et al. | |
| 7,874,920 B2 | 1/2011 | Hornik et al. | 463/42 |
| 7,874,921 B2 | 1/2011 | Baszucki et al. | 463/43 |
| 7,886,288 B2 | 2/2011 | Breckner et al. | |
| 7,892,093 B2 | 2/2011 | Kniesteadt et al. | |
| 7,898,679 B2 | 3/2011 | Brack et al. | 358/1.15 |
| 7,901,294 B2 | 3/2011 | Walker et al. | 463/42 |
| 7,908,486 B2 | 3/2011 | Gatto et al. | |
| 7,918,730 B2 | 4/2011 | Brosnan et al. | |
| 7,918,735 B2 | 4/2011 | Inamura | |
| 7,921,026 B2 | 4/2011 | O'Cull et al. | |
| 7,921,405 B2 | 4/2011 | Gupta et al. | |
| 7,937,464 B2 | 5/2011 | Ruppert et al. | 709/224 |
| 7,963,847 B2 | 6/2011 | Baerlocher | |
| 7,993,199 B2 | 8/2011 | Iddings et al. | |
| 8,028,046 B2 | 9/2011 | Elliott et al. | 709/220 |
| 8,033,913 B2 | 10/2011 | Cockerille et al. | |
| 8,051,180 B2 | 11/2011 | Mazzaferri et al. | |
| 8,057,297 B2 | 11/2011 | Silvestro et al. | |
| 8,062,121 B2 | 11/2011 | Crivelli | |
| 8,073,657 B2 | 12/2011 | Moore, III et al. | |
| 8,103,083 B2 | 1/2012 | Schaede et al. | |
| 8,117,461 B2 | 2/2012 | Bigelow, Jr. et al. | |
| 8,197,344 B2 | 6/2012 | Rathsack et al. | |
| 8,201,229 B2 | 6/2012 | Ruppert et al. | |
| 1,034,402 A1 | 7/2012 | Hardy | |
| 8,235,825 B2 | 8/2012 | French | |
| 8,280,777 B2 | 10/2012 | Mengerink et al. | |
| 8,303,414 B2 | 11/2012 | Joshi | |
| 8,348,759 B2 | 1/2013 | DiMichele et al. | |
| 2001/0019966 A1 | 9/2001 | Idaka | 463/40 |
| 2002/0004824 A1 | 1/2002 | Cuan et al. | |
| 2002/0024179 A1 | 2/2002 | Chida | 273/307 |
| 2002/0063389 A1 | 5/2002 | Breeding et al. | 273/292 |
| 2002/0084587 A1 | 7/2002 | Bennett et al. | 273/309 |
| 2002/0086725 A1 | 7/2002 | Fasbender et al. | |
| 2002/0111210 A1 | 8/2002 | Luciano, Jr. et al. | |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0123376 A1 | 9/2002 | Walker et al. | |
| 2002/0142844 A1 | 10/2002 | Kerr | |
| 2002/0142846 A1 | 10/2002 | Paulsen | 463/43 |
| 2002/0144115 A1 | 10/2002 | Lemay et al. | |
| 2002/0147042 A1* | 10/2002 | Vuong et al. | 463/40 |
| 2002/0147047 A1 | 10/2002 | Letovsky et al. | |
| 2002/0151363 A1 | 10/2002 | Letovsky et al. | |
| 2002/0152120 A1 | 10/2002 | Howington | |
| 2002/0163125 A1 | 11/2002 | Grauzer et al. | 273/149 R |
| 2002/0173354 A1 | 11/2002 | Winans et al. | 463/20 |
| 2002/0187821 A1 | 12/2002 | Soltys et al. | 463/11 |
| 2002/0187825 A1 | 12/2002 | Tracy et al. | 463/17 |
| 2002/0195773 A1 | 12/2002 | Dunn | |
| 2002/0195775 A1 | 12/2002 | Webb et al. | |
| 2002/0198044 A1 | 12/2002 | Walker et al. | |
| 2003/0004871 A1 | 1/2003 | Rowe | 705/39 |
| 2003/0027625 A1 | 2/2003 | Rowe | 463/20 |
| 2003/0032474 A1 | 2/2003 | Kaminkow | 463/25 |
| 2003/0036425 A1 | 2/2003 | Kaminkow et al. | 463/25 |
| 2003/0042679 A1 | 3/2003 | Snow | 273/292 |
| 2003/0064798 A1 | 4/2003 | Grauzer et al. | 463/29 |
| 2003/0069074 A1 | 4/2003 | Jackson | 463/43 |
| 2003/0075869 A1 | 4/2003 | Breeding et al. | 273/292 |
| 2003/0078103 A1 | 4/2003 | LeMay et al. | 463/43 |
| 2003/0078789 A1 | 4/2003 | Oren | 705/1 |
| 2003/0083126 A1 | 5/2003 | Paulsen | 463/25 |
| 2003/0090059 A1 | 5/2003 | Grauzer et al. | 273/149 R |
| 2003/0090064 A1 | 5/2003 | Hoyt et al. | 273/292 |
| 2003/0100369 A1 | 5/2003 | Gatto et al. | |
| 2003/0104865 A1 | 6/2003 | Itkis et al. | 463/39 |
| 2003/0130024 A1 | 7/2003 | Darby | 463/13 |
| 2003/0182414 A1 | 9/2003 | O'Neill | |
| 2003/0185229 A1 | 10/2003 | Shachar et al. | |
| 2003/0186733 A1 | 10/2003 | Wolf et al. | 463/16 |
| 2003/0186739 A1 | 10/2003 | Paulsen et al. | 463/25 |
| 2003/0195037 A1 | 10/2003 | Vuong et al. | 463/29 |
| 2003/0199320 A1 | 10/2003 | Nguyen et al. | |
| 2003/0206548 A1 | 11/2003 | Bannai et al. | 370/389 |
| 2003/0212597 A1 | 11/2003 | Ollins | 705/14 |
| 2003/0224858 A1 | 12/2003 | Yoseloff et al. | 463/43 |
| 2003/0228912 A1 | 12/2003 | Wells et al. | 463/43 |
| 2003/0232640 A1 | 12/2003 | Walker et al. | |
| 2003/0232651 A1 | 12/2003 | Huard et al. | 463/42 |
| 2003/0234493 A1 | 12/2003 | Frieman | |
| 2004/0002380 A1 | 1/2004 | Brosnan et al. | |
| 2004/0002385 A1 | 1/2004 | Nguyen | 463/42 |
| 2004/0002386 A1 | 1/2004 | Wolfe et al. | 463/42 |
| 2004/0002388 A1 | 1/2004 | Larsen et al. | 463/43 |
| 2004/0005920 A1 | 1/2004 | Soltys et al. | 463/25 |
| 2004/0007817 A1 | 1/2004 | Orbanes | |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0064815 A1 | 4/2004 | Shibayama et al. | |
| 2004/0067789 A1 | 4/2004 | Grauzer et al. | 463/11 |
| 2004/0068654 A1 | 4/2004 | Cockerille et al. | 713/168 |
| 2004/0082385 A1 | 4/2004 | Silva et al. | 463/40 |
| 2004/0087375 A1 | 5/2004 | Gelinotte | 463/47 |
| 2004/0090003 A1 | 5/2004 | Snow | |
| 2004/0100026 A1 | 5/2004 | Haggard | 273/304 |
| 2004/0102244 A1 | 5/2004 | Kryuchkov et al. | 463/32 |
| 2004/0106452 A1 | 6/2004 | Nguyen et al. | 463/42 |
| 2004/0108255 A1 | 6/2004 | Johnson | 209/547 |
| 2004/0110119 A1 | 6/2004 | Riconda et al. | 434/350 |
| 2004/0111338 A1 | 6/2004 | Bandy et al. | |
| 2004/0127277 A1 | 7/2004 | Walker et al. | |
| 2004/0127291 A1 | 7/2004 | George et al. | 463/42 |
| 2004/0132529 A1 | 7/2004 | Mkrtchyan et al. | |
| 2004/0133485 A1 | 7/2004 | Schoonmaker et al. | 705/30 |
| 2004/0142743 A1 | 7/2004 | Oliver | |
| 2004/0142744 A1 | 7/2004 | Atkinson et al. | 463/29 |

(56) References Cited

U.S. PATENT DOCUMENTS

| | | | |
|---|---|---|---|
| 2004/0160005 A1 | 8/2004 | Krise et al. | |
| 2004/0166940 A1 | 8/2004 | Rothschild | 463/42 |
| 2004/0169332 A1 | 9/2004 | Grauzer et al. | |
| 2004/0185936 A1 | 9/2004 | Block et al. | 463/42 |
| 2004/0207156 A1 | 10/2004 | Soltys et al. | 273/292 |
| 2004/0219982 A1 | 11/2004 | Khoo et al. | 463/42 |
| 2004/0224777 A1 | 11/2004 | Smith et al. | 463/47 |
| 2004/0229682 A1 | 11/2004 | Gelinotte | 463/25 |
| 2004/0229684 A1 | 11/2004 | Blackburn et al. | |
| 2004/0254012 A1 | 12/2004 | D'Amico et al. | |
| 2004/0254993 A1 | 12/2004 | Mamas | |
| 2004/0259618 A1 | 12/2004 | Soltys et al. | 463/11 |
| 2004/0259630 A1 | 12/2004 | Huard et al. | |
| 2005/0026680 A1 | 2/2005 | Gururajan | 463/25 |
| 2005/0027604 A1 | 2/2005 | Bandy et al. | |
| 2005/0043094 A1 | 2/2005 | Nguyen et al. | 463/42 |
| 2005/0051965 A1 | 3/2005 | Gururajan | 273/292 |
| 2005/0054408 A1 | 3/2005 | Steil et al. | 463/11 |
| 2005/0054438 A1 | 3/2005 | Rothschild et al. | 463/29 |
| 2005/0054445 A1 | 3/2005 | Gatto et al. | 463/42 |
| 2005/0059479 A1 | 3/2005 | Soltys et al. | 463/25 |
| 2005/0060055 A1 | 3/2005 | Hallowell et al. | |
| 2005/0070358 A1 | 3/2005 | Angell et al. | 463/39 |
| 2005/0080898 A1 | 4/2005 | Block | |
| 2005/0093230 A1 | 5/2005 | Grauzer et al. | |
| 2005/0098951 A1 | 5/2005 | Groves | 273/292 |
| 2005/0101367 A1* | 5/2005 | Soltys et al. | 463/12 |
| 2005/0110210 A1 | 5/2005 | Soltys et al. | 273/149 P |
| 2005/0116020 A1 | 6/2005 | Smolucha et al. | 235/375 |
| 2005/0116417 A1 | 6/2005 | Soltys et al. | 273/292 |
| 2005/0119052 A1 | 6/2005 | Russell et al. | 463/42 |
| 2005/0121852 A1 | 6/2005 | Soltys et al. | 273/149 P |
| 2005/0124411 A1 | 6/2005 | Schneider et al. | 463/29 |
| 2005/0137005 A1 | 6/2005 | Soltys et al. | 463/13 |
| 2005/0146094 A1 | 7/2005 | Soltys et al. | 273/292 |
| 2005/0153778 A1 | 7/2005 | Nelson et al. | 463/42 |
| 2005/0156318 A1 | 7/2005 | Douglas | |
| 2005/0164761 A1 | 7/2005 | Tain | 463/13 |
| 2005/0171808 A1 | 8/2005 | Saenz et al. | |
| 2005/0176502 A1 | 8/2005 | Nishimura et al. | |
| 2005/0176507 A1 | 8/2005 | Ephrati | 463/39 |
| 2005/0206078 A1 | 9/2005 | Soltys et al. | 273/149 R |
| 2005/0215311 A1 | 9/2005 | Hornik et al. | 463/20 |
| 2005/0222891 A1 | 10/2005 | Chan et al. | 705/9 |
| 2005/0227760 A1 | 10/2005 | Vlazny et al. | 463/28 |
| 2005/0236771 A1 | 10/2005 | Soltys et al. | 273/274 |
| 2005/0239542 A1 | 10/2005 | Olsen | 463/27 |
| 2005/0255911 A1 | 11/2005 | Nguyen et al. | 463/25 |
| 2005/0255922 A1 | 11/2005 | Nguyen et al. | |
| 2005/0258597 A1 | 11/2005 | Soltys et al. | 273/274 |
| 2005/0266919 A1 | 12/2005 | Rowe et al. | 463/25 |
| 2005/0282614 A1 | 12/2005 | Gauselmann | |
| 2005/0282623 A1* | 12/2005 | Matsuno et al. | 463/25 |
| 2005/0282626 A1 | 12/2005 | Manfredi et al. | 463/25 |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |
| 2006/0001217 A1 | 1/2006 | Soltys et al. | 273/292 |
| 2006/0003828 A1 | 1/2006 | Abecassis | |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | 713/155 |
| 2006/0019739 A1 | 1/2006 | Soltys et al. | 463/29 |
| 2006/0019745 A1 | 1/2006 | Benbrahim | 463/29 |
| 2006/0026499 A1 | 2/2006 | Weddle | 715/503 |
| 2006/0027971 A1 | 2/2006 | Radhakrishnan | |
| 2006/0035707 A1 | 2/2006 | Nguyen et al. | 463/29 |
| 2006/0046849 A1 | 3/2006 | Kovacs | 463/39 |
| 2006/0058100 A1 | 3/2006 | Pacey et al. | 463/31 |
| 2006/0079317 A1 | 4/2006 | Flemming et al. | |
| 2006/0116208 A1 | 6/2006 | Chen et al. | 463/43 |
| 2006/0117314 A1 | 6/2006 | Sato | |
| 2006/0121970 A1 | 6/2006 | Khal | 463/16 |
| 2006/0130046 A1 | 6/2006 | O'Neill | |
| 2006/0178185 A1 | 8/2006 | Weis | |
| 2006/0181026 A1 | 8/2006 | Wong | 273/292 |
| 2006/0183541 A1 | 8/2006 | Okada et al. | 463/29 |
| 2006/0195847 A1 | 8/2006 | Amano et al. | 718/103 |
| 2006/0199649 A1 | 9/2006 | Soltys et al. | 463/47 |
| 2006/0205461 A1 | 9/2006 | LaRocca et al. | |
| 2006/0205484 A1 | 9/2006 | Nicastro | |
| 2006/0205508 A1 | 9/2006 | Green | 463/40 |
| 2006/0205519 A1 | 9/2006 | Soltys | 463/47 |
| 2006/0211481 A1 | 9/2006 | Soltys et al. | 463/16 |
| 2006/0217202 A1 | 9/2006 | Burke et al. | |
| 2006/0247013 A1 | 11/2006 | Walker et al. | 463/20 |
| 2006/0247057 A1 | 11/2006 | Green et al. | |
| 2006/0248161 A1 | 11/2006 | O'Brien et al. | 709/217 |
| 2006/0252530 A1 | 11/2006 | Oberberger et al. | |
| 2006/0253702 A1 | 11/2006 | Lowell et al. | |
| 2006/0259604 A1 | 11/2006 | Kotchavi et al. | |
| 2006/0277487 A1 | 12/2006 | Poulsen et al. | 715/772 |
| 2006/0281529 A1 | 12/2006 | Seelig et al. | 463/20 |
| 2006/0287098 A1 | 12/2006 | Morrow et al. | |
| 2007/0004500 A1 | 1/2007 | Soltys et al. | 463/22 |
| 2007/0015583 A1 | 1/2007 | Tran | 463/40 |
| 2007/0026935 A1 | 2/2007 | Wolf et al. | 463/25 |
| 2007/0032288 A1 | 2/2007 | Nelson et al. | |
| 2007/0033247 A1 | 2/2007 | Martin | 709/201 |
| 2007/0045959 A1 | 3/2007 | Soltys | 273/274 |
| 2007/0054725 A1 | 3/2007 | Morrow et al. | 463/16 |
| 2007/0054740 A1 | 3/2007 | Salls et al. | 463/42 |
| 2007/0057453 A1 | 3/2007 | Soltys et al. | 273/149 P |
| 2007/0057454 A1 | 3/2007 | Fleckenstein | 273/149 R |
| 2007/0057462 A1 | 3/2007 | Fleckenstein | 273/274 |
| 2007/0057466 A1 | 3/2007 | Soltys et al. | 273/292 |
| 2007/0057469 A1 | 3/2007 | Grauzer et al. | 273/309 |
| 2007/0060259 A1 | 3/2007 | Pececnik | 463/16 |
| 2007/0060260 A1 | 3/2007 | Fleckenstein | 463/16 |
| 2007/0060307 A1 | 3/2007 | Mathis et al. | 463/25 |
| 2007/0060310 A1 | 3/2007 | Juds et al. | |
| 2007/0060365 A1 | 3/2007 | Tien et al. | 463/42 |
| 2007/0067768 A1 | 3/2007 | Breckner et al. | |
| 2007/0077995 A1 | 4/2007 | Oak et al. | 463/42 |
| 2007/0082737 A1 | 4/2007 | Morrow et al. | 463/42 |
| 2007/0093298 A1 | 4/2007 | Brunet | 463/42 |
| 2007/0105628 A1 | 5/2007 | Arbogast et al. | 463/42 |
| 2007/0111775 A1 | 5/2007 | Yoseloff | 463/16 |
| 2007/0111791 A1 | 5/2007 | Arbogast et al. | 463/40 |
| 2007/0111794 A1 | 5/2007 | Hogan et al. | 463/42 |
| 2007/0117608 A1 | 5/2007 | Roper et al. | 463/16 |
| 2007/0124483 A1 | 5/2007 | Marples et al. | 709/228 |
| 2007/0129145 A1 | 6/2007 | Blackburn et al. | |
| 2007/0138743 A1 | 6/2007 | Fleckenstein | 273/149 R |
| 2007/0150329 A1 | 6/2007 | Brook et al. | 705/8 |
| 2007/0155490 A1 | 7/2007 | Phillips et al. | |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald et al. | 705/52 |
| 2007/0208816 A1 | 9/2007 | Baldwin et al. | 709/206 |
| 2007/0214030 A1 | 9/2007 | Shear et al. | |
| 2007/0216092 A1 | 9/2007 | Fleckenstein | 273/149 R |
| 2007/0218998 A1 | 9/2007 | Arbogast et al. | 463/42 |
| 2007/0235521 A1 | 10/2007 | Mateen et al. | 235/379 |
| 2007/0241496 A1 | 10/2007 | Fleckenstein | 273/149 R |
| 2007/0241497 A1 | 10/2007 | Soltys et al. | 273/149 R |
| 2007/0241498 A1 | 10/2007 | Soltys | 273/149 R |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | 463/20 |
| 2007/0259711 A1 | 11/2007 | Thomas | 463/22 |
| 2007/0273094 A1 | 11/2007 | Fleckenstein | 273/149 P |
| 2007/0287534 A1 | 12/2007 | Fleckenstein | 463/29 |
| 2007/0287535 A1 | 12/2007 | Soltys | 463/29 |
| 2007/0293303 A1 | 12/2007 | Shayesteh | 463/25 |
| 2007/0298860 A1 | 12/2007 | Graves et al. | |
| 2007/0298865 A1 | 12/2007 | Soltys | 463/22 |
| 2007/0298868 A1 | 12/2007 | Soltys | 463/25 |
| 2008/0004108 A1 | 1/2008 | Klinkhammer | 463/29 |
| 2008/0009344 A1 | 1/2008 | Graham et al. | 463/25 |
| 2008/0026832 A1 | 1/2008 | Stevens et al. | 463/26 |
| 2008/0026848 A1 | 1/2008 | Byng | 463/42 |

(56) References Cited

U.S. PATENT DOCUMENTS

| | | |
|---|---|---|
| 2008/0038035 A1 | 2/2008 | Shuldman et al. ............. 400/76 |
| 2008/0045341 A1 | 2/2008 | Englman ........................ 463/42 |
| 2008/0045342 A1 | 2/2008 | Crowder, Jr. et al. |
| 2008/0058105 A1 | 3/2008 | Combs et al. |
| 2008/0064501 A1 | 3/2008 | Patel .............................. 463/40 |
| 2008/0065590 A1 | 3/2008 | Castro et al. |
| 2008/0076536 A1 | 3/2008 | Shayesteh ..................... 463/25 |
| 2008/0076572 A1 | 3/2008 | Nguyen et al. ................. 463/42 |
| 2008/0085772 A1 | 4/2008 | Iddings et al. |
| 2008/0090651 A1 | 4/2008 | Baerlocher .................... 463/27 |
| 2008/0096659 A1 | 4/2008 | Kreloff et al. ................. 463/39 |
| 2008/0102919 A1 | 5/2008 | Rowe et al. |
| 2008/0102932 A1 | 5/2008 | Anderson et al. |
| 2008/0108405 A1 | 5/2008 | Brosnan et al. |
| 2008/0108433 A1 | 5/2008 | DiMichele et al. ............ 463/40 |
| 2008/0113704 A1 | 5/2008 | Jackson |
| 2008/0113764 A1 | 5/2008 | Soltys ........................... 463/22 |
| 2008/0113773 A1 | 5/2008 | Johnson et al. ................ 463/25 |
| 2008/0113781 A1 | 5/2008 | Soltys et al. ................... 463/28 |
| 2008/0113793 A1 | 5/2008 | Miyamoto et al. |
| 2008/0117339 A1 | 5/2008 | Kirsche |
| 2008/0119284 A1 | 5/2008 | Luciano, Jr. et al. ........... 463/42 |
| 2008/0127174 A1 | 5/2008 | Johnson |
| 2008/0138773 A1 | 6/2008 | Lathrop |
| 2008/0146337 A1 | 6/2008 | Halonen et al. ............... 463/42 |
| 2008/0153599 A1 | 6/2008 | Atashband et al. ............ 463/42 |
| 2008/0153600 A1 | 6/2008 | Swarna .......................... 463/43 |
| 2008/0154916 A1 | 6/2008 | Atashband ..................... 707/10 |
| 2008/0155665 A1 | 6/2008 | Ruppert et al. ................. 726/5 |
| 2008/0162729 A1 | 7/2008 | Ruppert ......................... 709/249 |
| 2008/0165771 A1 | 7/2008 | Gainey et al. |
| 2008/0171588 A1 | 7/2008 | Atashband ..................... 463/20 |
| 2008/0171598 A1 | 7/2008 | Deng ............................. 463/40 |
| 2008/0200255 A1 | 8/2008 | Eisele ............................ 463/42 |
| 2008/0214277 A1 | 9/2008 | Kishi ............................. 463/20 |
| 2008/0217851 A1* | 9/2008 | Colton ........................... 273/274 |
| 2008/0243697 A1 | 10/2008 | Irving et al. ................... 705/54 |
| 2008/0244565 A1 | 10/2008 | Levidow et al. |
| 2008/0261699 A1 | 10/2008 | Topham et al. |
| 2008/0261701 A1 | 10/2008 | Lewin et al. ................... 463/43 |
| 2008/0287185 A1 | 11/2008 | Yoseloff et al. |
| 2008/0287197 A1 | 11/2008 | Ruppert et al. ................ 463/42 |
| 2008/0293494 A1 | 11/2008 | Adiraju et al. ................. 463/42 |
| 2008/0300046 A1 | 12/2008 | Gagner et al. |
| 2008/0305854 A1 | 12/2008 | Graham et al. |
| 2008/0311971 A1 | 12/2008 | Dean .............................. 463/20 |
| 2008/0313282 A1 | 12/2008 | Warila et al. |
| 2008/0318655 A1 | 12/2008 | Davies |
| 2008/0318671 A1 | 12/2008 | Rowe et al. |
| 2008/0318685 A9 | 12/2008 | Oak et al. ...................... 463/42 |
| 2009/0005177 A1 | 1/2009 | Kishi et al. |
| 2009/0011833 A1 | 1/2009 | Seelig et al. .................... 463/42 |
| 2009/0021516 A1 | 1/2009 | Graziani et al. |
| 2009/0029775 A1 | 1/2009 | Ruppert et al. ................ 463/42 |
| 2009/0054139 A1 | 2/2009 | Anderson |
| 2009/0063309 A1 | 3/2009 | Stephens |
| 2009/0069076 A1 | 3/2009 | Silvestro |
| 2009/0075739 A1 | 3/2009 | Richardson |
| 2009/0093293 A1 | 4/2009 | Koyama et al. |
| 2009/0104981 A1 | 4/2009 | Koyama ........................ 463/25 |
| 2009/0115133 A1 | 5/2009 | Kelly et al. .................... 273/274 |
| 2009/0117994 A1 | 5/2009 | Kelly et al. .................... 463/25 |
| 2009/0118001 A1 | 5/2009 | Kelly et al. .................... 463/29 |
| 2009/0118005 A1 | 5/2009 | Kelly et al. .................... 463/31 |
| 2009/0118006 A1 | 5/2009 | Kelly et al. .................... 463/31 |
| 2009/0124329 A1 | 5/2009 | Palmisano |
| 2009/0124392 A1 | 5/2009 | Ruppert et al. ................ 463/42 |
| 2009/0124394 A1 | 5/2009 | Swarna .......................... 463/43 |
| 2009/0125603 A1 | 5/2009 | Atashband et al. ............ 709/207 |
| 2009/0131144 A1 | 5/2009 | Allen ............................. 463/20 |
| 2009/0131163 A1 | 5/2009 | Arbogast et al. ............... 463/29 |
| 2009/0132720 A1 | 5/2009 | Ruppert et al. ................ 709/231 |
| 2009/0176556 A1 | 7/2009 | Gagner et al. .................. 463/25 |
| 2009/0176558 A1 | 7/2009 | Englman et al. |
| 2009/0176580 A1 | 7/2009 | Herrmann et al. ............. 463/43 |
| 2009/0181776 A1 | 7/2009 | Deng .............................. 463/42 |
| 2009/0239625 A1 | 9/2009 | Yoshizawa |
| 2009/0239667 A1 | 9/2009 | Rowe et al. |
| 2009/0253483 A1 | 10/2009 | Pacey et al. .................... 463/20 |
| 2009/0270170 A1 | 10/2009 | Patton ............................ 463/36 |
| 2009/0275410 A1 | 11/2009 | Kisenwether et al. |
| 2009/0275411 A1 | 11/2009 | Kisenwether et al. .......... 463/42 |
| 2009/0298583 A1 | 12/2009 | Jones |
| 2009/0307069 A1 | 12/2009 | Meyerhofer ................... 705/14.12 |
| 2009/0325708 A9 | 12/2009 | Kerr |
| 2010/0016067 A1 | 1/2010 | White et al. .................... 463/25 |
| 2010/0016068 A1 | 1/2010 | White et al. .................... 463/25 |
| 2010/0029385 A1 | 2/2010 | Garvey et al. .................. 463/35 |
| 2010/0048291 A1 | 2/2010 | Warkentin ...................... 463/25 |
| 2010/0058320 A1 | 3/2010 | Milligan et al. |
| 2010/0062838 A1 | 3/2010 | Nguyen et al. |
| 2010/0087247 A1 | 4/2010 | Joshi et al. |
| 2010/0093440 A1 | 4/2010 | Burke |
| 2010/0093441 A1 | 4/2010 | Rajaraman et al. |
| 2010/0113125 A1 | 5/2010 | Bernard et al. ................. 463/20 |
| 2010/0124990 A1 | 5/2010 | Crowder ........................ 463/42 |
| 2010/0125851 A1 | 5/2010 | Singh et al. .................... 718/104 |
| 2010/0130280 A1* | 5/2010 | Arezina et al. ................. 463/20 |
| 2010/0131772 A1 | 5/2010 | Atashband et al. ............ 713/189 |
| 2010/0137056 A1 | 6/2010 | Hoffman et al. |
| 2010/0151926 A1 | 6/2010 | Ruppert et al. ................ 463/1 |
| 2010/0161798 A1 | 6/2010 | Ruppert et al. ................ 709/225 |
| 2010/0210353 A1 | 8/2010 | Gagner et al. |
| 2010/0234104 A1 | 9/2010 | Ruppert et al. ................ 463/30 |
| 2010/0248842 A1 | 9/2010 | Ruppert ......................... 463/42 |
| 2011/0009184 A1 | 1/2011 | Byng ............................. 463/20 |
| 2011/0009188 A1 | 1/2011 | Adiraju et al. |
| 2011/0124417 A1 | 5/2011 | Baynes et al. .................. 463/43 |
| 2011/0161948 A1 | 6/2011 | Hilbert |
| 2011/0179409 A1 | 7/2011 | Yoseloff et al. |
| 2011/0269534 A1 | 11/2011 | Kelly et al. |
| 2012/0110649 A1 | 5/2012 | Murphy |
| 2012/0203692 A1 | 8/2012 | Olliphant et al. |

FOREIGN PATENT DOCUMENTS

| | | |
|---|---|---|
| DE | 197 48 930 A1 | 5/1998 |
| DE | 199 40 954 A1 | 3/2001 |
| EP | 0 327 069 A2 | 8/1989 |
| EP | 0 790 848 B1 | 8/1997 |
| EP | 0 700 980 B1 | 11/1999 |
| EP | 1074955 A2 | 2/2001 |
| EP | 1 291 045 A2 | 3/2003 |
| EP | 1463008 A2 | 9/2004 |
| FR | 530.732 | 12/1921 |
| FR | 2 775 196 A1 | 8/1999 |
| GB | 2 246 520 A | 2/1992 |
| GB | 2 370 791 A | 7/2002 |
| GB | 2 380 143 A | 4/2003 |
| GB | 2 382 034 A | 5/2003 |
| JP | 8255059 | 10/1996 |
| JP | 2003-265682 | 9/2003 |
| JP | 2004-275536 | 10/2004 |
| KR | 2001-0084838 | 9/2001 |
| KR | 2002-0061793 | 7/2002 |
| KR | 20-0335819 | 12/2003 |
| KR | 2003-0091635 | 12/2003 |
| WO | 96/03188 A1 | 2/1996 |
| WO | 96/14115 A1 | 5/1996 |
| WO | 96/36253 | 11/1996 |
| WO | 97/13227 A1 | 4/1997 |
| WO | 97/36658 A1 | 10/1997 |
| WO | 99/43403 | 9/1999 |
| WO | 00/22585 A2 | 4/2000 |
| WO | 01/87438 A2 | 11/2001 |
| WO | 02/05914 A1 | 1/2002 |
| WO | 02/051512 A2 | 7/2002 |
| WO | 02/101630 A1 | 12/2002 |
| WO | 03/004116 A1 | 1/2003 |
| WO | 03/006928 A1 | 1/2003 |
| WO | 03/023751 A1 | 3/2003 |
| WO | 03/060846 A2 | 7/2003 |
| WO | 04/001709 A2 | 12/2003 |
| WO | 2005/035084 | 4/2005 |

(56) References Cited

FOREIGN PATENT DOCUMENTS

| | | | |
|---|---|---|---|
| WO | 2006/039308 | A2 | 4/2006 |
| WO | 2007/033207 | A2 | 3/2007 |
| WO | 2009/071526 | A1 | 6/2009 |

OTHER PUBLICATIONS

U.S. Appl. No. 12/112,231, filed Apr. 30, 2008, Morrow et al.
U.S. Appl. No. 12/112,410, filed Apr. 30, 2008, McMahan et al.
U.S. Appl. No. 12/112,473, filed Apr. 30, 2008, Allen et al.
U.S. Appl. No. 12/112,501, filed Apr. 30, 2008, Nelson.
U.S. Appl. No. 12/112,554, filed Apr. 30, 2008, Nelson et al.
U.S. Appl. No. 12/112,582, filed Apr. 30, 2008, Kelly et al.
U.S. Appl. No. 12/112,691, filed Apr. 30, 2008, Backover et al.
U.S. Appl. No. 12/112,740, filed Apr. 30, 2008, Kisenwether et al.
U.S. Appl. No. 12/112,770, filed Apr. 30, 2008, Rehm et al.
U.S. Appl. No. 12/112,928, filed Apr. 30, 2008, Young et al.
U.S. Appl. No. 12/113,005, filed Apr. 30, 2008, McAllister et al.
U.S. Appl. No. 12/113,021, filed Apr. 30, 2008, Singh et al.
U.S. Appl. No. 12/113,038, filed Apr. 30, 2008, Arbogast et al.
U.S. Appl. No. 12/113,139, filed Apr. 30, 2008, Hermansen et al.
U.S. Appl. No. 61/057,306, filed May 30, 2008, Jones.
U.S. Appl. No. 61/080,165, filed Jul. 11, 2008, Rajaraman et al.
Bulaysky, J., "Tracking the Tables," *Casino Journal,* May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business,* Aug. 2003, 4 pages.
Gros, R., "All You Ever Wanted to Know About Table Games," reprinted from *Global Gaming Business,* Aug. 1, 2003, 2 pages.
Humble, L., *The World's Greatest Blackjack Book,* Random House, Inc., New York, 1987, p. 182.
Pro, L.V., "Book Review—The Card Counter's Guide to Casino Surveillance," *Blackjack Insider Newsletter,* May 2003, #40, accessed Aug. 25, 2006, URL = http:/bjinsider.com/newsletter_40_surveillance.shtml, 5 pages.
Scarne, J., *Scarne's Encyclopedia of Games,* Harper & Row, New York, 1973, p. 153.
Scarne, J., *Scarne's New Complete Guide to Gambling,* Simon & Schuster, Inc., New York, 1974, pp. 358-359.
Snyder, A., "The High-Tech Eye," excerpt from *Blackjack Forum,* Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News,* Aug. 18, 2003, 2 pages.
Ward, K., "BJ Tracking System has Players Down for the Count," *Gaming Today,* Mar. 5, 2002, accessed Dec. 21, 2005, from Casino Software & Services, LLC, URL = http://www.casinosoftware.com/gaming_today.html.
Winkler, C., "Product Spotlight: MindPlay," reprinted from *Gaming and Leisure Technology,* Fall 2003, 2 pages.
Bally TMS, "MP21—Automated Table Tracking/Features," 2 pages, Nov. 2005.
Bally TMS, "MPBacc—Intelligent Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Bravo Gaming Systems, "Casino Table Wager Analysis and Player Tracking System—Table Operations/Unique Features," accessed Apr. 11, 2005, URL = http://www.genesisgaming.com, 4 pages.
Casino Software & Services, LLC., accessed Aug. 25, 2006, URL = http:/casinosoftware.com/home.html, 6 pages.
*Gambling Magazine,* "Gaming Company Takes RFID to the Casino," Dec. 27, 2004, accessed Aug. 25, 2006, URL = http:/www.gamblingmagazine.com/managearticle.asp?C=290&A=13186, 4 pages.
International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Plaintiff's Declaration of Lawrence Luciano in Opposition to Shuffle Master's Motion for Preliminary Injunction, *Card, LLC* v. *Shuffle Master, Inc.,* D. Nev. (No. CV-N-03-0244-ECR-(RAM)), Nov. 24, 2003.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents the Ultimate Player Rating System . . . Bloodhound Sniffs Out the Pros and Cons," Dec. 31, 1997, 6 pages.
Arbogast et al., "Download and Configuration System for Gaming Machines," U.S. Appl. No. 60/716,713, filed Sep. 12, 2005, 110 pages.
Bally Technologies, Inc., iVIEW, http://ballytech.com/systems/product.cfm?id=9, download date Nov. 6, 2007, 2 pages.
MagTek, "Port Powered Swipe Reader," Technical Reference Manual, Manual Part No. 99875094 Rev 12, Jun. 2003, 20 pages.
Palermo, V. "Near-field magnetic comms emerges," EE Times Design, Oct. 31, 2003.
Rajaraman, U.S. Appl. No. 12/820,885, filed Jun. 22, 2010, 101 pages.
Kelly, B. et al., "Game Related Systems, Methods, and Articles That Combine Virtual and Physical Elements," Office Action mailed Aug. 17, 2010, for U.S. Appl. No. 11/938,204, 13 pages.
Kelly, B. et al., "Game Related Systems, Methods, and Articles That Combine Virtual and Physical Elements," Amendment dated Nov. 8, 2010, for U.S. Appl. No. 11/938,204, 14 pages.
Kelly, B. et al., "Game Related Systems, Methods, and Articles That Combine Virtual and Physical Elements," Office Action mailed Jan. 25, 2011, for U.S. Appl. No. 11/938,204, 11 pages.
Kelly, B. et al., "Game Related Systems, Methods, and Articles That Combine Virtual and Physical Elements," Amendment dated Mar. 25, 2011, for U.S. Appl. No. 11/938,204, 13 pages.
Kelly, B. et al., "Game Related Systems, Methods, and Articles That Combine Virtual and Physical Elements," Office Action mailed Dec. 22, 2010, for U.S. Appl. No. 11/938,206, 13 pages.
Kelly, B. et al., "Game Related Systems, Methods, and Articles That Combine Virtual and Physical Elements," Amendment dated Mar. 22, 2011, for U.S. Appl. No. 11/938,206, 15 pages.
Kelly, B. et al., "Game Related Systems, Methods, and Articles That Combine Virtual and Physical Elements," Office Action mailed Jun. 14, 2011, for U.S. Appl. No. 11/938,206, 10 pages.
Kelly, B. et al., "Game Related Systems, Methods, and Articles That Combine Virtual and Physical Elements," Amendment dated Oct. 14, 2011, for U.S. Appl. No. 11/938,206, 13 pages.
Kelly, B. et al., "Game Related Systems, Methods, and Articles That Combine Virtual and Physical Elements," Office Action mailed Dec. 22, 2010, for U.S. Appl. No. 11/938,207, 17 pages.
Kelly, B. et al., "Game Related Systems, Methods, and Articles That Combine Virtual and Physical Elements," Amendment dated Mar. 22, 2011, for U.S. Appl. No. 11/938,207, 18 pages.
Kelly, B. et al., "Game Related Systems, Methods, and Articles That Combine Virtual and Physical Elements," Office Action mailed Jun. 14, 2011, for U.S. Appl. No. 11/938,207, 15 pages.
Kelly, B. et al., "Game Related Systems, Methods, and Articles That Combine Virtual and Physical Elements," Amendment dated Sep. 13, 2011, for U.S. Appl. No. 11/938,207, 6 pages.
Kelly, B. et al., "Game Related Systems, Methods, and Articles That Combine Virtual and Physical Elements," Pre-Appeal Brief Remarks dated Sep. 14, 2011, for U.S. Appl. No. 11/938,207, 4 pages.
Kelly, B. et al., "Game Related Systems, Methods, and Articles That Combine Virtual and Physical Elements," Decision on Pre-Appeal Conference, dated Nov. 4, 2011, for U.S. Appl. No. 11/938,207, 2 pages.

(56) References Cited

OTHER PUBLICATIONS

Kelly, B. et al., "Game Related Systems, Methods, and Articles That Combine Virtual and Physical Elements," Office Action mailed Sep. 20, 2011, for U.S. Appl. No. 11/938,209, 20 pages.
Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.
Requirements document, "Game Authentication Terminal Program (GAT3)," to Gaming Standards Association, Aug. 2005, 27 pages.
Standards document, "Technical Standards for Gaming Devices and On-Line Slot Systems," to Nevada Gaming Commission and State Gaming Control Board, Aug. 17, 2005, 15 pages.
Kelly et al., "Game Related Systems, Methods, AMD Articles That Combine Virtual and Physical Elements," Office Action for U.S. Appl. No. 11/938,206, mailed Apr. 2, 2013, 13 pages.
Kelly, B. et al., "Game Related Systems, Methods, and Articles That Combine Virtual and Physical Elements," Amendment dated Dec. 20, 2011, for U.S. Appl. No. 11/938,209, 24 pages.
Kelly, B. et al., "Game Related Systems, Methods, and Articles That Combine Virtual and Physical Elements," Amendment dated Jan. 17, 2012, for U.S. Appl. No. 11/938,207, 13 pages.
Kelly, B. et al., "Game Related Systems, Methods, and Articles That Combine Virtual and Physical Elements," Amendment filed Apr. 24, 2013, for U.S. Appl. No. 11/938,209, 29 pages.
Kelly, B. et al., "Game Related Systems, Methods, and Articles That Combine Virtual and Physical Elements," Office Action dated Apr. 16, 2013, for U.S. Appl. No. 11/938,207, 13 pages.
Kelly, B. et al., "Game Related Systems, Methods, and Articles That Combine Virtual and Physical Elements," Office Action dated Feb. 20, 2013, for U.S. Appl. No. 11/938,209, 23 pages.
Kelly et al., "Game Related Systems, Methods, and Articles That Combine Virtual and Physical Elements," Office Action for U.S. Appl. No. 11/938,206, mailed Nov. 12, 2013, 12 pages.
Kelly et al., "Game Related Systems, Methods, and Articles That Combine Virtual and Physical Elements," Amendment dated Jul. 15, 2013, for U.S. Appl. No. 11/938,207, 16 pages.
Kelly et al., "Game Related Systems, Methods, and Articles That Combine Virtual and Physical Elements," Amendment dated Jul. 17, 2013, for U.S. Appl. No. 11/938,206, 15 pages.
Kelly et al., "Game Related Systems, Methods, and Articles That Combine Virtual and Physical Elements," Office Action mailed Nov. 18, 2013, for U.S. Appl. No. 11/938,207, 14 pages.
Kelly et al., "Game Related Systems, Methods, and Articles That Combine Virtual and Physical Elements," Response dated Jan. 18, 2014, for U.S. Appl. No. 11/938,207, 17 pages.
"BOB and LDAP," Gaming Standards Association, Fremont, California, 7 pages, Oct. 26, 2003.
"GSA Point-to-Point SOAP/HTTPS Transport and Security Specification v1.0.3," Gaming Standards Association Transport Technical Committee, 16 pages, Jun. 5, 2007.
Bally Technologies, "Introducing the New Bally Alpha EliteTM S9C," 12 pages.
Captain Morgan's Casino, Inc., "Blazing Sevens," accessed Oct. 31, 2006, URL http://www.captainmorganscasino.com/casino-games/blazing-seven, 1 page.
Hewlett Packard Handhelds, accessed Sep. 8, 2003, URL = http://www.shopping.hp.com/cgibin/hpdirect/shopping/scripts/home/store_access.jsp?temp . . . , 2 pages.
Linksys WAP11 "Wireless Network Access Point," accessed Sep. 8, 2003, URL = http:/www.linksys.com/products/product.asp-?prid=157&grid=, 4 pages.
Semtek PDA & Handheld Devices, Compaq iSwipeTM Magnetic Card Reader, accessed Sep. 8, 2003, URL = http:/www.semtek.com/products/iswipe.html, 3 pages.
VideoSlotMachines.com, "Bally Gaming: Blazing Sevens," accessed Jan. 5, 2007, URL = http://www.videoslotmachines.com/bally/blazingsevens.htm, 1 page.
Hung et al., "Performance Evaluation of the Least Conflict Sharable Spreading Code Assignment Algorithm," IEEE, 1996, 5 pages.
Kelly, B. et al., "Game Related Systems, Methods, and Articles That Combine Virtual and Physical Elements," Amendment dated Jul. 25, 2012, for U.S. Appl. No. 11/938,207, 13 pages.
Kelly, B. et al., "Game Related Systems, Methods, and Articles That Combine Virtual and Physical Elements," Notice of Allowance mailed May 24, 2012, for U.S. Appl. No. 11/938,204, 5 pages.
Kelly, B. et al., "Game Related Systems, Methods, and Articles That Combine Virtual and Physical Elements," Office Action dated Apr. 26, 2012, for U.S. Appl. No. 11/938,207, 13 pages.
Kelly, B. et al., "Game Related Systems, Methods, and Articles That Combine Virtual and Physical Elements," Office Action mailed May 11, 2012, for U.S. Appl. No. 11/938,209, 21 pages.
Kelly, B. et al., "Game Related Systems, Methods, and Articles That Combine Virtual and Physical Elements," Amendment dated Aug. 9, 2012, for U.S. Appl. No. 11/938,209, 25 pages.
Olesiejuk, "Discovery Services for Gaming Devices on a Casino Floor," Gaming Standards Association, 3 pages, Mar. 12, 2007.
Robbins, T., "15 Seconds: Introducing ADO.NET and the Typed DataSet," Dec. 23, 2003, 14 pages.

\* cited by examiner (virtual game layout)

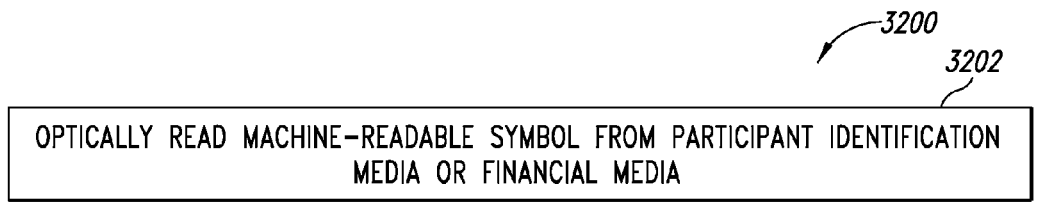
FIG. 32
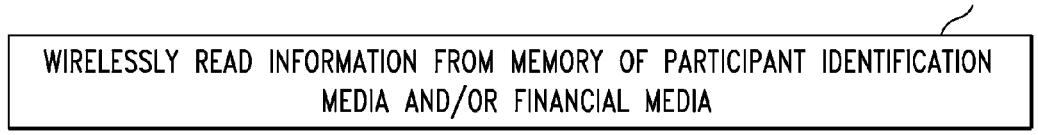
FIG. 33
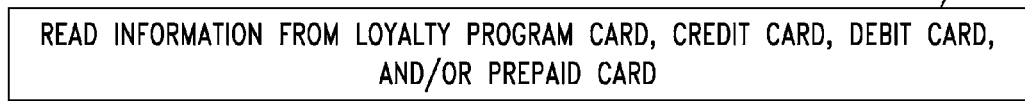
FIG. 34
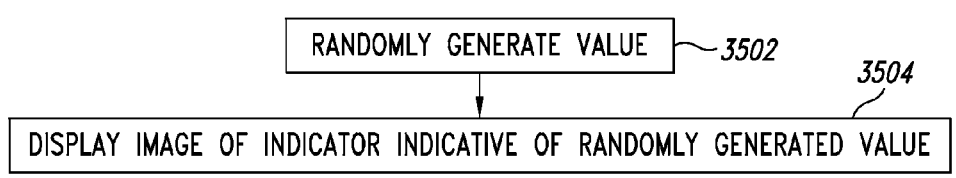
FIG. 35
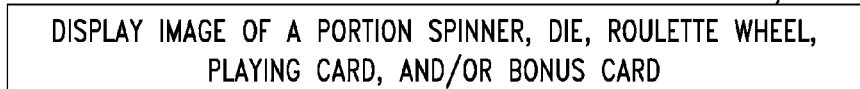
FIG. 36
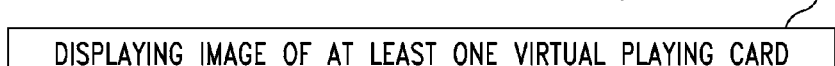
FIG. 37

GAME RELATED SYSTEMS, METHODS, AND ARTICLES THAT COMBINE VIRTUAL AND PHYSICAL ELEMENTS

CROSS-REFERENCE(S) TO RELATED APPLICATION

This application claims the benefit under 35 U.S.C. §119 (e) of U.S. Provisional Patent Application No. 60/985,178, filed Nov. 2, 2007, the content of which is incorporated herein by reference in its entirety.

BACKGROUND

1. Technical Field

This description generally relates to automation of games which may include games with or without wagering.

2. Description of the Related Art

There are numerous types of games that people play for entertainment or educational purposes.

Some games are classified as board games. Such games typically include a game layout which is defined or formed by a set of demarcations on a board. Typically, players advance game related pieces such as tokens, tiles or markers along various paths on the game layout to obtain some goal. The goal may, for example, include being the first player to reach a destination, collecting cards, points or pretend currency, or collecting other game related pieces such as tokens, tiles, houses, wedges, etc. Examples of boards games include chess, checkers, MONOPOLY, SCRABBLE, TRIVIAL PURSUIT, BATTLE SHIP, RISK, LIFE, CANDYLAND, and CHUTES AND LADDERS, GO FISH.

Some games are commonly associated with wagering. For example, roulette, craps, and many card games played with playing cards, for instance blackjack, baccarat, various types of poker, PAI GOW poker, LET IT RIDE. Sometimes games commonly associated with wagering are played for fun, without the exchange of money and/or for charitable fund raisers which typically involves pretend money. Card games may be played with one or more standard decks of playing cards. A standard deck of playing cards typically comprises fifty-two playing cards, each playing card having a combination of a rank symbol and a suit symbol, selected from thirteen rank symbols (i.e., 2, 3, 4, 5, 6, 7, 8, 9, 10, J, Q, K, and A) and four suit symbols (i.e., ♥, ♣, , ♦, and ♠). . Some games may include non-standard playing cards, for example playing cards with symbols other than the rank and suit symbols associated with a standard deck.

Gaming tables have traditionally consisted of a wood structure with a printed felt and an arm pad. There are numerous games played at conventional gaming tables. For example, roulette, craps, and card games played with playing cards. Table games have long been played on a traditional green felt table, with one or more players sitting at one side of the table and the dealer at the other side of the table standing in the casino pit area. A dealer or an electronic shuffler shuffles the decks of playing cards, and which are dealt to the players one by one from a card deck shoe or from a hand held deck. Players place bets or wagers on the table, typically prior to the playing cards being dealt. At the conclusion of the game the dealer judges the hands of the various players, including in some games the dealers own hand. If a player has a winning hand, the dealer pays the player based upon the size of the wager initially bet and any additional wagers made during game. Losing players have their wagers collected by the dealer. Then the next round or hand of the game begins.

Pit bosses monitor the amount of wagering by identified players and manually reward players with complimentary benefits commonly referred to as "comps" credited to the player account based upon this wager rate. Often this amount of the comp is significantly off because the pit boss is concurrently monitoring several players at several different tables as well as handling different duties in the pit. This leads to the casino or player being adversely affected.

The pit boss and surveillance cameras monitor the dealer and players to ensure that they are not secretly colluding or are individually acting to defraud the casino. Keen eyes by casino personnel are the only thing that keeps the games honest, and mistakes sometimes happen.

In recent years electronic systems have been added to table games to aid in the proper comping of players. Typically, such systems electronically detect the size of the bet or wager each play by a player. The chips used by players to place bets or wagers may be marked either optically or via wireless interrogation. Chips may be marked with a bar code of some other indicia, that is either visible or non visible to the player. Alternatively, chips may carry radio frequency identification (RFID) transponders. Machine-readable symbol readers or RFID readers recognize the bet or wager by each identified player, and the appropriate comps may be credited to the patron's account based upon the size of wagers. Also, the players overall value to the casino can be calculated since both wins and losses can be electronically monitored. Table gaming bet or wager recognition has become a significant focus in the casino industry as a way to properly understand total patron value. Each of these technologies has its own fidelity and resolution issues that need to be improved upon.

To aid in fraud detection, table game manufacturers have added the ability to detect the playing cards that are on the playing surface of the gaming table. Some systems read or scan the playing card as the playing cards come out of a deck shoe. Others systems know the order or sequence of playing cards in the card shoe. Some systems may randomly build a card order or sequence, and then also store the order or sequence associated with the deck. Thus when the playing cards are dealt from the card shoe, the order or sequence is pre-known by the system. Others systems read the playing cards after they are collected at the end of play or hand, and returned to a discard shoe or removed from the gaming table, for example into a holding area. The goal is to know every playing card that is dealt to each participant, including the dealer, and to look for new or fake playing cards that have been added or substituted into the game by the players or dealers. Some systems monitor all of the metrics of the games so dealer performance can be monitored. Reports may be run to see which dealers are paying out over the typical rate or paying out too much to specific players.

If the playing cards in play are known to the system, then various bonus games or awards, be electronically provided when certain triggering events occur. For example a certain type of full house (e.g., three of a kind combined with a pair) could trigger a progressive bonus award to the player or everyone at the same gaming table as the player at that time. This automatic award is clearly an improvement over the manual approaches used to award to players after the playing cards are shown to the dealer and the pit boss. An improved bonus game or bonus card experience that can occur in the middle of a game would be of value to players and the casino. Video card games like video poker have done this effectively over the years and the same type of experiences needs to be brought to table games.

New table games are often introduced to casino patrons. However, these games require that players are trained on the rules, or the games risk failure. This training takes time and typically slows up wagering and hurts the casino bottom line. Some players will often avoid new table games all together because of the associated learning curve. An improvement to the learning cycle is highly desirable.

Virtual or video based table games could solve many of the aforementioned issues, but they have had limited success to this date. These games suffer because the players are accustomed to the physical playing cards and chips. It is difficult for a player of traditional table games to give up the tactile feel of playing cards and chips in their hands. There is something special about holding the playing cards and lifting up the corner of a playing card to peek at the markings which makes the table game experience unique. Players enjoy seeing their playing cards come out of the card shoe and slide across the table. The pace and tease of the unknown playing cards is motivating, almost compelling factor for most players. A table game product that allows both the new virtual (video) and traditional physical cards and chips would give the player the best of both worlds. Also, it is desirable to improve the casino experience and operation.

Casinos and other gaming establishments are continually looking for ways to make gaming fresher and more exciting for their patrons. For example, many casinos offer the ability to place bonus wagers and/or progressive wagers. New approaches to varying existing gaming and otherwise servicing patrons are highly desirable.

BRIEF SUMMARY

The system and method of real (i.e., physical) and virtual playing piece table gaming is disclosed.

This new table consists of one or more surface computing displays that covers a portion or the complete table game surface. All play objects (cards, dice, play chips) are optically marked with a visible or invisible bar-code or other optical pattern to uniquely identify the object from all other objects or to identify the object class and/or value like (King of Hearts, or Dice #6, $100 chip). In addition the player patron card is optically marked with an invisible or visible pattern that can be scanned to provide the player ID or other player centric data. The surface computer is cable of optically scanning the play cards, play chips, dice, and patron cards that are lying on the table. Thus the entire table gaming experience can be monitored by the casino systems to provide COMPING, Bonusing, new types of table game experiences, Player identification, security, audit ability while still retaining the traditional play piece elements with the real feel of table gaming. This disclosure will provide a natural transition to full virtual or video table gaming in the future. This surface computer table game provides for secondary table game bonuses and virtual play pieces and virtual chips or player account funds to be used in addition to the real items traditionally used by players (chips, cards, dice, etc.). Completely or partially video rendered bonus games, secondary games may be played by the players at the same time or at the conclusion of the primary card or dice game. This disclosure allows for the interactive group table game play amongst multiple table games and players spanning multiple locations. Remote display only devices or user interactive devices throughout the casino, spanning casinos, at a patrons home, can display the table game play being rendered. Real cards on the actual table game surface are rendered as virtual cards on these alternate devices.

As set out in detail herein, embodiments of electronic gaming table systems may include a single surface computing device or multiple surface computing devices, displays, projectors, scanners, etc. Irregularly shaped or overly large table game surfaces may be realized. Such surface computing devices may be located in very close proximity to one another such that from a perspective of a user or player, the individual surface computing devices are effectively one large display and touch area. Physical objects moved from one surface computing device to another would allow corresponding visual changes to the appropriate surface computing display device. In some embodiments there may be one computing device driving multiple display projectors and surface scanners. The surface computing device may have multiple video cards supporting the driving of the media to each projector. An image (e.g., video image) may be projected onto the playing surface from above the playing surface. For example, a non-limiting example is a projector on the ceiling of the casino or suspended relative above height of a gaming table that projects the virtual game layout and/or virtual gaming pieces. Each surface computing device may have respective sensor subsystem configured to sense physical aspects of physical objects, and to report the data or information to the surface computing device. Movement can be directly tracked across all playing surfaces or portions thereof, and the visual display or media can seamlessly move from one playing surface or portion thereof to another, or even span across multiple playing surfaces at the same time or concurrently. An operating system or application software may be configured to support multi-playing surface display. In alternate embodiments, each surface computing device has a respective projector or display communicatively coupled to a respective computing subsystem. Each surface computing device may be networked with other surface computing devices to ensure that movements of the game related pieces (e.g., play pieces, playing cards, other cards, dice, chips, spinners, markers, tokens, tiles, spinners) and media (e.g., loyalty program or patron or club cards or financial cards) and/or other physical objects can be visually rendered and moved across the multiple playing surfaces.

At least one embodiment may be summarized as a game playing system including a display subsystem configured to display images related to one or more games to be played on at least a first game playing surface, the images including a virtual game layout including a number of demarcations of at least one area associated with the play of the one or more games; a sensor subsystem configured to detect at least one physical aspect of at least one game related piece when the game related piece is at least proximate the virtual game layout; and at least one computing subsystem, the at least one computing subsystem communicatively coupled to the display subsystem to control the images displayed by the display subsystem, the at least computing subsystem communicatively coupled to the sensor subsystem to receive information indicative of the at least one physical aspect of the game related piece sensed by the sensor subsystem.

At least one embodiment may be summarized as a method of controlling a game playing system including displaying images related to one or more games to be played on at least a first game playing surface, the images including a virtual game layout including a number of demarcations of at least one area associated with the play of the games; detecting at least one physical aspect of at least one game related piece when the game related piece is at least proximate the first game playing surface; and controlling the images displayed based at least in part on information indicative of the sensed at least one physical aspect of the at least one game related piece.

At least one embodiment may be summarized as a method of operating a table gaming system including from time-to time, determining information about at least one physical game related playing piece being used in a game; from time-to-time saving a state of the game to a computer-readable memory; and on return from an interruption, restoring the state of the game.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 32 is a flow diagram of a method of operating a game playing system environment according to an illustrated embodiment, including reading at least one machine-readable symbol from at least one of participant identification media or financial media located on at least one game playing surface of the game playing system.

FIG. 33 is a flow diagram of a method of operating a game playing system environment according to an illustrated embodiment, including wirelessly reading information from at least one memory of at least one of participant identification media or financial media located at least proximate at least one game playing surface of the game playing system.

FIG. 34 is a flow diagram of a method of operating a game playing system environment according to an illustrated embodiment, including reading information from at least one of a loyalty program card, a credit card, a debit card, or a prepaid card located proximate at least one game playing surface of the game playing system.

FIG. 35 is a flow diagram of a method of operating a game playing system environment according to an illustrated embodiment, including randomly generating a value and displaying an image of an indicator that is indicative of the randomly generated value.

FIG. 36 is a flow diagram of a method of operating a game playing system environment according to an illustrated embodiment, including displaying an image of an indicator that is indicative of the randomly generated value in the form of at least one of a portion of a spinner, a die, a roulette wheel, a playing card, or a bonus card.

FIG. 37 is a flow diagram of a method of operating a game playing system environment according to an illustrated embodiment, including displaying an image that is indicative of a randomly generated value in the form of at least one virtual playing card that is combinable with at least one physical playing card to form a winning combination.

DETAILED DESCRIPTION

Figure 1:
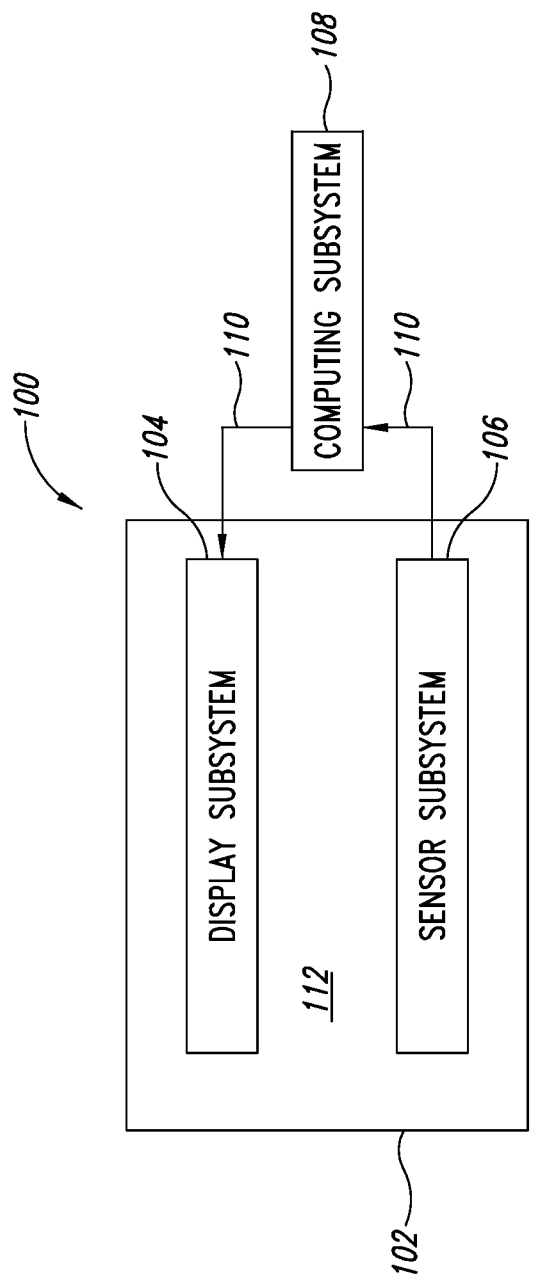
FIG. 1 is a schematic view of a game playing environment according to one illustrated embodiment, including a gaming table, a display subsystem operable to display a virtual game layout, a sensor subsystem configured to sense or detect physical aspects of objects, and a computing subsystem.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the term "physical" refers to tangible elements associated with a game. Such elements may take a variety of forms, including but not limited to playing cards, chips, dice, tiles, spinners, tokens or markers for instance chess pieces, checker pieces, pieces that represent players, houses in MONOPOLY, ships in BATTLESHIP, wedges in TRIVIAL PURSUIT, etc. As used herein, the term "virtual" refers a logical construct of an element associated with a game and a visual display of the logical construct, where there is no physical counterpart to the particular element in use in the game as the game is being played. For example, a virtual game layout refers to the logical construct of a layout of a game and the visual display of the game layout (e.g., demarcations typically found on a board or felt). As another example, a virtual playing card refers to the logical construct of a playing card which does not represent a physical playing card dealt or drawn in the game. As another example, a virtual chip refers to the logical construct of a monetary value which does not represent a physical chip placed as a wager in the game. As used here in the term "representation" or "visual representation" refers to a visual display of an icon or other graphical element that is representative of a physical object associated with a game. For example, visual icon may be displayed representing a physical playing card, physical chip or physical dice that are in use in the game.

Description of Game Playing Environments

FIG. 1 shows a game playing environment 100 according one illustrated embodiment.

The game playing environment 100 takes the form of at least one game playing system, for example a table gaming system or an upright or arcade style gaming system. In at least one embodiment, the table gaming system may include a gaming table 102, at least one display subsystem 104 associated with the table gaming 102, at least one sensor subsystem 106 associated with the gaming table 102, and at least one computing subsystem 108 communicatively coupled via communications links 120 to the display subsystem 104 and the sensor subsystem 106.

As described in more detail below, game playing environments 100 or game playing system may employ virtual game layouts including displays of various demarcations associated with a variety of games. The demarcations may, for example, set out various fields or areas associate with a game. For instance, the demarcations may set out wager or betting areas, a place where playing cards are to be positioned or may set out a path around which tokens are moved.

In particular, the computing subsystem 108 may cause the display subsystem 104 to display the virtual game layout in the form of demarcations on or below a playing surface 122 of the gaming table 102. The sensor subsystem 106 may sense or detect physical aspects of physical objects such as game related pieces (e.g., playing cards, chips, dice, tokens, tiles, markers, spinners). Additionally, or alternatively, the sensor subsystem 106 may sense or detect physical aspects of physical media, for instance identity media (e.g., loyalty program cards, drivers' licenses, passports, company identification badges) and/or financial media (e.g., credit cards, debit cards, prepaid cards). Additionally or alternatively, the sensor subsystem 106 may sense or detect physical inputs (e.g., selection of keys or icons) by individuals for example participants such as players and/or dealers.

The sensor subsystem 106 may provide information regarding the sensed or detected physical aspects, identity or financial media and/or individual inputs to the computing subsystem 108 for processing. The computing subsystem 108 may cause the display subsystem 104 to update the display of certain information based on the information received from the sensor subsystem 106. Additionally or alternatively, the computing subsystem 108 may process the received information, for example to determine actual value of a patron, place orders, detect suspect playing patterns, perform accounting, evaluate dealer performance, etc. Details of such processing and further aspects are described as part of the description of the various specific embodiments discussed herein.

Figure 2A:
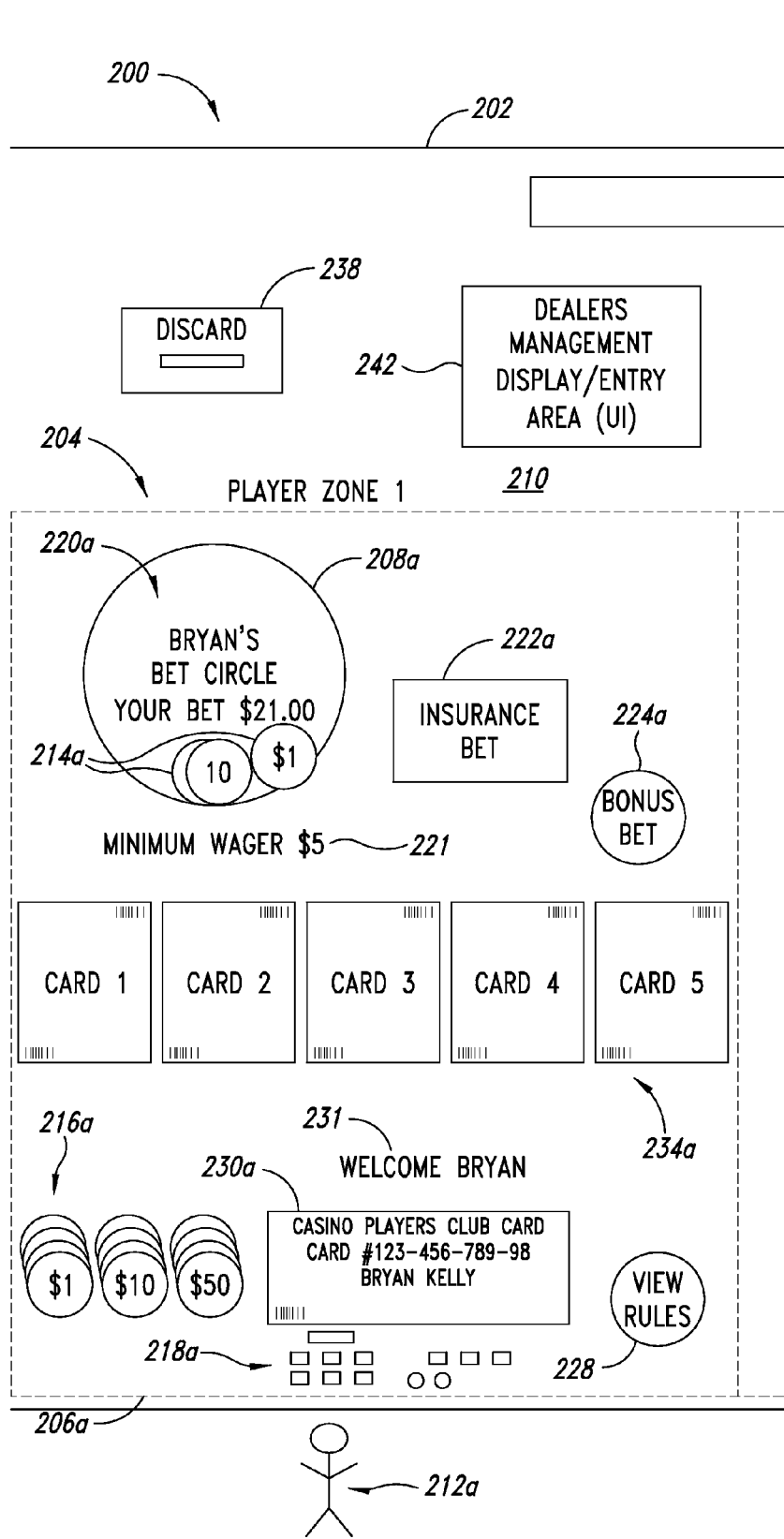
FIGS. 2A, 2B and 2C are schematic diagrams of a game playing environment according to multiple illustrated embodiments, including a gaming table with a virtual game layout including demarcations associated with multiple player positions, a number of physical objects such as playing cards and chips, a number of players and a dealer or attendant may be present in the game playing environment.
Figure 2B:
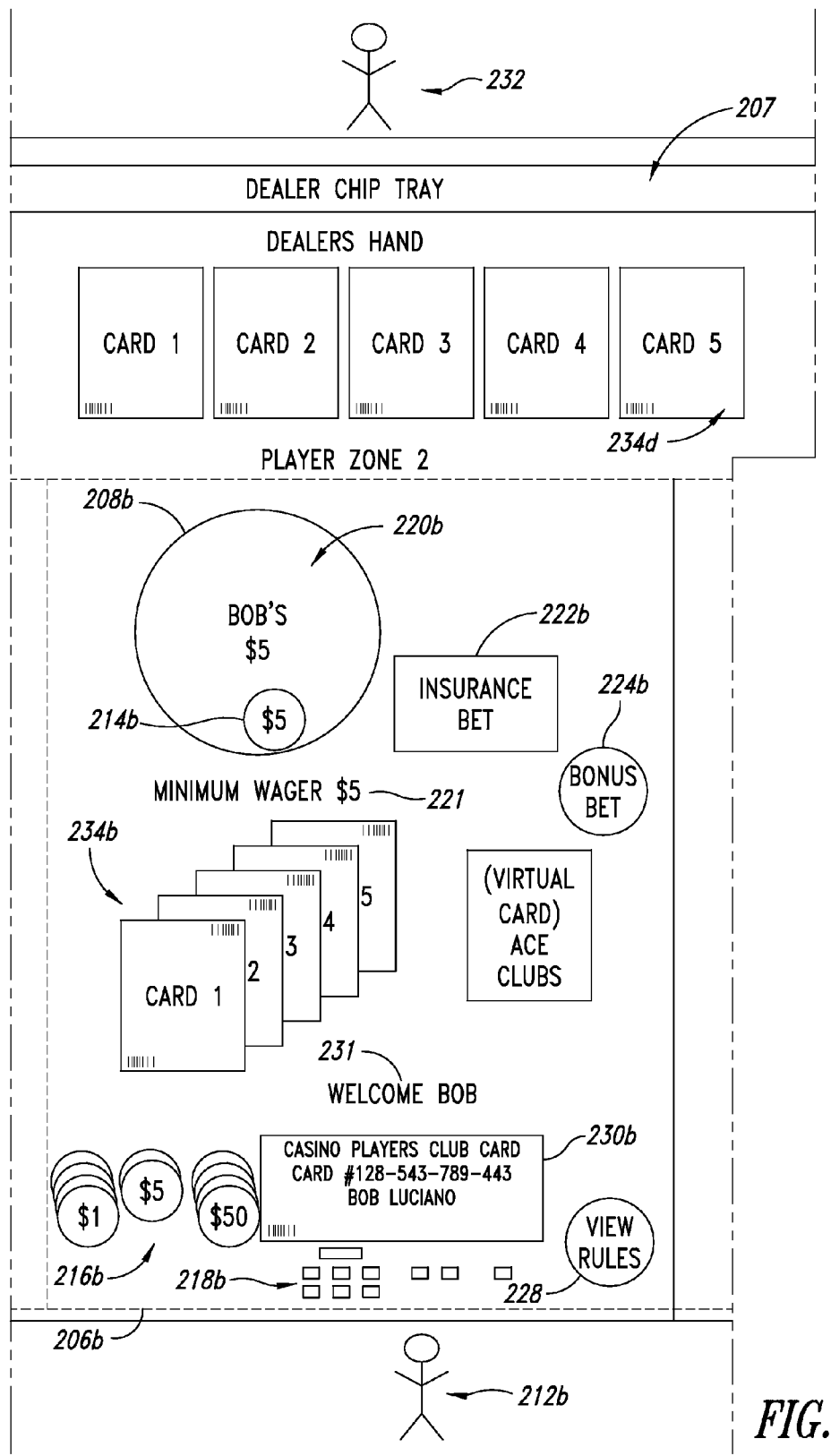
Figure 2C:
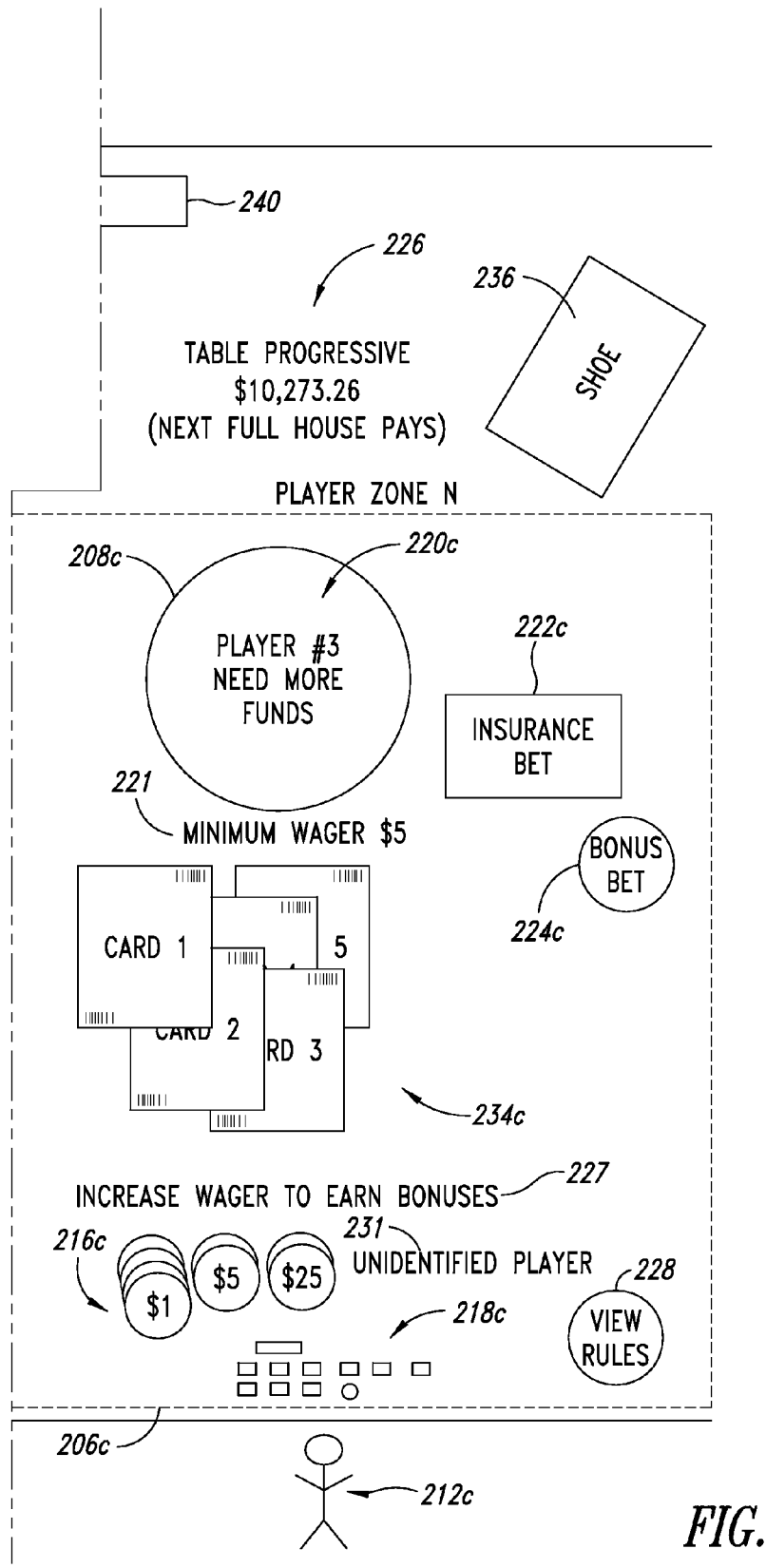

FIGS. 2A, 2B, and 2C show a gaming environment 200 according multiple illustrated embodiments.

The gaming environment includes a table gaming system 202 having a virtual game layout 204 including various demarcations appropriate to the game of Blackjack. While represented in FIG. 2A as a virtual game layout 204 suitable for Blackjack, the game playing systems described herein, such as a table gaming system 202, may include virtual game layouts for other games. For example, the table gaming system 202 may include virtual game layouts for games which typically involve wagering, for instance, poker, roulette, craps, baccarat, LET IT RIDE, PIA GOW poker, etc. Also for example, the table gaming system 202 may include virtual game layouts for games which typically do not involve wagering, for instance chess, checkers, MONOPOLY, SCRABBLE, TRIVIAL PURSUIT, BATTLE SHIP, RISK, LIFE, CANDYLAND, and CHUTES AND LADDERS. It is noted that many games commonly associated with wagering may be played without wagering or with pretend money or chips. Likewise, wagers may be placed in or on many games that are not commonly associated with wagering, such as board games. One of the advantages of some of the embodiments described herein is the ability to rapidly change a table gaming system between various games to accommodate the desires of the patrons or casino.

The table gaming system 202 has a number of player positions 206a-206c (collectively referenced as 206) and, optionally a dealer position 207.

The table gaming system 202 may include one or more secondary displays in addition to the principal display(s). The playing surface of the table gaming system 202 may include a single surface computing display or device, or multiple surface computing displays or devices in close proximity to each other. Each player may have a respective portion of zone of a single surface display or may have their own respective surface display.

In certain games the player positions 206 are typically associated with a primary wagering area, commonly referred to as a betting circle. The virtual primary wagering area on the table gaming system 202 may be visually identified virtually identified by betting circle demarcations 208 a-208c (collectively 208) displayed on or below a playing surface 210 of the table gaming system 202. A player 212a-212c (collectively 212) may place a bet or wager on the outcome of the game being played or an event in the game being played by locating one or more physical chips 214a, 214b (collectively 214) or other items of value in the respective betting circle demarcations 208a-208c from the player's 212 respective chip reserves 216a-216c (collectively 216). Additionally or alternatively, a player 212 may place a primary wager by entering appropriate information via a respective user interface 218a-218c (collectively 218). Information 220a-220c (collectively 220) about the wager may be displayed, for example within or proximate the betting circle demarcations 108. For example, information 220a, 200b may be displayed indicating a total amount wagered and/or information 220c may indicate that a player has yet to place a wager. The virtual game layout 204 may also include information 221 indicative of a minimum and/or maximum range for the primary wager.

The player positions 206 may also be associated with respective additional wagering areas.

For example, in certain games player positions 206 may include a virtual insurance bet area which allows the player to place an insurance bet or similar wager on the occurrence of particular event (e.g., when the dealer has an Ace showing). The insurance bet area on the table gaming system 202 may be visually identified by insurance bet area demarcations 222a-222c (collectively 222) displayed on or below the playing surface 210 of the table gaming system 202. A player 212 may place an insurance bet by locating one or more physical chips or other items of value in the respective insurance bet demarcations 222. Additionally or alternatively, a player 212 may place an insurance bet by entering appropriate information via a respective user interface 218a-218c.

Also for example, in certain games the player positions 206 may optionally include a virtual bonus wagering area, commonly referred to as a bonus betting circle. The bonus wagering area on the table gaming system 202 may be visually identified by bonus wagering area demarcations 224a-224c (collectively 224) displayed on or below the playing surface 210 of the table gaming system 202. A player 212 may place a bonus bet or bonus wager by locating one or more physical chips or other items of value in the respective bonus betting circle demarcations 224a-224c. Additionally or alternatively, a player 212 may place a bonus wager by entering appropriate information via a respective user interface 218a-218c.

A bonus wager or bet may entitle a player 212 to participate in a bonus. The bonus wager may be in addition to a conventional or primary wager on the outcome of the game being played at the gaming table 102 under the standard rules of the game, and entitles a player to participate in award of a bonus pool. In some embodiments, placement of the conventional wager will entitle a player to participate in the bonus pool.

The bonus may take any of a variety of forms including a jackpot, progressive jackpot or other type of bonus. For example, if a player has placed a wager, the computing subsystem or some other computing system may increase the bonus pool by an appropriate amount. The amount may be, for example, a fixed amount or a percentage of the wager. In some embodiments, the entire bonus wager may be placed into the bonus pool. In other embodiments, a portion of the bonus wager may be placed in the bonus pool. In other embodiments, a portion of the conventional or primary wager may be placed in the bonus pool. The bonus pool may include contributions from a single gaming table, more than one gaming tables, a single pit, multiple pits, a single property or multiple properties. The bonus pool may additionally, or alternatively, include contributions from one or more game operators, casinos or property owners as a promotional prize.

The outcome of the bonus may be based any of a variety of events, for example an event related to the player's own hand or the dealer's hand, an event occurring at the particular table gaming system 202, and event occurring at another gaming table, an event occurring at one or more specific properties, a randomly generated event or value (e.g., outcome of random number generator), and/or a passage of a set or a random amount of time. Likewise, the size or composition of the bonus may be based on any of a variety of factors, for example total amount of bonus wagers by a player, by players at a table, by players at a property, by players across multiple properties, a total amount of primary wagers, an amount of time or number of wagers over a period of time, a set contribution amount by one or more properties, outcome of a random number generator, etc. The bonus pool may take the form of money or equivalent (e.g., chips) prizes. Also as noted above, the bonus pool may additionally, or alternatively include goods and/or services. For example, the bonus pool may include automobiles, recreational equipment, vacation packages, and/or services such as meals, shows, drinks, casino club points, cash, promotional game credits, combinations of prize types, etc., which may be available on the property or off the property.

Bonus related Information 226 about the current status of a bonus may be displayed on or below the playing surface 210 of the gaming table. The bonus related information 226 may include information about the type of bonus (e.g., table progressive), the current size or amount of the bonus (e.g., $10,273.26), and/or the condition for winning the bonus (e.g., next full house pays). Player specific bonus related information 227 may be displayed on or below the playing surface 210 of the gaming table at one or more player positions 206c. For example, player specific bonus related information 227 may indicate that in increase in a primary wager is necessary to earn or to be entitled to participate in the bonus.

In some embodiments the table gaming system 202 may allow a player 212 to view or otherwise receive information about the rules of various games, for example the game associated with a currently displayed virtual game layout 204. The table gaming system 202 may, for example, include a user selectable icon or operable key 228, selection or operation of which produces a display of information about the rules of the game for the current virtual layout 204. In some embodiments, the display may include a narrative or prose explanation of the rules of the games. In some embodiments, the display may include a video showing the game being played. The video may be presented in its own isolated area. Alternatively, the video may incorporate one or more of the demarcations of the currently displayed virtual layout 204. For example, the video may illustrated the placement of certain wagers by displaying images of virtual chips in respective demarcated wager or bet areas or circles. Also for example, the video may illustrate various playing card combinations displaying images of virtual playing cards at various player positions 206. Such may be more informative and more entertaining than a display of a narrative or prose version of the rules.

In some embodiments the sensor subsystem 106 (FIG. 1) of the table gaming system 202 may be capable of reading information from media 230a, 230b (collectively 230), for example identity media and/or financial media. In such embodiments, the table gaming system 202 may have a specific area in which the media 230 is located. Information read from the media may allow the collection, tracking and/or analysis of a variety of player specific information such as player worth, any may allow automation of the determination of complimentary benefits (commonly known as "comps") that are issued to reward players 212. The information may also allow customization of player positions 206, for example allow the display of messages 231 tailored to specific players 212.

The table gaming system 202 may also includes various system components including: game monitoring units (e.g., Bally MC300), magnetic or smart card reader(s), pin pads, iVIEW player tracking displays, speakers, amplifiers, audio mixers, biometric input devices, printers and other input/output devices. In one embodiment the sensor subsystem may scan a fingerprint or hand print of a patron such as a player, for use in identifying the player or in authorizing a financial transaction.

In many games, for example Blackjack, a dealer 232 deals physical playing cards 234a-234c to the players 212, and in some games the dealer 232 may deal physical playing cards 234d (collectively 234) to the dealer's own self. The dealer 232 may deal physical playing cards 234 from a handheld deck or from a card shoe 236. The card shoe 236 may, for example take the form of a playing card handling system, for example, an automatic shuffling machine. The dealer 232 may collect playing cards 234 from the players 212 and the dealer's own self and after each hand is played out or after all hands have been played out. The dealer 232 may place the collected playing cards 234 in a discard shoe or receptacle 238. In some embodiments, the card shoe 236 and discard shoe or receptacle 238 are part of a single device that randomizes the playing cards 234.

In many games the dealer 232 uses a chip tray 240 for storing wagers commonly represented by chips or other physical objects collected from losing players 212 and for paying out winnings to winning players 212.

The table gaming system 202 may include a dealer interface 242 that provides information to the dealer 232 and/or allows the dealer 232 to input information, make selections, control various aspects of the game, view information about specific players 212, and/or request assistance. The dealer interface may include one or more dealer selectable icons and/or dealer operable keys.

Figure 3:
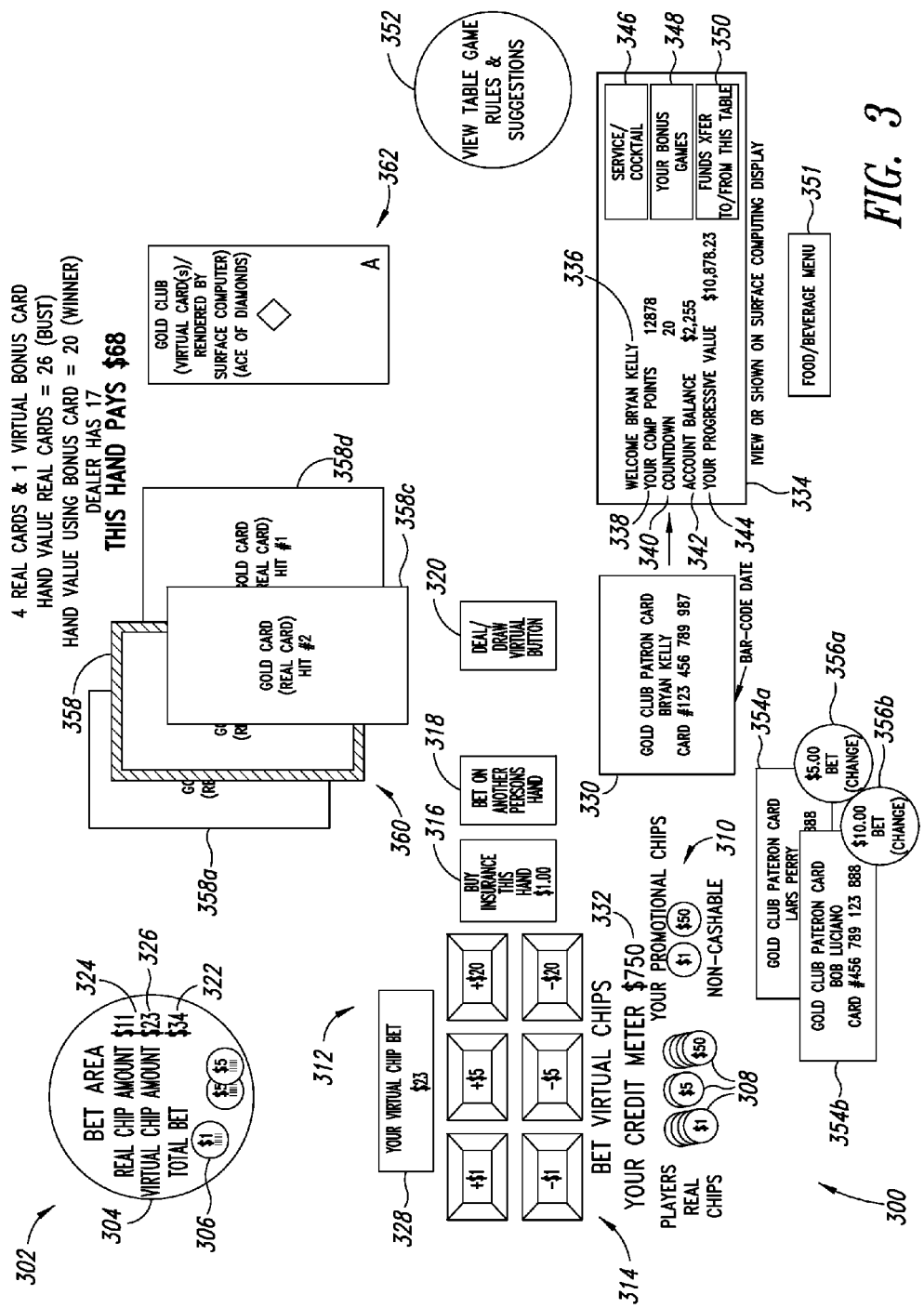
FIG. 3 is a schematic diagram of a player position of a game playing environment according to one illustrated embodiment, the player position including a virtual game layout having demarcations identifying betting or wagering areas and a user interface, a virtual playing cards, virtual chips, the player position also including a number of physical objects such as physical playing cards and chips and media such as player identity or financial media.

FIG. 3 shows a player position 300 according to one illustrated embodiment, including a virtual game layout 302 for use with one or more physical objects.

The virtual game layout 302 of the player position 300 includes betting circle demarcation 304. Primary wagers or bets may be made by placing an appropriate number of physical chips 306 within the betting circle demarcation 304. As discussed in detail below, the sensor subsystem 106 (FIG. 1) is configured to detect the number and/or value of the physical chips 306 located in the betting circle demarcation 306.

A primary player may store or locate their bank of physical chips 308 in a variety of locations at the player position 300, or the virtual game layout 302 may include chip storage area demarcation (not shown). In some embodiments, the sensor subsystem 106 (FIG. 1) is configured to detect the number and/or value of the physical chips 308 in the player's bank.

In some embodiments, promotional or bonus amounts may be provided to individual players for placing wagers. Such may be a form of comping or other award or reward to a player. Such may for example, be based on amount wagered, time spent wagering, assessed skill level, and/or previous wagering, etc. In some embodiments, the amount may not be converted directly into currency, but rather must be wagered or forfeited. In embodiments employing promotional amounts (i.e., amounts restricted to replay on the gaming device), the virtual game layout 302 of the player position 300 may include a virtual promotional amount, for example in the form of virtual chip icons 310 having a cumulative value equal to that which has been assigned or allocated to the specific player. The virtual chips icons 310 may be placed as a wager, for example in response to player selections via a player user interface 312.

The player user interface 312 may include one or more player selectable icons which may be displayed by the display subsystem 104 (FIG. 1) on or below the playing surface 210 (FIG. 2A) of a gaming table. For example, the player user interface 312 may include player selectable icons 314 that allow the player to increment or decrement a wagered amount on a primary wager. Also for example, the user interface 312 may include player selectable icons 316 that allow the player to place an insurance wager (i.e., "buy insurance") and/or player selectable icons 318 to place a wager as a back betting or secondary player on another player or hand on same or different table. The player user interface 312 may include one or more player selectable icons 320 that allow the player to have a physical or virtual card dealt or drawn.

In some embodiments, the user interface 312 may include a number of player selectable physical keys (not shown in the Figure) in place of, or in addition to, the various player selectable icons. Alternatively, or additionally, the virtual chips icons 310 may form part of the player user interface 312. For example, a player may place a wager by selecting one or more of the virtual chip icons 310 and/or by selecting a desired wagering or betting area or circle 304. For instance, a player may place a wager by touching a virtual chip icon 310 to select the virtual amount represented by that virtual chip icon 310 and dragging the virtual chip icon 310, for example with a finger to the desired wagering or betting area or circle 304 to select the desired wagering or betting area or circle 304.

In some embodiments, the virtual game layout 302 may display a indication 322 of a total of the currently wagered amount, as well as an indication 324 the amount wagered using physical chips and an indication 326 of the amount wagered in promotional chips or amounts represented by the virtual chip icons 310. Such may, for example, be displayed within the betting circle demarcation 304. The virtual game layout 302 may display an indication 328 of the total wager in promotional chips or amount proximate the icons 314.

In some embodiments, the virtual chip icons 310 may be convertible into lower or higher value denominations. For example, a defined selection mechanism may allow a player to vary the number denomination of the virtual chip icons 310. For instance, tapping twice on a virtual chip icon 310 may produce two virtual chip icons, each with half the value of the selected tapped virtual chip icon 310.

The virtual chip icons 310 may advantageously be displayed proximate the location of the physical chips 308, allowing a player to assess their entire bank. In embodiments without a defined player bank area, the virtual chip icons 310 may be displayed proximate a location at which the player's bank is determined to reside. Thus, the virtual layout 302 of the player position 300 may be customized in response to the player's placement of their chips 308.

The virtual game layout 302 of the player position 300 may also include an area or location to place primary player associated physical media 330, for instance identity media (e.g., loyalty program cards, drivers' licenses, passports, company identification badges) and/or financial media (e.g., credit cards, debit cards, prepaid cards, cellular phones, smartcards). The primary player associated physical media 330 identifies the primary player and/or an account that belongs to or is otherwise associated with the primary player. The virtual game layout 302 may, or may not, include demarcations of the primary player media placement area or location. As discussed in detail below, the sensor subsystem 106 (FIG. 1) is configured to read information from the primary player media 330 located in the media placement area or location, or located in other areas on the playing surface 210 (FIG. 1) or otherwise proximate the table gaming system 202. For example, an RFID interrogation system may employ antenna in or around the table gaming system 202 to detect primary player media 330 which carries one or more RFID transponders.

Information read from primary player physical media 330 may allow the primary player to establish credit, for example withdrawing funds from an account or from a prepaid card or charging to an account. The virtual game layout 302 may display an indication 332 of a total amount of credit (e.g., player's account) that the primary player has established. The indication 332 may also reflect amounts that are automatically debited upon each wager from the credited amount (e.g., player's account)

The virtual game layout 302 of the player position 300 may also include an area or location 334 to display player specific information or allow player specific requests to be made. For example, virtual game layout 302 may display a player identifier 336 such as a name, an indication 338 of a current total of comp points that have been awarded to the player, a count down 340, an indication 342 of a total account balance, and an indication 344 of a player specific progressive value. Player selectable icons may be provided for a variety of player requests. For example, a player selectable icon 346 to request service or beverage, a player selectable icon 348 for bonus games and/or a player selectable icon 350 to execute a funds transfer. The virtual game layout 302 may include a menu 351 of food, beverages or other items of services.

As noted previously, the virtual game layout 302 may include a player selectable icon 352 to allow a player to receive information about one or more games, for example including the rules, video demonstrating the game, and/or suggestions on game play.

The virtual game layout 302 of the player position 300 may also include an area or location to place back betting or secondary player associated physical media 354a, 354b (collectively 354), for example identity media and/or financial media. The back betting or secondary player associated physical media 354 identifies the a back betting or secondary player that is wagering on the play of a primary player or a primary player's hand and/or an account that belongs to, or is otherwise associated with, the back betting or secondary player. The virtual game layout 302 may, or may not, include demarcations identifying the back betting or secondary player media placement area or location. As discussed in detail below, the sensor subsystem 106 (FIG. 1) is configured to read information from the media 354 located in the back betting or secondary player media placement area or location. In some embodiments, the sensor subsystem 106 may read information from the physical media 354 located elsewhere on the table surface 210, or even proximate the player position 302. In such embodiments, precautions should be taken to assure that information read is actually intended to be a wager placement. One approach to assuring such is limiting a range of the sensor subsystem 106. Additionally or alternatively, the system may determine a position of the physical media 354 and associate the determined position with a closest one of the player positions. The position of the physical media 354 may be determined in a variety of ways, for example in absolute or relative coordinates, and/or in Cartesian or polar coordinates. The position of the physical media 354 may, for example, be determined using triangulation, time of flight measurements or differences in time between receipt of responses to interrogation signals.

The virtual game layout 302 of the player position 300 may also include an indication 356a, 356b (collectively 356) of information that is indicative of a wager placed by a back betting or secondary player. For example, the virtual game layout 302 of the player position 300 display an indication 356 that provides an amount or size of a back line bet or wager placed by one or more back betting or secondary players. The indication 356 may be proximate the location of the respective back betting or secondary player associated media 354a, 354b.

A number of physical playing cards 358a-358d (collectively 358) may be positioned on the playing surface 210 in the player position 302. The physical playing cards 358 may have been dealt to the player 212a (FIG. 2A) by the dealer 232. In some games, players 212 may touch and/or move the playing cards 358, while in other games the players 212 are not permitted to touch the playing cards 358.

In some embodiments, the virtual game layout 302 may provide an emphasis indication 360 with respect to one or more physical playing cards 358b. For example, the virtual game layout 302 may include a border, highlight, change in background color, flashing, marqueeing or other visual emphasis to indicate information about one or more particular playing cards 358b.

Some embodiments may employ virtual playing cards and/ or virtual bonus cards 362 in addition to, or as a substitute for, physical playing cards 358. The virtual game layout 302 may display the virtual cards 362 on or below the playing surface 210 of the gaming table at the particular player position 302 to whom the virtual card is dealt. The virtual playing cards 362 may be used with the physical playing cards 358 or in place of a respective one of the physical playing cards 358 in forming a hand under the rules of the respective game. Thus, virtual playing cards 362 can be combined with one or more of the physical playing cards 358 to form a winning combination of playing cards. The virtual playing cards 362 may, for example, be dealt or drawn in response to player activation or selection of the player selectable icon 320.

Figure 4A:
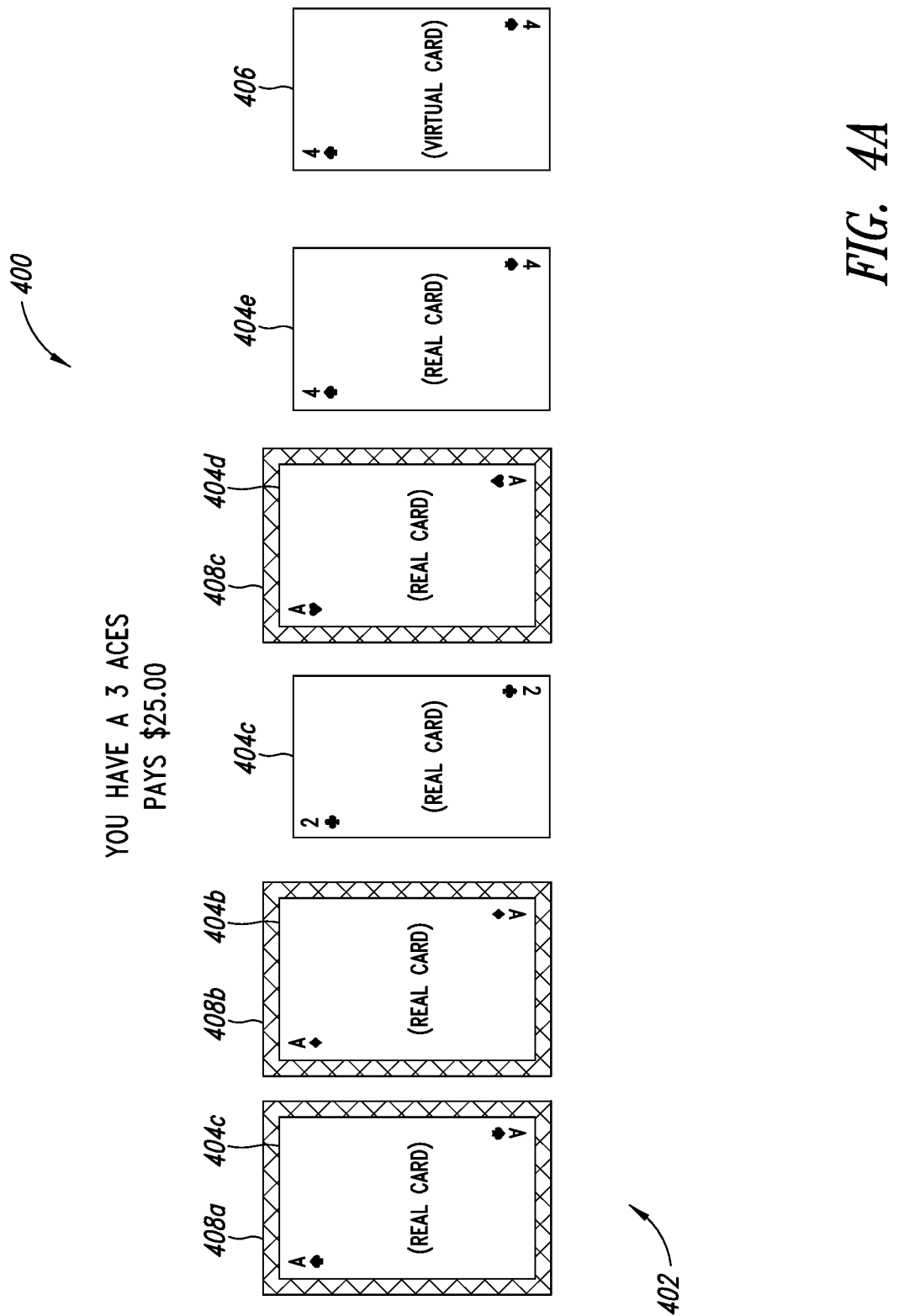
FIG. 4A is a schematic diagram of a portion of a player position of a game playing environment according to one illustrated embodiment, the portion of the player position including a number of physical playing cards and a virtual playing card.

FIG. 4A shows a portion of a virtual game layout 400 that includes a portion of a player position 402, illustrating the use of physical playing cards and virtual playing cards according to one illustrated embodiment.

A player 212a (FIG. 2A) may have been dealt or drawn a total of five physical playing cards 404a-404e (collectively 404). The player may also have been dealt or drawn one or more virtual playing cards 406. The display subsystem 104 (FIG. 1) displays the virtual playing cards 406 on or below a gaming surface 210 (FIG. 2A). A bonus multiplier or other symbol can also be added to a physical playing card by highlighting a specific playing card or group of playing cards in some way.

A winning combination may, for example, consist of the three playing cards 404a, 404b, 404d having the rank of Ace. The virtual game layout 400 may include an emphasis indication 408a-408c (collectively 408) identifying each of the physical playing cards 404a, 404b, 404d in the winning combination. The emphasis indication 408 may, for example, include a border, highlight, change in background color, flashing, marqueeing or other visual emphasis. Additionally or alternatively, the virtual game layout 400 may include an appropriate message regarding the winning combination (e.g., "You have 3 Aces, Pays $25.00").

Where the game is poker, the winning combination may be a full house, formed by both physical and virtual playing cards, for instance the three cards having the rank Ace and 402a, 402b, 402d along with two playing cards having the rank four 402e, 404. An emphasis indication 408 in such an embodiment may highlight the virtual playing card 406, as well as the physical playing cards 404 making up the particular winning combination.

Figure 4B:
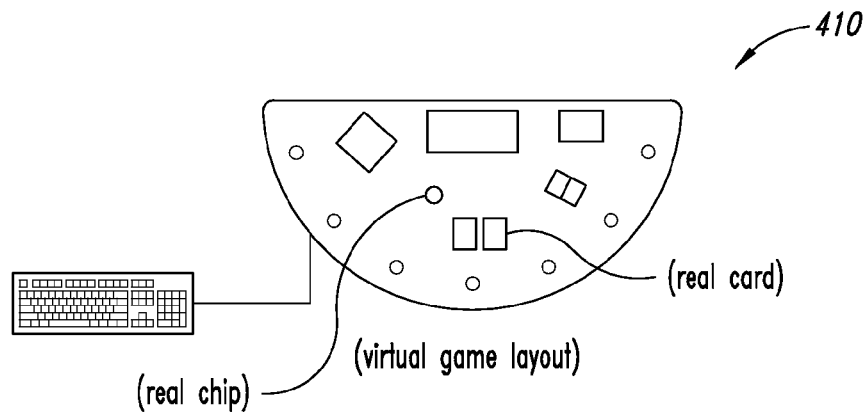
FIG. 4B is a schematic diagram of a portion of a game playing environment according to one illustrated embodiment; the illustrated portion includes a virtual layout of a blackjack table including a physical playing card, a virtual playing card, and a real chip.

FIG. 4B shows a virtual layout of a blackjack table 410 with a set of blackjack demarcations and including, for example, physical playing cards, virtual playing cards including real (i.e., physical) chips according to one illustrated embodiments. In some embodiments, the game playing environment may include user input devices in the form of a keyboard or keypad 412. The keyboard or keypad 412 may be operable to allow entry of, for example, a personal identification number, and/or a wager amount.

Figure 4C:
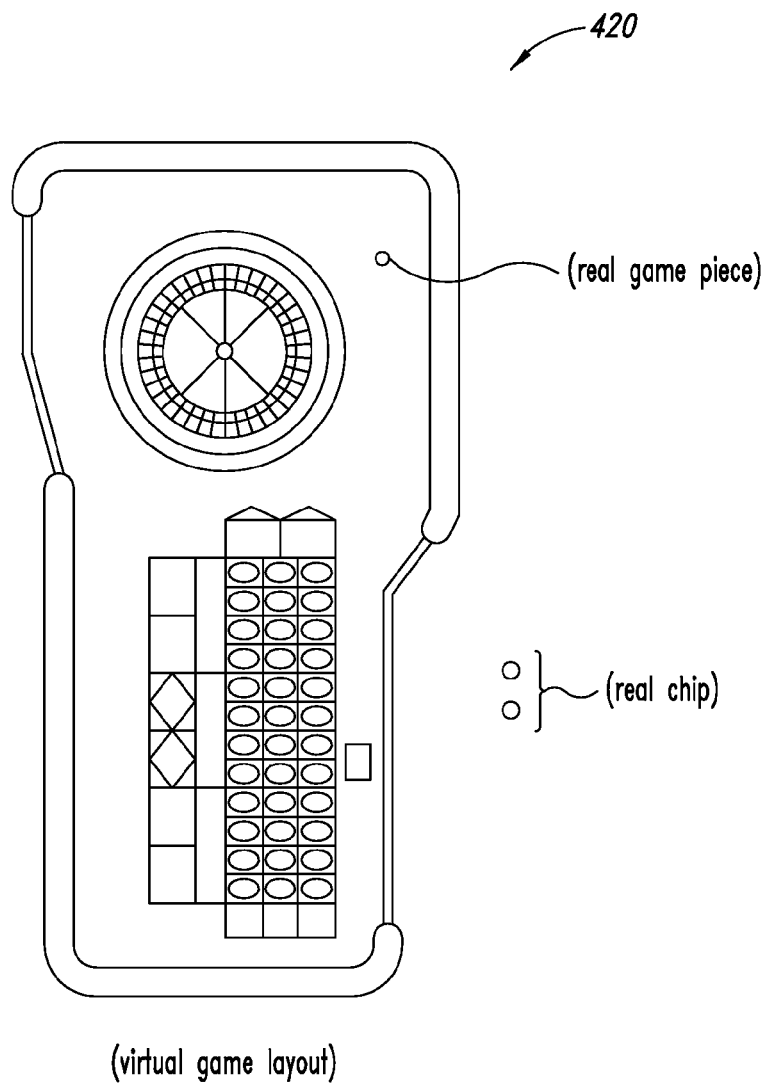
FIG. 4C is a schematic diagram of a portion of a game playing environment according to one illustrated embodiment; the illustrated portion includes a virtual layout of a roulette wheel, a physical game piece, and a real (i.e., physical) chip.

FIG. 4C shows a virtual layout of a roulette wheel 420 with a set of roulette wheel demarcations and roulette table layout demarcations, and including physical game related pieces including real (i.e., physical) chips. In some embodiments, the game field comprises a representation of a roulette table surface, a wheel, and a ball spinnable about the wheel.

Figure 4D:
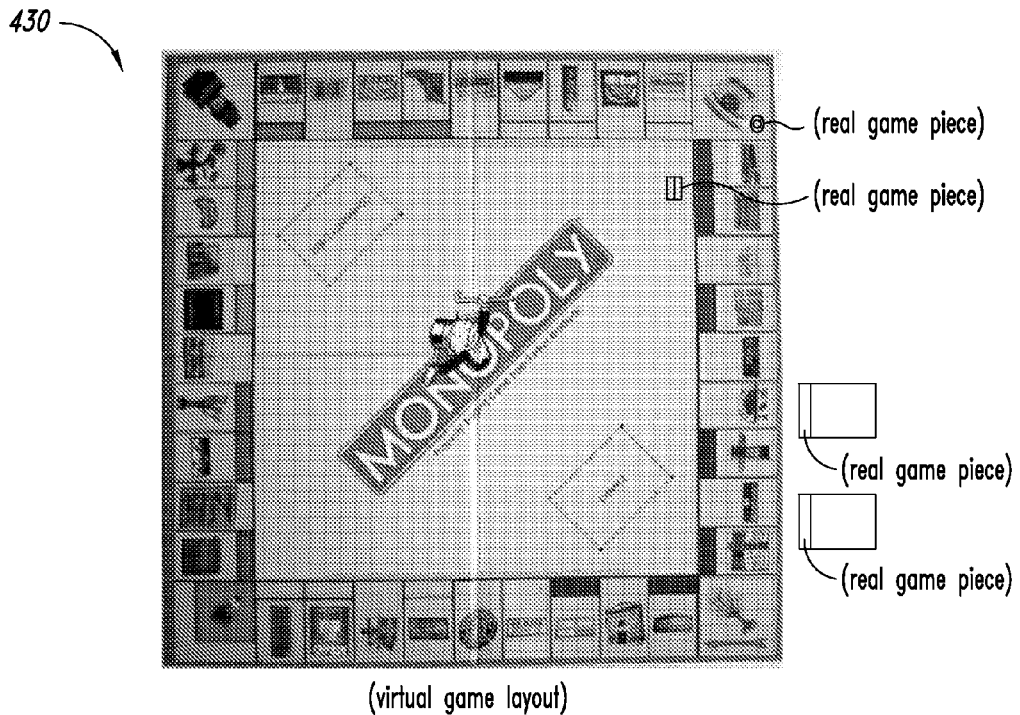
FIG. 4D is a schematic diagram of a portion of a game playing environment according to one illustrated embodiment; the illustrated portion includes a virtual layout of MONOPOLY game board and physical game related pieces.

FIG. 4D shows a virtual layout of MONOPOLY game board 430 with a set of MONOPOLY demarcations, and including physical game related pieces. In some embodiments, the computing subsystem may detect whether new game related pieces (e.g., tokens or markers such as chess pieces, tiles, checkers, or houses, hotels, car, shoe, dog, hat, horse and ride, train, wheelbarrow, thimble, cannot, sack of money, etc.) other than playing cards are on the playing surface.

Figure 4E:
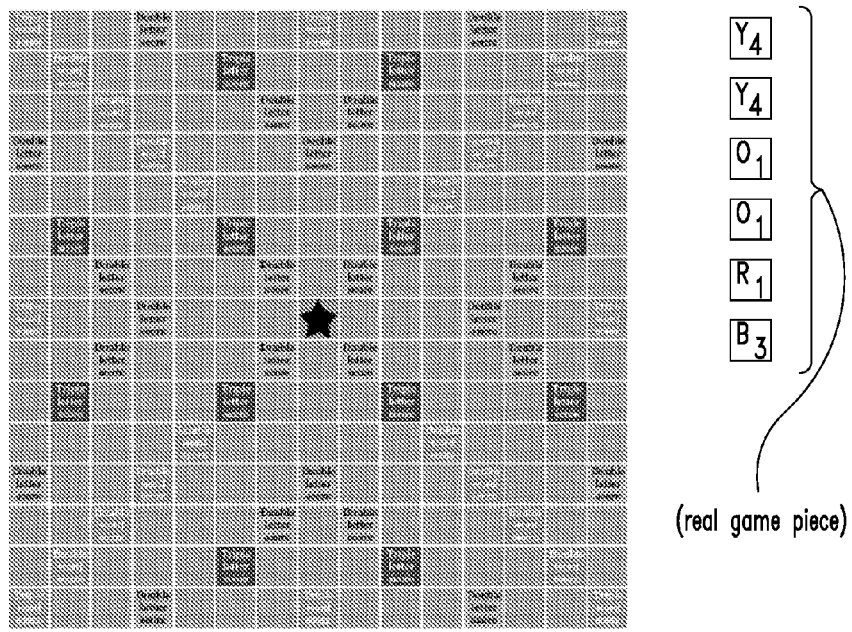
FIG. 4E is a schematic diagram of a portion of a game playing environment according to one illustrated embodiment; the illustrated portion includes a virtual layout of a SCRABBLE game board and physical game related pieces.

FIG. 4E shows a virtual layout of a SCRABBLE 440 game board with a set of SCRABBLE demarcations, and including physical game related pieces in the form of game tiles.

Figure 4F:
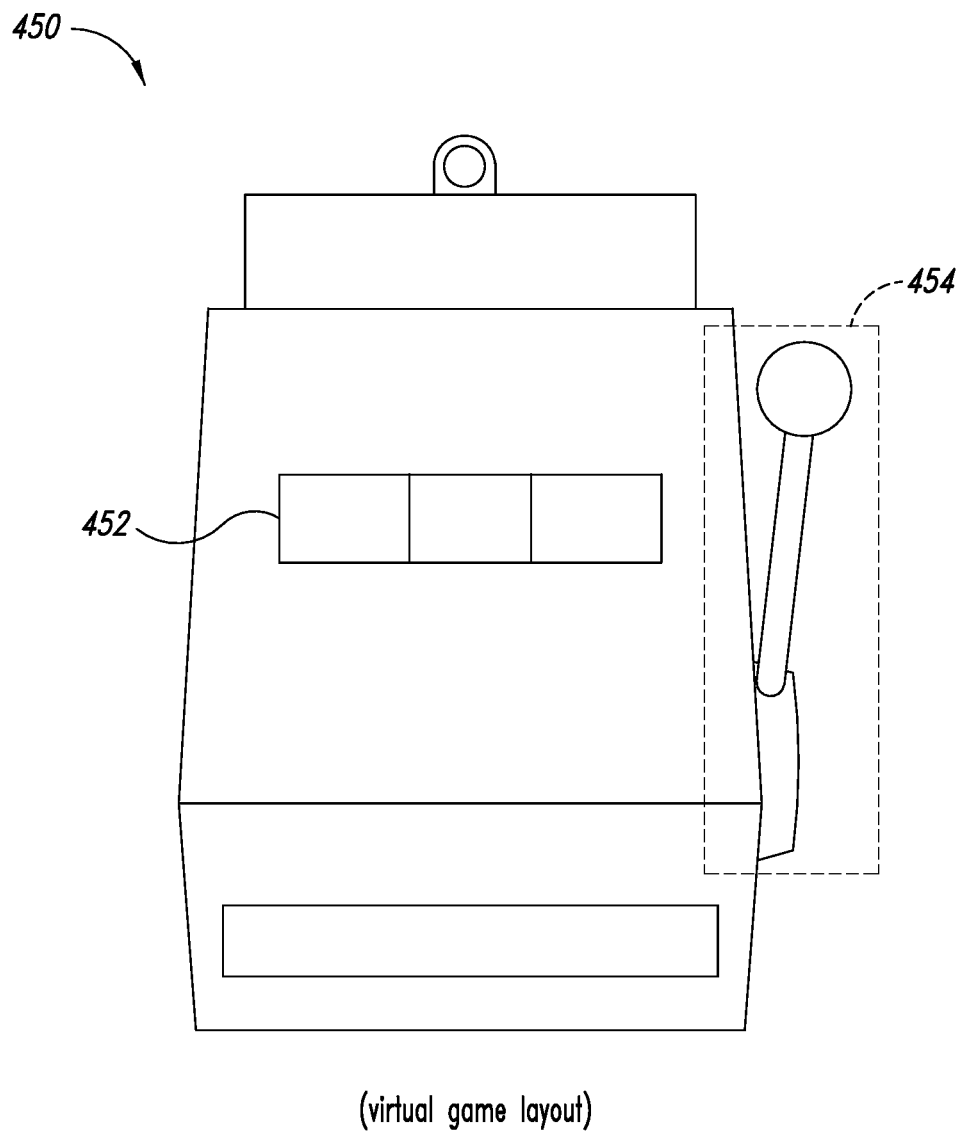
FIG. 4F is a schematic diagram of a portion of a game playing environment according to one illustrated embodiment; the illustrated portion includes a virtual layout of a slot game.

FIG. 4F shows a virtual layout of a slot game 450 with a set of slot game demarcations, and including physical game related pieces. The slot game demarcations may include a virtual reel 452 comprising three or more symbols (e.g., images of fruits, bells, diamonds, hearts, poker games images, and the like) and a virtual lever 454.

Figure 5:
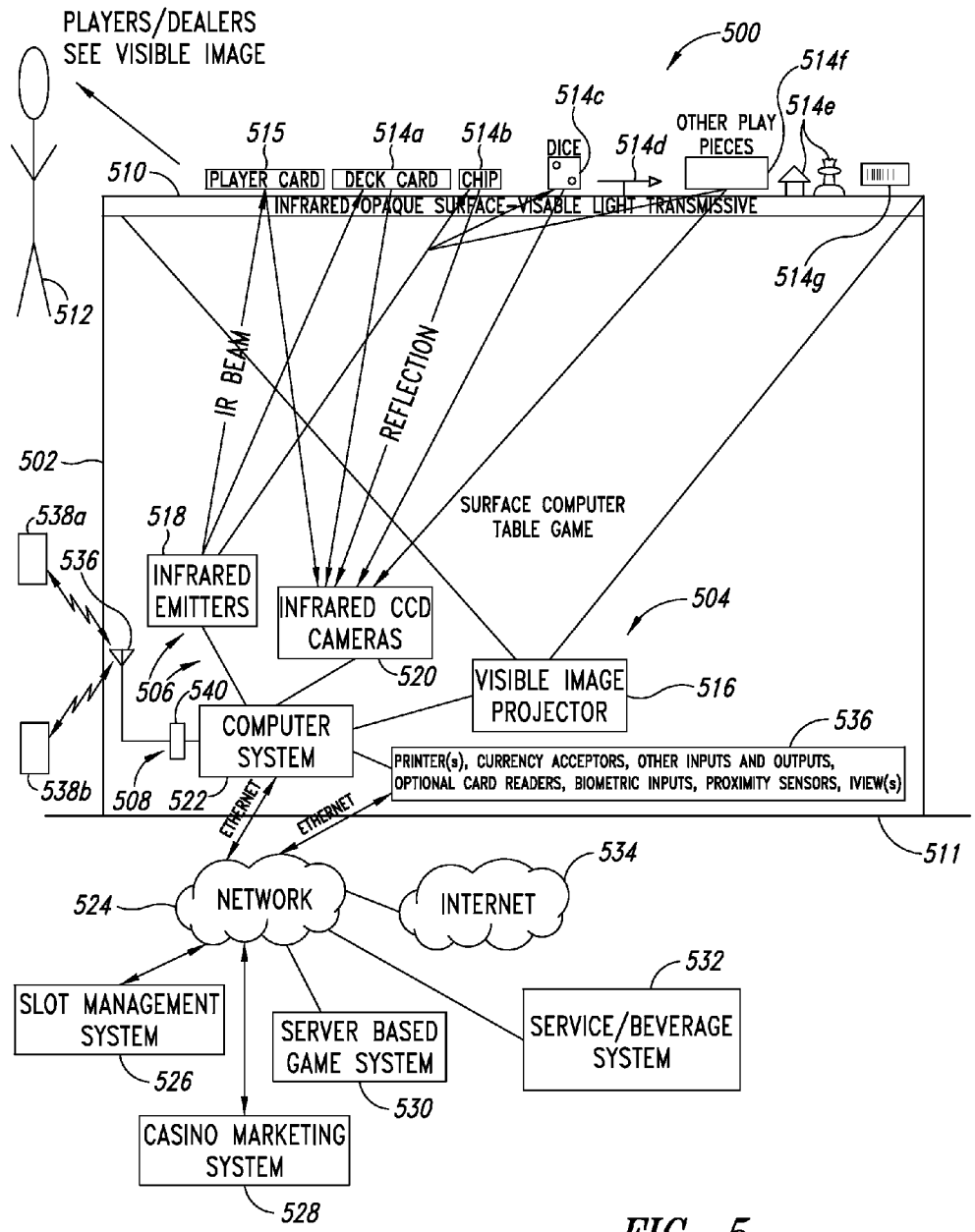
FIG. 5 is a schematic diagram of a table game playing system according to one illustrated embodiment, the table game playing system including gaming table carrying a number of physical objects, a display subsystem including projectors located under the gaming table operable to display a virtual game layout, a sensor subsystem including optical sensors configured to detect physical aspects of the physical objects, and a computing subsystem communicatively coupled with the display and sensor subsystems.

FIG. 5 shows a table gaming system 500 according to one illustrated embodiment.

The table gaming system 500 includes a gaming table 502, display subsystem 504, sensor subsystem 506 and computing subsystem 508 communicatively coupled to the display subsystem 504 and sensor subsystem 506.

The gaming table 502 includes a playing surface 510 that is position such that one or more players 512 may play a game thereupon. The playing surface 510 may, for example, be generally horizontal with respect to floor 512 on which the gaming table 502 is located. For example, the playing surface 510 should be positioned to allow the placement of one or more game related pieces, collectively 514, thereon by the players 512 and/or dealer 232 (FIG. 2A). The gaming table 502 may, for example, take the form of one or more surface computing devices. Game related pieces 514 may take a variety of forms. For example, game related pieces 514 may include physical playing cards 514a, chips 514b, dice 514c, spinners 514d, tokens 514e, markers, and other game related pieces 514f and/or tickets 514g. For example, tickets 514g may bear suitable machine-readable symbols (e.g., bar code, stacked code, area or matrix code). Such tickets 514g may be automatically read, validated and redeemed for credits at the gaming table 502 or credited to an account associate with a player. Also for example, the playing surface 510 may be positioned to allow the placement of one or more pieces of media (e.g., identity media and/or financial media) on the playing surface 510 or proximate thereto.

The playing surface 510 may take the form of material that is clear or at least partially transparent to light in the visible portion of the electromagnetic spectrum. The material also may be transparent or at least partially transparent to infrared portions of the electromagnetic spectrum. The material should be sufficiently strong and scratch resistant to allow thousands of rounds of play to occur thereon without adversely effecting visibility therethrough. In some embodiments, the playing surface 510 is a semi-transparent liquid crystal display (LCD), that allows a band of electromagnetic radiation (e.g., infrared) to pass to illuminate a game related piece or financial media on the playing surface, while also allowing display of a virtual game layout, virtual game related pieces and information. An suitable display may be commercially available from PureDepth Inc. of Redwood City, Calif.

The display subsystem 504 may take a variety of forms. FIG. 5 illustrates the display subsystem 504 as including at least one projector 516 located beneath the playing surface 510. The projector 516 displays the virtual game layout by projecting images on to or through the playing surface 510 toward the players 512.

The sensor subsystem 506 may take a variety of forms. FIG. 5 illustrates the sensor subsystem 506 as including one or more light sources 518 and one or more image capture devices 520. The light sources 518 may take a variety of forms, and may be positioned to illuminate one or more game related pieces 514 and/or media 515 located on the playing surface 510. For example, the light sources 518 may take the form of one or more infrared emitters. The infrared emitters may be collocated, as illustrated in FIG. 5, or may be distributed under the playing surface 510.

The image capture devices 520 may take variety of forms, and may be positioned to capture images of at least a portion of one or more game related pieces 514 and/or media 515 located on the playing surface 510. For example, the image capture devices 520 may take the form of one or more infrared sensitive cameras, for instance charged coupled device (CCD) based cameras or complementary metal-oxide-semiconductor based (CMOS) cameras. In some embodiments, the image capture devices 520 may be broad band sensors, sensitive over a broad portion of the optical spectrum, for example sensitive over the range of visible wavelengths (i.e., wavelengths considered as visible to most humans) or over the range of optical wavelengths (i.e., visible wavelengths as well as infrared and ultraviolet). In some embodiments, the image capture devices 520 may be sensitive on only limited portions of the optical spectrum, for example infrared, near-infrared, or narrow bands like laser red (694 nM). Such embodiments may employ one or more filters to selectively pass some wavelengths while blocking other wavelengths. Where multiple cameras are employed, the cameras may be collocated or may be distributed under the playing surface 510.

The computing subsystem 508 can take a variety of forms. FIG. 5 illustrates the computing subsystem 508 as including one or more computer systems 522, each of which may have one or more processors. The computer system 522 is communicatively coupled to at least drive the projector 516 and to at least receive information from the cameras 520. The computing subsystem may be configured to process image data captured by the cameras 520 to determine one or more physical aspects of one or more game related pieces 514 and/or process information in images of the media 515. In some embodiments, the computer system 522 determines a presence/absence of a game related piece 514, an identity of a game related piece 514, a location and/or orientation of a game related piece 514. The computer system 522 may determine information identifying a holder of a piece of media 515, account identifier, expiration date, prepaid amount, etc. from the piece of media 515. In some embodiments, the computer system 522 determines at least some of the information regarding the game related pieces 514 and/or media 515 by decoding one or more machine-readable symbols (e.g., bar code symbols, stack code symbols, area or matrix code symbols) carried by the game related pieces 514 and/or media 515. In such embodiments, the sensor subsystem may take the form of one or more machine-readable symbol readers, such as scanners or imagers that read bar codes, stacked codes, and/or area or matrix codes or other optical patterns (e.g., pips, rank and/or suit symbols, etc.), and the computer systems 522 may include instructions for decoding such machine-readable symbols or for performing pattern matching. Alternatively, or additionally, the sensor subsystem may take the form of one or more image sensors capture images or image information. In such embodiments, the computer systems 522 may include image processing instructions that allow for that detection of various features, for example edges. Such instructions may allow for object recognition as well as position or pose determination.

The computer system 522 may be communicatively coupled to one or more other components and/or systems. For example, the computer system 522 may be communicatively coupled by a network 524 to a slot management system 526, a casino marketing system 528, a server based game service 530, a service/beverage system 532, and/or the Internet 534. The computer system 522 (or game monitoring unit(s) may additionally or alternatively be coupled to one or more printers, currency acceptors, optional card readers, biometric measurement devices, proximity sensors, and/or management systems, collectively illustrated as 536.

The gaming table system 500 may include one or more antennas 536 to provide wireless communications with one or more wireless devices 538a, 538b (collectively 538). The antenna 536 may be coupled to a radio 540, for example a transmitter, receiver, or transceiver, which may be coupled to the computer system 522. The wireless devices 538 may take a variety of forms. For example, the wireless device 538a may take the form of a handheld mobile communications device, for instance a BLACKBERRY®, TREO®, cellular phone or other such device. Such a wireless device 538a may be operated by a patron, player, or other participant such as a dealer. Such a wireless device 538a may be operated by casino personnel, for instance a dealer, pit boss or security personnel. Also for example, the wireless device 538b may be a piece of automated equipment that monitors some aspect of a game or activity in a casino environment. For example, standalone automatic teller machine (ATM), security camera, card shoe or shuffler. Appropriate software or firmware may identify the operator of a wireless communications device 538, and provide for levels of security. Software or firmware may also provide for secure communications, for example via encryption.

Figure 6:
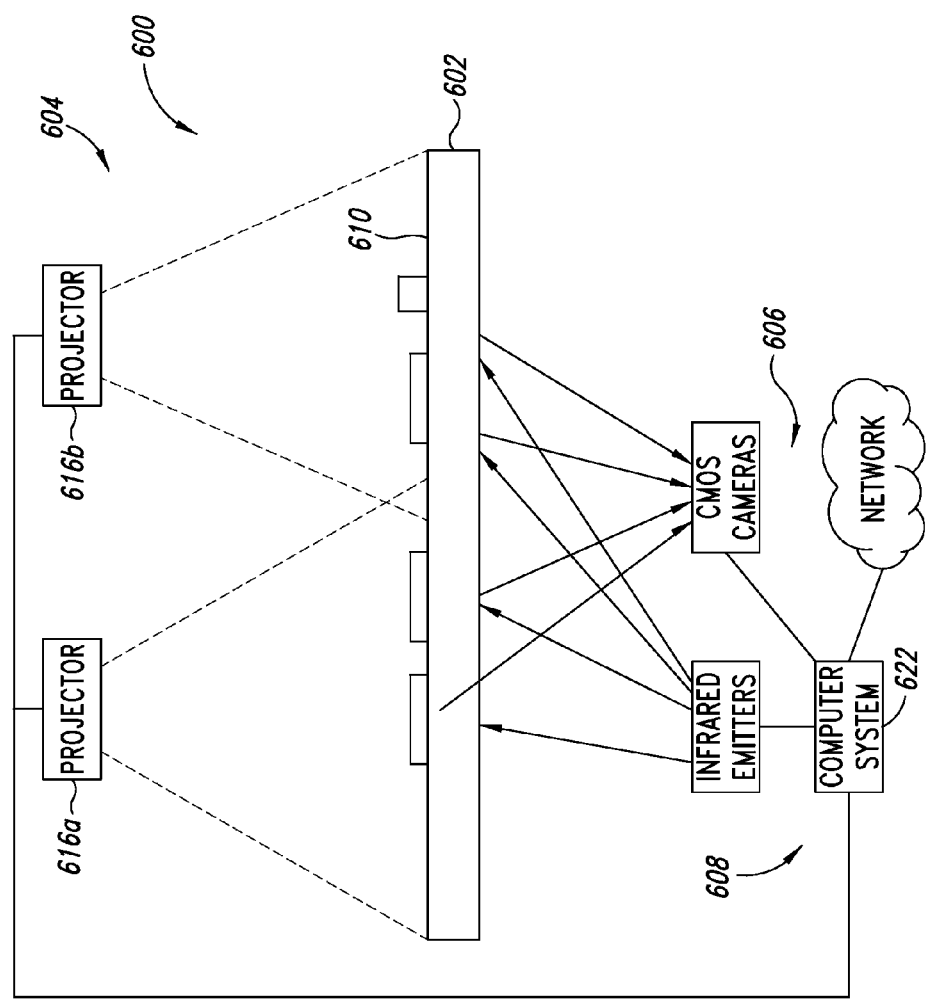
FIG. 6 is a schematic diagram of a table game playing system according to one illustrated embodiment, the table game playing system including gaming table carrying a number of physical objects, a display subsystem including projectors located relative above a height of the gaming table operable to display a virtual game layout, a sensor subsystem including optical configured to detect physical aspects of the physical objects, and a computing subsystem communicatively coupled with the display and sensor subsystems.

FIG. 6 shows a table gaming system 600 according to another illustrated embodiment. Many aspects of the embodiment of FIG. 6 are similar to or the same as the embodiment of FIG. 5. Only significant differences are described herein in the interest of brevity.

The table gaming system 600 includes a gaming table 602, display subsystem 604, sensor subsystem 606 and computing subsystem 608 communicatively coupled to the display subsystem 604 and sensor subsystem 606.

In contrast to the embodiment of FIG. 5, the display subsystem 604 includes projectors 616a, 616b positioned above a playing surface 610 of the gaming table 602. The projectors 616a, 616b display the virtual game layout by projecting images on to or through the playing surface 610. The virtual game layout may appear on the playing surface 610 or just under the playing surface 610 on a layer or medium that at least partially reflects or refracts the light. The projectors may be controlled by one or more computer systems 622 of the computing subsystem 608.

Figure 7:
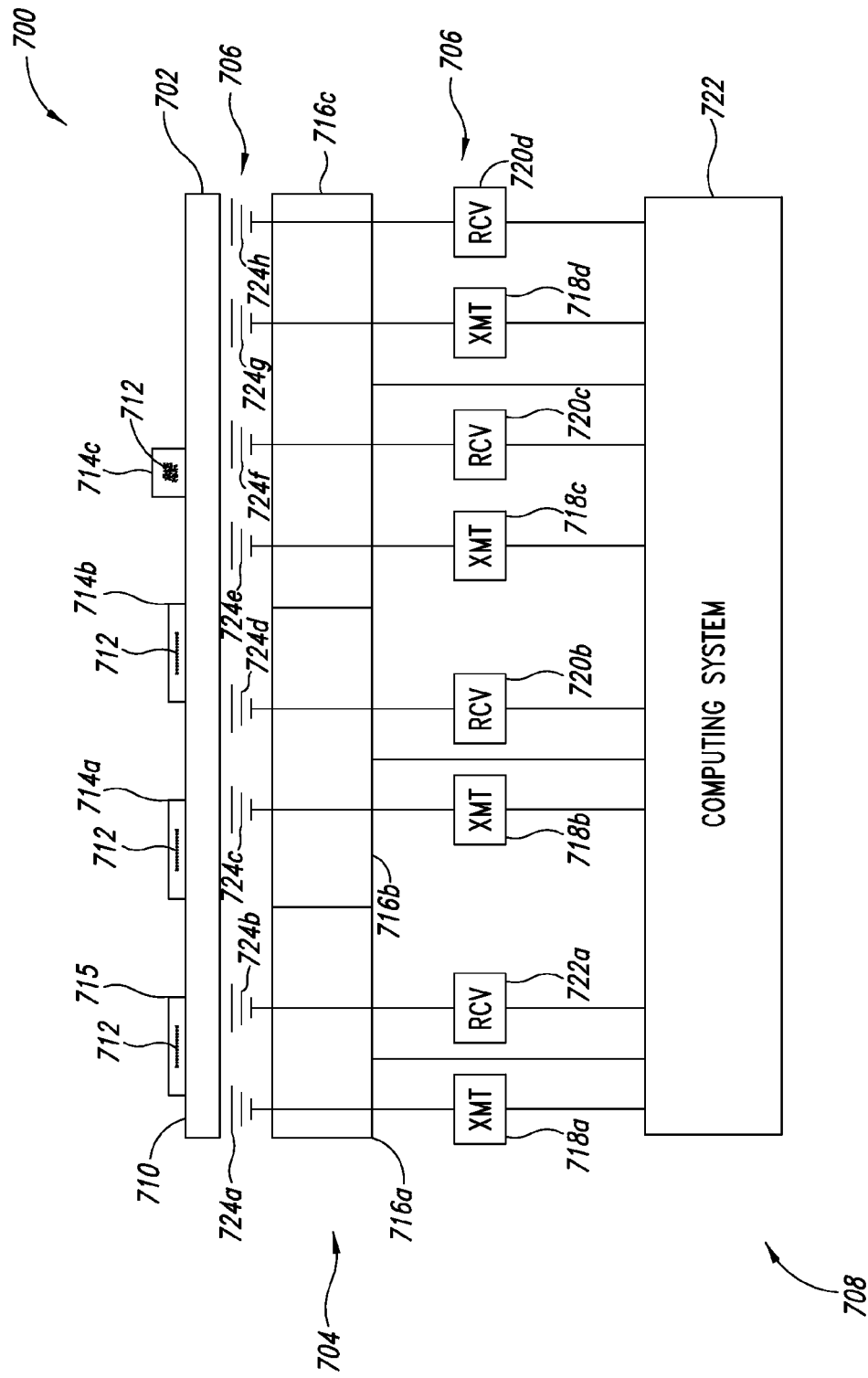
FIG. 7 is a schematic diagram of a table game playing system according to one illustrated embodiment, the table game playing system including gaming table carrying a number of physical objects, a display subsystem including at last one display located under the gaming table operable to display a virtual game layout, a sensor subsystem including wireless transmitters and receivers configured to detect physical aspects of the physical objects, and a computing subsystem communicatively coupled with the display and sensor subsystems.

FIG. 7 shows a table gaming system 700 according to another illustrated embodiment. Many aspects of the embodiment of FIG. 7 are similar to or the same as previously described embodiments. Only significant differences are described herein in the interest of brevity.

The table gaming system 700 includes a gaming table 702, display subsystem 704, sensor subsystem 706 and computing subsystem 708 communicatively coupled to the display subsystem 704 and sensor subsystem 706.

In contrast to the embodiment of FIGS. 5 and 6, the display subsystem 704 includes a number of displays 716a-716c (collectively 716) positioned below a playing surface 710 of the gaming table 702. The displays 716 display the virtual game layout on to or through the playing surface 710. Each of the displays 716 may display a respective portion the virtual game layout to produce the appearance of a continuous virtual game layout. The displays 716 may take a variety of forms, for example cathode ray tube (CRT) displays, or flat panel displays such as liquid crystal (LCD) displays, liquid crystal on silicon (LCoS) displays, plasma displays, digital light processing (DLP) displays, other projection type of displays, surface computing device display such as that proposed by MICROSOFT or Redmond, Wash., etc.

In contrast to the embodiment of FIGS. 5 and 6, the sensor subsystem 704 employs wireless radio transmission to interrogate or otherwise excite transponders 712 carried by various physical objects (e.g., playing cards 714a, chips 714b, dice 714c, and/or identity or financial media 715) on the playing surface 710. In some embodiments, wireless radio transmissions may interrogate objects proximate the playing surface 710, even when those physical objects are not on the playing surface 710. The radio transmission may be in any portion of the electromagnetic spectrum, but typically will be in the radio or microwave frequency portions. As used herein and in the claims, the terms radio and RF are inclusive of both radio and microwave frequencies, as well as other non-optical (i.e., visible, infrared, ultraviolet) portions of the electromagnetic spectrum.

The sensor subsystem 704 includes a number of transmitters 718a-718d (collectively 718) and a number of receivers 720a-720d (collectively 720), which may in some embodiments be formed as transceivers. The sensor subsystem 704a also includes a number of antennas 724a-724h (collectively 724) coupled to the transmitters 718 and receivers 720. While illustrated with each transmitter 718 and each receiver 720 having a respective antenna 724, in some embodiments pairs of transmitters 718 and receivers 720 may share a common antenna 724, for example where the frequency of interrogation or excitation is similar to the frequency of response to the interrogation by transponders 712.

The transponders 712 may take a variety of forms. For example, the transponders may be active (i.e., including a discrete, consumable power source), but typically will be passive (i.e., relying on power derived from an interrogation or excitation signal received from an external power source). Passive forms may include a memory structure that stores information, for example a radio frequency identification (RFID) transponder. Passive RFID transponders typically backscatter and interrogation signal with the contents of the memory encoded therein. The memory may include a unique identifier that uniquely identifies the particular transponder Such memory may be read only, one time writable or writeable memory. Passive RFID transponders are commercially available from a variety of sources.

Some passive forms may omit a memory, for example transponders generally classed as electronic article surveillance (EAS) type transponders. Such EAS transponders typically include a resonant circuit that backscatters 712 an interrogation or excitation signal.

One or more computer systems 722 of the computing subsystem 708 may be configured to process information derived by the sensor subsystem 706. For example, the computer system 708 may decode a response from a transponder 712 carried by a physical object to determine a physical aspect of the object, such as the type of object and/or identity of the physical object. Also for example, the computer system 708 may determine a physical aspect such a location, orientation of the physical object based on which antenna or antennas 724 received the signal, the strength of signal and/or triangulation or other position determining techniques, for example time of flight measurements or differences in time between receipt of responses to interrogation signals. The position may be determined in a variety of ways, for example in absolute or relative coordinates, and/or in Cartesian or polar coordinates. Where the sensor subsystem employs optical information (e.g., captured via still or video cameras, digital or analog cameras, CCD, opticons or other image capture devices), the position may be determined using image processing techniques to identify the position in absolute or relative coordinates. Such techniques may or may not include machine-vision techniques such as edge detection (e.g., Sobel filter, etc.).

Figure 8:
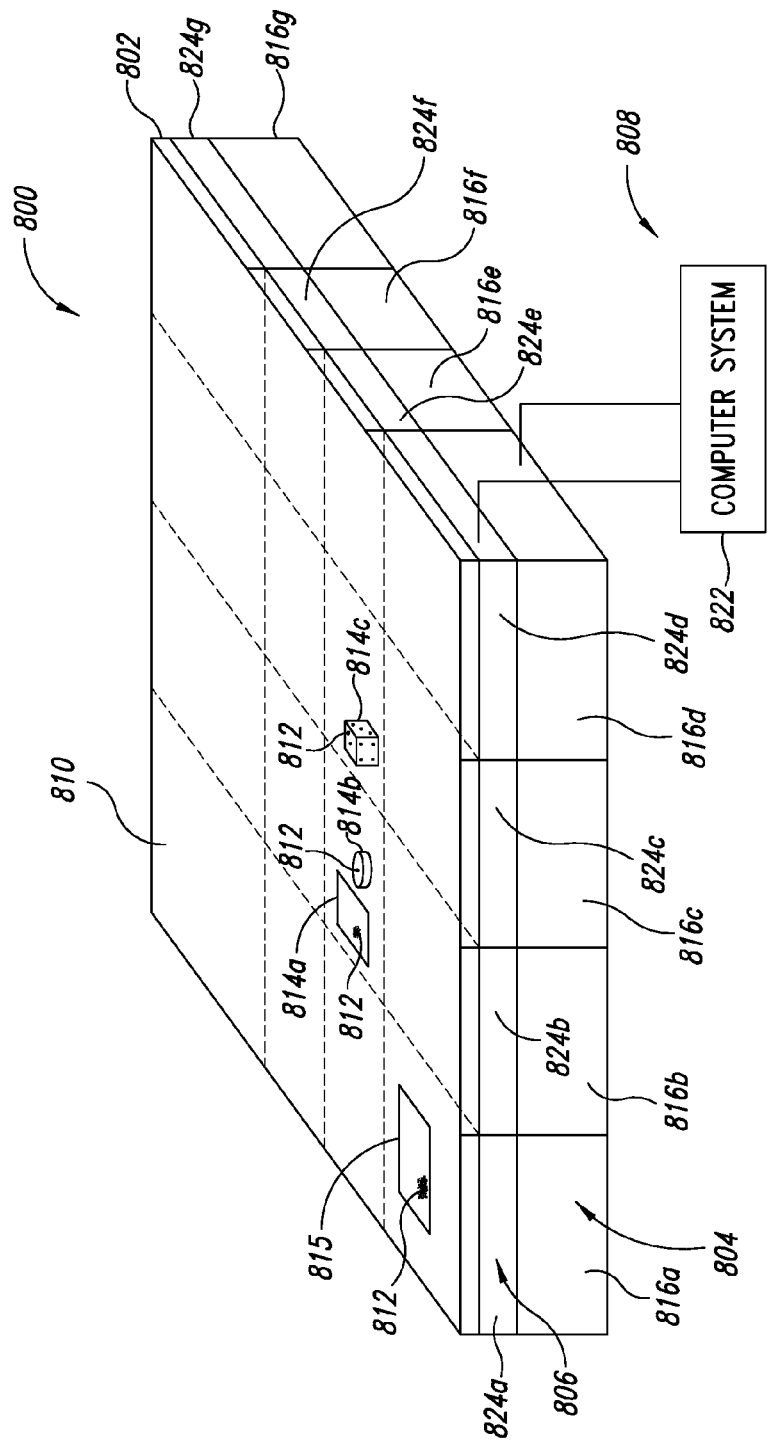
FIG. 8 is a schematic diagram of a table game playing system according to one illustrated embodiment, the table game playing system including gaming table carrying a number of physical objects, a display subsystem including a plurality of displays located under a contiguous playing surface of the gaming table operable to display a virtual game layout, a sensor subsystem including inductive or magnetic sensors configured to detect physical aspects of the physical objects, and a computing subsystem communicatively coupled with the display and sensor subsystems.

FIG. 8 shows a table gaming system 800 according to another illustrated embodiment. Many aspects of the embodiment of FIG. 8 are similar to or the same as previously described embodiments. Only significant differences are described herein in the interest of brevity.

The table gaming system 800 includes a gaming table 802, display subsystem 804, sensor subsystem 806 and computing subsystem 808 communicatively coupled to the display subsystem 804 and sensor subsystem 806 (only one communications link between the computing subsystem 808 and each of the display and sensor subsystems 804, 806 and shown).

The display subsystem 804 may include a number of displays 816a-816g (collectively 816, not all displays called out in the Figure in the interest of clarity) positioned below a playing surface 810 of the gaming table 702. As illustrated in FIG. 8, the playing surface 810 may be contiguous, while the displays 816 may have some distinct lines of separation between adjacent displays.

The sensor subsystem 806 may include number of magnetic or inductive sensor 824a-824g (collectively 824, not all sensors called out in the Figure in the interest of clarity). The magnetic or inductive sensors 824 are configured to detect magnetic or ferrous indicia 812 carried by various physical objects (e.g., playing cards 814a, chips 814b, dice 814c, and/or identity or financial media 815). The magnetic or ferrous indicia 812 may take a variety of forms. For example, the magnetic or ferrous indicia 812 may take the form of one or more stripes carried on a surface or an interior of an object. Also for example, the magnetic or ferrous indicia 812 may take the form of a distribution of magnetic or ferrous particles in or on the object. In some embodiments, the distribution may be random, providing a high likelihood of a unique signature for each object.

One or more computer systems 822 of the computing subsystem 808 may be configured to process information derived by the sensor subsystem 806. For example, the computer system 808 may decode a signal indicative of the magnetic or ferromagnetic indicia 812 carried by a physical object to determine a physical aspect of the object, such as the type of object and/or identity of the physical object. Also for example, the computer system 808 may determine a physical aspect such a location, orientation of the physical object based on which sensor 824 produced the signal, the strength of signal and/or triangulation or other position determining techniques.

Figure 9:
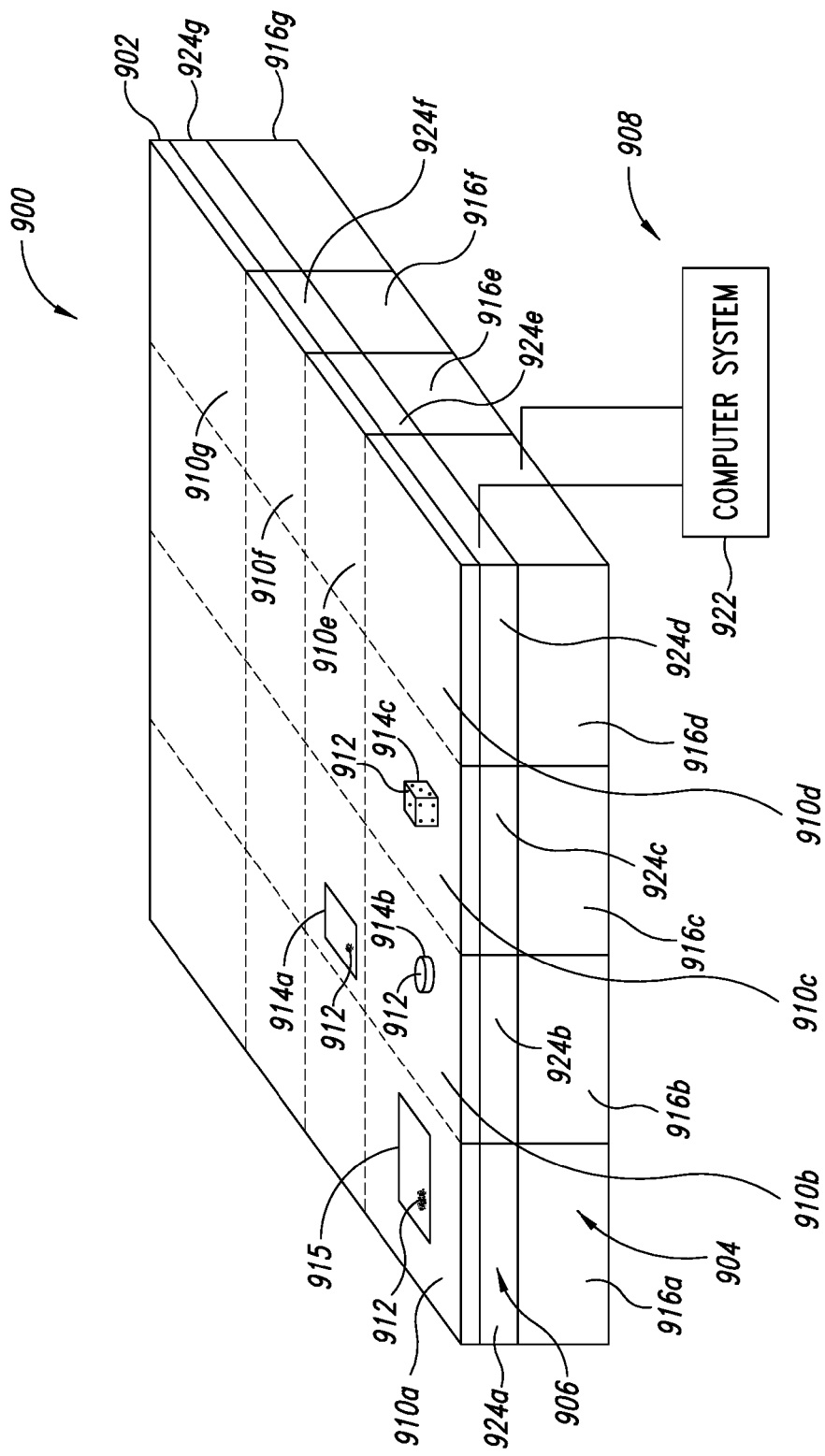
FIG. 9 is a schematic diagram of a table game playing system according to one illustrated embodiment, the table game playing system including gaming table carrying a number of physical objects, a display subsystem operable to display a virtual game layout, a sensor subsystem configured to detect physical aspects of the physical objects, and a computing subsystem communicatively coupled with the display and sensor subsystems, where the display and sensor subsystems implemented as touch sensitive display devices.

FIG. 9 shows a table gaming system 900 according to another illustrated embodiment. Many aspects of the embodiment of FIG. 9 are similar to or the same as previously described embodiments. Only significant differences are described herein in the interest of brevity.

The table gaming system 900 includes a gaming table 902, display subsystem 904, sensor subsystem 906 and computing subsystem 908 communicatively coupled to the display subsystem 904 and sensor subsystem 906 (only one communications link between the computing subsystem 908 and each of the display and sensor subsystems 904, 906 and shown).

The display subsystem 904 may include a number of displays 916a-916g (collectively 916, not all displays called out in the Figure in the interest of clarity) positioned below number of playing surfaces 910 of a gaming table 702. As illustrated in FIG. 8, the playing surface 910 may have some distinct lines of separation between adjacent playing surface 910. As in the previously described embodiments, the playing surfaces 910 may take the form of a protective (e.g., scratch resistant) layer overlying the sensor subsystem 906 and/or display subsystem 904. In some embodiments, the playing surfaces 910 may be integral with the sensor subsystem 906 and/or display subsystem 904. In other embodiments, the playing surfaces 910 may be a distinct component from the sensor subsystem 906 and/or display subsystem 904, for example overlying and spaced from the sensor subsystem 906 and/or display subsystem 904.

As described previously, the sensor subsystem 906 may include number of magnetic or inductive sensor 924a-924g (collectively 924, not all sensors called out in the Figure in the interest of clarity). The magnetic or inductive sensors 924 are configured to detect magnetic or ferrous indicia 912 carried by various physical objects (e.g., playing cards 914a, chips 914b, dice 914c, and/or identity or financial media 915).

Also as described previously, one or more computer systems 922 of the computing subsystem 908 may be configured to process information derived by the sensor subsystem 906.

Figure 10:
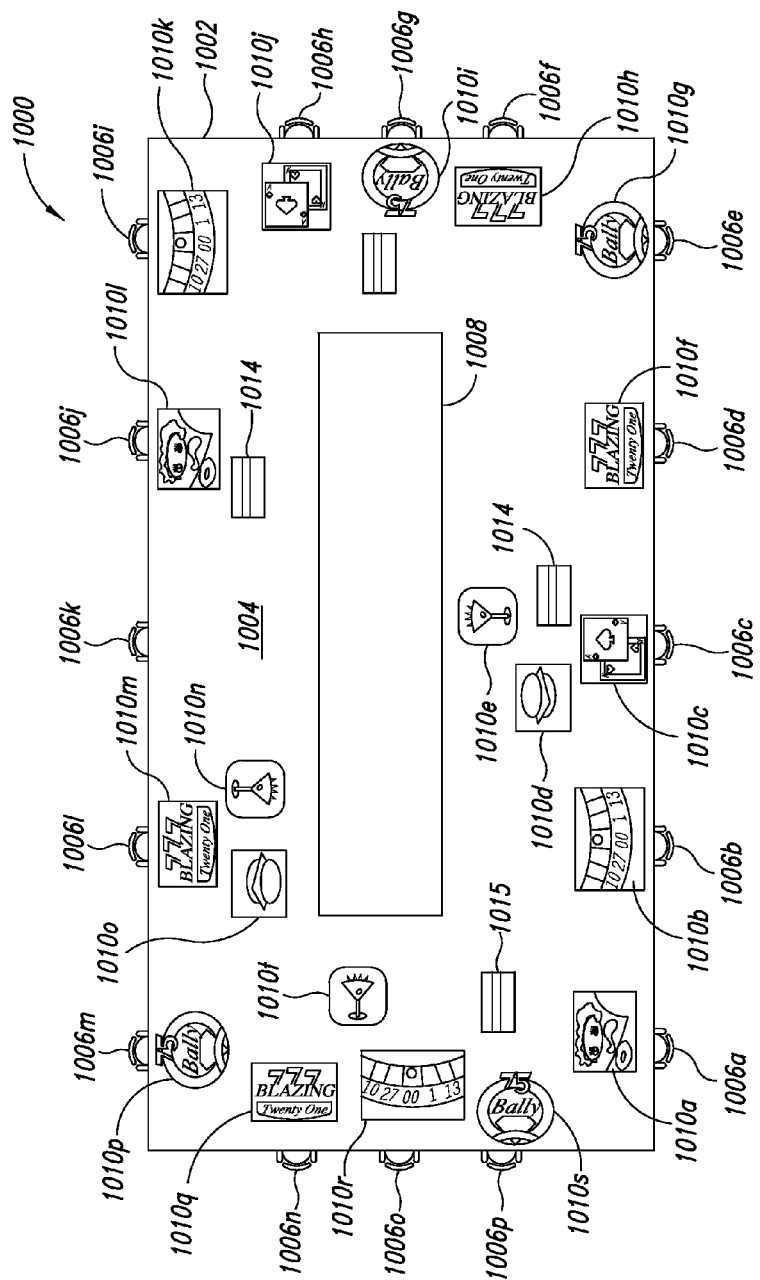
FIG. 10 is a top plan view of a game playing environment according to one illustrated embodiment, the game playing environment including a circular or oval bar with a number of player positions spaced there around.

FIG. 10 shows a table gaming system 1000, according to another illustrated embodiment. Many aspects of the embodiment of FIG. 10 are similar to or the same as previously described embodiments. Only significant differences are described herein in the interest of brevity.

The table gaming system 1000 includes a gaming table 1002 in the form of a bar, for example a circular or oval bar. The gaming table 1002 includes a playing surface 1004. The table gaming system 1000 also includes a display subsystem, sensor subsystem and computing subsystem, which may be identical or similar to those previously described.

The gaming table 1002 may have a plurality of player positions, indicted by seats (e.g., chairs or stools) 1006a-1006p (collectively 1006) distributed about the gaming table 1002. The gaming table 1002 may also have an attendant position 1008, which may provide convenient access to the player positions 1004. One or more attendants, for example a dealer, barkeeper, server and/or cashier, may occupy the attendant position 1008.

The display subsystem includes one or more displays or projectors (collectively) configured to produce a display 1010a-1010s (collectively 1010) viewable from each player position 1006, and optionally from the attendant position 1008. The produced display 1010 may include at least one virtual game layout and/or other information, data, menus, graphical user interfaces, advertisements videos, rules, suggestions, and/or other visual elements. For example, the produced display 1010a, 1010j may be a video, movie, television show, live or recorded sports events, casino messages or other form of entertainment. The produced display 1010b, 1010k, 1010r may be a virtual game layout for roulette. The produced display 1010c, 1010j may be a virtual game layout of a card game such as Blackjack, poker, or other card games. The produced display 1010d, 1010o may be a menu of food items from which a player or other patron may choose and/or electronically place an order. The produced display 1010e, 1010n, 1010t may be a menu of drinks or beverages from which a player or other patron may choose and/or electronically place an order. The produced display 1010f, 1010h, 1010m, 1010R may be a virtual game, for example video slot game, for instance BLAZING SEVENS. The produced display 1010g, 1010i, 1010p, 1010s may be an advertisement or promotion, for instance a random drawing or a bonus game.

As previously described, various forms of media 1014, 1015 may be read by the sensor subsystem and transaction completed.

Figure 11:
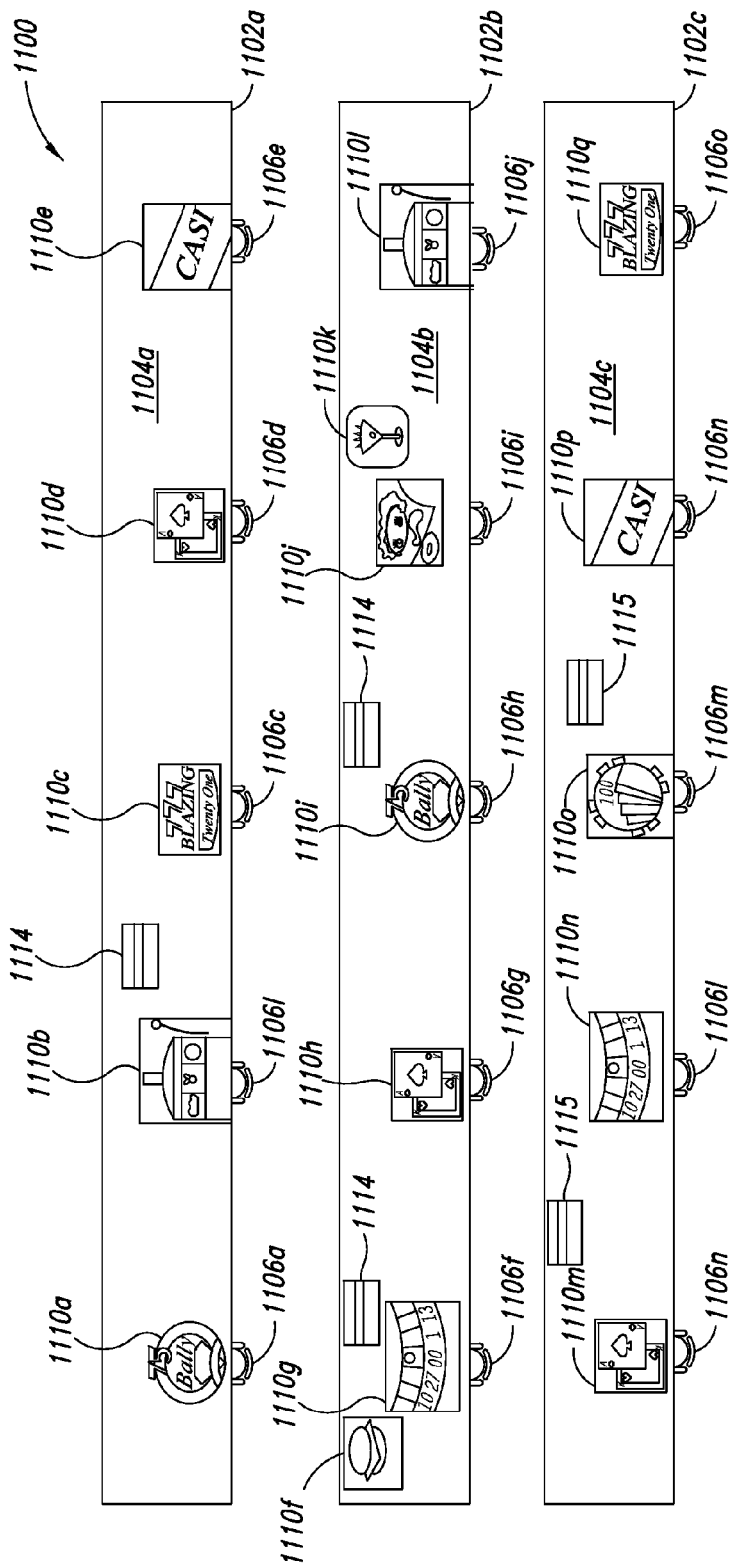
FIG. 11 is a top plan view of a game playing environment according to one illustrated embodiment, the game playing environment including a number of elongated or rectangular gaming tables each with a number of player positions spaced therealong.

FIG. 11 shows a table gaming system 1100, according to another illustrated embodiment. Many aspects of the embodiment of FIG. 11 are similar to or the same as previously described embodiments. Only significant differences are described herein in the interest of brevity.

The table gaming system 1100 includes a number of gaming tables 1102a-1102c (collectively 1102) in the form of a bars or table, for example a rectangular bar or table. The table gaming system 1100 includes playing surfaces 1104a-1104c. The table gaming system 1100 also includes a display subsystem, sensor subsystem and computing subsystem, which may be identical or similar to those previously described.

The gaming tables 1102 may have a plurality of player positions, indicted by seats (e.g., chairs or stools) 1106a-1106o (collectively 1106) distributed about the gaming tables 1102. There may be sufficient space between respective gaming tables 1102 for one or more attendants (e.g., dealer, barkeeper, server and/or cashier) to access the various player positions 1106.

The display subsystem includes one or more displays or projectors (collectively) configured to produce a display 1110a-1110q (collectively 1110) viewable from each player position 1106, and optionally viewable by an attendant. The produced display 1110 may include at least one virtual game layout and/or other information, data, menus, graphical user interfaces, advertisements videos, rules, suggestions, and/or other visual elements. For example, the produced display 1110j may be a video, movie, television show or other form of entertainment. The produced display 1110g, 1110n may be a virtual game layout for roulette. The produced display 1110d, 1110h, 1110m, 1110o may be a virtual game layout of a card game such as Blackjack, poker, or other card games. The produced display 1110f may be a menu of food items from which a player or other patron may choose and/or electronically place an order. The produced display 1110k may be a menu of drinks or beverages from which a player or other patron may choose and/or electronically place an order. The produced display 1110b, 1110c, 1110l, 1110q may be a virtual game, for example video slot game, for instance BLAZING SEVENS. The produced display 1110a, 1110i may be an advertisement or promotion, for instance a random drawing. The produced display 1110e, 1110p may be a directory or a user interface that provides access to player's own within a casino management system and Slot Management System (e.g., Bally Gaming IVIEW display system). Such may allow a player to determine and/or apply comps that have been awarded to the player, to determine or access credit balances and perform other transactions, and/or to receive news, announcements and promotions.

As previously described, various forms of media 1114, 1115 may be read by the sensor subsystem and transaction completed.

Figure 12:
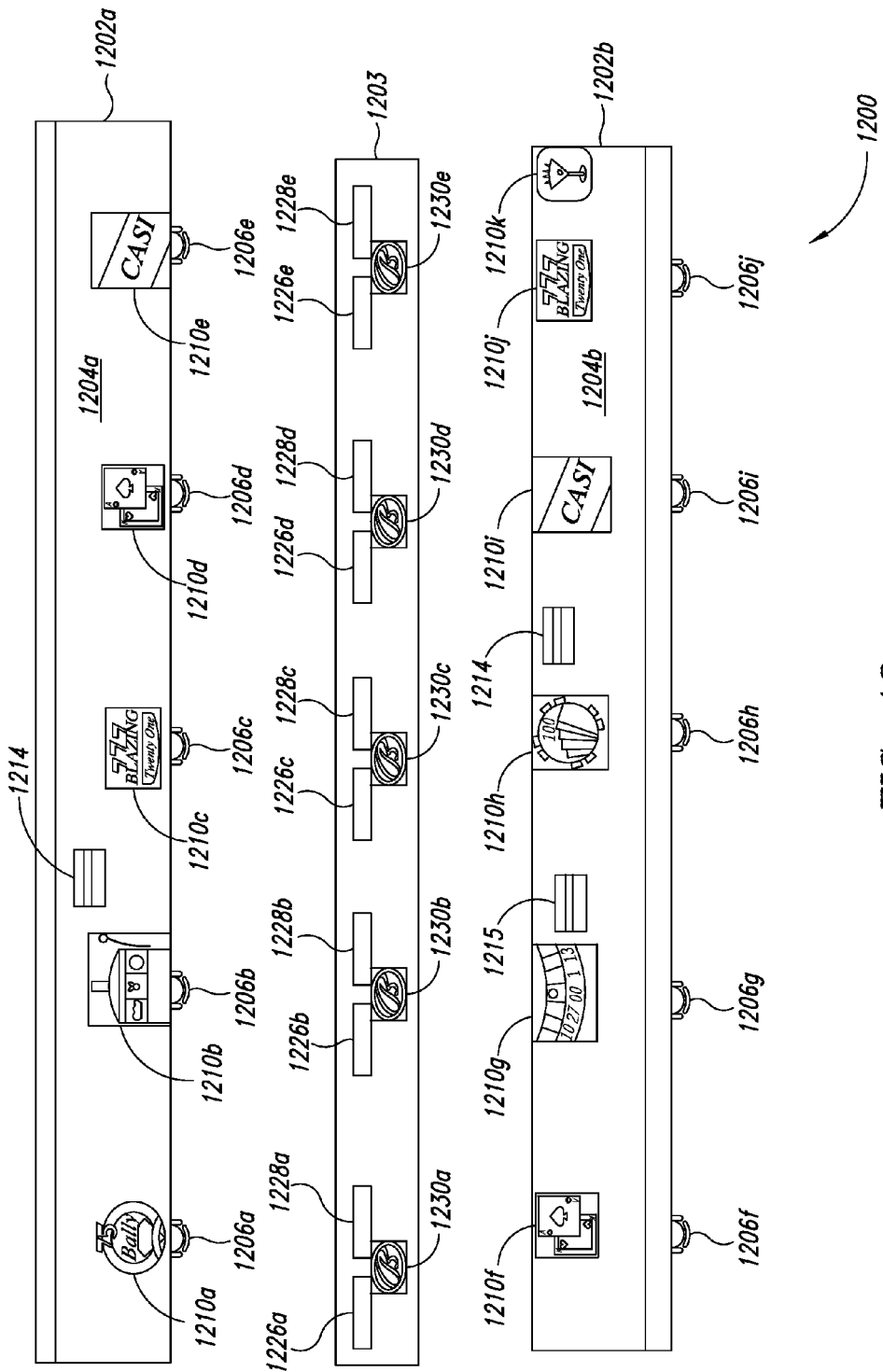
FIG. 12 is a top plan view of a game playing environment according to one illustrated embodiment, the game playing environment including a number of elongated or rectangular gaming tables each with a number of player positions spaced therealong and a bar top unit including printers, bill validators, and casino management system interfaces.

FIG. 12 shows a table gaming system 1200, according to another illustrated embodiment. Many aspects of the embodiment of FIG. 12 are similar to or the same as previously described embodiments. Only significant differences are described herein in the interest of brevity.

The table gaming system 1200 includes a number of gaming tables 1202a, 1202b (collectively 1202) in the form of a bars or tables, for example rectangular bars or tables, and a side bar or bar top unit 1203 positioned between the gaming tables 1202. The side bar or bar top unit 1203 may be positioned differently in other embodiments. The side bar or bar top unit 1203 may have cushioned sides. The table gaming system 1200 includes playing surfaces 1204a, 1204b. The table gaming system 1200 also includes a display subsystem, sensor subsystem and computing subsystem, which may be identical or similar to those previously described.

The gaming tables 1202 may have a plurality of player positions, indicted by seats (e.g., chairs or stools) 1206a-1206j (collectively 1206) distributed about the gaming tables 1202. There may be sufficient space between gaming tables 1202 and the bar top 1203 unit for one or more attendants (e.g., dealer, barkeeper, server and/or cashier) to access the various player positions 1206.

The display subsystem includes one or more displays or projectors (collectively) configured to produce a display 1210a-1210k (collectively 1210) viewable from each player position 1206, and optionally viewable by an attendant. The produced displays 1210 may be identical or similar to those previously described. Also as previously described, various forms of media 1214, 1215 may be read by the sensor subsystem and transaction completed.

The side bar or bar top unit 1203 may include one or more printers 1226a-1226e (collectively 1226) which may be networked to the computing subsystem (not shown in the Figure). The printers 1226a-1226e may allow printing of receipts, vouchers, and promotional literature, for example, where the environment is not paperless.

The bar top unit 1203 may include one or more bill validators 1230a-1230e (collectively 1230). The bill validators 1203 may be employed to validate currency and negotiable instruments.

The bar top unit 1203 may optionally include one or more interfaces 1232a-1232e (collectively 1232) to casino management system (e.g., Bally Gaming iVEIW display system), for example where such an interface is not provided at the gaming tables 1202.

Figure 13:
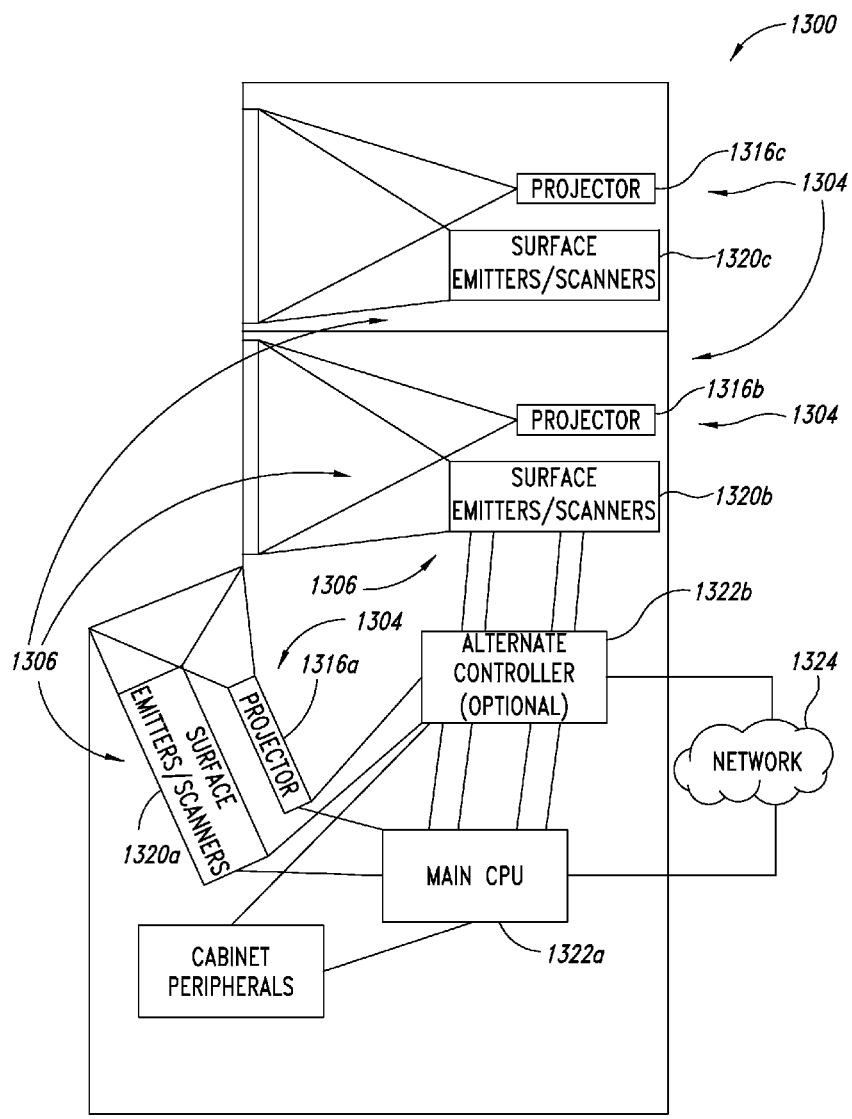
FIG. 13 is a schematic diagram of an upright or arcade style or casino style game playing system according to one illustrated embodiment, the upright or arcade/casino style game playing system including a number of display subsystems, sensor subsystems and computing subsystems communicatively coupled with the display and sensor subsystems.

FIG. 13 shows an upright or arcade/casino style gaming system 1300, according to another illustrated embodiment. Many aspects of the embodiment of FIG. 13 are similar to or the same as previously described embodiments. Only significant differences are described herein in the interest of brevity.

The upright or arcade style gaming system 1300 includes a display subsystem 1304, sensor subsystem 1306 and computing subsystem 1308.

The display subsystem 1304 may take a variety of forms. FIG. 13 illustrates the display subsystem 1304 as including one or more projectors 1316a-1316c (collectively 1316) located so as to produce respective displays visible to a player. Some embodiments may employ projectors that are externally located with respect to a housing of the upright or arcade style gaming system 1300, for example as described in reference to FIG. 6. Still other embodiments may employ displays (e.g., CRT displays, or flat panel displays such as LCD displays, LCoS displays, plasma displays, DLP displays, etc.), such as those discussed in reference to the embodiment of FIG. 7.

The sensor subsystem 1306 may take a variety of forms. FIG. 13 illustrates the sensor subsystem 1306 as including one or more light sources and/or image capture devices 1320a-1320c (collectively 1320). The light sources may take a variety of forms, and may be positioned to illuminate one or more playing surfaces 1310a-1310c (collectively 1310). For example, the light sources may take the form of one or more infrared emitters. The infrared emitters may be collocated at various positions with respect to each of the playing surfaces 1310 as illustrated in FIG. 13, or may be distributed under the playing surfaces 1310. The image capture devices may take a variety of forms, and may be positioned to capture images of the playing surfaces 1310. For example, the image capture devices may take the form of one or more infrared sensitive cameras, for instance charged coupled device (CCD) based cameras or complementary metal-oxide-semiconductor based (CMOS) cameras. Where multiple cameras are employed, the cameras may be collocated with respect to respective ones of the playing surfaces 1310 or may be multiple cameras may be distributed under each of the playing surfaces 1310.

The computing subsystem 1308 can take a variety of forms. FIG. 13 illustrates the computing subsystem 1308 as including one or more main computer systems (e.g., Bally Alpha suitcase—regulated gaming device platform) 1322a and an alternative controller 1322b. The computing subsystem 1308 is communicatively coupled to at least drive the projectors 1316 and to at least receive information from the image capture devices 1320. The computing subsystem 1308 may also be communicatively coupled to various peripherals of the upright or arcade/casino style gaming system 1300, for example bill validators, coin acceptors, control panels and user interfaces, connectors that allow downloads of games or game reconfiguration. For example, in some embodiments, the computing subsystem 1308 may include one or more input/output ports communicatively coupled to cabinet security switches, dual port or IP based bill/ticket acceptors, dual port or IP based printers, cabinet alarms, game meters (electronic and physical), bar code scanners, and/or laser scanners, or optional Game monitoring units (GMU's).

The computing subsystem 1308 may be configured to process image data captured by the image capture devices 1320 to determine one or more physical aspects of one or more game related pieces 1314 and/or process information in images of the media 1315. In some embodiments, the computing subsystem 1308 determines a presence/absence of a game related piece, an identity of a game related piece, a location and/or orientation of a game related piece. The computing subsystem 1308 may determine information identifying a holder of a piece of media, account identifier, expiration date, prepaid amount, etc. from the piece of media. In some embodiments, the computing subsystem 1308 determines at least some of the information regarding the game related pieces and/or media by decoding one or more machine-readable symbols (e.g., bar code symbols, stack code symbols, area or matrix code symbols) carried by the game related pieces and/or media. In such embodiments, the sensor subsystem 1306 may take the form of one or more machine-readable symbol readers, such as scanners or imagers that read bar codes, stacked codes, and/or area or matrix codes, and the computing subsystem 1308 may include instructions for decoding such machine-readable symbols. The computing subsystem 1308 may execute instructions stored on a memory that allows the computing subsystem to determine information about one or more game playing pieces based on information received from the game playing pieces via the sensor subsystem and/or from other information collected or sensed by the sensor subsystem. For example, the computing subsystem may determine the type of game playing piece, value of the game playing piece, player to which the game playing piece is associated, position and/or orientation of the game playing piece, etc.

The computing subsystem 1308 may be communicatively coupled to one or more other components and/or systems. For example, the computer system 1322 may be communicatively coupled by a network 1324 to a slot management system, accounting system, a casino marketing system, a server based game service, a service/beverage system, bonus system, download or reconfiguration system, dynamic button deck, and/or the Internet 1334. The computing subsystem 1308 may additionally or alternatively be coupled to one or more printers, currency acceptors, optional card readers, biometric measurement devices, proximity sensors, and/or management systems, collectively illustrated as 1336.

Various embodiments may employ touch screen technologies. For example, various embodiments may employ a resistive system, capacitive system or surface acoustic wave system to detect physical aspects, for example player and/or dealer selections.

Resistive systems may include a glass panel that carries an electrically conductive layer and an electrically resistive layer, which layers are separated by spacers. The glass panel may be part of a display. The structure may also include a scratch resistant covering or layer. A current runs through the conductive layer, and the conductive and resistant layers contact at a location where touched, changing the electrical field. A controller, processor or driver converts the change in electrical field into position data, which is mapped to the virtual game layout.

Capacitive systems may include a glass panel that carries a charge storage layer. The glass panel may be part of a display. In use, when a player or dealer touches the charge storage layer, charge is transferred to the user, which changes the charge on the capacitive layer. Circuits sense or measure the change in charge. A processor, controller or drive determine position data from the change in charge, which is mapped to the virtual game layout.

Alternatively, the surface may include one or more pressure sensitive layers, which may detect differences in pressure asserted by a game playing piece of player identity media. For example, one or bumps (e.g., similar to brail) or printed elements (e.g., barcode elements) may be sensed and decoded.

Surface acoustic wave systems may employ a pair of transducers along perpendicular axes of a glass panel and reflectors that reflect an electrical signal sent from one transducer of each pair to the other transducer of the pair. The receiving transducer of each pair senses or measures disturbances of electrical wave. A processor, controller or driver can determine position data based on the disturbances, which is mapped top the virtual game layout. While more costly than the other touch screen systems, surface acoustic wave systems advantageously allow transmission of almost all light. Surface acoustic wave systems are also advantageously sensitive to touches by any object, in contrast to capacitance based touch screen systems. A surface computing display such as one announced by MICROSOFT of Redmond Wash. may be employed in the upright or arcade/casino style gaming system 1300.

Figure 14:
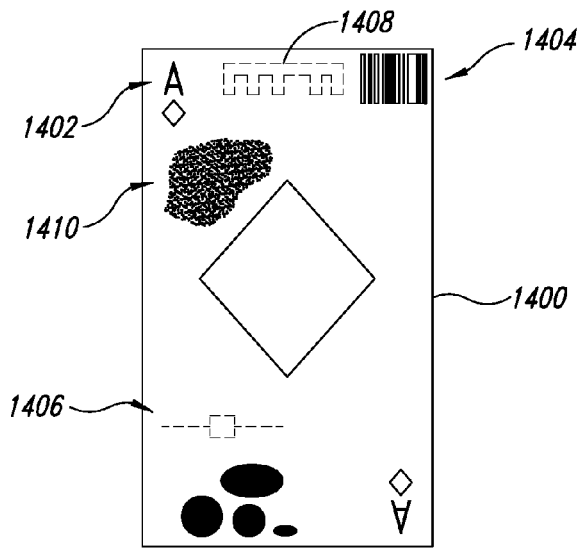
FIG. 14 is a top plan view of a game related piece in the form of a physical playing card according to one illustrated embodiment, the playing card including human-readable markings such as rank and/or suit symbols, and one or more of machine-readable symbols, RFID transponder, EAS type transponder, or other machine-readable indicia.

The display subsystem and/or the touch screens may, for example, present a graphical user interface (GUI) with one or more user selectable icons FIG. 14 shows a game related piece according to one illustrated embodiment.

The game related piece takes the form of a physical card 1400, which may be a playing card. The card 1400 may have human-readable markings 1402 which may, for example, take the form of standard rank (e.g., 2-Ace) and suit symbols (e.g., Heart, Spade, Diamond, Club). The card 1400 may include machine-readable markings 1404 (e.g., bar code symbol, stacked code symbol, area or matrix code symbol, pips). The machine-readable markings 1404 may be invisible to humans, for example visible only in the infrared portion of the electromagnetic spectrum. The machine-readable markings 1404 may be located on the face and/or back of the card 1400.

Additionally or alternatively, the card 1400 may include a transponder. The transponder may take a variety of forms. For example, the transponder may take the form of passive transponder, such as an RFID circuit 1406 or EAS resonator 1408. Additionally or alternatively, the card 1400 may include magnetic or ferromagnetic indicia 1410. The magnetic or ferromagnetic indicia 1410 may take a variety of forms. For example, the magnetic or ferromagnetic indicia 1410 may be printed or otherwise deposited on a surface of the card 1400, or on an inner layer of the card 1400 between the face and the back. The magnetic or ferromagnetic indicia 1410 may be deposited within the card 1400, for example as particles distributed in the medium (e.g., paper, cardboard, Mylar, Vellum) from which the card 1400 is made.

Figure 15:
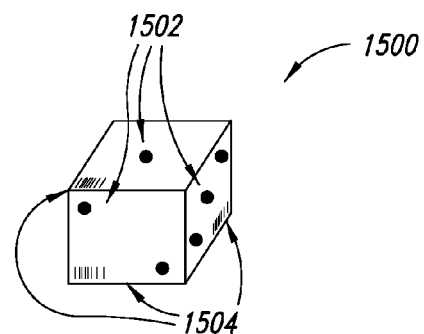
FIG. 15 is a top plan view of a game related piece in the form of a physical die according to one illustrated embodiment, the playing card including human-readable markings such as spots, and one or more of machine-readable symbols or other machine-readable indicia.

FIG. 15 shows a game related piece according to one illustrated embodiment.

The game related piece takes the form of a multi-sided die 1500. The die 1500 may have human-readable markings 1502 which may, for example, take the form of standard spot patterns (e.g., one-six spots). The die 1500 may have machine-readable markings 1504 (e.g., bar code symbol, stacked code symbol, area or matrix code symbol). The machine-readable markings 1504 may be invisible to humans, for example visible only in the infrared portion of the electromagnetic spectrum. The machine-readable markings 1504 may be located on one or more faces of the die 1500. In some embodiments, the spots are the machine-readable markings.

Figure 16:
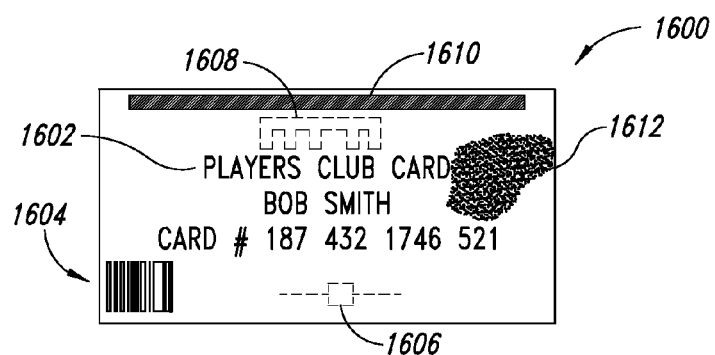
FIG. 16 is a top plan view of a physical piece of media such as a loyalty program card or financial card according to one illustrated embodiment, the playing card including human-readable markings such as name, account number, expiration date, and one or more of machine-readable symbols, magnetic stripe, RFID transponder, EAS type transponder, or other machine-readable indicia.

FIG. 16 shows a piece of media, according to one illustrated embodiment.

The piece of media may take the form of a card 1600, for instance an identity card (e.g., loyalty program card, driver's license, passport) or a financial card (e.g., credit card, debit card, prepaid card, voucher). The card 1600 may have human-readable markings 1602 which may, for example, take the form of alpha-numeric characters (e.g., name, account number). The card 1600 may have machine-readable markings 1604 (e.g., bar code symbol, stacked code symbol, area or matrix code symbol). The machine-readable markings 1604 may be invisible to humans, for example visible only in the infrared portion of the electromagnetic spectrum. The machine-readable markings 1604 may be located on the face and/or back of the card 1600. As noted previously, image processing such as machine vision techniques (e.g., feature or edge detection for instance via a Sobel filter) may be employed to identify game playing pieces and/or player identity or financial media.

Additionally or alternatively, the card 1600 may include a transponder. The transponder may take a variety of forms. For example, the transponder may take the form of passive transponder, such as an RFID circuit 1606 or EAS resonator

1608. Additionally or alternatively, the card 1600 may include magnetic or ferromagnetic indicia. The magnetic or ferromagnetic indicia may take a variety of forms. For example, the magnetic or ferromagnetic indicia may be printed or otherwise deposited on a surface of the card 1600, or on an inner layer of the card 1600 between the face and the back, or example as a stripe 1610. The magnetic or ferromagnetic indicia 1610 may be deposited within the card 1600, for example as particles 1612 distributed in the medium (e.g., paper, cardboard, Mylar, Vellum) from which the card 1600 is made.

Discussion of Suitable Computing Environment

Figure 17:
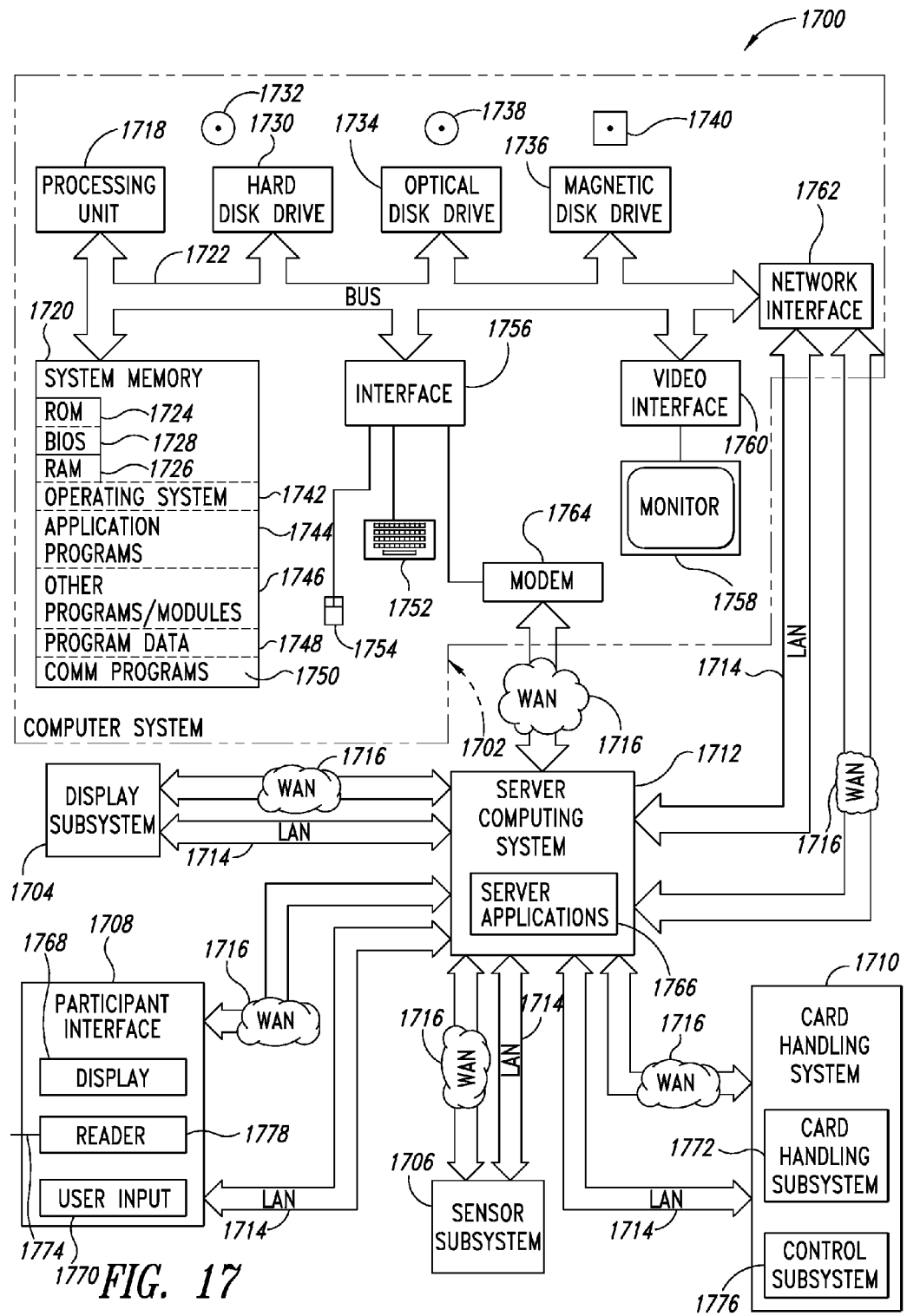
FIG. 17 a schematic diagram of a computer system according to one illustrated embodiment, suitable for use with various embodiments of the game playing environment and game playing systems described herein.

FIG. 17 and the following discussion provide a brief, general description of a suitable gaming system environment 1700 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 17 shows the gaming system environment 1700 comprising one or more computer systems 1702, display subsystems 1704, sensor subsystems 1706, participant interfaces 1708, playing card handling other gaming systems 1710, and/or server computing systems 1712 coupled by one or more communications channels, for example one or more local area networks (LANs) 1714 or wide area networks (WANs) 1716. The gaming system environment 1700 may employ other computers, such as conventional personal computers, where the size or scale of the system allows.

The computer system 1702 may take the form of a conventional mainframe or mini-computer, that includes a processing unit 1718, a system memory 1720 and a system bus 1722 that couples various system components including the system memory 1720 to the processing unit 1718. The computer system 1702 will at times be referred to in the singular herein, but this is not intended to limit the embodiments to a single computing system since in typical embodiments, there will be more than one computing system or other device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation. One suitable device is the Bally Alpha motherboard and suitcase, which has been certified as a regulated gaming device in hundreds of jurisdictions throughout the World. Such may include instructions top generate random numbers or may include a dedicated random number generator. As used herein random number and variations thereof such as random number generator includes pseudo random numbers and software or devices to generate pseudo-random numbers. Some embodiments may include server based outcomes or random number generators. Such outcomes or prize award values may be reverse mapped back into a game experience or bonus experience for the player at the game table or arcade/casino gaming system. Such a game experience may be enhanced by providing the information via server generated images and/or video streamed data sent to a client device.

The processing unit 1718 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 17 are of conventional design. As a result, such blocks need not be described in further detail herein, as they will be understood by those skilled in the relevant art.

The system bus 1722 can employ any known bus structures or architectures, including a memory bus with memory controller, a peripheral bus, and a local bus. The system memory 1720 includes read-only memory ("ROM") 1724 and random access memory ("RAM") 1726. A basic input/output system ("BIOS") 1728, which can form part of the ROM 1724, contains basic routines that help transfer information between elements within the computer system 1702, such as during start-up.

The computer system 1702 also includes a hard disk drive 1730 for reading from and writing to a hard disk 1732, and an optical disk drive 1734 and a magnetic disk drive 1736 for reading from and writing to removable optical disks 1738 and magnetic disks 1740, respectively. The optical disk 1738 can be a CD-ROM, while the magnetic disk 1740 can be a magnetic floppy disk or diskette. The hard disk drive 1730, optical disk drive 1734 and magnetic disk drive 1736 communicate with the processing unit 1718 via the system bus 1722. The hard disk drive 1730, optical disk drive 1734 and magnetic disk drive 1736 may include interfaces or controllers (not shown) coupled between such drives and the system bus 1722, as is known by those skilled in the relevant art. The drives 1730, 1734 and 1736, and their associated computer-readable media 1732, 1738, 1740, provide nonvolatile storage of computer readable instructions, data structures, program modules and other data for the computer system 1702. Although the depicted computer system 1702 employs hard disk 1730, optical disk 1734 and magnetic disk 1736, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, Secure Disks SD, CF media (compact flash), etc.

Program modules can be stored in the system memory 1720, such as an operating system 1742, one or more application programs 1744, other programs or modules 1746 and program data 1748. The system memory 1720 may also include communications programs 1750 for example a Web client or browser 1750 for permitting the computer system 1702 to access and exchange data with sources such as Web sites of the Internet, corporate intranets, or other networks as described below, as well as other server applications on server computing systems such as those discussed further below. The browser may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from America Online and Microsoft of Redmond, Wash. The communications programs 1750 may additionally or alternatively include one or more server applications that allow the computer system 1702 to function as a server. Browser support may cause the display subsystem or other user inference to render server based content related to the gaming, relating to identified players and their accounts, advertisements, service and other offers to the players, electronic funds transfer. Server pushed and client rendered content can be shown to the player at the same time on different portions of the playing surface or other user interface.

While shown in FIG. 17 as being stored in the system memory 1720, the operating system 1742, application programs 1744, other programs/modules 1746, program data 1748 and browser 1750 can be stored on the hard disk 1732 of the hard disk drive 1730, the optical disk 1738 of the optical disk drive 1734 and/or the magnetic disk 1740 of the magnetic disk drive 1736. An operator, such as casino personnel, can enter commands and information into the computer system 1702 through input devices such as a touch screen or keyboard 1752 and/or a pointing device such as a mouse 1754. Other input devices can include a microphone, joystick, game pad, tablet, touch screen, scanner, etc. These and other input devices are connected to the processing unit 1718 through an interface 1756 such as a serial port interface that couples to the system bus 1722, although other interfaces such as a parallel port, a game port or a wireless interface or a universal serial bus ("USB") or FIREWIRE can be used. A monitor 1758 or other display device(s) is coupled to the system bus 1722 via a video interface 1760, such as a video adapter. The computer system 1702 can include other output devices, such as speakers, printers, etc.

The computer system 1702 can operate in a networked environment using logical connections to one or more remote computers and/or devices, for example the server computing system 1712. The server computing system 1712 can be another personal computer, a server, another type of computer, or a collection of more than one computers communicatively linked together and typically includes many or all of the elements described above for the computer system 1702. The server computing system 1712 is logically connected to one or more of the computer systems 1702 under any known method of permitting computers to communicate, such as through one or more LANs 1714 and/or WANs 1716 such as the Internet. Such networking environments may take the form of wired and/or wireless enterprise-wide computer networks, intranets, extranets, and the Internet. Other embodiments include other types of communication networks including telecommunications networks, cellular networks, paging networks, and other mobile networks.

When used in a LAN networking environment, the computer system 1702 is connected to the LAN 1714 through an adapter or network interface 1762 (communicatively linked to the system bus 1722). When used in a WAN networking environment, the computer system 1702 may include a modem 1764 or other device, such as the network interface 1762, for establishing communications over the WAN 1716. The modem 1764 is shown in FIG. 17 as communicatively linked between the interface 1756 and the WAN 1716. In a networked environment, program modules, application programs, or data, or portions thereof, can be stored in the server computing system 1712. In the depicted embodiment, the computer system 1702 is communicatively linked to the server computing system 1712 through the LANs 1714 and/or WAN 1716, for example with TCP/IP middle layer network protocols. However, other similar network protocol layers are used in other embodiments, such as User Datagram Protocol ("UDP"). Those skilled in the relevant art will readily recognize that the network connections shown in FIG. 17 are only some examples of establishing communication links between computers, and other links may be used, including wireless links.

The server computing system 1712 is also communicatively linked to one or more other computing systems or devices, such as the display subsystem 1704, participant interface 1708, and/or playing card handling system and/or other gaming systems, which may be through the LAN 1714 or the WAN 410 or other networking configuration such as a direct asynchronous connection (not shown).

The server computing system 1712 includes server applications 1766 for the routing of instructions, programs, data and agents between the computer system 1702, display subsystem and/or other gaming systems 1704, playing card handling system 1710 and/or participant interface 1708. For example the server applications 1766 may include conventional server applications such as WINDOWS NT 4.0 Server, and/or WINDOWS 2000 Server, available from Microsoft Corporation or Redmond, Wash. Additionally, or alternatively, the server applications 1766 can include any of a number of commercially available Web servers, such as INTERNET INFORMATION SERVICE from Microsoft Corporation and/or IPLANET from Netscape. The client gaming device may also include a Web server to serve up content and data to other table game devices or servers when remote devices request data, for example using Microsoft .NET, ASPX, Java, DHTML, FLASH, Shockwave).

The server computing system 1712 may also include one or more random number generators. The random number generator may be implemented as a dedicated device, or alternatively, the random number generator functionality may be implemented as instructions executed by a processor. The random number generator may be used to select one or more winners of a bonus from a plurality of chances.

The participant interface 1708 may include one or more displays 1768 and user input devices 1770. The participant interface 1708 may take the form of one or more of the components of the various embodiments of the display and sensor subsystems previously described. Alternatively, or additionally, the participant interface 1708 may employ a display and/or user input device that is separate from the display and sensor subsystems. For example, the displays 1768 and user input devices 1770 may take the form of touch screen displays, as previously discussed. Also for example, the user input devices 1770 may take the form of a keyboard or keypad. The participant interface 1708 may additionally or alternatively include one or more sound transducers, such as a speaker and/or microphone.

The participant interface 1708 may include one or more readers 1778 operable to information from media 1774, for example player identification from player identity media (e.g., loyalty program or player club card, driver's license, etc.) or financial information from financial media (e.g., credit card, debit card, prepaid card, cellular phone, PDA). For example, the readers 1778 may take the form of one or more magnetic stripe readers operable to read player identification information encoded into one or more magnetic stripes. Alternatively, or additionally, the readers 1778 may take the form of one or more optical machine-readable symbol readers operable to read player identification information encoded into one or more machine-readable symbols (e.g., barcode symbols, stacked code symbols, area or matrix code symbols). For example, the readers 1778 may take the form of one or more RFID readers or interrogators operable to read player identification information encoded into one or more RFID carriers (e.g., tags or cards). All Bally Table View product features may be available on the surface computing display.

The participant interface 1708 may include one or more controllers, memories and may store and execute one or more applications for providing information to, and collecting information from the participants. For example, players, dealers or other casino personnel may select between various game, both wagering and non-wagering games via the participant interface 1708. Also for example, the players may select payout or house odds and/or house advantage via the participant interface 1708, for example via a GUI. The participant interface 1708 may provide the player with a selection of predefined payout or house odds and/or house advantages, or may receive payout or house odds and/or house advantage defined by the player. The participant interface 402 may permit the players to select from a variety of bonus gaming options. Likewise, the participant interface 1708 may provide the dealer with the selected payout or house odds and/or house advantage for the various players, and may permit the dealer to enter the payout or house odds or house advantage for the various player positions. The participant interface 1708 may provide the player and/or dealer with information regarding the player's opportunity to participate in a bonus pool. For example, the information may include the player's absolute number of chances, relative chances, size of bonus pool, qualification status, and time remaining to qualify for the bonus pool and/or factors to enhance the player's opportunity to participate in the bonus pool.

Additionally, the participant interface 1708 may include instructions for handling security such as password or other access protection and communications encryption. The participant interface 1708 can also provide statistics (win, loss, time, etc.) to the players 120 and/or dealer 124. The statistics may be provided in real-time or almost real-time. Statistics for all play at a table may be displayed at the table and/or at other tables or locations in the casino property. Further, the participant interface 1708 may allow the player 120 to request drinks, food, and/or services. The participant interface 1708 may allow the dealer 124 to request assistance, for example requesting more chips or new playing cards. Other information may include one or more of player identification data, preference data, statistical data for the particular player and/or other players, account numbers, account balances, maximum and/or minimum wagers, currency convertors. etc.

The gaming system environment 400 may employ various playing card handling systems 1710, and may include one or more playing card handling subsystems 1772 and one or more controller subsystems 1776, which may include one or more programmed microprocessors, application specific integrated circuits (ASICs), memories or the like. Playing card handling systems 1710 may, for example, detect an order in which playing card are dealt. Playing card handling systems 1710 may, for example, employ means for mechanical randomizing or ordering playing cards. The playing cards may have conventional markings (e.g., ranks 2-ACE and suits of Spades, Hearts, Clubs and Diamonds) or unconventional markings (e.g., slot machine symbols such as lemons, cherries, etc.), and/or special bonus cards). Playing card handling systems 1710 may for example, computationally determine an order (e.g., randomized, sorted, etc.) in which playing cards will be dealt, and may provide the playing cards in the determined order. For example, such playing card handling systems 1710 may employ mechanical means to physically arrange or provide the playing cards in the computationally generated order. Such mechanical means may, for example, include one or more playing card receivers such as carousels, stacks of compartments, elevators, pickers, ejectors, grippers, etc. Also for example, playing card handling systems 1710 may employ indicia forming means for forming playing card markings on playing card media to provide the playing cards in the computationally generated order. Such indicia forming means may, for example, take the form of one or more print heads operable to print one or more playing card markings (e.g., rank and/or suit) on playing card media in the computationally defined order. The print head can take any of a variety of forms, such as a thermal print head, ink jet print head, electrostatic print head, or impact print head. In other embodiments, the indicia forming means may take the form of a magnetic write head, similar to those employed to encode information into magnetic stripes. In other embodiments, the indicia forming means may take the form of an inductive write head, a radio frequency transmitter, or transmitter of other frequencies of electromagnetic radiation, including but not limited to optical magnetic radiation (e.g., visible light, ultraviolet light, and/or infrared light). Printing may be done on almost any physical game related piece, for example playing cards and dice. Printing may add indicia that is indicative of a bonus or to add various dimensions or levels to the play of conventional games. For example, symbols traditionally associated with slot machines may be added to playing cards, dice or other game related pieces. Indicia may even be printed on physical chips, which may entitle a player who receives the chip to a bonus or to participate in a bonus game or drawing.

In some embodiments, the playing card media takes the form of playing card blanks without any markings. In other embodiments, the playing card media takes the form of playing card blanks with some playing card designs, but without playing card value markings (e.g., rank and/or suit symbols). Thus, the playing media may include identical ornamental designs on the backs of the playing card blanks, with the faces left blank for the playing card value markings. In still other embodiments, the playing card media may take the form of existing playing cards, from which the playing card value markings will be erased, prior to being reformed or otherwise generated. In some embodiments, the playing card media may take the form of a fiber based media, for example card stock, vellum, or polymer based media. In some embodiments, the playing card media takes the form of an active media, for example a form of electronic or "e-paper", smart paper, organic light emitting diodes, and/or ink code, which allows the formation and erasure of markings via electrical, magnetic, or electromagnetic radiation. Smart paper is a product developed by Xerox Palo Alto Research Center, of Palo Alto, Calif. The smart paper consists of a flexible polymer containing millions of small balls and electronic circuitry. Each ball has a portion of a first color and a portion of a second color, each portion having an opposite charge from the other portion. Applying a charge causes the balls to rotate within the polymer structure, to display either the first or the second color. Charges can be selectively applied to form different ones or groups of the balls to from the respective markings on the playing cards. The markings remain visible until another charge is applied. Alternatively, the playing card handling systems 1710 can be adapted to employ color-changing inks such as thermochromatic inks (e.g., liquid crystal, leucodyes) which change color in response to temperature fluctuations, and photochromatic inks that respond to variations in UV light. Such materials may be employed to provide special or bonus markings on the physical game related pieces. Visual indicia on physical game related pieces (e.g., playing cards, dice, etc.) may be selectively activated. For example, indicia (e.g., human-readable markings, machine-readable markings, standard symbols such as rank and suit symbols or pips, non-standard symbols, bonus marking, etc.) may not be visible until activated by a suitable stimulus. The stimulus may take a variety of forms, for example, light or electromagnetic energy of certain wavelength(s), electrical current and/or voltage, heat, force or stress, and/or chemicals.

Some suitable playing card handling systems are discussed in detail in U.S. patent publication No. 2002-0187821 A published Dec. 12, 2002; U.S. Pat. No. 6,638,161 issued Oct. 28, 2003; U.S. patent publication No. 2004-0259618 A; U.S. patent application Ser. No. 11/352,416 filed Feb. 10, 2006, Ser. No. 11/428,249 filed Jun. 30, 2006, Ser. No. 11/428,258 filed Jun. 30, 2006, Ser. No. 11/428,286 filed Jun. 30, 2006, Ser. No. 11/428,253 filed Jun. 30, 2006, Ser. No. 11/428,240 filed Jun. 30, 2006, Ser. No. 11/480,321 filed Jun. 30, 2006, Ser. No. 11/480,349 filed Jun. 30, 2006, Ser. No. 11/479,930 filed Jun. 30, 2006, Ser. No. 11/480,273 filed Jun. 30, 2006, Ser. No. 11/480,345 filed Jun. 30, 2006, Ser. No. 11/480,295 filed Jun. 29, 2006, Ser. No. 11/478,360 filed Jun. 29, 2006, and Ser. No. 11/479,963 filed Jun. 29, 2006.

Other gaming systems which may be part of the gaming environment 1700 may include one or more sensors, detectors, input devices, output devices, actuators, and/or controllers such as programmed microprocessor, DSP, ASIC and/or Field Programmable Gate Array (FPGA) or the like. The controllers may execute one or more gaming applications. The gaming applications can include instructions for acquiring wagering and gaming event information from the live gaming at the gaming table. The other gaming systems may collect information via images (visible, infrared, ultraviolet), radio or microwave electromagnetic radiation, and/or by detecting magnetic, inductance, or mechanical energy. The other gaming systems may, for example, employ optical machine-readable symbol readers, operable to read non-standard playing card markings from the playing cards, and/or identifiers from chips and/or player identification media such as casino club cards. Such markings or identifiers may, for example, take the form of machine-readable symbols such as barcode, matrix or area code, or stacked code symbols. Such optical machine-readable symbol readers may take the form of a scanner or an imager. The other gaming systems may, for example, employ sensors operable to read standard playing card markings (e.g., rank, suit, pips). The other gaming systems may, for example, employ one or more magnetic strip readers or inductive sensors to read magnetic stripe or other indicia carried on or in the playing cards, chips and/or player identification media. The other gaming systems may, for example, employ one or more radio frequency readers, for example a radio frequency identification (RFID) interrogator where the playing cards, chips or player identification media carry RFID tags or circuits.

Such other gaming systems may, for example, be implemented in the card shoe 128, playing card handling system 120, dedicated discard shoe (not shown), chip tray, or other areas at or proximate a gaming table. The gaming applications can also include instructions for processing, at least partially, acquired wagering and gaming event information, for example, identifying the position and amount of each wager and/or the value of each hand of playing cards. The gaming applications may include statistical packages for producing statistical information regarding the play at a particular gaming table, the performance of one or more players including indications of skill level, and/or the performance of the dealer and/or game operator. The gaming applications can also include instructions for providing a video feed and/or simulation of some or all of the participant positions. Gaming applications may determine, track, monitor or otherwise process outcomes of games, amounts of wagers, average wager, player identity information, complimentary benefits information ("comps"), player performance data including indications of player skill or theoretical advantage or use of counting schemes, dealer performance data, chip tray accounting information, playing card sequences, etc. Some suitable applications are described in one or more of commonly assigned U.S. patent application: U.S. Pat. No. 6,460,848 issued Oct. 8, 2002; U.S. Pat. No. 6,652,379 issued Nov. 25, 2003, U.S. Pat. No. 6,685,568 issued Feb. 3, 2004; U.S. patent publication No. 2002-0187821 A published Dec. 12, 2002; U.S. Pat. No. 6,638,161 issued Oct. 28, 2003; and U.S. patent publication No. 2004-0259618 A.

Some embodiments may communicatively couple one or more of the systems 1702, 1712, 1710, subsystems 1704, 1706 and/or participant interfaces 1708 without the use of the server computing system 1712, or alternatively via multiple server computing systems.

Figure 18A:
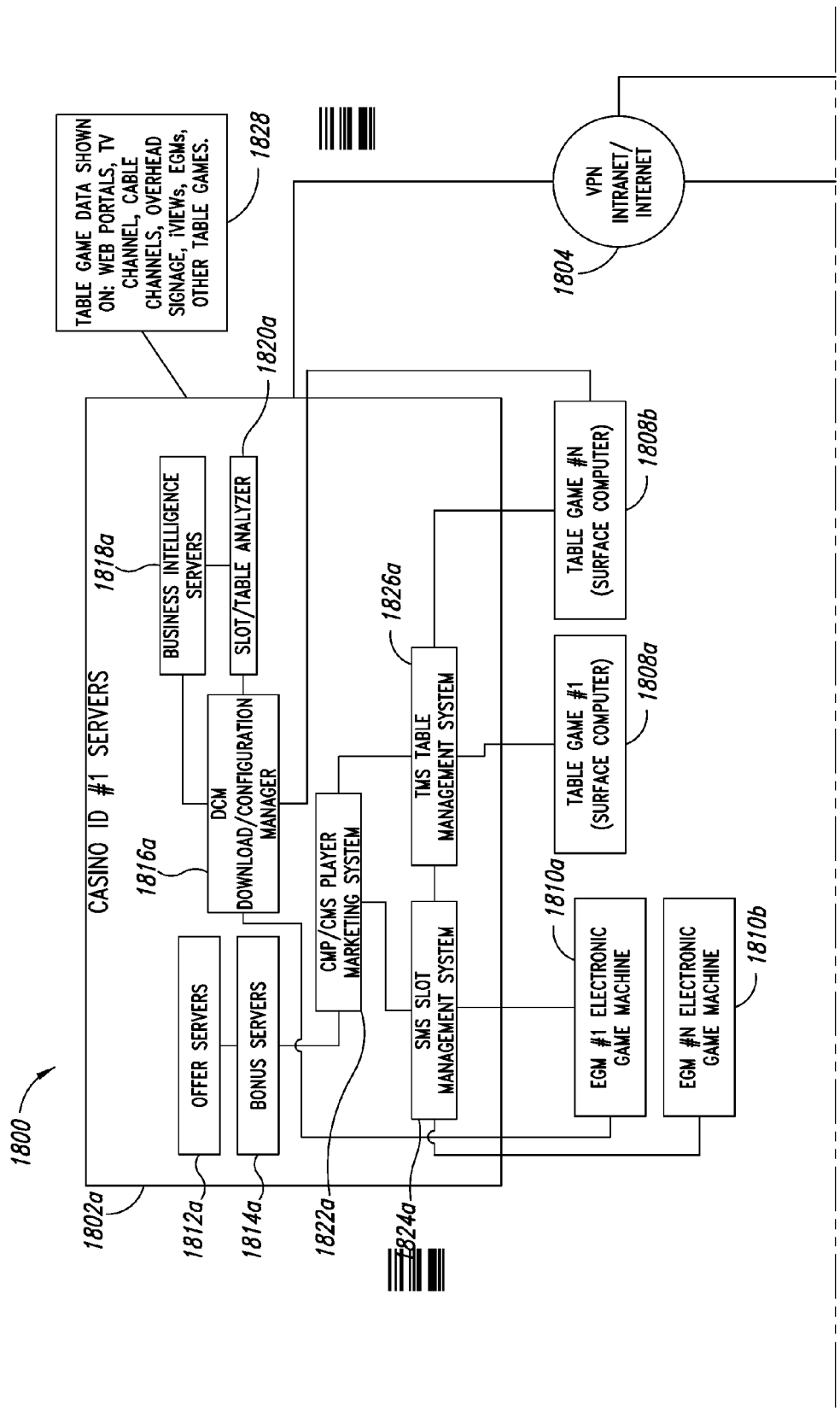
FIGS. 18A and 18B are schematic diagrams of a game playing environment network according to multiple illustrated embodiment.

FIG. 18A and the following discussion provide a brief, general description of a suitable gaming system environment 1800 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

Figure 18B:
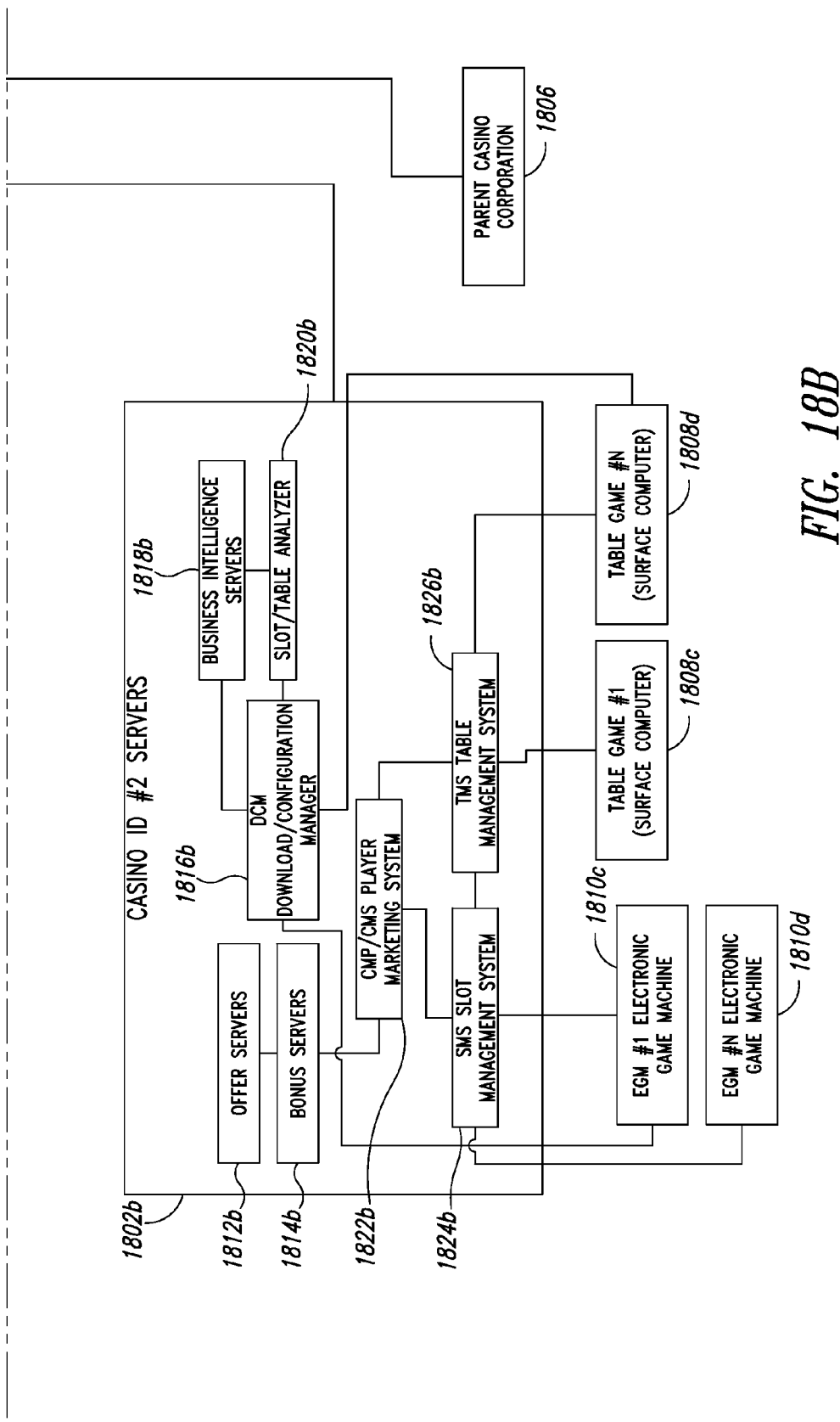

FIGS. 18A and 18B show the gaming system environment 1800 comprising one or more server systems 1802a, 1802b (collectively 1802) communicatively coupled by a network, for example a VPN Intranet of Internet network 1804. The VPN Intranet of Internet network 1804 is also communicatively coupled to a parent system, for example the corporate systems 1806 of a parent casino organization.

Each of the server systems 1802 is communicatively coupled with one or more game devices or systems, for instance table game systems 1808a-1808d (collectively 1808) and/or electronic game machines (e.g., upright or arcade style gaming systems, slot machines, video poker machines, video blackjack machines, etc.) 1810a-1810d (collectively 1810). The table game systems 1808 may, for example, take the form of the various previously described embodiments of table game systems. The electronic game machines 1810 may, for example, take the form of the various previously described embodiments of upright or arcade style gaming systems, or other types of electronic gaming systems, for example video gaming systems that employ virtual game related pieces.

The server systems 1802 may be located on respective casino premises. Alternatively, the server systems 1802 may be located on a same casino's premises, for instance in respective portions of the premises (e.g., respective pits, rooms or floor), or may be collocated. Alternatively, the server systems 1802 may be remotely located from the casino and/or remotely located from the table game systems 1808 and electronic game machines 1810.

The server systems 1802 may include one or more software programs, routines or functions, or may include one or more circuits to implement various functions.

For example, the server systems 1802 may include one or more offer servers 1812a, 1812b (collectively 1812).

For example, the server systems 1802 may include one or more bonusing servers 1814a, 1814b (collectively 1814). The bonusing servers 1814 may determine bonus winners. For instance, the bonusing servers 1814 may determine when a player receives a particular bonus card, playing card or combination of playing cards. Also for instance, the bonusing servers 1814 may determine produce random numbers, which may be used to identify a bonus winner or to allocate a card, playing card or combination of playing cards to a player or table. Also for instance, the bonusing servers 1814 may track time or track a duration since a last bonus award and produce bonus qualifying event or otherwise award a bonus based on the same. Additionally or alternatively, the bonusing servers 1814 may track player participation or qualification in the bonus. For instance, the bonusing servers 1814 may determine whether a player has placed a bonus wager and/or a primary wager. Also for instance, the bonusing server may determine other aspects of a player's wager which may entitle the player to participate in the bonus pool, for example length of time spent wagering, player worth to the casino, amount wagered, number of visits to the casino. The bonusing servers 1814 may track contributions to a bonus pool. For instance, the bonusing servers 1814 may track contributions by casino properties, number and/or amount of bonus wagers, number and/or amount of primary wagers, etc.

For example, the server systems 1802 may include one or more download configuration managers 1816a, 1816b (collectively 1816). The download configuration managers 1816 may allow the various gaming systems to be configured remotely over the network 1804. For example, such may allow the downloading and updating or modifying of game software, operating systems, firmware, either to the computer system 1702 and/or peripherals at will from a central download/configuration system (e.g., BALLY DCM). For instance, the table and/or arcade system gaming systems may be configured to handle new games or variations in games, for example with new or modified virtual game layouts. Also for instance, the table and/or arcade system gaming systems may be configured to execute new, upgraded or different software with new hardware, such as new, upgraded or different components of the display subsystem, sensor subsystem or computing subsystem. Also for instance, the table and/or arcade system gaming systems may be configured to execute new, upgraded or different software on existing hardware. Such avoids time intensive and costly manual configuration. The download configurations managers 1816 may further track the various hardware and software installed at each gaming table. For example, download configurations managers 1816 may maintain a database of the specific hardware and hardware functionality for each table gaming system and/or specific software including version numbers and software functionality for each gaming table. Such may simplify the maintenance of gaming tables and configuration of new hardware and/or software. All of the software in the table or arcade style gaming device cabinet may be authenticated with digital hashes and signatures to guarantee regulatory compliance.

The download configuration manager 1816 may be communicatively coupled with one or more business intelligence servers 1818a, 1818b (collectively 1818). The download configuration manager 1816 may be communicatively coupled with one or more slot and/or table analyzers 1820a, 1820b (collectively 1820). The business intelligence servers 1818 and the slot and table analyzers 1820 may, for example, suggests schedule changes for the table games to casino personnel, which may or may not require either configuration or complete software changes. Some changes may be prescheduled by a central system (e.g., server systems 1802 or one or more systems of the parent casino corporation 1806) and the table gaming or arcade style gaming system will go through automatic changes, preferably while players are not present.

For example, the server systems 1802 may include one or more player marketing systems 1822a, 1822b (collectively 1814). Player marketing systems 1822 may track player's play, accommodation, and purchases and provide promotions based on such tracked information. For example, the server systems 1802 may include one or more slot management systems 1824a, 1824b (collectively 1824). The slot management systems 1824 track slot play, and may implement bonuses, for example progressive bonuses on the slot machines. For example, the server systems 1802 may include one or more table management systems 1826a, 1826b (collectively 1826). The table management system tracks play at gaming tables, for example including amounts wagered, discrepancy in play, card counting, dealer efficiency, chip reserves, etc. One or more of the server systems 1802a may be communicatively coupled to one or more display devices 1828. One or more of the server systems 1802a may include an offer servers module. For example, signage throughout the casino property may present table gaming data to other players and non-players, including information about bonuses, for instance progressive bonuses.

Figure 19:
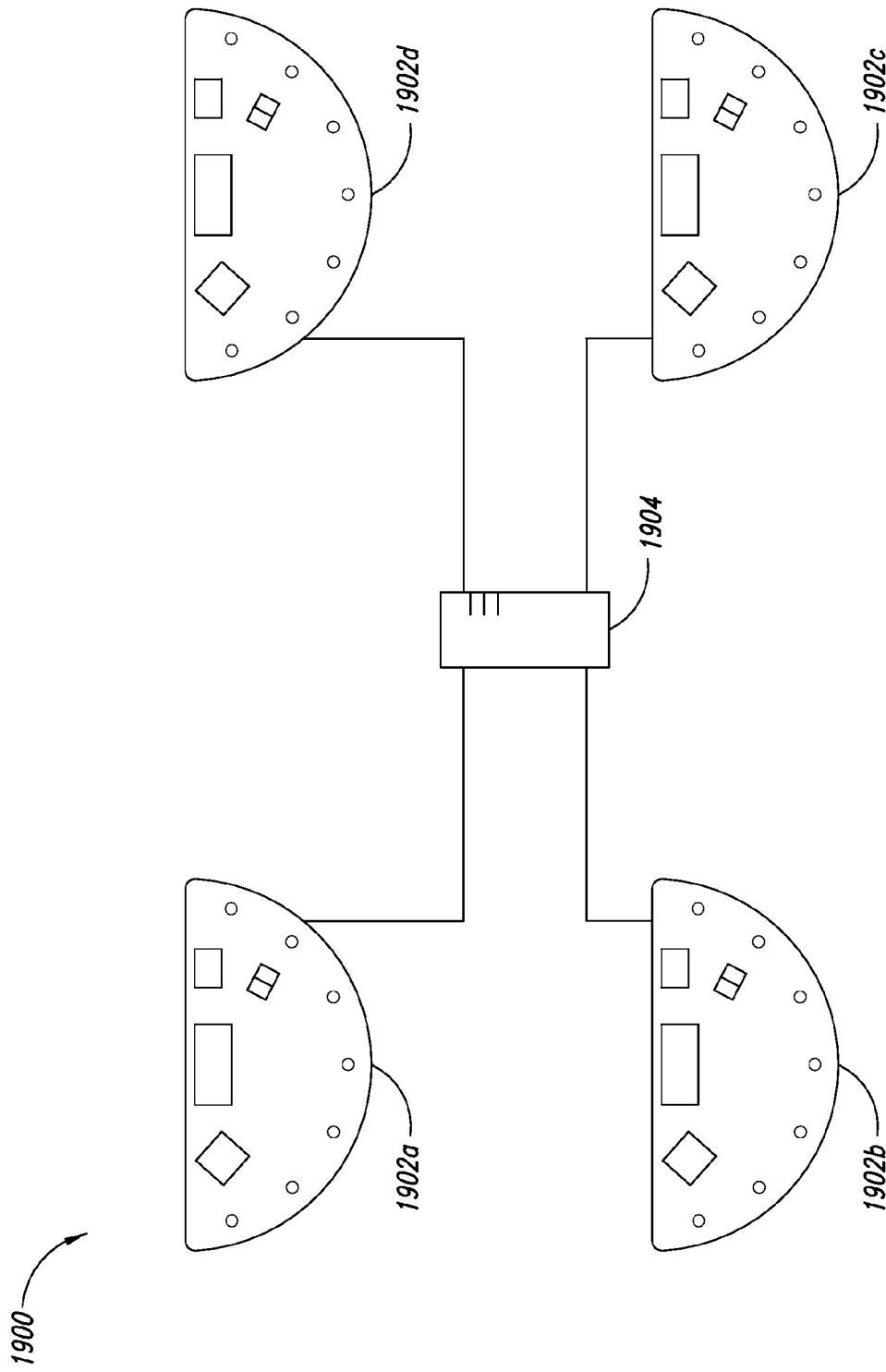
FIG. 19 is a schematic diagram of a game playing environment, including a number of gaming tables associated with or constituting a gaming pit and a computing system, according to another illustrated embodiment.

FIG. 19 shows a gaming environment 1900, according to one illustrated embodiment.

The gaming environment 1900 takes the form of a pit, including a plurality (e.g., four) of gaming tables 1902a-1902d communicatively coupled via the computer system 1904. The various gaming tables 1902a-1902d may each include a respective display subsystem and sensor subsystem, and share a common computing subsystem (e.g., computer system 1904). Alternatively, the various gaming tables 1902a-1902d may the form of one or more of the previously described embodiment of gaming tables, and/or upright or arcade/casino style gaming system, each including respective display, sensor and computing subsystems. In such an embodiment, the computer system 1904 may simply functions as a communications server, or may synchronize various operations between the various gaming tables 1902a-1902d. The computer system 1904 may take variety of forms, for example the computer system 1702 previously discussed with reference to FIG. 17.

Figure 20:
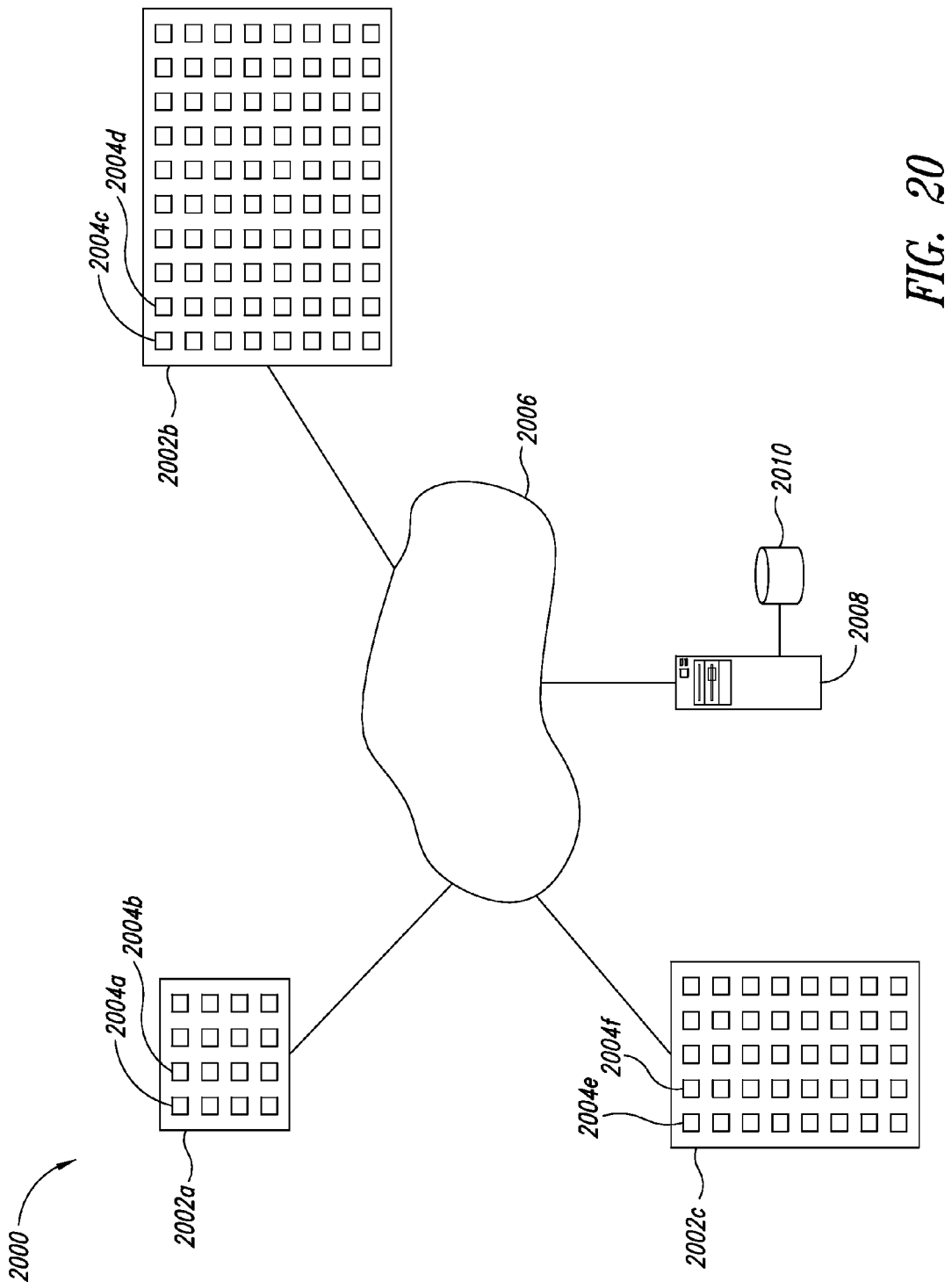
FIG. 20 is a schematic diagram of a game playing environment, including a number of properties each including a plurality of gaming pits with one or more gaming tables, a computing system, and a network communicatively coupling the computing system with the properties, according to another illustrated embodiment.

FIG. 20 shows a multi-property gaming environment 2000 according to one illustrated embodiment.

The multi-property gaming environment 2000 includes two or more properties 2002a-2002c (collectively 2002). The properties 2002 may be distinct locations, for example distinct casinos. One or more of the properties 2002 may be commonly owned by a single business entity or may be commonly owned by multiple business entities. Additionally, or alternatively, the some or all of the properties 2002 may be separately owned by distinct business entities. One or more of the properties 2002 may be located in the same city, town, county, state or country. Additionally, or alternatively, one or more of the properties 2002 may be located in different cities, towns, countries or states or countries.

Each property 2002a-2002c may include one or more pits 2004a-2004f (only six called out in FIG. 20), which may include one or more gaming tables or gaming systems. The pits 2004a-2004f may, for example take a form similar to that shown in FIG. 19.

The properties 2002 are communicatively linked by one or more networks 2006, computer system 2008 and associated memory 2010 storing instructions and a database. The network(s) 2006 may take the form of local area networks (LANs), wide area networks (WANs) or other networks. The network(s) 2006 may include wired and/or wireless communications links. The networks(s) 2006 may include digital and/or analog communications links. The network(s) 2006 may employ other networking technologies, some of which are discussed in more detail herein.

The memory 2010 may store instructions for operating the gaming environment 2000, along with a database populated with information related to bonus wagers, chances at a bonus pool as well as the bonus pool itself. For example, the database may reflect a total number of chances provided to respective players for a bonus pool. Each of the chances may, for example, reflect a single chance or opportunity to participate in the bonus pool. As such, the chances may be virtual (i.e., computer data). For example, a player may be provided with zero, one or more chances to participate or win all or a portion of a bonus pool. Such may be implemented in a fashion similar to a lottery, with each chance have the same probability of winning as each other chance. The total number of chances for a given bonus pool may be variable, or may be fixed. As discussed below, the chances may be provided based on one or more of a variety of factors. Also for example, the database may reflect a total amount of a bonus pool. The database may reflect amounts contributed by individual players either via conventional wagers or bonus wagers. The database may reflect amounts contributed by individual gaming tables, individual pits 2004, individual properties 2002, individual business entities such as the casinos or other corporate of business sponsors (e.g., advertisers) and/or a consortium of property owners or casinos.

Figure 21:
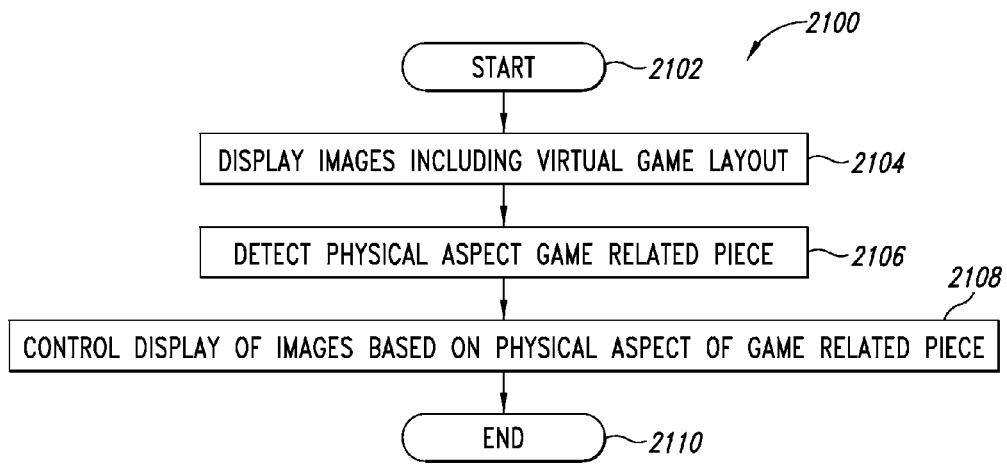
FIG. 21 is a flow diagram of a method of operating a game playing system environment according to an illustrated embodiment, including displaying a virtual game layout and sensing at least one physical aspect of a game related piece and controlling images based on the sensed physical aspects.

FIG. 21 shows a method 2100 of operating a gaming system environment, according to one illustrated embodiment.

At 2102, the method 2100 starts. The method may, for example, start in response to the powering or turning ON of one or more components of the gaming system environment or other event.

At 2104, the display subsystem displays images related to one or more games to be played on at least a first game playing surface. The images include a virtual game layout that includes a number of demarcations of at least one area associated with the play of the games.

At, 2106, the sensor subsystem detects at least one physical aspect of at least one game related piece when the game related piece is at least proximate the first game playing surface.

At 2108, the computing subsystem controls the images displayed based at least in part on information indicative of the sensed at least one physical aspect of the at least one game related piece.

The method 2100 terminates at 2110 until called or started again by an appropriate signal. Alternatively, the method 2100 may repeat, operating as a continuous thread or process by passing control back to 2104.

Figure 22:
FIG. 22 is a flow diagram of a method of operating a game playing system environment according to an illustrated embodiment, including displaying images such that demarcations at least appear to be on or below the first game playing surface.

FIG. 22 shows a method 2200 of operating a gaming system environment, according to one illustrated embodiment.

At 2202, the display subsystem displays the images such that the demarcations at least appear to be on or below the first game playing surface. Such may be suitable to implement the act 2104 (FIGS. 21A, 21B).

Figure 23:
FIG. 23 is a flow diagram of a method of operating a game playing system environment according to an illustrated embodiment, including displaying images of a respective portion of a virtual game layout on each of a plurality of display devices such that the virtual game layout formed by the portions of the virtual game layout is continuous.

FIG. 23 shows a method 2300 of operating a gaming system environment, according to one illustrated embodiment.

At 2302, the display subsystem displays images of a respective portion of the virtual game layout on each of a plurality of display devices such that the virtual game layout formed by the portions of the virtual game layout is continuous. Thus, the display subsystem may display on or below multiple playing surfaces if those playing surfaces were one contiguous playing surface. Such may be suitable to implement the act 2104 (FIGS. 21A, 21B).

Figure 24:
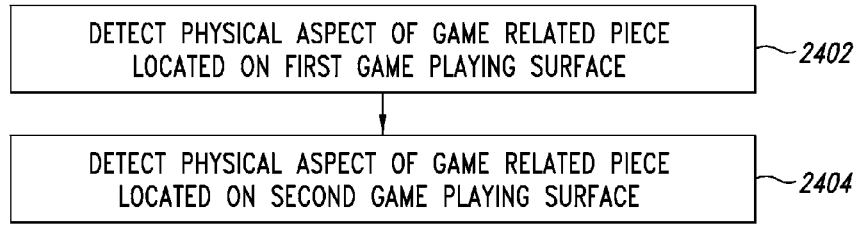
FIG. 24 is a flow diagram of a method of operating a game playing system environment according to an illustrated embodiment, including detecting at least one physical aspect of a single game related piece when the game related piece is located on a first game playing surface and on a second game playing surface.

FIG. 24 shows a method 2400 of operating a gaming system environment, according to one illustrated embodiment.

At 2402, the sensor subsystem detects or otherwise senses at least one physical aspect of a single game related piece when the game related piece is located on the first game playing surface. At 2404, the sensor subsystem detects or otherwise senses at least one physical aspect of a single game related piece when the game related piece is located on the second game playing surface. Thus, the sensor subsystem may track the movement of game related pieces over multiple game playing surfaces. Such may be suitable to implement the act 2106 (FIGS. 21A, 21B).

Figure 25:
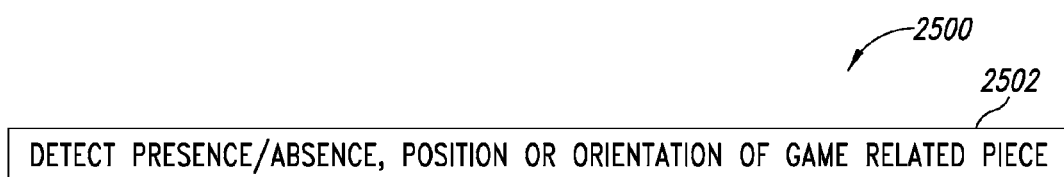
FIG. 25 is a flow diagram of a method of operating a game playing system environment according to an illustrated embodiment, including detecting at least one of a presence/absence of the game related piece from at least a portion of at least one game playing surface, a position of the game related piece on the at least one game playing surface, or an orientation of the game related piece with respect to the at least one game playing surface.

FIG. 25 shows a method 2500 of operating a gaming system environment, according to one illustrated embodiment.

At 2502, the sensor subsystem detects or otherwise senses at least one of a presence/absence of the game related piece from at least a portion of at least one game playing surface, a position of the game related piece on the at least one game playing surface, or an orientation of the game related piece with respect to the at least one game playing surface. Such may be suitable to implement the act 2106 (FIGS. 21A, 21B).

Figure 26:
FIG. 26 is a flow diagram of a method of operating a game playing system environment according to an illustrated embodiment, including optical detecting at least one physical aspect of a game related piece.

FIG. 26 shows a method 2600 of operating a gaming system environment, according to one illustrated embodiment.

At 2602, the sensor subsystem optical detects the at least one physical aspect of the game related piece. Such may be suitable to implement the act 2106 (FIGS. 21A, 21B).

Figure 27:
FIG. 27 is a flow diagram of a method of operating a game playing system environment according to an illustrated embodiment, including optically reading a machine-readable symbol carried by a game related piece.

FIG. 27 shows a method 2700 of operating a gaming system environment, according to one illustrated embodiment.

At 2702, the sensor subsystem optically reads a machine-readable symbol carried by the game related piece. Such may be suitable to implement the act 2602 (FIG. 26).

Figure 28:
FIG. 28 is a flow diagram of a method of operating a game playing system environment according to an illustrated embodiment, including inductively or magnetically detecting at least one physical aspect of a game related piece.

FIG. 28 shows a method 2800 of operating a gaming system environment, according to one illustrated embodiment.

At 2802, the sensor subsystem inductively or magnetically detects or otherwise sense the at least one physical aspect of the game related piece. For example, the sensor subsystem may detect magnetic or ferromagnetic particles carried by the game related pieces, for instance as a stripe or distribute on or on the game related piece. Such may be suitable to implement the act 2106 (FIGS. 21A, 21B).

Figure 29:
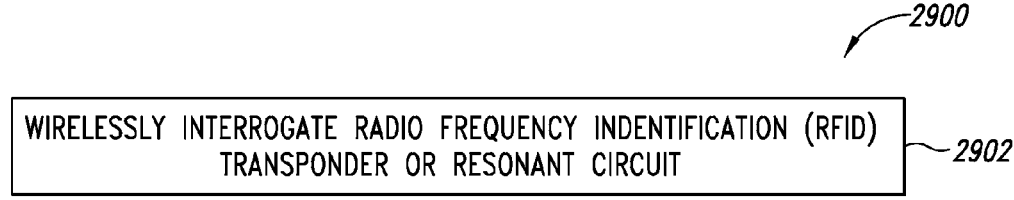
FIG. 29 is a flow diagram of a method of operating a game playing system environment according to an illustrated embodiment, including wirelessly interrogating at least one of a radio frequency identification transponder or a resonant circuit carried by the game related piece.

FIG. 29 shows a method 2900 of operating a gaming system environment, according to one illustrated embodiment.

At 2902, the sensor subsystem wirelessly interrogating at least one of a radio frequency identification transponder or a resonant circuit carried by the game related piece. For example, the sensor subsystem may transmit a wireless interrogation signal at an interrogation frequency and may detect a response signal, for instance backscattered by the transponder at a response frequency. Such may be suitable to implement the act 2106 (FIGS. 21A, 21B).

Figure 30:
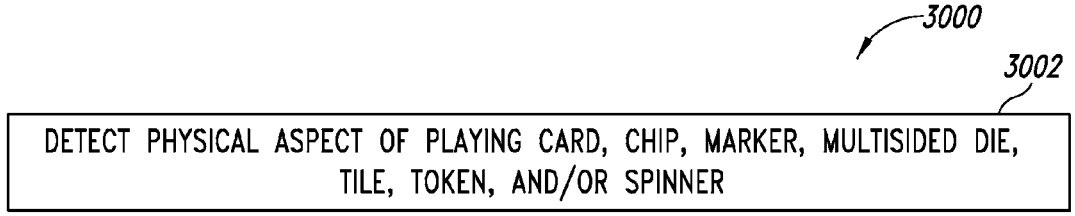
FIG. 30 is a flow diagram of a method of operating a game playing system environment according to an illustrated embodiment, including detecting a physical aspect of at least one of a playing card, a chip, a marker, a multisided die, a tile, a token, or a spinner or other game related piece.

FIG. 30 shows a method 3000 of operating a gaming system environment, according to one illustrated embodiment.

At 3002, the sensor subsystem detects a physical aspect of at least one of a playing card, a chip, a marker, a multisided die, a tile, a token, or a spinner or other game related piece. For example, the sensor subsystem may optically read a machine-readable symbol carried by the game related piece. For example, the sensor subsystem may detect magnetic or ferromagnetic particles carried by the game related pieces, for instance as a stripe or distribute on or on the game related piece. For example, the sensor subsystem may transmit a wireless interrogation signal at an interrogation frequency and may detect a response signal, for instance backscattered by the transponder at a response frequency. Such may be suitable to implement the act 2106 (FIGS. 21A, 21B).

Figure 31:
FIG. 31 is a flow diagram of a method of operating a game playing system environment according to an illustrated embodiment, including reading at least one of participant identification media or financial media located proximate at least one game playing surface of the game playing system.

FIG. 31 shows a method 3100 of operating a gaming system environment, according to one illustrated embodiment.

At 3102, the sensor subsystem reads at least one of participant identification media or financial media located proximate at least one game playing surface of the game playing system. Such may be automatically performed in addition to the acts of method 2100 (FIGS. 21A, 21B).

FIG. 32 shows a method 3200 of operating a gaming system environment, according to one illustrated embodiment.

At 3202, the sensor subsystem optically reads at least one machine-readable symbol from at least one of participant identification media or financial media located on at least one game playing surface of the game playing system. For example, the sensor subsystem may optically scan or image one or more machine-readable symbols carried by the media. Such may be suitable to implement the act 3102 (FIG. 31).

FIG. 33 shows a method 3300 of operating a gaming system environment, according to one illustrated embodiment.

At 3302, the sensor subsystem wirelessly reads information from at least one memory of at least one of participant identification media or financial media located at least proximate at least one game playing surface of the game playing system. For example, the sensor subsystem may transmit a wireless interrogation signal at an interrogation frequency and may detect a response signal, for instance backscattered by a transponder at a response frequency. Such may be suitable to implement the act 3102 (FIG. 31).

FIG. 34 shows a method 3400 of operating a gaming system environment, according to one illustrated embodiment.

At 3402, the sensor subsystem reads information from at least one of a loyalty program card, a credit card, a debit card, or a prepaid card located proximate at least one game playing surface of the game playing system. For example, the sensor subsystem may optically scan or image one or more machine-readable symbols carried by the media. Also for example, the sensor subsystem may transmit a wireless interrogation signal at an interrogation frequency and may detect a response signal, for instance backscattered by a transponder at a response frequency. Such may be suitable to implement the act 3102 (FIG. 31).

At 3404, the computing system or some other system electronically transfers funds between a financial institution and a participant account based at least in part on information read from at least one of a loyalty program card, a credit card, a debit card, or a prepaid card.

FIG. 35 shows a method 3500 of operating a gaming system environment, according to one illustrated embodiment.

At 3502, the computing subsystem or some other subsystem such as a random number generator, randomly generates a value. At 3504, the display subsystem displays an image of an indicator that is indicative of the randomly generated value. The image may, for example, be used to vary play of a game or provide a bonus. Such may be automatically performed in addition to the acts of method 2100 (FIGS. 21A, 21B).

FIG. 36 shows a method 3600 of operating a gaming system environment, according to one illustrated embodiment.

At 3602, the display subsystem displays an image of an indicator that is indicative of the randomly generated value in the form of at least one of a portion of a spinner, a die, a roulette wheel, a playing card, or a bonus card. The image may, for example, be used to vary play of a game or provide a bonus. Such may be suitable to implement the act 3504 (FIG. 35).

FIG. 37 shows a method 3700 of operating a gaming system environment, according to one illustrated embodiment.

At 3702, the display subsystem displays an image that is indicative of the randomly generated value in the form of at least one virtual playing card that is combinable with at least one physical playing card to form a winning combination. The image may, for example, be used to vary play of a game or provide a bonus. Such may be suitable to implement the act 3504 (FIG. 35).

Figure 38:
FIG. 38 is a flow diagram of a method of operating a game playing system environment according to an illustrated embodiment, including displaying an image of an indicator that is indicative of a randomly generated value in the form of at least one of a bonus, a progressive jackpot, or a promotional reward.

FIG. 38 shows a method 3800 of operating a gaming system environment, according to one illustrated embodiment.

At 3802, the display subsystem displays an image of an indicator that is indicative of the randomly generated value in the form of at least one of a bonus, a progressive jackpot, or a promotional reward. Such may be automatically performed in addition to the acts of method 2100 (FIGS. 21A, 21B).

Figure 39:
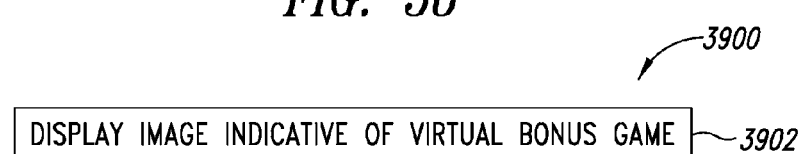
FIG. 39 is a flow diagram of a method of operating a game playing system environment according to an illustrated embodiment, including displaying an image of an indicator that is indicative of a virtual bonus game.

FIG. 39 shows a method 3900 of operating a gaming system environment, according to one illustrated embodiment.

At 3902, the display subsystem displays an image of an indicator that is indicative of a virtual bonus game. Such may be suitable to implement the act 3802 (FIG. 35).

Figure 40:
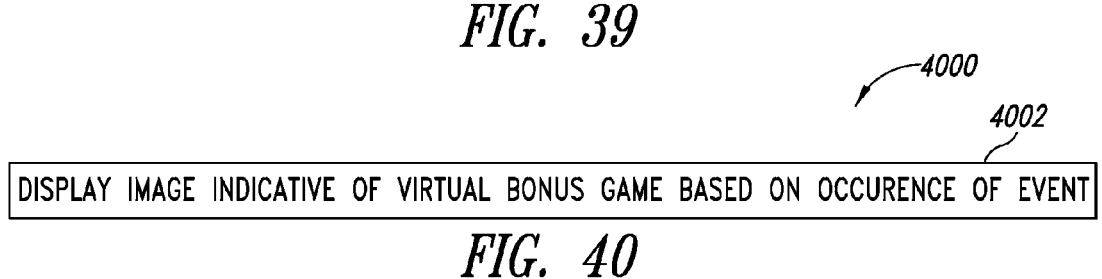
FIG. 40 is a flow diagram of a method of operating a game playing system environment according to an illustrated embodiment, including displaying an image of an indicator that is indicative of a virtual bonus game based on an occurrence of an event.

FIG. 40 shows a method 4000 of operating a gaming system environment, according to one illustrated embodiment.

At 4002, the display subsystem displays an image of an indicator that is indicative of a virtual bonus game based on an occurrence of an event. The event may take any of a variety of forms. For example, a player playing for a set period of time, exceeding a defined amount wager either in a single play or cumulatively, incurring losses exceeding a defined amount, the appearance of one or more physical and/or virtual playing cards in the player's hand, at a table or elsewhere, passage of a set time, or occurrence of a random event. Such may be suitable to implement the act 3802 (FIG. 38).

Figure 41:
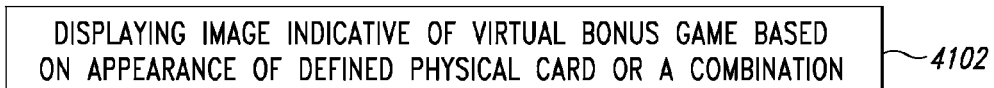
FIG. 41 is a flow diagram of a method of operating a game playing system environment according to an illustrated embodiment, including displaying an image of an indicator that is indicative of a virtual bonus game based on an occurrence of an appearance of defined physical card or a combination of physical cards.

FIG. 41 shows a method 4100 of operating a gaming system environment, according to one illustrated embodiment.

At 4102, the display subsystem displays an image of an indicator that is indicative of a virtual bonus game based on an occurrence of an appearance of defined physical card or a combination of physical cards. Such may be suitable to implement the act 4002 (FIG. 40).

Figure 42:
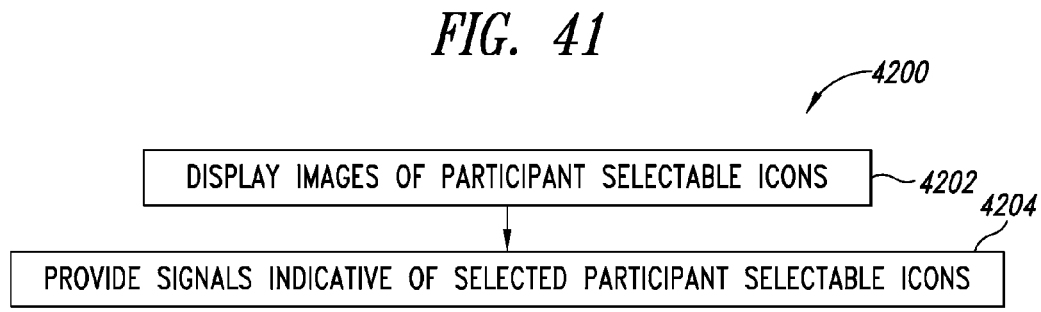
FIG. 42 is a flow diagram of a method of operating a game playing system environment according to an illustrated embodiment, including displaying images of a number of participant selectable icons and provides signals indicative of selected ones of the participant selectable icons in response to detection of participant selection of the participant selectable icons.

FIG. 42 shows a method 4200 of operating a gaming system environment, according to one illustrated embodiment.

At 4202, the display subsystem displays images of a number of participant selectable icons. At 4204, the computing subsystem or another subsystem provides signals indicative of selected ones of the participant selectable icons in response to detection of participant selection of the participant selectable icons. Such may allow player or other patrons to interact with the gaming system, to request games, to execute funds transfers, etc. Such may be automatically performed in addition to the acts of method 2100 (FIGS. 21A, 21B).

Figure 43:
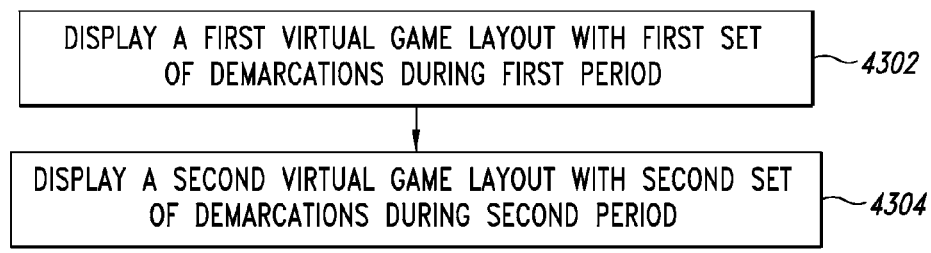
FIG. 43 is a flow diagram of a method of operating a game playing system environment according to an illustrated embodiment, including displaying a first virtual game layout with a first set of demarcations during a first period and a second virtual game layout with a second set of demarcations during a second period, the second set of demarcations different from the first set of demarcations.

FIG. 43 shows a method 4300 of operating a gaming system environment, according to one illustrated embodiment.

At 4302, the display subsystem displays a first virtual game layout with a first set of demarcations during a first period. At 4304, the display subsystem displays a second virtual game layout with a second set of demarcations during a second period, the second set of demarcations different from the first set of demarcations. Thus, the display subsystem may allow the table gaming or other gaming device to be electronically reconfigured to provide different games at different times. Such may reduce the time and effort currently required to reconfigure conventional felt top gaming tables. Such may be performed in addition to the acts of method 2100 (FIGS. 21A, 21B).

Figure 44:
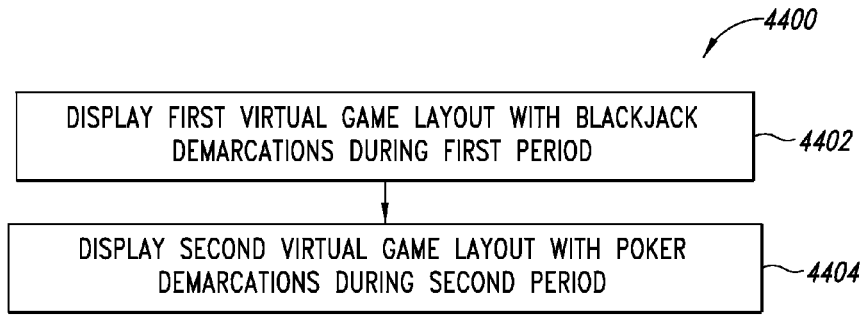
FIG. 44 is a flow diagram of a method of operating a game playing system environment according to an illustrated embodiment, including displaying a first virtual game layout with a set of blackjack demarcations during a first period and a second virtual game layout with a set of poker demarcations during a second period.

FIG. 44 shows a method 4400 of operating a gaming system environment, according to one illustrated embodiment.

At 4402, the display subsystem displays a first virtual game layout with a set of blackjack demarcations during a first period. At 4404, the display subsystem displays a second virtual game layout with a set of poker demarcations during a second period. The display subsystem may display virtual game layouts of other games, including baccarat and roulette. Such may be suitable to implement the acts of method 4300 (FIG. 43).

Figure 45:
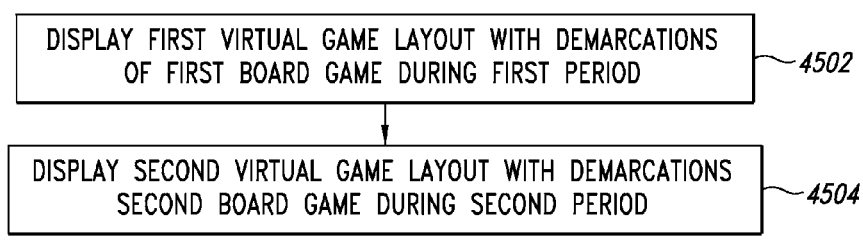
FIG. 45 is a flow diagram of a method of operating a game playing system environment according to an illustrated embodiment, including displaying a first virtual game layout with a set of demarcations of a first board game during a first period and a second virtual game layout with a set of demarcations of a second board game during a second period.

FIG. 45 shows a method 4500 of operating a gaming system environment, according to one illustrated embodiment.

At 4502, the display subsystem displays a first virtual game layout with a set of demarcations of a first board game during a first period. At 4504, the display subsystem displays a second virtual game layout with a set of demarcations of a second board game during a second period. The display subsystem may display virtual game layouts of most board games. Such may be suitable to implement the acts of method 4300 (FIG. 43).

Figure 46:
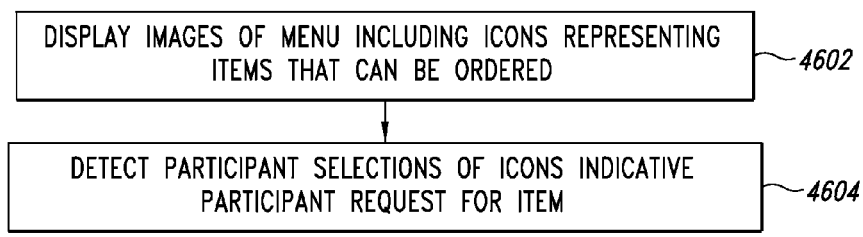
FIG. 46 is a flow diagram of a method of operating a game playing system environment according to an illustrated embodiment, including displaying images of a menu including icons representing a number of items that may be ordered and detecting participant selections of the icons indicative of a participant request for the item represented by the selected one of the icons.

FIG. 46 shows a method 4600 of operating a gaming system environment, according to one illustrated embodiment.

At 4602, the display subsystem displays images of a menu including icons representing a number of items that may be ordered. At 4604, the sensor subsystem detects participant selections of the icons indicative of a participant request for the item represented by the selected one of the icons. Such may allow player or other patrons order items such as food, beverages, souvenirs, gifts, tickets, or to order services such as room service, valet service, etc. Such may be automatically performed in addition to the acts of method 2100 (FIGS. 21A, 21B).

Figure 47:
FIG. 47 is a flow diagram of a method of operating a game playing system environment according to an illustrated embodiment, including displaying images indicative of participant account information for at least one participant in the at least one game. The information may cover a variety of accounts and account types.

FIG. 47 shows a method 4700 of operating a gaming system environment, according to one illustrated embodiment.

At 4702, the display subsystem displays images indicative of participant account information for at least one participant in the at least one game. The information may cover a variety of accounts and account types. For example, the information may relate to an account the casino has set up for the player. For example, the information may relate to an account associated with the particular game being played by the player, such as an account associated with a credit meter or virtual chips. For example, the information may related to an account a financial institution has set up for the player, such as a bank account, checking account, money market account, debit account or prepaid account, which may or may not be associated with a piece of financial media. Such may be performed in addition to the acts of method 2100 (FIGS. 21A, 21B).

Figure 48:
FIG. 48 is a flow diagram of a method of operating a game playing system environment according to an illustrated embodiment, including displaying images indicative of at least one characteristic of the game related piece.

FIG. 48 shows a method 4800 of operating a gaming system environment, according to one illustrated embodiment.

At 4802, the display subsystem displays images indicative of at least one characteristic of the game related piece. For example, the images may be a virtual representation of the physical game related piece. For example, the images may include text or numbers or other indicia indicative of an identity of the physical game related piece, a value of the physical game related piece, a position and/or orientation of the physical game related piece on the playing surface, a player who controls the physical game related piece. Such may be performed in addition to the acts of method 2100 (FIGS. 21A, 21B). For example, in games where one piece captures another (e.g., chess, checkers) special graphics may be displayed in a vicinity of where the capture occurred to enhance the game playing experience. Also for example, in games where game related piece associated with one player overtakes a game related piece associated with another player as the game related pieces are travel a game layout, a visual emphasize may be provided when such an event occurs.

Figure 49:
FIG. 49 is a flow diagram of a method of operating a game playing system environment according to an illustrated embodiment, including determining a value indicative of a net worth of a patron based at least in part on information received from a sensor subsystem that is indicative of the at least one physical aspect of the game related piece sensed by a sensor subsystem.

FIG. 49 shows a method 4900 of operating a gaming system environment, according to one illustrated embodiment.

At 4902, the computing subsystem or some other system (e.g., CMS/CMP system) determines a value indicative of a net worth of a patron based at least in part on information received from a sensor subsystem that is indicative of the at least one physical aspect of the game related piece sensed by a sensor subsystem. For example, the value may be a function of one or more of an amount wagered, time spent wagering, amount of losses, actual hold, actual hold versus theoretical hold, skill level rating, and/or expenditures at one or more casino properties. Such may be performed in addition to the acts of method 2100 (FIGS. 21A, 21B).

Figure 50:
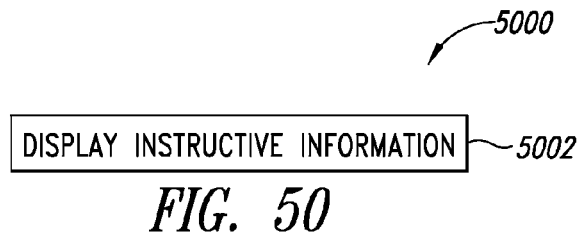
FIG. 50 is a flow diagram of a method of operating a game playing system environment according to an illustrated embodiment, including displaying instructive information regarding the at least one game.

FIG. 50 shows a method 5000 of operating a gaming system environment, according to one illustrated embodiment.

At 5002, the display subsystem may display instructive information regarding the at least one game. For example, the instructive information may include information about rules, strategy or tactics of game play. The instructive information may, for example, be presented in text, audio, video or audio visual formats. Such may be performed in addition to the acts of method 2100 (FIGS. 21A, 21B).

Figure 51:
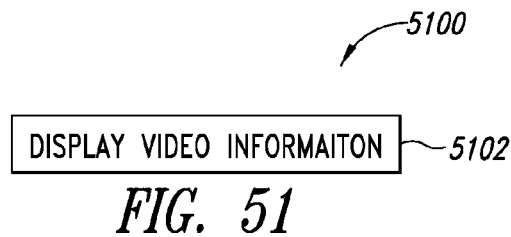
FIG. 51 is a flow diagram of a method of operating a game playing system environment according to an illustrated embodiment, including displaying video information regarding the at least one game.

FIG. 51 shows a method 5100 of operating a gaming system environment, according to one illustrated embodiment.

At 5102, the display subsystem may display video information regarding the at least one game. Such may be suitable to implement the act 5002 of method 5000 (FIG. 51).

Figure 52:
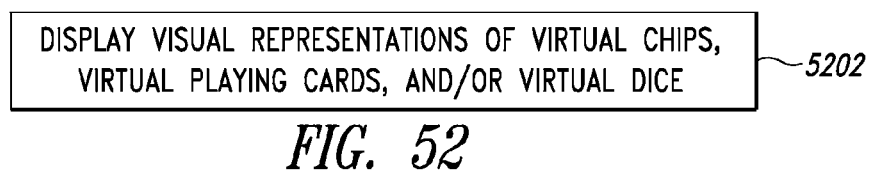
FIG. 52 is a flow diagram of a method of operating a game playing system environment according to an illustrated embodiment, including displaying representations of virtual playing pieces, for example virtual chips, virtual playing cards, or virtual dice.

FIG. 52 shows a method 5200 of operating a gaming system environment, according to one illustrated embodiment.

At 5202, the display subsystem displays representations of virtual chips, virtual playing cards, or virtual dice. The virtual chips may, for example, represent credit from a financial transaction or an award to the player such as a bonus. The virtual playing cards may be in addition toe physical playing cards. The virtual playing cards may, for example be a bonus awarded to the player. The virtual dice may, for example, represent a free dice roll awarded to a player or players, for example as a bonus. Such may be performed in addition to the acts of method 2100 (FIGS. 21A, 21B).

Figure 53:
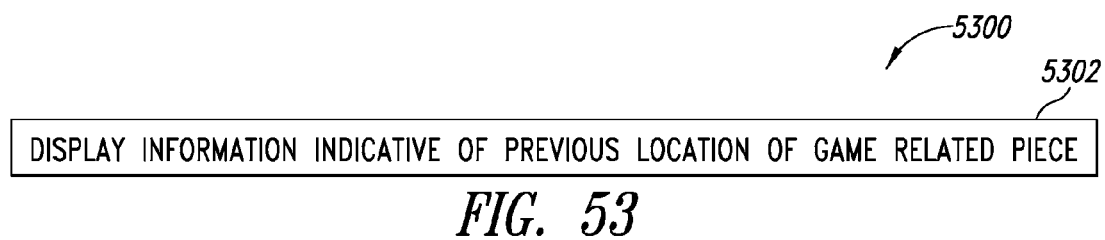
FIG. 53 is a flow diagram of a method of operating a game playing system environment according to an illustrated embodiment, including displaying information that is indicative of a previous location of the at least one game related piece.

FIG. 53 shows a method 5300 of operating a gaming system environment, according to one illustrated embodiment.

At 5302, the display subsystem displays information that is indicative of a previous location of the at least one game related piece. Such may allow a game related piece to be returned to the correct location on the playing surface, for example after a player intentionally or unintentionally moves the playing piece. Such may be performed in addition to the acts of method 2100 (FIGS. 21A, 21B). Additionally, a game state that represents a state of the game (e.g., number and/or location of game related pieces, number of amounts of wagers, other historical information representing the play of the game) may be stored by the computer or server for recovery purposes or to allow a pause and resume feature later.

Figure 54:
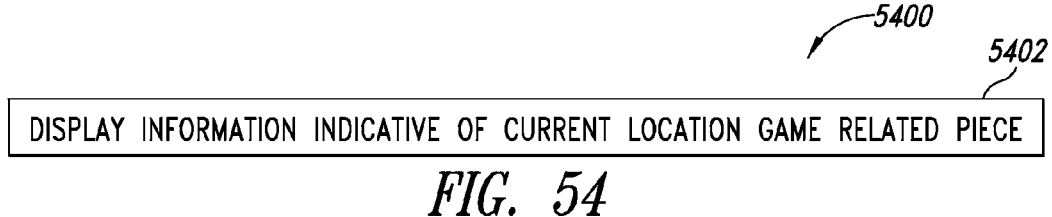
FIG. 54 is a flow diagram of a method of operating a game playing system environment according to an illustrated embodiment, including displaying information that is indicative of a current location of the at least one game related piece.

FIG. 54 shows a method 5400 of operating a gaming system environment, according to one illustrated embodiment.

At 5402, the display subsystem displays information that is indicative of a current location of the at least one game related piece. Such may allow a game related piece to be placed in the correct location on the playing surface, for example after being unintentionally knocked off, or when resuming a game. Such may be performed in addition to the acts of method 2100 (FIGS. 21A, 21B).

Figure 55:
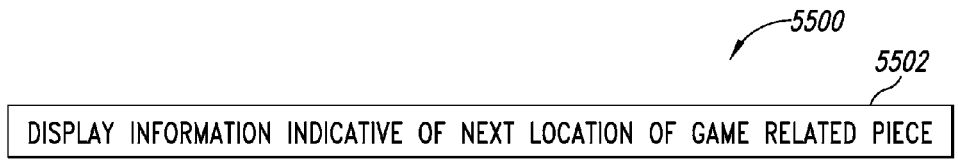
FIG. 55 is a flow diagram of a method of operating a game playing system environment according to an illustrated embodiment, including displaying information that is indicative of a next location of the at least one game related piece.

FIG. 55 shows a method 5500 of operating a gaming system environment, according to one illustrated embodiment.

At 5502, the display subsystem displays information that is indicative of a next location of the at least one game related piece. Such may assist a player in placing or moving a game related piece to the correct location on the playing surface, for example after a roll of dice, spin of a spinner or dealing of a playing card. Such may be performed in addition to the acts of method 2100 (FIGS. 21A, 21B). A course of movement or final location can be visually emphasized, for example by highlighting, marqueeing, etc., to aid the player in moving physical game related pieces.

Figure 56:
FIG. 56 is a flow diagram of a method of operating a game playing system environment according to an illustrated embodiment, including visually emphasizing an area surrounding a physical playing card on a game playing surface.

FIG. 56 shows a method 5600 of operating a gaming system environment, according to one illustrated embodiment.

Figure 57:
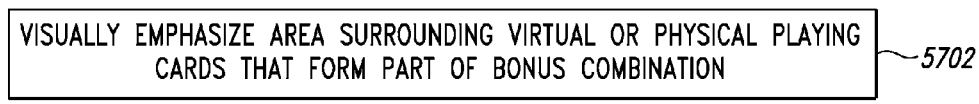
FIG. 57 is a flow diagram of a method of operating a game playing system environment according to an illustrated embodiment, including visually emphasizing an area surrounding at least one of a virtual playing card or a physical playing card on a game playing surface that form part of a bonus combination.

At 5602, the display subsystem visually emphasizes an area surrounding a physical playing card on a game playing surface. Such may assist a player locating or drawing the player's attention to one or more playing cards. Such may be useful, for example, where the playing card entitles the player to a bonus For example, a special feature or multiplier may be associated with a physical playing card. For instance, a player may be paid or otherwise awarded a bonus or extra bonus (e.g., 2 times the standard payout) if visually emphasized playing card is used in forming a winning combination. Such may be performed in addition to the acts of method 2100 (FIGS. 21A, 21B FIG. 57 shows a method 5700 of operating a gaming system environment, according to one illustrated embodiment.

At 5702, the display subsystem visually emphasizes an area surrounding at least one of a virtual playing card or a physical playing card on a game playing surface that form part of a bonus combination. Such may assist a player locating or drawing the player's attention to playing cards. Such may be useful, for example, where the playing card(s) form at least a portion of a particular winning combination. Such may be performed in addition to the acts of method 2100 (FIGS. 21A, 21B).

Figure 58:
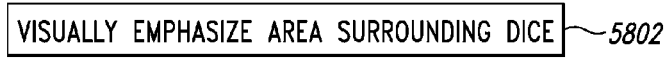
FIG. 58 is a flow diagram of a method of operating a game playing system environment according to an illustrated embodiment, including visually emphasizing an area surrounding each of a number of dice on a game playing surface.

FIG. 58 shows a method 5800 of operating a gaming system environment, according to one illustrated embodiment.

At 5802, the display subsystem visually emphasizes an area surrounding each of a number of dice on a game playing surface. Such may assist a player locating dice as the dice roll or stop on the playing surface. Such may be performed in addition to the acts of method 2100 (FIGS. 21A, 21B).

Figure 59:
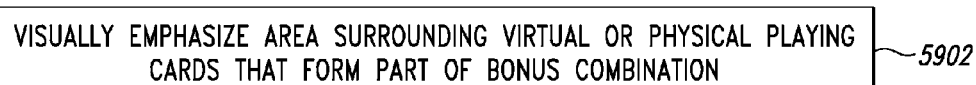
FIG. 59 is a flow diagram of a method of operating a game playing system environment according to an illustrated embodiment, including displaying at least a virtual pair of dice with same pattern as a physical pair of dice that have been rolled.

FIG. 59 shows a method 5900 of operating a gaming system environment, according to one illustrated embodiment.

At 5902, the display subsystem displays at least a virtual pair of dice with same pattern as a physical pair of dice that have been rolled. Such may assist player remotely located from where the dice stop in ascertaining the value of a roll. In some embodiments, a bonus may be awarded to one or more player if an outcome of a virtual dice roll and an outcome of a roll of physical dice. Such may be performed in addition to the acts of method 2100 (FIGS. 21A, 21B).

Figure 60:
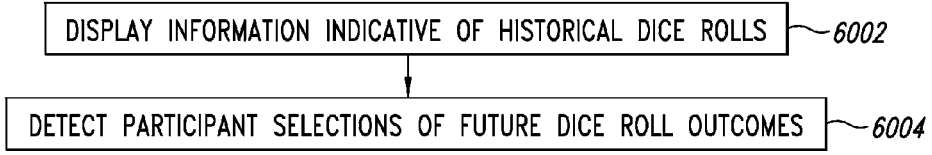
FIG. 60 is a flow diagram of a method of operating a game playing system environment according to an illustrated embodiment, including displaying information indicative of a history of previous rolls of dice and detecting selections by participants of an outcome of a future roll of dice.

FIG. 60 shows a method 6000 of operating a gaming system environment, according to one illustrated embodiment.

At 6002, the display subsystem displays information indicative of a history of previous rolls of dice. At 6002, the sensor subsystem detects or otherwise senses selections by participants of an outcome of a future roll of dice. Such may facilitate additional wagering opportunities. For example, some players may wish to wager on a certain number being thrown that number has not appeared over a long series of dice rolls. Such may be performed in addition to the acts of method 2100 (FIGS. 21A, 21B).

Figure 61:
FIG. 61 is a flow diagram of a method of operating a game playing system environment according to an illustrated embodiment, including detecting a number of spots on a face of at least one die.

FIG. 61 shows a method 6100 of operating a gaming system environment, according to one illustrated embodiment.

At 6102, the sensor subsystem detects a number of spots on a face of at least one die. For example, the sensor subsystem may optically detect the number of spots on a downward facing face or an upward facing face of the die. Such may facilitate games played with physical dice. Such may be performed in addition to the acts of method 2100 (FIGS. 21A, 21B).

Figure 62:
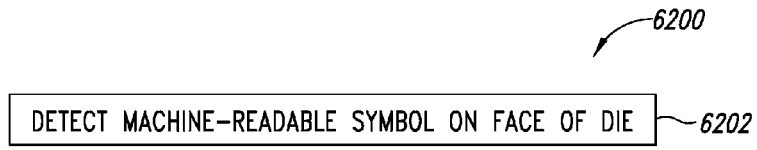
FIG. 62 is a flow diagram of a method of operating a game playing system environment according to an illustrated embodiment, including detecting a machine-readable symbol on a face of at least one die.

FIG. 62 shows a method 6200 of operating a gaming system environment, according to one illustrated embodiment.

At 6202, the sensor subsystem detects a machine-readable symbol on a face of at least one die. For example, the sensor subsystem may optically detect the number of one or more machine-readable symbols on a downward facing face or an upward facing face of the die. Such may facilitate games played with physical dice. Such may be performed in addition to the acts of method 2100 (FIGS. 21A, 21B).

Figure 63:
FIG. 63 is a flow diagram of a method of operating a game playing system environment according to an illustrated embodiment, including reading information from a radio frequency identification transponder carried by at least one die.

FIG. 63 shows a method 6300 of operating a gaming system environment, according to one illustrated embodiment.

At 6302, the sensor subsystem reads information from a radio frequency identification transponder carried by at least one die. For example, the sensor subsystem may wirelessly interrogate a transponder carried by the die at an interrogation frequency and detect a response signal from the die, for example a backscattered signal at response frequency. The response may encode a casino identifier, table identifier and/or die identifier, allowing the authenticity of the dice to be ascertained against a central database or list of approved dice. Such may be performed in addition to the acts of method 2100 (FIGS. 21A, 21B).

Figure 64:
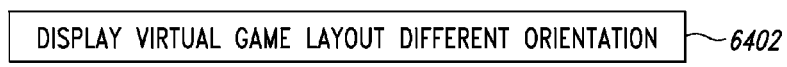
FIG. 64 is a flow diagram of a method of operating a game playing system environment according to an illustrated embodiment, including displaying the virtual game layout at a different orientation than previously displayed between portions of the games.

FIG. 64 shows a method 6400 of operating a gaming system environment, according to one illustrated embodiment.

At 6402, the display subsystem displays the virtual game layout at a different orientation than previously displayed between portions of the games. For example, the display subsystem may reorient the virtual game layout to match each of a number of respective player positions located around a gaming table. For example, text may be presented right side up to each player as the player's respective turn in the game occurs. Other variations are possible. Such may be performed in addition to the acts of method 2100 (FIGS. 21A, 21B).

Figure 65:
FIG. 65 is a flow diagram of a method of operating a game playing system environment according to an illustrated embodiment, including updating a display of information in response to a movement of a physical game related piece between at least two game playing surfaces.

FIG. 65 shows a method 6500 of operating a gaming system environment, according to one illustrated embodiment.

At 6502, the display subsystem updates a display of information in response to a movement of a physical game related piece between at least two game playing surfaces. Thus, the display subsystem is able to seamlessly operate with multiple playing surfaces, which may be adjacent or spaced from one another. Such may be performed in addition to the acts of method 2100 (FIGS. 21A, 21B).

Figure 66:
FIG. 66 is a flow diagram of a method of operating a game playing system environment according to an illustrated embodiment, including receiving information indicative of respective game related pieces associated with each of at least two different participants at a single game playing surface playing a single game.

FIG. 66 shows a method 6600 of operating a gaming system environment, according to one illustrated embodiment.

At 6602, the sensor subsystem receives information indicative of respective game related pieces associated with each of at least two different participants at a single game playing surface playing a single game. Thus, the sensor subsystem is able to seamlessly operate with multiple players playing the same game on the same playing surface. Such may be performed in addition to the acts of method 2100 (FIGS. 21A, 21B).

Figure 67:
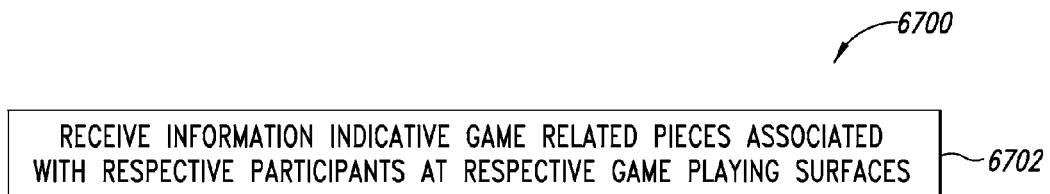
FIG. 67 is a flow diagram of a method of operating a game playing system environment according to an illustrated embodiment, including receiving information indicative of respective game related pieces associated with each of at least two different participants at a respective game playing surfaces playing a single game.

FIG. 67 shows a method 6700 of operating a gaming system environment, according to one illustrated embodiment.

At 6702, the sensor subsystem receives information indicative of respective game related pieces associated with each of at least two different participants at a respective game playing surfaces playing a single game. Thus, the sensor subsystem is able to seamlessly operate with multiple players playing respective games on the same playing surface. Such may be performed in addition to the acts of method 2100 (FIGS. 21A, 21B).

Figure 68:
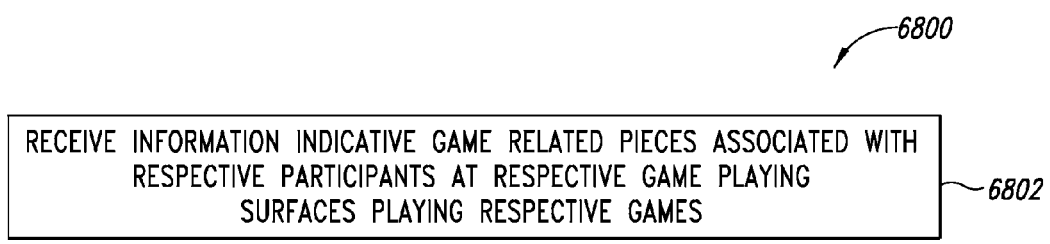
FIG. 68 is a flow diagram of a method of operating a game playing system environment according to an illustrated embodiment, including receiving information indicative of respective game related pieces associated with each of at least two different participants at a respective game playing surfaces playing in respective games.

FIG. 68 shows a method 6800 of operating a gaming system environment, according to one illustrated embodiment.

At 6802, the sensor subsystem receives information indicative of respective game related pieces associated with each of at least two different participants at a respective game playing surfaces playing in respective games. Thus, the sensor subsystem is able to seamlessly operate with multiple players playing respective games on respective playing surfaces. Such may be performed in addition to the acts of method 2100 (FIGS. 21A, 21B).

Figure 69:
FIG. 69 is a flow diagram of a method of operating a game playing system environment according to an illustrated embodiment, including detecting chips within a back betting area associated with a primary participant playing a game.

FIG. 69 shows a method 6900 of operating a gaming system environment, according to one illustrated embodiment.

At 6902, the sensor subsystem detects chips within a back betting area associated with a primary participant playing a game. Thus, the sensor subsystem facilitates back betting or wagering by a secondary player on a primary player or other outcome. Such may be performed in addition to the acts of method 2100 (FIGS. 21A, 21B).

Figure 70:
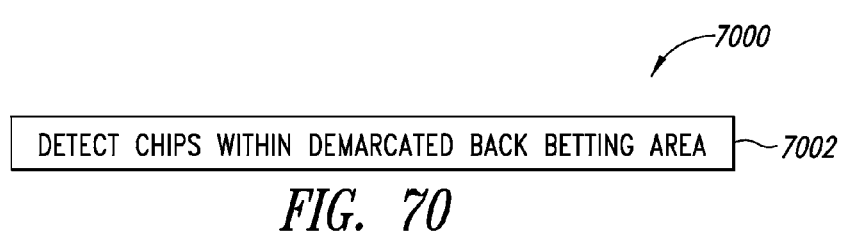
FIG. 70 is a flow diagram of a method of operating a game playing system environment according to an illustrated embodiment, including displaying a virtual game layout and sensing at least one physical aspect of a game related piece.

FIG. 70 shows a method 7000 of operating a gaming system environment, according to one illustrated embodiment.

At 7002, the sensor subsystem detects chips within a demarcated back betting area associated with a primary participant playing a game. Whether physical chips constitute a wager may depend on the relative position of the chips with respect to a demarcated area such as a bet circle. Thus, the sensor subsystem facilitates tracking and identification of wagers made with physical chips or virtual chips. Such may be performed in addition to the acts of method 2100 (FIGS. 21A, 21B).

Figure 71A:
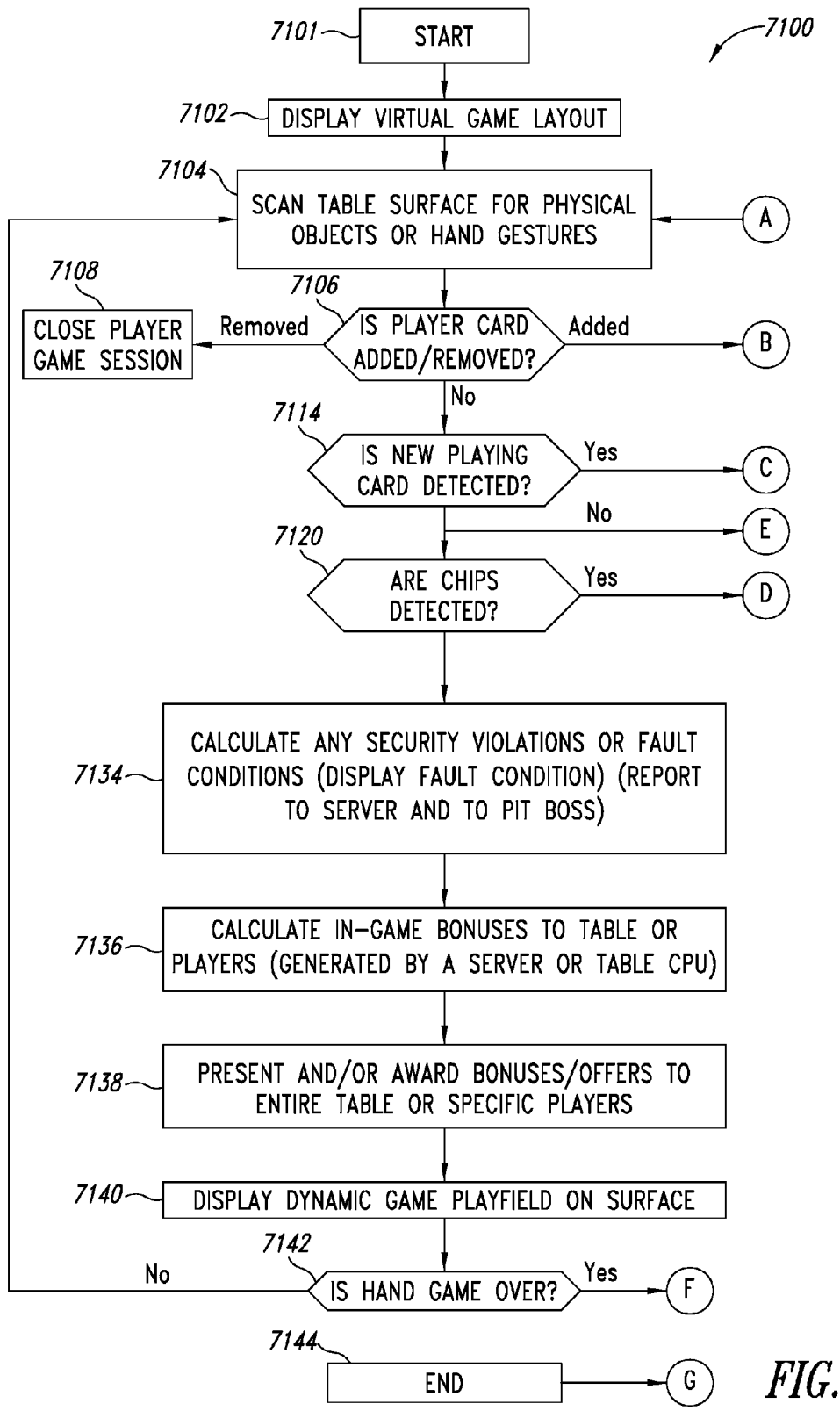
FIGS. 71A and 71B are flow diagrams of a method of operating a game playing system environment according to an illustrated embodiment, including displaying a virtual game layout and sensing at least one physical aspect of a game related piece.
Figure 71B:
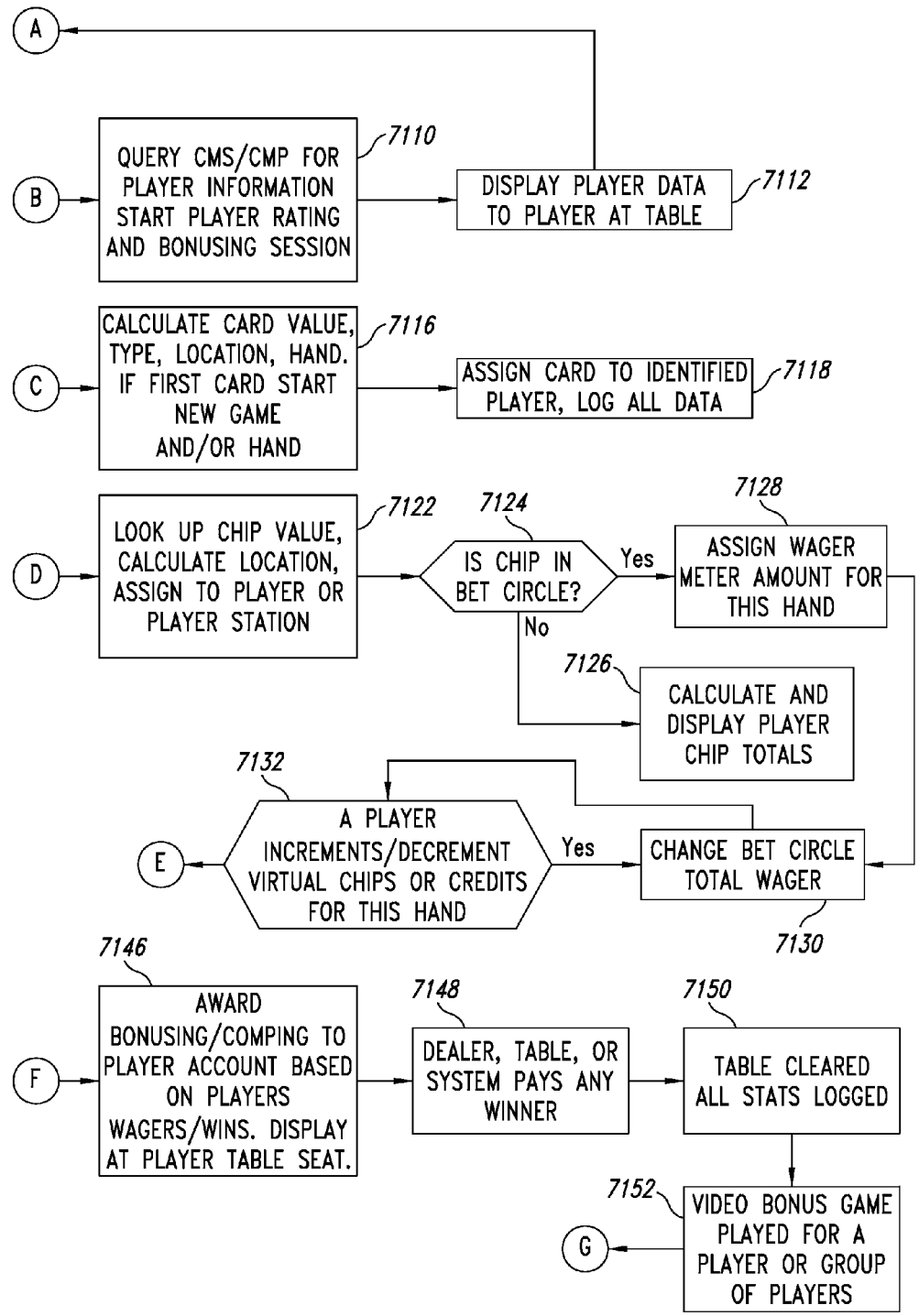

FIGS. 71A and 71B show a method 7100 of operating a gaming system environment, according to one illustrated embodiment. While illustrated in terms of game played with physical playing cards and chips, the method 7100 may be generalized to other types of games including games played using physical objects other than playing cards and chips.

The method 7100 starts at 7101, for example in response to the powering or turning ON of one or more components of the gaming system environment or other event.

At 7102, the display system displays a virtual game layout on or below a playing surface of a table gaming or arcade/casino style gaming system. As described above, the display subsystem may display the virtual game layout via one or more projectors or displays which may, for example, be positioned above or under the playing surface.

At 7104, the sensor system determines if there are physical objects which can be read on the playing surface or whether any hand gestures are occurring. For instance, the sensor subsystem may scan the playing surface(s) using one or more transducers. For example, the sensor system may optically read information from one or more game related pieces such as playing cards, chips, tokens, tiles, spinners, etc., or one or more pieces of media such as identity or financial media. Also for example, the sensor system may wirelessly interrogate the volume proximate the playing surface or may magnetically or inductively attempt to read information from physical objects on the playing surface. For example, the sensor system sense movement of a body part, such as a hand or fingers via one or more infrared or microwave, or ultrasonic motion sensors or a touch sensitive interface.

At 7106, the gaming system determines whether a player's identity card (e.g., loyalty program card, driver's license, etc.) has been added or removed.

If a player's identity card has been removed, the computing subsystem closes the associated gaming session for the player at 1708.

If a player's identity card has been added, the computing subsystem queries the casino management system (CMS) for information about the player 7110. The computing subsystem or CMS may also start a player rating session and/or a bonusing session. During the player rating session, the CMS or a dedicated system tracks aspects of the player's such as amounts wagered, time wagered, average wagered amounts, actual hold, actual hold versus theoretical hold, performance relative to basis strategy and/or performance relative to various counting strategies. During the player rating session, the CMS or a dedicated system tracks information about the player that may be used to award bonuses to the player. At 7112, the display subsystem may display player related data to the respective player at the table or arcade type gaming system or device. Control may then return to 7104. Identified players may be eligible for bonusing, for example based upon club level, identity of the player, and/or other casino data.

If no player identity cards have not been added or removed, or if further player cards have not been added or removed, control passes to 7114.

At 7114, the computing subsystem determines whether a new playing card is on the playing surface. The computing system may rely on information from the sensor system to detect the appearance or removal of playing cards from the playing surface. In some embodiments, the computing subsystem may detect whether new game related objects (e.g., tokens or markers such as chess pieces, tiles, checkers, or houses, car, hat, etc. in MONOPLOY®) other than playing cards are on the playing surface. If there is no new playing cards are detected on the playing surface, control passes directly to 7120. If a new game related piece is detected on the playing surface, control passes to 7116.

At 7116, the computing subsystem determines a physical aspect of the game related piece. For example, the computing subsystem may determine a value (e.g., rank and/or suit of playing card), location, and/or hand to which the playing card belongs. If the new playing card is the first card, the computing subsystem starts a new game and/or hand. At 7118, the gaming system assigns the playing card to a particular player, and may log any relevant data. For example, the computing subsystem may assign or otherwise associate a playing card with a player, player position or seat to which the playing card was dealt or drawn, or who placed the chip as a wager. Such may be determined by logically associating a location of the playing card with a player position or virtual demarcation associated with the player position, and/or with media that identifies the player located in the player position. In some embodiments, the computing subsystem may additional determine the type of gaming related piece detected (e.g., playing card, chip, token, marker, tile, spinner). Control passes to 7120.

At 7120, the computing subsystem determines if there are chips on the playing surface. If no chips are detected on the playing surface, control passes directly to 7134. If chips are detected on the playing surface, control passes to 7122.

At 7122, the computing subsystem determines a chip value, a location of the chip, and assigns the chip to a player or player position. The computing subsystem may rely on information from the sensor subsystem. In some embodiments, the sensor subsystem may make the determination. At 7124, the computing subsystem determines whether the chip is in a wagering or betting area or position. Again, the computing subsystem may rely on information from the sensor subsystem, or may rely on the sensor subsystem to perform the determination. If the chip is not in a wagering or betting area or position, at 7126 the computing subsystem calculates the player chip totals and causes the display subsystem to display the chip totals. If the chip is in a wagering or betting area or position, the computing subsystem assigns the wager meter amount to the determine the total wager for the hand. At 7130, the computing subsystem updates the display of the total wager (e.g., display within bet circle) accordingly.

At 7132, the computing subsystem determines whether the player has incremented or decrement the wager. If the player has not incremented or decrement the wager, control returns directly to 7120 to process additional wagers. If the player has not incremented or decrement the wager, control may then return to 7130.

At 7134, the computing subsystem determines if any security valuations and/or fault conditions have occurred. If such conditions are determine to exist, the gaming system may display an appropriate message to the dealer, the player pit boss and/or a server or casino management system. Fault conditions may, for example, include attempts to change a wager after the start of a game, or a round or hand of a game, attempt to swap, change or unauthorized movement a game related piece (e.g., playing card, dice, etc.).

At 7136, the computing subsystem or other system determines if there are any in-game bonuses to be awarded to the table or individual players. Such may be generated by a server (e.g., bonusing servers 1814a, FIG. 18A) or a computing subsystem associated or located at the particular gaming table. At 7138, the computing subsystem presents and/or awards bonus or promotional offers to the table or individual players. A player may be awarded a bonus award and other players at the table or group of tables gets a consolation prize. These awards or prizes may be automatically credited to the respective credit meter or player account associated with each player. Credits or prizes may be restricted (to use at the same gaming table or machine as awarded and/or in time) or non-restricted credits or player's club points.

At 7140, the computing subsystem dynamically updates the display of the virtual game layout, along with associated information.

At 7142, the computing subsystem determines whether a round, hand or the game is completed. If the round, hand or game is not completed, the method 7100 may repeat, operating as a continuous thread or process by passing control back to 7104 to detect new game related pieces. For example, a thread or process may cause the display subsystem to update the graphics displayed, to denote the appearance of new game related pieces, the disappearance (e.g., removal) of game related pieces, and/or movement of game related pieces.

If the round, hand or game is completed, at 7146 the computing subsystem awards bonuses and/or comps to player accounts, for example, based on players wagers, winnings, etc. The display subsystem may display such awards to the player or players, on or below the playing surface. At 7148, the computing subsystem may credit any winners, or prompt the dealer or table to pay any winners. Optionally at 7150, the computing subsystem may clear a log of statistics for the table. At 7152, the computing subsystem may provide a video bonus game for play by one or more players. The method 7100 may terminate at 7144 until called or started again by an appropriate signal, or alternatively may repeat, operating as a continuous thread or process by passing control back to 7104. Some embodiments may allow for concurrent game playing by a player. For example, a player may play a first game using a physical game related piece, while concurrently playing one or more additional games, for example using one or more virtual playing pieces. The game play may occur in the same period or may occur sequentially. One or more of the games, for instance the additional games, may be a promotional game, for example awarded to the player based on some criteria (e.g., amount of time spent playing, amount wagered, amount lost, ability) or based on a random event. Wagers and awards may be debited and credit either manually or automatically to a credit meter or other account associated with the particular player.

Figure 72:
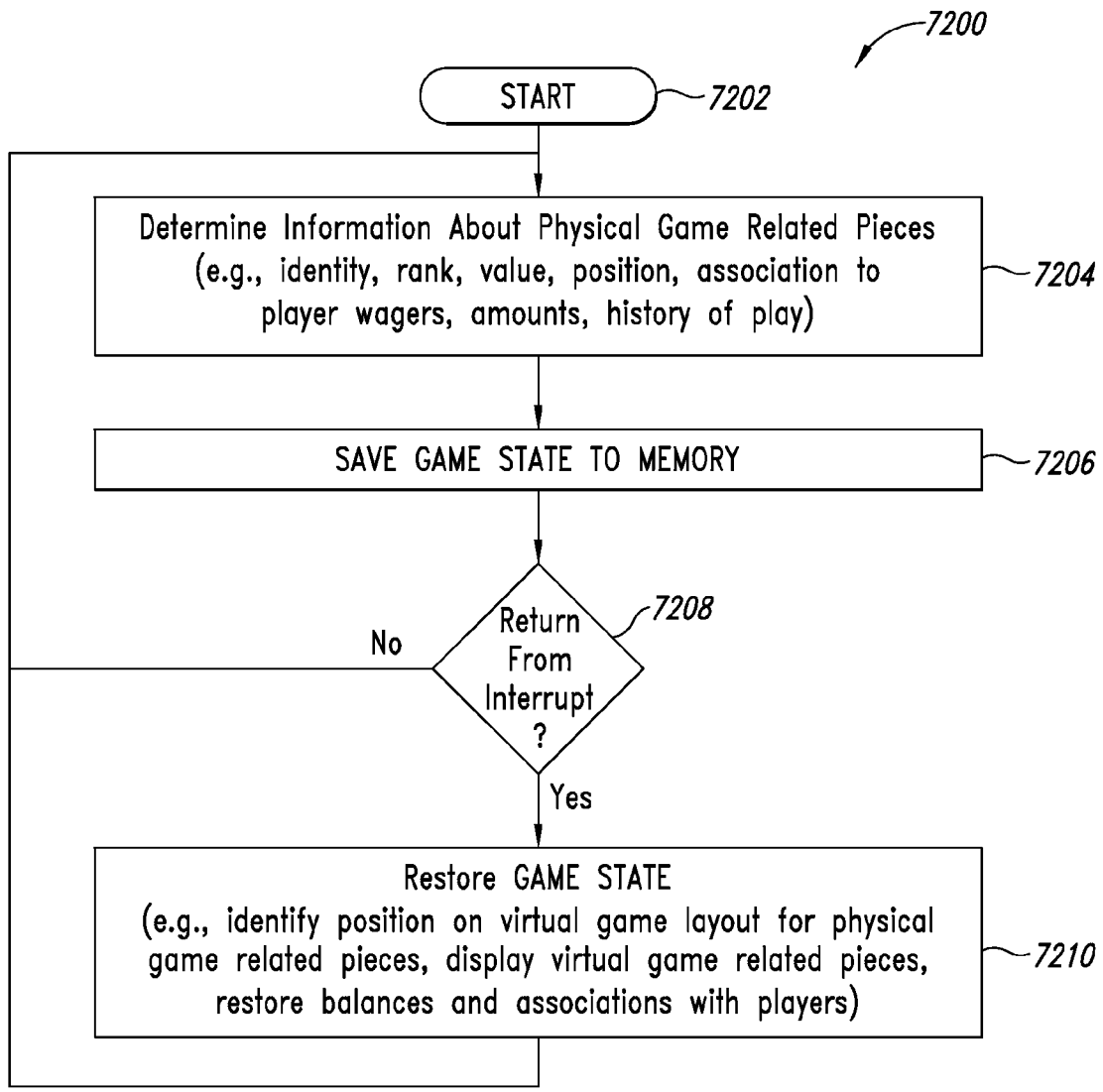
FIG. 72 is a flow diagram of a method of operating a table gaming system environment to save and restore a state of a game, according to one illustrated embodiment.

FIG. 72 shows a method 7200 of operating a table gaming system environment according to one illustrated embodiment.

The method 7200 starts at 7200. For example, the method 7200 may start in response to power being supplied to the table gaming system, operation of a switch, or the occurrence of an event on or proximate the table gaming system.

From time-to time the sensor subsystem of determines information about at least one physical game related playing piece being used in a game at 7204. Determining information about at least one physical game related playing piece being used in a game may include determining an identity of the at least one physical game related piece. For instance, the sensor subsystem may determine an identity of a playing card, for example rank and/or suit or a unique identifier. Also for instance, the sensor subsystem may determine a rank of a playing piece, for example King, Queen, Knight, Bishop, Rook, or Pawn in a game of chess. Also for instance, the sensor subsystem may determine an identity and/or value of a game related piece, for example a chip. Determining information about at least one physical game related playing piece being used in a game may include determining an association between the at least one physical game related piece and at least one player. For example, associating physical playing cards with a player or player position, and/or associating physical chips with a player or player position. As a further example, associating a marker or token with a player. Determining information about at least one physical game related playing piece being used in a game may include determining a position of the game related piece on a virtual game layout. For instance, the sensor subsystem may determine a position of a marker or other token on a path (e.g., path of a board game).

The sensor subsystem may, for example, determine the information periodically. The sensor subsystem may, for example, determine the information in response to the occurrence of certain events at the gaming table, for instance dealing of playing cards, roll of dice, placement of wagers and/or movement of a marker, token or other game related piece. The sensor subsystem may, for example, determine the information in response to an activation signal generated by activation of one or more switches by a dealer, pit boss, security personnel and/or players or other patrons. The sensor subsystem may, for example, determine the information at random times. The sensor subsystem may execute one or more threads or processes to periodically, continually, in response to an event or randomly determine the information.

From time-to-time, a state of the game is saved to a computer-readable memory at 7206. One or more threads or processes may be executed to save the state of the game periodically, continually, in response to an event or randomly. The computer-readable memory may be static or dynamic, may be spinning media (e.g., hard disk, floppy disk, optical disk) or solid state media (e.g., RAM, Flash), etc.

At 7208 the computing subsystem determines whether an interruption has occurred. The interruption may have been a loss of power, a suspension of play by the dealer or other casino personnel, or the occurrence of an event occurring at or proximate the gaming table system. The computing subsystem may, for example, check a flag or detect an application of power after an interruption of power.

On return from an interruption, the computing system restores the state of the game at 7210. Restoring the state of the game may, for example, include displaying a visual identification of a position for the physical game related pieces on a virtual game layout by the display subsystem. Restoring the state of the game may, for example, include displaying one or more virtual game related pieces. Restoring the state of the game may, for example, include logically associating one or more game related pieces with one or more players in game logic that defines a particular game. Restoring the state of the game may, for example, include restoring balances, credits, or debits in one or more accounts associated with one or more players. The game may then continue as if the game had not been interrupted.

The method 7200 may repeat, may run as one or more threads or processes, or may end until started again.

The above described embodiments offer numerous advantages over current systems.

The various embodiments may be provide in table top, bar top, slant top and/or upright embodiments including various forms associated with conventional and video slot machines. The playing surfaces should provide an environmental seal, for example a hermetic seal to protect the various components located therein. Thus, the components are protected against drink spills and/or smoke.

The gaming systems described herein may be used in a wide variety of different fields, but will typical be used in a casino table game area environment, or alternative in poker club environments. In alternate embodiments, this technology can be used in bars, arcades, restaurants, clubs, bingo halls, keno halls, sports-book betting, or other non-traditional gaming locations. In certain embodiments this technology can be used at a user's home for supporting card/dice or other amusement entertainment games on the surface computing device. For example, a coffee table that is a surface computing device would be an ideal home table gaming platform. Players may use real (i.e., physical) playing cards or other play pieces on the surface computing device, and as long at the pieces can be machine read (e.g., carry an optically recognizable bar code or pattern or wireless transponder) then the traditional game can be enhanced with a video or virtual game layout but with actual physical game related pieces. The game of chess, for example, would be an ideal game to play at home on the surface computing coffee table. Each player could move physical chess pieces around the virtual game layout projected on or under a playing surface. The virtual game layout may dynamically change based upon events occurring in the game. For instance, a powerful visual effect may be displayed underneath affected game related, for example when as a piece captures another piece. Secondary bonuses or goals for players can be visually or virtually represented the playing surface. The player may receive enhanced scoring if the player achieves such goals. Scoring for one or more players may be visually or virtually represented on the playing of the surface computing device. Board style or home games may be enhanced by the use of virtual game layouts and object sensing of the surface computing device, verses the static layout of traditional cardboard type boards. Game related pieces may come with machine readable symbols, transponders or other markings. For example, game related pieces may bear optical bar code symbols pre-affixed, pre-printed, stamped, or etched on a bottom of the game related piece. Alternatively, a kit may be purchased separately to affix bar code symbols to the bottom of the game related pieces. The assignment of bar code symbols to game related pieces may be performed using the playing surface of a surface computing device. For example, an image of each chess piece would be displayed on the playing surface, and the player would put the actual playing piece onto the playing surface over or next to the image. The bar code symbol may be read and assigned by a software game application. From that point forward, play with the game related piece can be tracked and analyzed. In some embodiments, the game related pieces may be pre-associated in the game software provided by the game manufacturer.

The game software may include logic to produce visual and/or audio effects at the optimal time, once certain moves of the real (i.e., physical) playing pieces are made or other events in the game occur. The virtual game layout may be displayed with the locations of the game related pieces marked to allow the game to be reset should the physical game related pieces accidentally or intentionally be knocked off the playing surface. The game related pieces may be identified by player name or color or other identifying mark that allows each player to know their own game related pieces if multiple players use similar looking game related pieces. Thus a player would not only know that a Bishop belongs at an identified position of the virtual game layout, but also knows to which player the Bishop belongs. Each player may be given the opportunity to enter their name or other key identifier to mark all of their game related pieces virtual game layout. One advantage of the virtual game layout is the ability to dynamically change the appearance between each round or game, for example to add new depth to games. This keeps an ever changing experience for the player, keeping the game experience fresh. Consequently, traditional board games can be enhanced using the virtual game layout and sensing of physical aspects of game related pieces.

A management system, for example the Bally Gaming download and remote configuration management system, may allow scheduled downloads and reconfiguration of the playing surface of a table gaming or arcade/casino style gaming system from one or more servers, for example as taught in U.S. provisional patent application Ser. No. 60/716,713 filed Dec. 9, 2005, and U.S. nonprovisional patent application Ser. Nos. 11/530,450 and 11/530,452 both filed Aug. 9, 2006. The system may allow a casino operator to manage groups of table gaming or arcade/casino style gaming systems, reducing the effort required to download or configure large numbers of table gaming or arcade/casino style gaming systems. For example, new soft-ware may be downloaded to groups of table gaming or arcade/casino style gaming systems from a central location, and the table gaming or arcade/casino style gaming systems may be configured from the central location. Accordingly, this operational efficiency reduces maintenance costs and minimizes table gaming or arcade/casino style gaming system downtime due to maintenance or table gaming or arcade/casino style gaming system set-up Standardized classes may be employed, such as Gaming Standards Association (GSA) download and configuration classes. For example, the G2S Player class would allow multiple players on the same surface computer table game device identifier to be bound to the same device session.

The teachings herein are applicable to a variety of games. For instance games that are not commonly associated with wagering, for example: boards games including chess, checkers, MONOPOLY®, SCRABBLE®, TRIVIAL PURSUIT®, BATTLE SHIP®, RISK®, LIFE®, CANDYLAND®, BACKGAMMON, YAHTZEE®, AXIS & ALLIES®, PICTIONARY®, DUNGEONS & DRAGONS®, CLUE®, HANGMAN®, OPERATION®, SORRY®, UNO®, PARCHESSI®, and CHUTES AND LADDERS®. Also for instance, games that are commonly associated with wagering. for example: roulette, craps and other dice games, and bingo, as well as many card games played with playing cards, for instance blackjack, baccarat, various types of poker including TEXAS-HOLD'EM, CRIBBEAN STUD POKER, THREE CARD POKER, PAI GOW poker, BIG SIX, SPANISH 21, CASINO WAR, 357 POKER, HEARTS, LET IT RIDE, and also Macau style card games and tile based games.

These table and/or upright or arcade/casino style gaming systems may be linked together in a local area network (LAN), wide area network, internet, or wirelessly to provide for group play or competitive gaming spanning different gaming systems or tables. For example, people playing chess can be in different cities or locations and be able to see each others pieces move on their respective display. Each player would move their real physical game related piece (e.g., chess piece) on the virtual game layout, and the same move would be visually represented by a virtual game related piece at the remote gaming device (e.g., surface computing display remotely located from one where move was made).

The teachings herein may be suitable for traditional games that use one or more dice. Physical dice may produce a random number, which the gaming system may use to automatically move the virtual game related pieces (e.g., forward) or to advance the game in another manner, and/or which may be used to determine whether a prize is awarded (e.g., Baccarat). It is noted that dice using with more or less than six sides may be used, and a game many employ one or more die. Home games often use a spinner manually spun by a player to produce a random outcome to advance the game in some manner. The random outcome of a spinner is an effective means to create ever varying game outcomes from one game to the next. In an alternate embodiment, a spinner that is manually spun have include a structure or instructions that allow an orientation of a pointer to be determined or ascertained by the sensor subsystem of the gaming system. For example, For example, a barcode or optical pattern may be affixed to a portion of the spinner (e.g., bottom) or the entire spinner may be optically, magnetically or inductively detectable by the sensor subsystem. In some embodiments, the spinner (e.g., pointer) or the background (i.e., selections) may be a visual or virtual representation of the playing surface. Wherever physical spinner would stop spinning, it would point to some portion of the virtual background or selections to denote an advancement or other game relevant data. Thus, the virtual game layout may change from move to move, round to round, game to game, and can be player centric (i.e., customized for each player). Typically, the spinner is mounted on a piece of cardboard, which bears a fixed printed pattern. The gaming system allows the pattern or selections to change, and/or may provide enhanced visual effects such as highlighting to create an exciting visual and ever changing experience for the players. A physical spinner or pointer and a virtual representation of selections underneath the spinner, may allow for new table gaming experiences. Games employing a physical spinner to randomize play are popular. That popularity may be enhanced by dynamically changing selections which the spinner may point over most traditional board games. The spinner may, for example, be mounted to the playing surface with a suction cup.

The virtual game layout of the playing surface allows new virtual bonus games or virtual game related pieces to be awarded to players, in addition to the real physical cards dealt by dealer. These virtual bonus cards awarded or won may be represented by appropriate visual indicators displayed on or below the playing surface by the display subsystem.

For example, a player may be given a virtual bonus card and if the player busts (i.e., goes over 21) in blackjack based on the physical playing cards, the virtual playing card will replace the one of the physical playing cards that provides the optimal result for the player. Optionally, a player can choose the physical playing card to be replaced. Thus a player is given a chance to recover from a bust. Once the virtual playing card is revealed and used, the visual representation of the virtual playing card is removed for future games. Alternatively, the virtual playing card may be valid for a series of games or alternatively may be valid in perpetuity. A player may be given the opportunity to choose when to use the virtual bonus card or not.

In other embodiments, one or more of a player's physical playing cards may be visually enhances with appropriate visual effects displayed on or below the playing surface around or proximate the location of the physical playing card on the playing surface. This may denote if a certain hand is achieved with a combination of playing card(s), for example if the player is entitled to a bonus prize. A non-limiting example is a progressive award. In some embodiments, bonus playing cards or bonus playing card counter may be stored in a player account for use at any time by the player. In some embodiments, bonus playing cards may have a time in which the bonus playing card must be used before the bonus playing card expires.

The specific virtual bonus playing cards could be determined from an outcome of a random number generator. Thus, a player may have two of the same playing cards at any one time. One virtual (visual representation rendered by display subsystem) and another physical playing card. In other embodiments, the random number generator or software may preclude certain virtual playing cards to be given to a player if a corresponding physical playing is already in play r will be coming into play shortly in embodiments where the system knows the order of the cards in the shoe.

In one embodiment, a joker or other specially marked card may be dealt to the player from the dealers shoe and can be later used in this game or other games to exchange for a new free playing card to be dealt at the time of the players choosing. This would typically occur when the player wishes to use a new playing to improve their hand. Alternately, a virtual bonus card may be given to the player, with a representation visually rendered on or below the playing surface. Such a virtual bonus card could be used in a manner similar to the physical playing card.

Virtual playing cards visually represented on or below the playing surface may be dealt or rendered face down. Covering the playing surface proximate the visual representation of the virtual playing card with the player's hand causes the display subsystem to temporarily display the face of the playing card. In some embodiments, the face of the virtual playing card may be displayed while the playing surface is covered by a players actual hand. Touching the playing surface proximate a corner of the representation of the virtual playing card causes the display subsystem to display a portion of the face of the virtual playing card, in a similar fashion to bending an edge of a physical playing card. This way other players would not be able to see the face of the virtual playing card. Another touch on the playing surface or removing a finger from display screen or onscreen button proximate the corner of the representation of the virtual playing card may cover the face of the playing card back up again.

Bonus games may be provided via the display subsystem. For example, if a player is to be awarded a bonus for any reason, the section or portion of the playing surface in front of that player may include a visual representation of the bonus game displayed. The bonus game may be completely virtual, being visually rendered by the display subsystem, for example based on an output of a random number generator of the game system. In some embodiments, the bonus game may use both physical and virtual playing cards. The bonus game may even be a completely different genre of game title, for example a video slot machine.

In some embodiments, a winning event on a hand of one player may trigger a group bonus game. For example, virtual bonus games may be displayed in front of each player at the table, or then entire playing surface may switch to a bonus mode or round of play. In this case, if the outcome of the bonus round is good, all players would share in the bonus award. In alternate embodiments, the winning player in the group play bonus would win the main prize, while the other players may win consolation prizes. Consolation prizes may be of fixed size or a percentage of the main prize award.

Bonus games won may be visually indicated by visual indicators on the playing surface.

In some embodiments, players may be awarded bonus promotional chips or credits or virtual credits that must be used in play on the table game or other gaming device where awarded. Such promotional chips or credits cannot be cashed out at the cashier. A bonusing server could award these bonus promotional chips or credits to a specific player or seat at the table either randomly or based on some predetermined logic. The display subsystem may visually represent bonus promotional chips or credits with appropriate visual indicators (e.g., circular with value markings) on or below the playing surface proximate the player own physical chips. These bonus promotional chips or credits may be awarded to either identified or non-identified players. Unused bonus promotional chips may be cleared by the dealer or sent back to the players account for later use barring any expiration rules.

Some embodiments may provide a player one or more free bonus dice throws in dice based games. Timing of the free bonus dice throws may be determined by the table game system, the casino host or the player. The display subsystem may represent the free bonus dice roles with appropriate visual indicators display on or below the playing surface. These free bonus dice rolls may be used by the player to replace any bad previous roll. These free bonus dice rolls may allow a player throw physical dice on the playing surface, or alternatively to "throw" virtual dice on the playing surface. For example, the player may activate a switch which causes the computing subsystem to produce one or more random values representative of the possible out come of a dice throw. Also for example, the display system may visually represent (e.g., animation) a roll of virtual dice across the surface display in a manner that replicates the way physical dice roll across a surface of a gaming table. The display subsystem may the produce a visual representation that mimics a physical dice throw (e.g., animation or a dice shaped icon), with an out come that is determined based on the random value(s). These free bonus dice rolls may be saved in a player account for later use on a different table or in a different game on a different time or day. Unused free bonus dice rolls may have an expiration time limit, so if not used by a certain date/time the free bonus dice rolls may expire.

At certain times of the day, the display subsystem may provide different content on the playing surface. For example, the display subsystem may display sporting events, advertisements, casino marketing media, or access to the casino Web portal. Also for example, the display subsystem may display an interface that serves as customer kiosks for the patrons to use, serves as electronic game machines (EGMS) to provide traditional video poker, video slots or other pay to play or free play gaming for the patrons. The display subsystem may display a user interface that allows patrons to manage player accounts, review and order food or cocktails, shop for merchandise or services, or redeem prizes.

In certain markets like Macau players, referred to herein as secondary players, often place back bets on live table games played by others, referred to herein as primary players. Various embodiments discussed herein may help to automated back betting. For example, a secondary player or back better can simply place a piece of media (e.g., identity card such as loyalty program card or driver's license, or financial media such as credit, debit or prepaid card, or cellular phone or PDA) down on the playing surface table proximate a player position on which the secondary player wishes to wager. The sensor subsystem reads information from the piece of media. The location of the media indicate one which primary player the secondary player is placing a wager or bet on. The computing subsystem of the gaming system may identify the secondary player or back bettor from the read information and may use funds from one of the secondary player's accounts to fund the back betting. For example, an identity or identify information of the back better may be pre-associated with a player account, with or without prior wagering of funds. This may occur even though the secondary player is not actually sitting at the table or playing directly, but rather the secondary player is placing a wager or bet on a primary player or outcome of a primary player's hand. The computing subsystem may automatically apply winnings to account of the secondary player or back better. Alternatively, the display subsystem may display virtual chips in the amount of the winnings, or a credit meter may be incremented based upon the winnings for this back better.

In some embodiments the gaming table or gaming system may automatically re-price itself at various times of day or be controlled by a Download/Configuration server, a dealer or pit boss. Additionally, or alternatively, the exchange rate of player account credits to game credits or game chips may be modified from time-to-time.

In alternate embodiments, the secondary player or back better may enter or place secondary wagers or back bets via a wireless communications device. The communications device may allow the entry of account information to identify a source of funds, for example by keying, swiping a magnetic stripe on a card, or wireless interrogation of a transponder carried by the card. Additionally or alternatively, the wireless communications device may be associated with an account which may serve as a source of funds. For example, wireless communications devices are typically associated with a service account (e.g., service provider account). Such a service provider account may serve as the source of funds. The wireless communications device may provide a user selectable icon that allows the user to identify the service provider account as the source of funds, or to identify some other account. For example, the wireless communication device may store information for two or more accounts from which the user may choose from to fund the wagering.

In some embodiments, the wireless communications device may wirelessly and electronically bind to a specific gaming system or table or table seat or station, for example based on a proximity of the wireless communications device to a gaming system such as a table or arcade/casino style gaming system. The electronic binding may be established through one or more proximity sensors or radios (e.g., transmitter, receiver or transceiver), which may form part of the sensor subsystem of the gaming system or may form a separate wireless device subsystem. The proximity sensors or radio may wirelessly detect and/or communicate with a transponder or a radio (e.g., transmitter, receiver or transceiver) of the wireless communications device. Alternatively, the proximity sensors or radio may wirelessly detect or wireless communicate with a transponder or radio carried by media (e.g., loyalty program or club card, credit, debit or prepaid card). Such communications may employ Ultra Wide Band (UWB) frequencies, which may be particularly advantageous where proximity sensing is desired. Otherwise the communications may employ Bluetooth, IRDA, Wi-Fi, or other wireless protocols. Some entries or selections made by a player via the wireless communications device may be displayed by the display subsystem. For example, the placement of wagers may be displayed via suitable information and/or icons on the surface of the gaming table.

Since the dealt physical playing cards are recognized by the sensor subsystem, the wireless communications device may display a representation of the actual hand of the primary player to secondary player or back better using the wireless communications device. This allows the secondary player or back better to follow the play even when the secondary player's or back bettor's view of the game is blocked. A user interface may be provided at the gaming system, for example as user selectable icons displayed on or below the playing surface that allows the secondary player of back better to select a table to bet on, a player to bet on, and to set an amount of the wager or bet. Additionally or alternatively, a user interface may be provided on the wireless communications device, or on some other peripheral device to allow the secondary player or back better to make such selections. A secondary player of back better may, for example, choose to match the bet by the primary player exactly, or may bet a percentage or any multiple of the bets of the primary player. In alternate embodiments, a primary player playing one game, may also desire to place a side wager or secondary wager on the play of another player. The other player may be playing in the same game (e.g., at the same table) or at another game (e.g., at another table). For example, a back better may be provided with a bonus game or bonusing as if the back bettor was actually sitting at the gaming table or gaming device.

Physical media may be read by the sensor subsystem of the gaming system. The display subsystem may render visual representations of virtual media, for example in front of a secondary player or back better who is wagering on the play of the primary player. Visual or virtual representation of the outcomes of the wagers may be presented or otherwise rendered at both a position associated with the primary player and a position or device associated with the secondary or back betting player.

Some embodiments may implement a virtual craps table gaming system. For example, the sensor subsystem may determine the orientation and/or location of physical dice thrown by a player on the playing surface. For instance, the sensor subsystem may read the spot patterns or machine-readable symbols printed on the faces of the dice. Such spots or machine-readable symbols may indicate which face is up. Thus, is the sensor subsystem includes a scanner or imager positioned under the playing surface, the machine-readable symbol read off a face lying flat on the playing surface should indicated that the opposed face of the die is facing up. Thus, diametrically opposed faces of the die may be marked with the reverse machine-readable symbols from the actual value of the face.

The sensor subsystem may detect the location of the dice as the dice move across the playing surface. The display subsystem may produce an enhanced visual indication of the location of the dice. For example, the display subsystem may illuminate or other highlight the area of the playing surface surrounding the dice. Additionally or alternatively, the display subsystem may produce a visual indication indicative of the faces of the dice that are face up on the playing surface. This may assist players who are located at a far end of a table to easily see the dice value. The sensor subsystem may allow thrown dice to be tracked, and visual representations of such presented to players.

Secondary game offers to players may occur where players bet on dice rolls based upon historical play. For example, there has not been a six rolled in the last 20 rolls, the casino may offer a progressive or other prize for an additional wager or as a bonus when the next six is rolled. The table gaming system or associated system may detect such historical situations, calculate the odds, cause the display of historical data and/or monitor the progressive bonus automatically.

In some embodiments, the dice may have an RFID transponder that uniquely associates the dice with the casino property or table. RFID interrogators may be placed under, within, or around the gaming table or playing surface to ensure compliance. The virtual layout of the craps table may be easily modified before, during or just after play to create ever changing playfields.

A player may be identified at the table gaming system in any one or more of a variety of ways.

For example, the sensor subsystem may read information from a piece of media (e.g., identity or financial media) placed on the playing surface by a player. The sensor subsystem may employ an optical device such as a scanner or imager, or may employ a wireless device such as a wireless RFID or EAS type interrogator. Also for example, a biometric reader may be located at each player position. The biometric reader may take a variety of forms, for instance a fingerprint reader, iris scan, microphone and voice recognition software may be used, hand vein pattern detection. In alternate embodiments, a patron's written signature may be digitized and verified against a signature database. For example a player may sign on surface computer display with finger or stylus). Biometric analysis may be performed at the gaming system (e.g. table or arcade style gaming systems) or may be performed by remotely located remote system computer system.

Also for example, a player's identity and proximity may be detected by the sensor subsystem or other subsystem of the gaming system. For instance, a transponder carried by a piece of media or a wireless communications device which is carried by or otherwise associated with a player may be wireless detected via wireless interrogation. The piece of media may take any of a variety of forms, for instance a loyalty program card, driver's license, credit, debit or prepaid card. Proximity data acquired by the gaming system may, for example, include a location in the casino (e.g., x, y, and z coordinates or GPS data). The gaming system or some other system may associate the proximity data with a player identifier. Based at least one part on the location coordinates, the system may create a logical relationship between the player identifier and a particular gaming system, a table identifier, seat identifier and/or player position identifier.

As another example, a standalone card reader (e.g., magnetic or smart card reader) that is distinct from the sensor subsystem may be provided at each of player position for the player to insert or swipe their media (e.g., loyalty program or patron card, driver's license, credit, debit or prepaid card).

As a further example, a dealer or a pit boss may manually assign the player to the specific table seat at a management user interface of the gaming system. The management user interface may include user selectable icons displayed on the playing surface, or on a separate display or input device such as the Bally Table View product. This assignment is usually performed by entering the player's patron card number into the user interface or swiping the club card at the dealers or pit boss's terminal. The dealer or pit boss typically un-assigns the player when the player leaves the table. Such closes the bonusing and session account for the player at the particular table gaming or arcade style gaming system.

The game related pieces may be marked in a variety of ways.

For example, game related pieces may have one or more machine-readable symbols, for instance bar code symbols, stacked code symbols, area or matrix code symbols or other machine-readable indicia. The machine-readable symbols may take any form or geometric shape or pattern that is defined by the particular machine-readable symbology. The machine-readable symbols may be visible to the players or may be invisible to the players, for instance formed using an invisible ink (e.g., infrared reflective) printed on or affixed to some manner to the game related piece. The machine-readable symbol may encode a casino identifier and/or game piece identifier. Where the game related pieces are playing cards, the game piece identifier may, for example, include a rank identifier indicative of a rank (e.g., Heart, Spade, Club, Diamond), a suit identifier indicative of a rank (e.g., 2-Ace) and/or a deck identifier indicative of a specific deck to which the playing card belongs. In some embodiments, the machine-readable symbol may encode a unique game piece identifier, which is mapped via a database to particular information regarding the game related piece. Thus, a ranks, suit and deck may be determined from a unique playing card identifier encoded in a machine-readable symbol carried by a playing card. While such an approach may slow the performance of a gaming system, the approach reduces the amount of information which must be encoded, and hence the area occupied by the machine-readable symbol. Where the game related piece is a die, the spots on the die may be machine-read, for example by the sensor subsystem. Additional visible or non-visible markings may also be used or used in lieu of the spots on the die, for example to encode a unique identifier for the die. The unique identifier may be logically related to other information using a database.

Also for example, game related pieces may include one or more wireless transponders which encode information regarding the game related pieces. Transponders may, for example, take the form of RFID transponders with one or more identifier stored in memory. Transponders may include one or more EAS type transponders with information encoded in form or shape of the backscatter antenna structure. The encoded information may take the form of one or more identifiers, such as described with respect to machine-readable symbols.

Also for example, game related pieces may include one or more magnetic stripes or distributions of magnetic or ferromagnetic particles that which encode information regarding the game related pieces. The encoded information may take the form of one or more identifiers, such as described with respect to machine-readable symbols.

Players may wish to transfer funds into an account associated with a credit meter or display of virtual chips on the playing surface. Such a transfer may be performed in a variety of ways.

A player may hand a dealer or a pit boss cash or a cash voucher. In such a situation, the dealer or pit boss may assign the funds to a specific seat at the table where the player is sitting. The assignment may be made via a dealer management interface, which may be displayed on or below the playing surface or may be a secondary display such as Bally's Table view or a separate device.

A player may place physical casino chips on a playing surface. The sensor subsystem may read the chips, and the display subsystem may display a representation indicative of total quantity and/or amount or value of the physical chips in response. As described previously, the sensor subsystem may employ cameras or CCDs under, above or surrounding the playing surface, or may employ other sensors, for instance wireless interrogators. The dealer or player can convert the physical chips into virtual chips via an approval process. The dealer collect the physical chips in response, since the value of such has been credited to an account of the player or virtual credit meter.

A player may identify him or herself at the gaming system by placing a piece of media (e.g. loyalty program or patron club card, driver's license, credit, debit or prepaid card) on the playing surface. A sensor subsystem may read the media, and a CMP/CMP system may identify the player from the read information. The display subsystem may display indicia representing cash and/or point balances one or more accounts associated with the player. The player may employ a user interface to transfer funds from their account, for example to a credit meter of the gaming system or as virtual chips. The transfer may require entry and approval of a personal identification number (PIN), biometric data, and/or password. The user interface may include one or more user selectable icons display on or below the playing surface, or some separate device such as a PIN pad, keypad or keyboard, for example located at each seat. Transfers may employ appropriate security protocols and encryption, for example AFT or WAT transfer protocols of SAS or the GSA G2S class respectively.

A player may initiate a cash systems credit card transfer on the playing surface using the patron's loyalty program or club card. The display subsystem or another system (e.g., Bally Gaming's iVIEW display) may display a list of credit cards pre-associated by the player with the player's loyalty program or club account. The player may select a specific debit/credit card account, and the amount of transfer. The player may be required to enter a PIN and/or password to approve the transaction. The funds may automatically be transferred into the account associated with player's loyalty program or club card. A second transaction may then transfer funds to the credit meter and/or/virtual chips associated with the player from the account associated with player's loyalty program or club card. The second transaction may occur with, or without, further player interaction.

A player may initiate a funds transfer by placing a piece of financial media on the playing surface, for example a credit card, debit card or prepaid card. The sensor subsystem reads information from the financial media. For example the sensor subsystem may optically read one or more machine-readable symbols on the financial media. The machine-readable symbol may be stamped into the financial media during manufacture, for example by a bank or other entity that issues the financial media. The machine-readable symbol may be applied to the financial media during or after manufacture, for example as a label. The machine-readable symbol allows the financial media and/or player to be uniquely identified. Alternatively, the sensor subsystem may wireless interrogate a transponder carried by the financial media. Alternatively, the sensor subsystem may magnetically or inductively read information from a magnetic stripe of other material carried by the financial media. The transponder of magnetic stripe or other material may encode a unique identifier. The display subsystem may visually present an ATM type interface to the player, for example positioned next to piece of financial media on the playing surface. The interface table may allow the player to enter an amount of funds to transfer, and optionally a PIN and/or password to authorize the transaction. A debit/credit transfer from an account associate with the player (e.g., bank, credit, debit or prepaid card account) to the credit meter or virtual chip meter is completed.

Some embodiments may employ of bill or currency acceptor or validators for the entire table or one per player position. Once a credit, cash, or promotional credit voucher is inserted into the WBA bill/ticket validator the appropriate funds are credited to an account associated with the player or to a credit meter that is associated with the player at the table or arcade style gaming system. If only a single bill/ticket validator is present at the gaming system then the credit value is shown to the dealer or pit boss, who can direct the credit to the appropriate players credit meter or account. The display subsystem may provide an interface on or under the playing surface that allows the funds to be credited credit meter or account of a specific player. Funds could be credited with, or without, identifying the player by name.

Some embodiment may allow wireless transfer of funds from a personal computing device and/or wireless communications device capable of performing funds transfer, for example from an eWallet inside the device or from a remote financial institution or other points or cash funds account. Personal computing and/or wireless communications devices may take a variety of forms, for example a cell phone, iPhone, personal digital assistant (PDA), laptop computer, BLACKBERRY, TREO and other such devices. The device may establish wireless communications with the table or arcade style gaming system or with a casino patron account. Funds may be debited from or credited to the device or a remote financial account. The communication protocol may take a variety of forms, for example Bluetooth or Wi-Fi, but other standard networking protocols are envisioned as long as the protocols support security via authentication and/or encryption of the transmissions and transactions.

Some embodiment may allow players to transfer of funds from the server based (e.g., CMP/CMS) patron accounts to machine credit meters or virtual token meters of specific table or arcade style gaming systems. Such transfers may, for example, occur automatically at the commencement of each game play. The transfer may, for example, employ the GSA WAT class protocol. Alternatively, in an entirely server based gaming system where all credits are maintained on the server, there would not be a funds transfer from the server to the table game meters. The funds would be decremented from the player account automatically at commencement of play in the amount of the wager. Reports of these transactions may be automatically generated, and made electronically available to the player and/or authorized casino personnel.

In some embodiments, the table or arcade style gaming system and/or associated systems may enforce responsible gaming practices for players and casinos. For example, if a player has played a certain amount of time, a certain amount of wagers, or has a certain amount of losses, or combinations of these, further play on the virtual game layout may be blocked for the particular player. The system may produce an alert (e.g., visual, aural) such that a dealer is notified of the player crossing certain predetermined thresholds and further bets or currency conversions are disallowed. The player session may be suspended and the remaining player funds can be printed out of a printer on a cash voucher, handed to the player in the form of chips or cash, sent to the player account or any combination of these acts may occur. Once the responsible gaming triggers or events have expired, then the player may resume play on the table or arcade style gaming system, and/or at other gaming devices throughout the casino or spanning casino properties. To enforce responsible gaming, a player may be required to identify oneself prior to play, otherwise play may be prevented by the dealer, the system or both.

Detection of bets or wagers may take a variety of forms.

For example, a player may manually increment a bet meter by selecting various user selectable icons which may, for example, be displayed on or below the playing surface at the player position by a display subsystem. The displays subsystem may update a representation of a bet meter associated with the player position to indicate an increase, while updating a representation of a credit meter or virtual token meter to indicate a consequent reduction.

Also for example, a player may place one or more casino chips into a demarcated wagering area such as a bet circle that forms part of the virtual game layout displayed on or below the playing surface by the display subsystem. The sensor subsystem may detect a number and/or amount or value of the chips. For instance, the chips may be optically coded and the sensor subsystem may read a chip identifier, chip value and/or casino identifier. Bally Technologies currently employs a series of color transitions about the peripheral edge of the chip to optically identify the value of a chip and the issuing casino. Such patterns are distinguishable to readers (optical scanners and imagers). These chip identifiers may be are associated to a value via a database, such as a lookup table. Alternatively, or additionally, the chips may have wireless transponders, such as RFID transponders or EAS type transponders, which may be wireless interrogated via interrogation devices of the sensor subsystem. The interrogation devices may read a unique identifier, chip value and/or casino identifier from each chip. Again, the identifiers may be associate to a value via a database. The interrogation devices may determine a sum total of the chips in each demarcated area.

As another example, a player may employ a combination of the virtual chips or credit meter betting and/or detection of physical chips. The total value of credits bet with the credit meter and with physical chips may be combined to a total credit bet or wager for the game play.

If the appropriate minimum/maximum bets conditions are not met by a player or players, the table or arcade style gaming system may indicate such (visually, aurally), for example causing the display subsystem to display an indication of the discrepancy and/or an message that encourages players to provide sufficient funds to begin play. If the sensor subsystem is not able to read the physical chips located in the demarcated wagering area or bet circle, the gaming system may produce a suitable indication, for example a visual indication that notifies one or more participants that the physical chips need to be spread out to get an accurate reading.

Under certain conditions a player may be provided an opportunity to buy insurance for as hand or to double down a bet. At this time the player may have to apply more funds into the active game. Any of the above approaches may be used.

Some non-limiting examples of suitable machine-readable symbologies may include EAN-13, EAN-8, UPC-A, UPC-E, Code 11, Interleaved 2 of 5, Industrial 2 of 5, Standard 2 of 5, Codabar, Plessey, MSI, PostNet, Code 39, Code 93, Code 39i, Code 128, LOGMARS, PDF417, DataMatrix, Maxicode, QR Code, ISSN, SISAC, etc. As described above, symbols formed of symbol characters selected from an appropriate symbology may be applied to game related pieces such as playing cards, chips, dice, tokens, tiles, markers spinners and/or pieces of media such as loyalty program or patron club cards, credit cards, debit cards and/or prepaid cards.

In some embodiments, the sensor subsystem employs optical recognitions (e.g., scanning or imaging) which may, for example be used to read a machine-readable symbol using infrared (IR), visible light or other wavelengths of electromagnetic energy. Processing of the read symbols may employ conventional machine-readable processing techniques, for example edge/pattern detection algorithms. In some embodiments machine-readable symbol processing logic may be used to identify or determine a unique identifier from a pattern. The identifier may be associated with other information via a database or lookup table. Consequently, a gaming system may employ a unique identifier to obtain additional information. For example, a database may associate unique identifiers with the values of respective physical chips carrying the identifiers. Also for example, a player identifier (e.g., ID 123456789 or Bryan Kelly-Platinum level player) may be read from a piece of media such as a loyalty program or patron club card. As a further example, the sensor subsystem may read a card identifier from a playing card. A database may relate the card identifier to playing card rank and/or suit, as well as a casino identifier. The display subsystem may produce an appropriate visual display on the virtual gaming layout indicative of a characteristic or identity of a physical object (game related pieces, pieces of media, etc.). The display subsystem may also produce visual cues around or near the physical objects to indicate to the players and/or dealer that the physical object has been properly detected or read by the sensor subsystem. Any fault or non-reading condition can be timely addressed by the appropriate personnel or player.

The table and/or arcade system gaming system may allow certain patron club levels or player types to receive enhanced and/or modified games, extra features and/or options. For example, a high level player (e.g., gold members) may receive different bonus cards or more bonus cards than other levels (e.g., silver members). Each player type or level may receive different bonus games and/or bonus features unique to the particular level. These extra features may be targeted to one or more players at the table, and typically are designed so as not affect play of the other players in the game. However, in some embodiments, bonus features may affect other players, even adversely affecting other player. Also, the table gaming or arcade/casino style gaming system may be configured to reward specific actions by a player or events, for example providing a bonus to the player upon occurrence of the action or event. Such may, for instance, include providing a bonus game, bonus playing card, bonus dice throw, and/or bonus spin upon a significant loss or loss rate by the player in a primary game. The bonus game, bonus playing card, bonus dice throw, and/or bonus spin may be displayed by the display subsystem. Such a bonus game, bonus playing card, bonus dice throw, and/or bonus spin may combine with the primary game in progress or be separate or distinct from the primary game. Examples of bonuses include a progressive win, one or more bonus games, one or more bonus playing cards, one or more bonus dice rolls, one or more insurance markers, additional game related pieces or free play to be used at time of the players choosing. Bonuses may be awarded on occurrence of a variety of events. For example, a bonus may be awarded when a player wagers a defined amount or defined cumulative amount, either on one bet or over a period of time. A bonus may be awarded when a player loses a defined amount on one bet or over a period of time. A bonus may be awarded when a player plays for a defined period of time, wagers at a defined rate (e.g., amount per time), and/or if a total value of a player to the casino exceeds one or more thresholds. The display subsystem may display a list of bonuses and/or activities that earn bonuses on or below the playing surface. The list of bonuses may be customized to each player. The display may include user selectable icons which a player may activate to select between various offered bonuses. Example bonuses may include: services, an additional chance to win the primary game, a bonus game, a physical prize, or right to participate in some compelling event that enhances the total player experience. Awarding of bonuses may be related to the table seat, player identifier, player club level, casino identifier, a jurisdictional identifier, table identifier, group of tables, and/or combinations thereof. These player preferences may be stored in the player account for automatic retrieval at next table gaming session time, allowing the gaming system to offer a player their preferred games or other bonuses.

Table games inherently provide a good environment for implementing group play (e.g., cooperative play between two or more players). The various table gaming system embodiments previously discussed facilitate group play, allowing players to, for example, exchange game related pieces (e.g., playing cards, chips, tokens, markers, tiles, spinners) since and table gaming system can track which players have which game related pieces. Such may facilitate team play. For example, two or more players may be able to join together with their physical game related pieces and compete with other players or teams of players located at the same gaming table or spanning multiple gaming tables. The display subsystem(s) may display visual representations of the physical game related pieces and/or virtual game related pieces to each team. The display may show either the team's own game related pieces, the other teams' game related pieces, or both. The combination of the virtual game layout and physical game related pieces enables players at different seats or locations to play completely different games from each other. For example, there may be a common dealer dealing the playing cards to the players, but each player can play by different rules. The computing subsystem may track by player which game, pay tables and/or rules apply.

Alternatively or additionally, some games require a minimum number of players may be required to start a table game, for example two players in addition to the dealer to begin play. If there are not enough players at a first gaming table to start the game, the gaming system may allow players at other gaming tables to join in the game at the first gaming table. Some embodiments may provide a virtual player, for example placing wagers with virtual chips and playing out virtual hands. This may allow a game to proceed where there would not otherwise be a sufficient number of players, and/or may enhance the entertainment experience for physical players. Such may be particularly suitable for games where players are not in competition with one another, but rather compete against the dealer or house, since the decisions of the virtual player will be unlikely to adversely affect the physical player. Such may also be applied to games where players compete against one another, for example by using a random number generator to determine the actions (e.g., hit or stay, change wager, etc.) that the virtual player will take.

This may even span casino properties. Such an approach may, for example, allow a large poker tournament to be conducted without requiring players to travel to a common site. The players could, for example, play from multiple local sites hosting the competition play, and play against players at remote sites via networked table gaming systems such as those previously described. Some players may play using virtual playing cards while others may play using physical playing cards, and still other may play using a combination of virtual and physical playing cards. In some embodiments, the display system(s) may display all of the other player's visible cards and wagers to each player. Such may enhance to player experience, as if all players were physically present at the same gaming table. The display subsystem(s) may display visual representations of the physical playing cards dealt to or held by the dealer or other game related pieces throughout the casino and/or spanning multiple casino. The grouping of players from different gaming tables may be done by a dealer or PIT BOSS. Alternatively, a group play server may automatically assign players to appropriate gaming tables as necessary to fill the gaming tables. Alternately, a player may be presented with a list of remote gaming tables having openings and may select a gaming table to join or a player may create ones own virtual table to invite others to play at.

At the end of a hand of play the dealer may distribute the appropriate funds to the player, for example in the form of physical chips, or electronic credits for instance to a player account, table credit meter or virtual chips associated with the player. The sensing subsystem can read physical chips awarded to the player and compare the award against a known pay table for the game and the amount of the player's wager to ensure that the payout was correct. The gaming system may provide an indication (visual, aural) if the payout is incorrect. The notification may be to the player, the dealer, pit boss or other casino personnel. In some embodiments, the computing subsystem or some other system may automatically determine and award the appropriate pay out, with or without dealer interaction. The appropriate payout may be determined using a known pay table stored electronically and the amount of the player's wager. The appropriate payout may be automatically added to the credit meter, virtual chips, or directly placed into a player account associated with the player. The display subsystem may display the proper pay out to the player and/or dealer on or below the playing surface. This display may be sufficiently large such that one or more surveillance cameras can capture the displayed values for later use if needed. The display subsystem may provide visual prompt to the player, inquiring whether the player would like their wager and/or winnings to ride on the outcome of a next game or hand (e.g., double or nothing). Some embodiments may employ credit meters, virtual chips and player accounts in lieu of physical chips, advantageously relieving the dealer from having to calculate payouts or manual handle physical chips. Such may also advantageously eliminate the need to service tables to replenish the table bank.

Using a surface computing approach may provide numerous advantages over traditional touch screens. For example, a surface computing system is capable handling multi-touch interaction, recognizing dozens and dozens of touches simultaneously, including fingers, hands, gestures and objects placed on the playing surface. Surface computing recognizes many points of contact simultaneously, not just from one finger as with a typical touch screen, but up to dozens and dozens of items at once. Additionally, users can actually "grab" digital information with their hands and interact with content through touch and gesture, without the use of a mouse or keyboard. Users can place physical objects on the surface to trigger different types of digital responses, including the transfer of digital content. The surface computing environment facilitates interaction between virtual or animated objects and physical objects. Also, the surface computing interface rarely or never needs recalibration as compared to traditional touch screens. Further, the horizontal form factor associated with surface computing makes it easy for several people to gather around a surface computer together, providing a collaborative, face-to-face experience. Further, the surface computing device can be designed to be easily cleaned and provide a water tight surface.

Employing a virtual or video representation of a game layout allows casino owners to dynamically reprogram or assign which table games are available on the floor at anyone time. For example, if there are too many blackjack tables, some may be quick and easily reconfigured into another type of game, for example baccarat. This allows for optimal configuration of the table game floor to maximize revenue. For example, in the middle of the week a casino can open the table games up to traditional video slot stations without requiring a dealer at the table. Surface computing table games allow the casino to dynamically re-apportion their floor mix from table games to traditional video games at the time of their choosing to maximize revenue.

In some embodiments, the playing surface, a portion thereof, the playfield, the game related or play pieces may be varied or changed. Some non-limiting examples of possible changes include: rotation, moved, or scaled. Such changes may be applied, for example, by a player, a dealer, or the gaming system itself to create a more optimal viewing and entertainment presentation. User hand gestures or button presses may allow the surface or portion of the surface to move around. This is optimal for a turns based game experience where each player takes turns in succession to another. Once a persons turn is over then the entire virtual surface re-orientates itself to the next player whose turn it is.

Software may be update over a network or other communications channel, eliminating the inconvenience of manually changing software. Changing game software, buttons, and displays may all be accomplished via software downloaded to the table or arcade style gaming system.

All game functions may occur on the playing surface interface. Media such as a loyalty program card, player's card or even an identity card or financial card may allow table ratings, slot ratings, promotional activity, electronic funds transfer (EFT) transfers, as well as traditional player tracking and accounting functions. Such media may be automatically read when placed in the playing surface of a gaming table. Such media may, for example, include machine-readable symbols and/or transponders such as RFID or EAS circuits. In some embodiments, appropriately equipped digital music players and/or cellphones may be located on the playing surface to hold EFT transfers or other player data.

The various previously described embodiments bring a truly interactive experience to the player, for example offering the player help with various games, basic rules and/or strategies. A dealer can be a real person or electronic. The type of game being played at the gaming table can be easily changed to suit the player's demand. Thus, games offerings may be modified, for example during peak times, without changing felt. With machine-readable chips and playing cards (e.g., machine-readable symbols, RFID or EAS type transponders), cheating and dealer or player error will be detectable with the surface table gaming system automatically recognizing which playing cards are in play and which chips have been wagered. Players may be able to "buy in" chips by locating a credit, debit or prepaid card or other media on the playing surface.

Table gaming systems could be used to open new areas of a resort to gaming, beyond the traditional gaming floors or rooms. For example, the table gaming system may be used as a restaurant table. A player would be able to play while waiting for food, and/or play while dining. Such may allow a group in the restaurant to play at a four top and have cocktails, appetizers, lunch, dinner while playing a game either together or separately based on the table configuration.

Table gaming systems may be set up in hotel rooms or poolside. Menu and ordering functions may provide quicker, more accurate service to patrons. Orders for room service may be printed or electronically logged based on the selections made from a table gaming system location in a patron's room. Patrons would also be able to play games while in their rooms, away from the traditional gaming floors. Thus gaming could be expanded throughout a resort if the jurisdiction allows gaming beyond the traditional gaming areas.

The table gaming systems may also allow menus to be displayed, and orders for food and beverages placed in traditional gaming floor or rooms, enhancing the gaming atmosphere. The table gaming systems may allow expansion of game types, for example bring board type games to the more traditional casino or resort experience.

The table gaming systems may dramatically change the look of the casino floor. Gaming may be provided in rectangular bars and/or carousels that are serviced by servers based orders submitted by the players through the table surface interface, while the players continue to play. Long table tops may better accommodate patrons. Patrons may even have their own access to the news and other information via connections to the Internet or World Wide Web from the table surface interface. Some embodiments provide a fully paperless solution where cards and media are read from the playing surface and accounts are also debited and credited though the table surface interface.

Additionally, or alternatively, displays may be carried or otherwise associated with one or more communications devices, for example handheld wireless communications devices such as personal digital assistants (PDAs), BLACK-BERRY® or TREO® type devices, and/or cellular phones. The computing subsystem can cause the to display virtual game layouts including gaming related information regarding the game as well as other information.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the teachings, as will be recognized by those skilled in the relevant art. The teachings provided herein can be applied to other playing card distributing systems, not necessarily the exemplary playing card handling systems generally described above.

For example, in some embodiments, the playing cards used are standard playing cards from one or more standard decks of fifty-two (52) playing cards. The standard playing cards have a uniform back and the faces each bear a respective combination of a first primary symbol and a second primary symbol. The first primary symbol is selected from a standard set of playing card rank symbols comprising: 2, 3, 4, 5, 6, 7, 8, 9, 10, J, Q, K, and A; and the second primary symbol is selected from a standard set of playing card suit symbols comprising: ♥, ♣, , ♦, and ♠). . One or more of the primary symbols may identify a value of the playing card under the rules of a specific card game. For example, in blackjack or twenty-one the ranks 2-10 are worth 2-10 points respectively, the ranks J-K are each worth 10 points, and the rank A is worth 10 or 1 point at the player's option. In other embodiments, the playing cards may have other symbols, graphics, backings, etc., and may even be modified within the playing card handling system 120 to add, enhance, or alter the value or significance of the playing card. In one embodiment, the playing cards are dual sided playing cards as described in U.S. patent application Ser. No. 10/902,436, which published on Jun. 2, 2005.

Some of the methods discussed above employ the generation of random numbers or values and some of the structures discussed above refer to random number generators (RNGs). While referred to herein and in the claims as being a random number or value and/or RNG, such terms encompass numbers and values as well as generators that are not truly random in the mathematical sense, such as those sometimes referred to as being pseudo-random. In some embodiments, the random number generator may take the form of a discrete analog or digital component. In other embodiments the RNG may take the form of a controller such as a microcontroller, microprocessor, digital signal processor, application specific integrated circuit or field programmable gate array executing suitable instructions to provide an RNG function.

In some embodiments, the RNG randomly determines or selects one or more chances from a domain of chances. In some embodiments, the domain may be fixed, while other embodiments may vary the domain. For example, the domain may be varied to match the number of chances provided to the players, or to adjust a probability of winning or payout. In some embodiments, parameters for a RNG function may be selected or varied to achieve a desired set of odds or payout. In some embodiments, the particular RNG function may be selected to achieve the a desired set of odds or payout.

The chances may take a variety of forms. The chances may take the form virtual chances in the form of electronic or other data that represent or are otherwise indicative of a value (e.g., integer or serial number) or identity (e.g., alpha-numeric string). The virtual chances may be provided or allocated to a player from a domain of virtual chances. Provision or allocation may take place in a computer-readable memory or other storage element, for example as relationships in a database or other data structure. The domain of virtual chances may be fixed or generated on the fly.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. Nos. 60/130,368, filed Apr. 21, 1999; 60/259,658, filed Jan. 4, 2001; 60/296,866, filed Jun. 8, 2001; 60/300,253, filed Jun. 21, 2001; 60/716,538, filed Sep. 12, 2005; 60/791,549, filed Apr. 12, 2006; 60/791,554, filed Apr. 12, 2006; 60/791,398, filed Apr. 12, 2006; 60/791,513, filed Apr. 12, 2006; and 60/808,161, filed May 23, 2006; and U.S. nonprovisional patent application Ser. No. 09/474,858, filed Dec. 30, 1999, and issued as U.S. Pat. No. 6,460,848 on Oct. 8, 2002; Ser. No. 09/849,456, filed May 4, 2001, and issued as U.S. Pat. No. 6,652,379 on Nov. 25, 2003; Ser. No. 09/790,480, filed Feb. 21, 2001, and issued as U.S. Pat. No. 6,685,568 on Feb. 3, 2004; Ser. No. 10/017,276, filed Dec. 13, 2001; Ser. No. 10/885,875, filed Jul. 7, 2004; Ser. No. 10/902,436, filed Jul. 29, 2004; Ser. No. 10/981,132, filed Nov. 3, 2004; Ser. No. 10/934,785, filed Sep. 2, 2004; and Ser. No. 10/823,051, filed Apr. 13, 2004, filed are incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A game playing system, comprising:
a display subsystem configured to display images related to one or more games to be played on at least one game playing surface, the images including a virtual game layout including a number of demarcations of at least one area associated with the play of the one or more games;
a sensor subsystem configured to detect a number of physical game related pieces placed at any location on the virtual game layout displayed on the at least one game playing surface; and
at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface by the sensor subsystem:
acquire unique, non-player specific, identification data for each of the detected number of physical game related pieces using identification data carried by each respective one of the detected number of game pieces;
determine whether each of the detected number of physical game related pieces are newly placed on the virtual game layout displayed on the at least one game playing surface or were previously placed on the virtual game layout displayed on the at least one game playing surface using the acquired unique identification data;
for those physical game related pieces identified as newly placed, logically associate the unique identification data for the respective physical game related piece with at least one game player and validate at least one game specific attribute of the respective physical game related piece using the respective unique identification data and a database storing particular information regarding the respective physical game related piece;
responsive to a successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout.

2. The game playing system of claim 1, further comprising:
at least a first game playing surface on which at least a portion of the one or more games is playable, wherein the display subsystem is positioned to display the images such that the demarcations at least appear to be on or below the first game playing surface.

3. The game playing system of claim 1 wherein the display subsystem includes at least one display device selected from the group consisting of a cathode ray tube display, a liquid crystal (LCD) display, a liquid crystal on silicon (LCoS) display, a plasma display, a digital light processing (DLP) display or a projector.

4. The game playing system of claim 1, further comprising:
at least a first game playing surface on which at least a portion of the one or more games is playable with at least one of the number of physical game related pieces, and wherein the display subsystem includes at least one display device positioned relatively below or relatively above the first game playing surface.

5. The game playing system of claim 1, further comprising:
at least a first game playing surface on which at least a portion of the one or more games is playable with at least one of the number of physical gaming related pieces located there upon, and wherein the first game playing surface is at least approximately horizontal with respect to a floor and sized to accommodate at least two participants.

6. The game playing system of claim 1, further comprising:
at least a first game playing surface on which at least a portion of the one or more games is playable, the first game playing surface forming a portion of a table top or a bar top.

7. The game playing system of claim 1, further comprising:
at least a first game playing surface on which at least a portion of the one or more games is playable, and wherein the first game playing surface is part of a slant top or vertical gaming machine.

8. The game playing system of claim 1 wherein the display subsystem includes a plurality of display devices and the at least one computing subsystem is configured to cause at least two of the display devices to each display a respective portion of the virtual game layout such that the virtual game layout formed by the portions of the virtual game layout is continuous.

9. The game playing system of claim 1, further comprising:
at least a first game playing surface on which at least a portion of the one or more games is playable; and
at least a second game playing surface on which at least a portion of the one or more games is playable, where the sensor subsystem is configured to detect at least one of the number of physical game related pieces when the respective at least one physical game related piece is located on the first game playing surface and when the respective at least one physical game related piece is located on the second game playing surface.

10. The game playing system of claim 1, further comprising:
at least a first game playing surface on which at least a portion of the one or more games is playable; and
at least a second game playing surface on which at least a portion of the one or more games is playable, wherein the display subsystem includes a first display device and at least a second display device, the first display device positioned to display the images on or under the first game playing surface and the second display device positioned to display the images on or under the second game playing surface.

11. The game playing system of claim 1 wherein the computing subsystem is configured cause the display subsystem to display the virtual game layout at a different orientation than previously displayed between portions of the games.

12. The game playing system of claim 1 wherein the computing subsystem is configured cause the display subsystem to update a display of information in response to a movement of at least one of the number of physical game related pieces between at least two game playing surfaces.

13. The game playing system of claim 1 wherein the display subsystem and the sensor subsystem are remotely located from the computing subsystem.

14. The game playing system of claim 1 wherein the display subsystem and the sensor subsystem are located in a wireless communications device.

15. The game playing system of claim 1 wherein the display subsystem and the sensor subsystem are collocated remotely from a gaming floor of a gaming premises.

16. The game playing system of claim 1 wherein the display subsystem and the sensor subsystem are collocated remotely from a gaming premises.

17. The game playing system of claim 1 wherein the display subsystem and the sensor subsystem are collocated remotely from a gaming premises, and the display subsystem displays representative of physical game related pieces in use at a gaming table.

18. The game playing system of claim 1 wherein the virtual game layout comprises a casino table game.

19. The game playing system of claim 1 wherein the at least one computing subsystem controls the display subsystem to display images of a menu including icons representing a number of items that may be ordered, and the sensor subsystem is configured to detect participant selections of the icons indicative of a participant request for the item represented by the selected one of the icons.

20. The game playing system of claim 1 wherein the at least one computing subsystem controls the display subsystem to display images indicative of participant account information for at least one participant in the at least one game.

21. The game playing system of claim 1 wherein the at least one computing subsystem controls the display subsystem to display images indicative of at least one characteristic of the game related piece.

22. The game playing system of claim 1 wherein the computing subsystem is configured to determine a value indicative of a net worth of the game participant based at least in part on information received from the sensor subsystem indicative of the at least one aspect of the physical game related piece sensed by the sensor subsystem.

23. The game playing system of claim 1 wherein the computing subsystem is configured cause the display subsystem to display instructive information regarding the at least one game.

24. The game playing system of claim 1 wherein the computing subsystem is configured cause the display subsystem to display video information regarding the at least one game.

25. A game playing system, comprising:
a display subsystem configured to display images related to one or more games to be played on at least one game playing surface, the images including a virtual game layout including a number of demarcations of at least one area associated with the play of the one or more games;
a sensor subsystem configured to detect a number of physical game related pieces placed at any location on the virtual game layout displayed on the at least one game playing surface; and
at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface:
uniquely identify each of the number of physical game related pieces using unique, non-player specific, identification data carried by each respective one of the detected number of game pieces;
determine whether each of the detected number of physical game related pieces are newly placed on the virtual game layout displayed on the at least one game playing surface or were previously placed on the virtual game layout displayed on the at least one game playing surface using the acquired unique identification data;

for those physical game related pieces identified as newly placed, logically associate the unique identification data for the respective physical game related piece with at least one game participant and validate at least one game specific attribute of the respective physical game related piece using the respective unique identification data and a database storing particular information regarding the respective physical game related piece;

responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and wherein the sensor subsystem includes one or more sensors configured to detect at least one of: a presence/absence of the physical game related piece from at least a portion of at least one game playing surface, a position of the physical game related piece on the at least one game playing surface or an orientation of the physical game related piece with respect to the at least one game playing surface.

26. The game playing system of claim 25 wherein the sensor subsystem includes one or more optical sensors to optically detect at least some of the number of physical game related pieces.

27. The game playing system of claim 25 wherein the sensor subsystem includes one or more machine-readable symbol readers to optically detect a machine-readable symbol carried by at least some of the number of physical game related pieces.

28. The game playing system of claim 25 wherein the sensor subsystem includes one or more sensors to inductively or magnetically detect at least some of the number of physical game related pieces.

29. The game playing system of claim 25 wherein the sensor subsystem includes one or more interrogators to wirelessly interrogate at least one of a radio frequency identification transponder or a resonant circuit carried by at least some of the number of physical game related pieces.

30. The game playing system of claim 25 wherein the at least one physical game related piece is at least one of a playing card, a chip, a marker, a multisided die, a tile, a token, or a spinner.

31. The game playing system of claim 25 wherein the sensor subsystem is configured to detect a number of spots on a face of at least one die positioned at any location on the virtual game layout displayed on the at least one game playing surface.

32. The game playing system of claim 25 wherein the sensor subsystem is configured to detect a machine-readable symbol on a face of at least one die positioned at any location on the virtual game layout displayed on the at least one game playing surface.

33. The game playing system of claim 25 wherein the sensor subsystem is configured to read information from a radio frequency identification transponder carried by at least one die.

34. The game playing system of claim 25 wherein the computing subsystem receives information indicative of respective ones of the number of physical game related pieces associated with each of at least two different participants at a single game playing surface playing a single game.

35. The game playing system of claim 25 wherein the computing subsystem receives information indicative of respective ones of the number of physical game related pieces associated with each of at least two different participants at a respective game playing surfaces playing a single game.

36. The game playing system of claim 25 wherein the computing subsystem receives information indicative of respective ones of the number of physical game related pieces associated with each of at least two different participants at a respective game playing surfaces playing in respective games.

37. The game playing system of claim 25 wherein the sensor subsystem is configured to detect chips within a back betting area associated with a primary participant playing a game.

38. The game playing system of claim 25 wherein the sensor subsystem is configured to detect chips within a demarcated back betting area associated with a primary participant playing a game.

39. A game playing system, comprising:

a display subsystem configured to display images related to one or more games to be played on at least one game playing surface, the images including a virtual game layout including a number of demarcations of at least one area associated with the play of the one or more games;

a sensor subsystem configured to detect a number of physical game related pieces placed at any location on the virtual game layout displayed on the at least one game playing surface; and at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface:

uniquely identify each of the number of physical game related pieces using non-player specific identification data carried by each respective one of the detected number of game pieces;

determine whether each of the detected number of physical game related pieces are newly placed on the virtual game layout displayed on the at least one game playing surface or were previously placed on the virtual game layout displayed on the at least one game playing surface using the acquired unique identification data;

for those physical game related pieces identified as newly placed, logically associate the unique identification data carried by the respective physical game related piece with at least one game participant and validate at least one game specific attribute of the at least one physical game related piece using the respective unique identification data and a database storing particular information regarding the respective physical game related piece;

responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and wherein the sensor subsystem includes one or more sensor devices configured to read at least one of participant identification media or financial media carried by the at least one game playing surface.

40. The game playing system of claim 39 wherein the one or more sensor devices of the sensor subsystem includes one or more optical readers configured to read at least one machine-readable symbol from at least one of the participant identification media or financial media located on the at least one game playing surface of the game playing system.

41. The game playing system of claim 39 wherein the one or more sensor devices of the sensor subsystem includes one or more interrogators configured to wireless read information from at least one memory of at least one of the participant identification media or financial media located at least proximate the at least one game playing surface of the game playing system.

42. The game playing system of claim 39 wherein the one or more sensor devices of the sensor subsystem includes one or more readers configured to read at least one of a loyalty program card, a credit card, a debit card or a prepaid card.

43. The game playing system of claim 39 wherein the one or more sensor devices of the sensor subsystem includes one or more readers configured to read information from at least one of a loyalty program card, a credit card, a debit card or a prepaid card and the at least one computing subsystem is configured to transfer funds between a financial institution and a participant account based at least in part on the read information.

44. The game playing system of claim 39, further comprising:
a reader configured to read at least one of participant identification media or financial media at least partially inserted in the sensor device.

45. A game playing system, comprising:
a display subsystem configured to display images related to one or more games to be played on at least one game playing surface, the images including a virtual game layout including a number of demarcations of at least one area associated with the play of the one or more games;
a sensor subsystem configured to detect a number of physical game related pieces placed at any location the virtual game layout displayed on the at least one game playing surface; and
at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface:
uniquely identify each of the number of physical game related pieces using non-player specific identification data carried by each respective one of the detected number of physical game related pieces;
determine whether each of the detected number of physical game related pieces are newly placed on the virtual game layout displayed on the at least one game playing surface or were previously placed on the virtual game layout displayed on the at least one game playing surface using the acquired unique identification data;
for those physical game related pieces identified as newly placed, logically associate the unique identification data carried by the respective physical game related piece with at least one game participant and validate at least one game specific attribute of the respective physical game related piece using the respective unique identification data and a database storing particular information regarding the respective physical game related piece;
responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and
wherein the at least one computing subsystem is configured to randomly generate a value.

46. The game playing system of claim 45 wherein the at least one computing subsystem is configured to cause the display subsystem to display an image of an indicator that is indicative of the randomly generated value.

47. The game playing system of claim 45 wherein the at least one computing subsystem is configured to cause the display subsystem to display an image of an indicator that is indicative of the randomly generated value in the form of at least one of a portion of a spinner, a die, a roulette wheel, a playing card, or a bonus card.

48. The game playing system of claim 45 wherein the at least one computing subsystem is configured to cause the display subsystem to display an image of an indicator that is indicative of the randomly generated value in the form of at least one virtual playing card that is combinable with at least one physical playing card to form a hand.

49. The game playing system of claim 45 wherein the at least one computing subsystem is configured to cause the display subsystem to display an image of an indicator that is indicative of the randomly generated value in the form of at least one of a bonus, a progressive jackpot, or a promotional reward.

50. A game playing system, comprising:
a display subsystem configured to display images related to one or more games to be played on at least one game playing surface, the images including a virtual game layout including a number of demarcations of at least one area associated with the play of the one or more games;
a sensor subsystem configured to detect a number of physical game related pieces placed at any location on the virtual game layout displayed on the at least one game playing surface; and
at least one computing subsystem communicatively coupled to the display subsystem to control the images displayed by the display subsystem and communicatively coupled to the sensor subsystem to, responsive to the detection of the placement of the number of physical game related pieces on the virtual game layout on the at least one game playing surface by the sensor subsystem:

uniquely identify each of the number of physical game related pieces using non-player specific identification data carried by each respective one of the detected number of game pieces;

determine whether each of the detected number of physical game related pieces are newly placed on the virtual game layout displayed on the at least one game playing surface or were previously placed on the virtual game layout displayed on the at least one game playing surface using the acquired unique identification data;

for those physical game related pieces identified as newly placed, logically associate the unique identification data carried by the respective physical game related piece with at least one game participant and validate at least one game specific attribute of the respective physical game related piece using the respective unique identification data and a database storing particular information regarding the respective physical game related piece;

responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and wherein the at least one computing subsystem is configured to cause the display subsystem to display an image of an indicator that is indicative of a virtual bonus game.

51. The game playing system of claim 50 wherein the at least one computing subsystem is configured to cause the display subsystem to display the image of the indicator that is indicative of the virtual bonus game based on an occurrence of an event.

52. The game playing system of claim 50 wherein the at least one computing subsystem is configured to cause the display subsystem to display the image of the indicator that is indicative of the virtual bonus game based on an occurrence of an appearance of defined physical card or a combination of physical cards.

53. A game playing system, comprising:

a display subsystem configured to display images related to one or more games to be played on at least one game playing surface, the images including a virtual game layout including a number of demarcations of at least one area associated with the play of the one or more games;

a sensor subsystem that in use detects a number of physical game related pieces placed at any location on the virtual game layout displayed on the at least one game playing surface; and at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the game playing surface by the sensor subsystem:

uniquely identify each of the number of physical game related pieces using non-player specific identification data carried by each respective one of the detected number of game pieces;

determine whether each of the detected number of physical game related pieces are newly placed on the virtual game layout displayed on the at least one game playing surface or were previously placed on the virtual game layout displayed on the at least one game playing surface using the acquired unique identification data;

for those physical game related pieces identified as newly placed, logically associate the unique identification data carried by the respective physical game related piece with at least one game participant and validate at least one game specific attribute of the respective physical game related piece using the respective unique identification data and a database storing particular information regarding the respective physical game related piece;

responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and a participant interface subsystem communicatively coupled to the at least one computing system, wherein the display subsystem displays images of a number of participant selectable icons, and the participant interface subsystem provides signals indicative of selected ones of the participant selectable icons in response to detection of participant selection of the participant selectable icons.

54. The game playing system of claim 53 wherein the participant interface subsystem includes at least one participant selectable key.

55. A game playing system, comprising:

a display subsystem configured to display images related to one or more games to be played on at least one game playing surface, the images including a virtual game layout including a number of demarcations of at least one area associated with the play of the one or more games;

a sensor subsystem configured to detect a number of physical game related pieces placed at any location on the virtual game layout displayed on the at least one game playing surface; and at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface by the sensor subsystem:

uniquely identify each of the number of physical game related pieces using non-player specific identification data carried by each respective one of the detected number of game pieces;

determine whether each of the detected number of physical game related pieces are newly placed on the virtual game layout displayed on the at least one game playing surface or were previously placed on the virtual game layout displayed on the at least one game playing surface using the acquired unique identification data;

for those physical game related pieces identified as newly placed, logically associate the unique identification data carried by the respective physical game related piece with at least one game participant and validate at least one game specific attribute of the respective physical game related piece using the respective unique identification data a database storing particular information regarding the respective physical game related piece;

responsive to the successful validation of all physical game related pieces identified as newly placed on the virtual game layout displayed on the at least one game playing surface, and responsive to the physical game related pieces identified as newly placed and the physical game related pieces identified as previously placed on the virtual game layout displayed on the at least one game playing surface, cause the display of at least one previously undisplayed virtual game related element on the virtual game layout; and wherein the display subsystem displays a first virtual game layout with a first set of demarcations during a first period and displays a second virtual game layout with a second set of demarcations during a second period, the second set of demarcations different from the first set of demarcations.

56. The game playing system of claim 55 wherein the display subsystem displays the first virtual game layout with a set of blackjack demarcations during the first period and displays the second virtual game layout with the set of poker demarcations during a second period.

57. The game playing system of claim 55 wherein the display subsystem displays the first virtual game layout with a set of demarcations of a first board game during the first period and displays the second virtual game layout with a set of demarcations of a second board game during the second period.

58. A game playing system, comprising:
a display subsystem configured to display images related to one or more games to be played on at least one game playing surface, the images including a virtual game layout including a number of demarcations of at least one area associated with the play of the one or more games;
a sensor subsystem configured to detect a number of physical game related pieces placed at any location on the virtual game layout displayed on the at least one game playing surface; and
at least one computing subsystem communicatively coupled to the display subsystem to control the images displayed by the display subsystem and communicatively coupled to the sensor subsystem to, responsive to the detection of the placement of the number of physical game related pieces on the virtual game layout displayed on the at least one game playing surface by the sensor subsystem:
uniquely identify each of the number of physical game related pieces using non-player specific identification data carried by each respective one of the detected number of game pieces;
determine whether each of the detected number of physical game related pieces are newly placed on the virtual game layout displayed on the at least one game playing surface or were previously placed on the virtual game layout displayed on the at least one game playing surface using the acquired unique identification data;
for those physical game related pieces identified as newly placed, logically associate the unique identification data carried by the respective physical game related piece with at least one game player and validate at least one game specific attribute of the respective physical game related piece using the respective unique identification data and a database storing particular information regarding the respective physical game related piece;
responsive to the successful validation of all physical game related pieces identified as newly placed on the virtual game layout displayed on the at least one game playing surface, and responsive to the physical game related pieces identified as newly placed and to the physical game related pieces identified as previously placed on the virtual game layout displayed on the at least one game playing surface, cause the display of at least one previously undisplayed virtual game related element on the virtual game layout; and
wherein the computing subsystem is configured cause the display subsystem to display representations of one or more virtual chips, one or more virtual playing cards, or one or more virtual dice.

59. The game playing system of claim 58 wherein the computing subsystem is configured cause the display subsystem to display information that is indicative of a previous location of at least one of the number of physical game related pieces.

60. The game playing system of claim 58 wherein the computing subsystem is configured cause the display subsystem to display information that is indicative of a current location of at least one of the number of physical game related pieces.

61. The game playing system of claim 58 wherein the computing subsystem is configured cause the display subsystem to display information that is indicative of a next location of at least one of the number of physical game related pieces.

62. The game playing system of claim 58 wherein the computing subsystem is configured cause the display subsystem to highlight an area surrounding a physical playing card on a game playing surface.

63. The game playing system of claim 58 wherein the computing subsystem is configured cause the display subsystem to display an area surrounding at least one of a virtual playing card or a physical playing card on a game playing surface that form part of a bonus combination.

64. The game playing system of claim 58 wherein the game related pieces include at least a pair of physical dice and the computing subsystem is configured cause the display subsystem to highlight an area surrounding each of the dice on a game playing surface.

65. The game playing system of claim 58 wherein the computing subsystem is configured cause the display subsystem to display at least a virtual pair of dice with a pattern that matches a pattern of a physical pair of dice that have been rolled.

66. The game playing system of claim 58 wherein the computing subsystem is configured cause the display subsystem to display information indicative of a history of previous rolls of dice.

67. The game playing system of claim 58 wherein the computing subsystem is configured cause the display subsystem to display information indicative of a history of previous rolls of dice and the sensor subsystem is configured to detect selections of participants identifying an outcome of a future roll of dice.

68. The game playing system of claim 1 wherein the at least one physical game related piece is selected from the group of physical game related pieces consisting of: a playing card, a die, a roulette ball and pai-gow tiles.

69. The game playing system of claim 1 wherein the at least one at least one computing subsystem generates an alert output responsive to an unsuccessful validation of at least one physical game related piece identified as newly placed on the virtual game layout
   displayed on the at least one game playing surface.

* * * * *